US009638093B2

(12) United States Patent
Blank

(10) Patent No.: US 9,638,093 B2
(45) Date of Patent: May 2, 2017

(54) COMBUSTION CONTROL VIA HOMOGENEOUS COMBUSTION RADICAL IGNITION (HCRI) OR PARTIAL HCRI IN CYCLIC IC ENGINES

(71) Applicant: David A. Blank, Arnold, MD (US)

(72) Inventor: David A. Blank, Arnold, MD (US)

(73) Assignee: HCRI Technologies International, LLC, Arnold, MD (US)

( * ) Notice: Subject to any disclaimer, the term of this patent is extended or adjusted under 35 U.S.C. 154(b) by 196 days.

(21) Appl. No.: 14/690,004

(22) Filed: Apr. 17, 2015

(65) Prior Publication Data

US 2015/0219004 A1    Aug. 6, 2015

Related U.S. Application Data

(63) Continuation of application No. 13/152,944, filed on Jun. 3, 2011, now Pat. No. 9,010,293, which is a
(Continued)

(51) Int. Cl.
| | | |
|---|---|---|
| *F02B 19/10* | (2006.01) | |
| *F02D 35/02* | (2006.01) | |
| *F02B 19/18* | (2006.01) | |
| *F02D 41/00* | (2006.01) | |
| *F02B 19/12* | (2006.01) | |
| *F02B 53/02* | (2006.01) | |
| *F02B 55/02* | (2006.01) | |
| *F02D 41/30* | (2006.01) | |
| *F02M 26/35* | (2016.01) | |

(Continued)

(52) U.S. Cl.
CPC .............. *F02B 19/10* (2013.01); *F02B 19/12* (2013.01); *F02B 19/18* (2013.01); *F02B 53/02* (2013.01);
(Continued)

(58) Field of Classification Search
CPC .......... F02B 19/10; F02B 19/12; F02B 53/02; F02B 55/02; F02B 2023/085;
(Continued)

(56) References Cited

U.S. PATENT DOCUMENTS

| 3,092,088 A | 6/1963 | Goossak et al. |
| 3,230,939 A | 1/1966 | Goossak |

(Continued)

FOREIGN PATENT DOCUMENTS

| JP | 2001-193464 A | 7/2001 |
| JP | 2001-248445 A | 9/2001 |

OTHER PUBLICATIONS

Onishi et al., "Active Thermo-Atmosphere Combustion (Atac)—A New Combustion Process for Internal Combustion Engines", SAE paper No. 790501, Feb. 1, 1979.
(Continued)

*Primary Examiner* — Hieu T Vo
(74) *Attorney, Agent, or Firm* — Smith Moore Leatherwood LLP; Thomas W. Epting

(57) ABSTRACT

A process is provided for improving combustion control and fuel efficiency in rotary and reciprocating IC engines by enabling leaner combustion at higher compression ratios using less heat for ignition. Embodiments employ secondary chambers of minimal total volume within a cylinder periphery. These chambers communicate with a main chamber via conduits and enable a radical ignition ("RI") species generation and supply process that starts in earlier cycles to be augmented and used in later cycles. Measures regulate the RI species generated and provided to the main chamber. These species alter dominant chain-initiation reactions of the combustion ignition mechanism. Also employed when preferable are fluids of higher heat of vaporization and volatility but lower ignitability than the fuel. This process improves combustion in radical ignition engines and radical augmented spark and compression ignition engines.

56 Claims, 18 Drawing Sheets

Related U.S. Application Data continuation-in-part of application No. 12/945,306, filed on Nov. 12, 2010, now abandoned, and a continuation-in-part of application No. 12/390,800, filed on Feb. 23, 2009, now Pat. No. 7,832,372, and a continuation of application No. 11/695,797, filed on Apr. 3, 2007, now Pat. No. 7,493,886.

(60) Provisional application No. 61/350,939, filed on Jun. 3, 2010, provisional application No. 61/426,503, filed on Dec. 22, 2010, provisional application No. 61/484,179, filed on May 9, 2011, provisional application No. 60/789,933, filed on Apr. 7, 2006, provisional application No. 60/865,709, filed on Nov. 14, 2006, provisional application No. 60/885,279, filed on Jan. 17, 2007, provisional application No. 60/892,332, filed on Mar. 1, 2007.

(51) Int. Cl.
  *F02B 53/00* (2006.01)
  *F02B 23/08* (2006.01)
  *F02P 15/02* (2006.01)

(52) U.S. Cl.
  CPC .............. *F02B 55/02* (2013.01); *F02D 35/02* (2013.01); *F02D 41/0025* (2013.01); *F02D 41/3035* (2013.01); *F02M 26/35* (2016.02); *F02B 2023/085* (2013.01); *F02B 2053/005* (2013.01); *F02D 41/0027* (2013.01); *F02P 15/02* (2013.01); *Y02T 10/125* (2013.01); *Y02T 10/128* (2013.01); *Y02T 10/17* (2013.01)

(58) Field of Classification Search
  CPC .............. F02B 2053/005; F02D 41/00; F02D 41/0035; F02D 35/02; F02D 41/0027; F02M 26/35
  See application file for complete search history.

(56) References Cited

U.S. PATENT DOCUMENTS

| | | | |
|---|---|---|---|
| 3,283,751 | A | 11/1966 | Goossak et al. |
| 3,802,827 | A | 4/1974 | Semenov et al. |
| 3,809,024 | A | 5/1974 | Abbey |
| 4,140,090 | A | 2/1979 | Lindberrg |
| 4,237,831 | A | 12/1980 | Noguchi et al. |
| 4,317,432 | A | 3/1982 | Noguchi et al. |
| 4,347,825 | A | 9/1982 | Suzuki et al. |
| 4,442,807 | A | 4/1984 | Latsch et al. |
| 4,592,318 | A | 6/1986 | Pouring |
| 4,592,331 | A | 6/1986 | Pouring |
| 4,742,804 | A | 5/1988 | Suzuki et al. |
| 4,898,135 | A | 2/1990 | Failla et al. |
| 4,924,828 | A | 5/1990 | Oppenhelm |
| 4,926,818 | A | 5/1990 | Oppenhelm et al. |
| 4,974,571 | A | 12/1990 | Oppenhelm et al. |
| 4,977,873 | A | 12/1990 | Cherry et al. |
| 5,109,817 | A | 5/1992 | Cherry |
| 5,271,365 | A | 12/1993 | Oppenhelm et al. |
| 5,297,518 | A | 3/1994 | Cherry |
| 5,322,042 | A | 6/1994 | di Priolo et al. |
| 5,421,299 | A | 6/1995 | Cherry |
| 5,697,332 | A | 12/1997 | Asai et al. |
| 5,855,192 | A | 1/1999 | McCowan et al. |
| 5,862,788 | A | 1/1999 | Pouring et al. |
| 5,887,566 | A | 3/1999 | Glauber et al. |
| 6,092,512 | A | 7/2000 | Ma |
| 6,178,942 | B1 | 1/2001 | di Priolo et al. |
| 6,345,610 | B1 | 2/2002 | Yang |
| 6,386,177 | B2 | 5/2002 | Urushihara et al. |
| 6,561,157 | B2 | 5/2003 | zur Loye et al. |
| 6,595,181 | B2 | 7/2003 | Najt et al. |
| 6,609,493 | B2 | 8/2003 | Yamaguchi et al. |
| 6,898,929 | B2 | 5/2005 | Asmus et al. |
| 6,932,048 | B2 | 8/2005 | Shimazaki |
| 7,464,688 | B2 | 12/2008 | Yu et al. |
| 7,493,886 | B2 | 2/2009 | Blank |
| 7,832,372 | B2 * | 11/2010 | Blank ............... F02B 11/00 123/256 |
| 9,010,293 | B2 * | 4/2015 | Blank ............... F02B 19/10 123/143 B |
| 2004/0154581 | A1 | 8/2004 | Yamaoka et al. |
| 2004/0163619 | A1 | 8/2004 | Thomas |
| 2005/0121009 | A1 | 6/2005 | Flowers |
| 2006/0016438 | A1 | 1/2006 | Kang |
| 2013/0306045 | A1 | 11/2013 | Blank |

OTHER PUBLICATIONS

Asai, "A Low-Pressure Pneumatic Direct-Injection, Two-Stroke Engine by Activated Radical Combustion Concept", SAE paper No. 980757, published Feb. 23, 1998.

Najt et al., "Compression-Ignited Homogeneous Charge Combustion", SAE paper No. 830264, published Feb. 1, 1983.

Blank et al., "NOx Reduction Kinetics Mechanisms and Radical-Induced Autoignition Potential of EGR in I.C. Engines Using Methanol and Hydrogen", SAE paper No. 2001-28-0048, published Nov. 1, 2001.

Murase, "Enhancement of Combustion by Injection of Radicals", SAE paper No. 2000-01-0194, published Mar. 6, 2000.

Hayashi et al., "Performance of a Flame Jet Ignition System in a Two-Stroke Engine", SAE paper No. 2000-01-0199, published Mar. 6, 2000.

Blank, "CNG/Methane-Combustion Kinetics (Without N2) and Frozen Equilibrium in Radical-Ignition Reduced Compression Ratio D.I. Diesel Engines Using Pistons with Micro-Chambers" SAE paper No. 2004-01-1677, published Mar. 8, 2004.

Blank, "CNG/Methane-Combustion in a Homogeneous-Combustion Radical-Ignition D.I. Diesel Engine", SAE paper No. 2007-01-0047, published Jan. 23, 2007.

Blank, "Hydrogen Combustion in a Novel Rotary DI-HCRI Engine with Low Heat Rejection", SAE 2007-01-1254, published Apr. 16, 2007.

Blank, "Radical Ignition Combustion Studies with Hydrogen in a Two-Stroke DI-HCRI Diesel Engine", SAE paper No. 2007-01-0135, published Apr. 16, 2007.

Blank, "Lean Combustion Chemical-Kinetics Studies of an Ethanol Four-Stroke Radical-Ignition DI-Diesel Engine", SAE paper No. 2007-01-0623, published Apr. 16, 2007.

Blank, "Radical Controlled Autoignitlon in a HCRI Hydrogen DI Four-Stroke Diesel Engine with Reduced Heat Rejection", SAE paper No. 2007-01-0013, published Jan. 23, 2007.

Mather et al., "Modeling the Use of Air-Injection for Emissions Reduction in a Direct-Injected Diesel Engine", SAE paper No. 952359, published Oct. 1, 1995.

Blank, "Methanol Hypergolic Combustion Kinetics (Without ND2) and Frozen Equilbrium in Radical-Ignition Reduced Compression Ratio D.I. Engines Using Piston Microchambers", SAE paper No. 2004-01-1847, published Jun. 8, 2004.

Blank, "Methane/CNG Combustion in a DI Radical-Ignition Rotary Engine with Low-Heat Rejection," SAE paper No. 2007-01-1912 and JSAE Paper No. 20077210, 2007, published Jul. 23, 2007.

Blank, "Hydrogen Lean-Combustion Studies in a Four-Stroke DI Radical-Ignition Diesel Engine with EGR," SAE paper No. 2007-01-1887 and JSAE Paper No. 20077212, 2007, published Jul. 23, 2007.

Westbrook, C. K. and Dryer, F.L.,"Chemical Kinetic Modeling of Hydrocarbon Combustion", Prog. Energy Combust. Sci. 1984, vol. 19, pp. 1-57.

Blank, David A., "NOx Reduction in Natural Gas RI Species Augmented Large Bore Four-Stroke SI Engines", SAE Paper No. 2011-26-0005, 2011, published Jan. 19, 2011.

Blank, David A., "Combustion Control Chemical-Kinetics Studies with Natural Gas in HCRI Enhanced Four-Stroke DI SI", SAE Paper No. 2011-01-1895 and JSAE 20119330, published Aug. 30, 2011.

(56) References Cited

OTHER PUBLICATIONS

Blank, David A., "A Novel Two-Stroke SI Design for NOx Reduction in Natural Gas RI Species Enhanced Engine", SAE Paper No. 2011-01-2025 and JSAE 20119326, 2011, published Aug. 30, 2011.

International Search Report, PCT Serial No. PCT/US2011/039090, International Filing Date: Jun. 3, 2011, mailed Oct. 4, 2011.

Pouring et al., "The Influence of Combustion with Pressure Exchange on the Performance of Heat Balanced Internal Combustion Engines", SAE Paper No. 770120, published Feb. 1, 1977.

Blank, D.A., Pouring, A. A, and Lu, J., "Methanol Combustion in Low Compression Ratio DI Engines Enabled by Sonex Piston Design", 2001 SAE Transactions, vol. 110, Journal of Engines, Section 3, pp. 1234-1252 (also SAE Paper 2001-01-1197, 2001).

Lu, J. and Pouring, A.A., "Development of a New Concept Piston for Alcohol Fuel Use in a CI Engine", SAE Paper 961078, 1996.

Toulson, et. al., "A Review of Pre-Chamber Initiated Jet Ignition Combustion Systems", SAE 2010-01-2283, 2010.

Gussak, L.A. and Turkish, M.C., "LAG-Process of Combustion and Its Application in Automobile Gasoline Engines", Proc. IMechE, C257/76, 1976.

Blank, D.A., and Pouring, A.A. "Radical Controlled Autoignition at Reduced Compression Ratios in a Hydrogen D.I. Diesel Engine with Piston Micro-Chambers", 2004 SAE Transactions, vol. 113, Journal of Engines, Section 3, pp. 1185-1182 and SAE Paper 2004-1846, 2004.

\* cited by examiner

100

| Event No. & Cycle Timing | Main Chamber Occurrences | Mini-Chamber (M-C) Occurrences |
|---|---|---|
| 1 Exhaust, Intake and Early Main-Compression 105 | RI Species Conveyed via: *Main Chamber Carry Over + Recycling + M-C Carry Over.* Recycling: *RI Species Augmentations* | Pressure Differences: *Transfer M-C RI Species to Main Chambers* |
| 2 By Mid Main-Compression 110 | *Main Chamber Gases Highly Impregnated With RI Species* | |
| 3 After Mid Main-Compression 115 | Temperature Rise: *RI Species to Become Reactive* | Pressure Differences: *Intake Gases +Premixed Fuel Forced Into M-C's* |
| 4 Mid to Late Main-Compression 120 | If Full DI HCRI Case: *Fuel Inserted but No Autoignition* | *Some of Main Chamber DI Fuel Trapped in M-C* |
| 5 Late Main Compression 125 | If Full DI HCRI Case: *Fuel Mixed at least Quasi-Homogeneously* | |
| 6 Late to End Main-Compression 130 | At Below "Lower" Temperatures: *RI Species-Air Mixture Reacting with Fuel* | RI Species Generation Regulated by: *Control Fluid + Generation Augmentation-Control Devices* |
| 7 Just After Start of Expansion 135 | Ignition: *Involves Fuel-OH Decomposition + OH and Pressure Peak* | Pressure Differences: *Main Chamber OH + Energy Driven Into M-C* |
| 8 Early to Before Mid Expansion 140 | | OH-Induced RI Species Generation: *Production Sensitive to M-C. Temperature, M-C Volume and % Fuel in M-C* |
| 9 Well Before Mid Expansion to Blow-Down and Exhaust 145 | M-C RI Species and Unused Fuel Transferred to Main Chambers. Results: *RI Species Generation +Radical Retention; RI Species Go into/(or)near Frozen Equilibrium* | Temperature Drops: *RI Species Go Into Frozen Equilibrium* |

| Event No. & Cycle Timing | Main Chamber Occurrences | Mini-Chamber (M-C) Occurrences |
|---|---|---|
| 1  Exhaust, Intake and Early Main-Compression 605 | RI Species Conveyed via: *Main Chamber Carry Over + Recycling + M-C Carry Over.* Recycling: *RI Species Augmentations* | Pressure Differences: *Transfer M-C RI Species to Main Chambers* |
| 2  By Mid Main-Compression 610 | *Main Chamber Gases Highly Impregnated With RI Species* | |
| 3  After Mid Main-Compression 615 | Temperature Rise: *RI Species to Become Reactive* | Pressure Differences: *Intake Gases +Premixed Fuel Forced Into M-C's* |
| 4  Mid to Late Main-Compression 620 | If Full DI HCRI Case: *Base Fuel+Additive Inserted but No Autoignition* | *Some of Main Chamber DI Fuel Trapped in M-C* |
| 5  Late Main Compression 625 | If Full DI HCRI Case: *Base Fuel+Additive Mixed at least Quasi-Homogeneously* | |
| 6  Late to End Main-Compression 630 | At Below "Lower" Temperatures: *RI Species-Air Mixture Reacting with Fuel* | RI Species Generation Regulated by: *Control Fluid + Generation Augmentation-Control Devices* |
| 7  Just After Start of Expansion 635 | Ignition: *Involves Fuel-OH Decomposition + OH and Pressure Peak* | Pressure Differences: *Main Chamber OH + Energy Driven Into M-C* |
| 8  Early to Before Mid Expansion 640 | | OH-Induced RI Species Generation: *Production Sensitive to M-C Temperature, M-C Volume and % Fuel in M-C* |
| 9  Well Before Mid Expansion to Blow-Down and Exhaust 645 | M-C RI Species and Unused Fuel Transferred to Main Chambers. Results: *RI Species Generation +Radical Retention; RI Species Go into/(or)near Frozen Equilibrium* | Temperature Drops: *RI Species Go Into Frozen Equilibrium* |

| Event No. & Cycle Timing | Main Chamber Occurrences | Mini-Chamber (M-C) Occurrences |
|---|---|---|
| 1 Exhaust, Intake and Early Main-Compression 805 | RI Species Conveyed via: *Main Chamber Carry Over + Recycling + M-C Carry Over*. Recycling: *RI Species Augmentations* | Pressure Differences: *Transfer RI Species to Main Chamber* If Choice M-C's: *Use Heat or Other Means to Drive More RI Species Into Main Chamber* |
| 2 By Mid Main-Compression 810 | *Main Chamber Gases Highly Impregnated With RI Species* | In Select M-C's: *Direct Fuel Insertion to Support Secondary RI Species Generation* |
| 3 After Mid Main-Compression 815 | Temperature Rise: *RI Species to Become Reactive* | Pressure Differences: *Intake Gases +Premixed Fuel Forced Into M-C's;* If Select M-C's - Secondary RI Species Generation: *Thermal-OH-Induced and Pressure Driven Into Main Chambers* |
| 4 Mid to Late Main-Compression 820 | If Full DI HCRI Case: *Base Fuel+Additive Inserted but No Autoignition* | *Some of Main Chamber DI Fuel Trapped in M-C's* |
| 5 Late Main Compression 825 | If Full DI HCRI Case: *Base Fuel+Additive Mixed at least Quasi-Homogeneously* | |
| 6 Late to End Main-Compression 830 | At Below "Lower" Temperatures: *RI Species-Air Mixture Reacting with Fuel* | RI Species Generation Pre-Regulated by: *Control Fluid + Generation Augmentation-Control Devices* |
| 7 Just After Start of Expansion 835 | Ignition: *Involves Fuel-OH Decomposition + OH and Pressure Peak* | Pressure Differences: *Main Chamber OH + Energy Driven Into M-C* |
| 8 Early to Well Before Mid Expansion 840 | | Main RI Species Generation: *OH-Induced, Production Sensitive to M-C Temperature, M-C Volume and % Fuel in M-C* |
| 9 Well Before Mid Expansion to Blow-Down and Exhaust 845 | M-C RI Species and Unused Fuel Transferred to Main Chambers. Results: *RI Species Generation +Radical Retention; RI Species Go into/(or)near Frozen Equilibrium* | Temperature Drops: *RI Species Go Into Frozen Equilibrium* |

FIG. 10

COMBUSTION CONTROL VIA HOMOGENEOUS COMBUSTION RADICAL IGNITION (HCRI) OR PARTIAL HCRI IN CYCLIC IC ENGINES

RELATED APPLICATIONS

This application is a continuation of U.S. Utility patent application Ser. No. 13/152,944 filed on Jun. 3, 2011, now U.S. Pat. No. 9,010,293, issued Apr. 21, 2015, which claims priority and benefit of U.S. Provisional Application Ser. No. 61/350,939 filed on Jun. 3, 2010, U.S. Provisional Application Ser. No. 61/426,503 filed on Dec. 22, 2010 and U.S. Provisional Application Ser. No. 61/484,179 filed on May 9, 2011, and which is a continuation-in-part of U.S. Utility patent application Ser. No. 12/945,306 filed on Nov. 12, 2010, which is a continuation-in-part of U.S. Utility patent application Ser. No. 12/390,800 filed on Feb. 23, 2009, now U.S. Pat. No. 7,832,372, issued Nov. 16, 2010, which is a continuation of U.S. Utility patent application Ser. No. 11/695,797, filed Apr. 3, 2007, now U.S. Pat. No. 7,493,886, which claims priority to U.S. Provisional Application Ser. No. 60/789,933 filed on Apr. 7, 2006, U.S. Provisional Application Ser. No. 60/865,709 filed on Nov. 14, 2006, U.S. Provisional Application Ser. No. 60/885,279 filed on Jan. 17, 2007, and U.S. Provisional Application Ser. No. 60/892,332 filed on Mar. 1, 2007. The entirety of the contents of all the foregoing applications is incorporated herein by reference.

FIELD

Embodiments relate generally to the common thermo-fluid chemical-kinetic processes involved in an improved controlled initiation and augmentation of the combustion of hydrogen, alcohol, hydrocarbon, nitrogen and sulfur derivative fuels and fuel/aqueous-fuel combinations in engines through the use of select radical ignition species.

DESCRIPTION OF THE RELATED ART

The internal combustion ("IC") engine has been a primary source of motive power for nearly eight decades. Thus, while much effort is currently being devoted to the development of new concept engines (electric, fuel cell, hybrid, etc.), more effort is still being aimed at the continued enhancement of the cyclic (reciprocating and rotary) IC engine. Newer to this progression are efforts to co-evolve the "fuel designs" and "engine designs" to better accommodate each other. And most of this work still remains focused around the spark ignition ("SI") and the compression ignition ("CI") modes for the start of combustion ("SOC"). However, despite many related advances, there continue to be penalties and limitations associated with not only the conventional versions of these ignition modes, but also with newer permutations of these two modes. Reasons for these inhibitors flow from the natures of the combustions with these modes.

In conventional SI initiated flame propagation combustion, when a homogeneous mixture of fuel and air is both sufficiently rich enough to sustain a flame and is ignited at a point by a spark, a flame kernel forms and advances from the ignition point as a combustion front. However, this front spreads through the main chamber at its own natural speed, and is thus effectively beyond any further control. Additionally, within this zone (front) of chemical activity, the specific-exothermic power and residence time of the reacting species cannot be controlled. The rapid expansion within this moving combustion zone (due to the release of the exothermic energy) tends to cause its reacting particles to be expelled prematurely (from the moving front). Thus, the rate of combustion is diminished and the combustion is incomplete with undesirable emissions.

In conventional direct injected ("DI") CI the fuel is inserted with an appreciable inlet velocity. Upon entering the combustion chamber, the fuel is atomized into globule sets whose number density is high enough to form clouds of sufficiently densely spaced fuel droplets for the flame to become established around as an envelope. Their fronts are then driven across the compressed air charge by the momentum imparted at spray insertion. The oxygen is completely depleted inside the flame envelopes while fuel is fully consumed at the fronts. The fuel reaches its maximum temperature at the flame fronts, thus stabilizing the process of combustion. However, this also serves to maximize the formation of nitric oxides. Further, the fuel is pyrolized into soot as it approaches the high temperature zones in the absence of oxygen. And as in the case of conventional SI, after the SOC, the combustion in this conventional process is effectively beyond any additional control. Conventional enhancements to this process have been generally limited to the efficacy of the air fuel-mixing.

In both conventional SI and conventional DI CI the ignition process is driven by relatively "higher" temperature chemical-kinetics mechanisms. Depending on the fuel, the chain-initiation reactions responsible for initiating these mechanisms involve either direct fuel oxidation or fuel dissociation. Fuel dissociation can be either due to the higher temperatures themselves (thermal dissociation) or due to third body reactions at (dependent on) the higher temperatures. Thus, in their conventional forms, both of these modes require relatively higher levels of heat to start combustion (compared to levels needed in some of the newer developments). Also, for the combustion initiated by these modes to be sustainable, relatively higher concentrations of the fuel relative to the oxygen are typically required (compared to those required with some of the newer ignition permutations).

In contrast to conventional SI and conventional CI, the process of homogeneous combustion can enable both a lowering of the heat required for ignition and a reduction in the ratio of the fuel to the oxygen required for sustained combustion. Homogeneous combustion entails the simultaneous envelopment of the bulk of the main combustion chamber air-fuel charge during ignition. The combustion event is initiated throughout the entire mixture (i.e., multipoint ignition) and proceeds without visible moving flame fronts. Thus engines employing homogeneous combustion generally behave like compression-ignited stirred chemical reactors. In the process of homogeneous combustion, the chemical-kinetics of the reacting fuel-air mixture is primarily initiated by species concentrations, temperature or combinations thereof.

Hereinafter, the chemical inducement of homogeneous combustion via species concentrations is referred to as RI ("Radical Ignition") and inducement by temperature is referred to as TI ("Thermal Ignition"). TI is a CI permutation.

An early example of RI-induced homogeneous combustion is described in U.S. Pat. Nos. 3,092,088; 3,230,939; 3,283,751; and 3,802,827 by Goossak. In Goossak's "LAG" 4-stroke reciprocating IC engine the spark ignition of a fuel-rich mixture in a small pre-chamber is followed by the burning of a fuel-lean mixture in the much larger main chamber. To connect these chambers Goossak's low-temperature ignition engine makes use of a small channel. This channel tears and quenches the burning gases emitted from the pre-chamber so that the flame is not passed. Rather only a mass jet of non-burning incomplete combustion products is transmitted to the main combustion chamber. Under certain operating conditions the combustion is then seen developing simultaneously in the bulk of the air-fuel charge of the main combustion chamber from the many small kernels of products induced by the turbulent wakes of the pre-chamber mass jet. At such operating conditions this multi-point ignition follows from the virtually quasi-homogeneous dispersion of these kernels.

It is the high chemical activity induced by intermediate species and radicals such as $CH_3$, $H_2O_2$, $CH_2O$, $C_2$, CH, and H (produced by the incomplete combustion of a rich mixture in the pre-chamber) coupled with high turbulent intensity levels (generated by the mass jet) that together produce early ignition and rapid combustion in the main combustion chamber of the LAG engine. Though not all of the species responsible for the stratified-charge homogeneous combustion in the LAG engine are radicals, since Goossak and hereinafter, RI is understood to mean autoignition induced primarily by the presence of highly-reactive intermediate species and/or radicals (together called "RI species"). Unfortunately, because it is dependent on fluid-dynamic dispersion of the product kernels in the same cycle, the LAG engine could only be made to operate effectively over a limited portion of the overall engine-operating regime.

Blaser, et. al., discovered a different approach to RI. Follow-on work to this approach has lead to several practical 4-stroke reciprocating IC engine designs (U.S. Pat. Nos. 4,898,135; 5,862,788; and 6,178,942)). This approach enables RI species generation in one cycle for use in the next in a manner that overcomes the dispersion limitations of the LAG engine. In a recent example called the SCS ("Sonex Combustion System") the same dominant effects found in low-temperature ignition in the LAG engine are created by this piston micro-chamber configuration: namely "RI species" and intense turbulence. Unfortunately, this technology has disadvantages. One is that it can only provide average overall engine operating-regime optimizations for simultaneous engine efficiency improvements and emission reduction. Because it must typically be optimized for an engine's overall operating-regime conditions, this piston-based technology produces too many radicals during high loads and not enough radicals during low loads. To compensate, the engine controls must then over-adjust the fuel injection timings to achieve desired SOC timings. Consequently, at high loads, the injection timings must be too late for adequate mixing of the fuel, degrading the degree of homogeneity of the combustion and increasing the production of CO and other pollutants. Thus, it cannot take advantage of the full potential of RI at all points in the engine's operating regime. At some operating points it actually lowers engine performance.

Turning to TI, an early example of is attributed to Noguchi, et. al., in U.S. Pat. No. 4,317,432. This patent describes a low-temperature self-ignited combustion process in a gasoline 2-stroke reciprocating IC engine called Toyota-Soken ("TS") combustion. In this TI variant the intake-exhaust port design creates an overlap between the leaving burned gases and entering fresh charge. This allows for the transfer of heat (and also the carry-over of some chemically active products) to the cold fresh charge. Some characteristics of the TS combustion mimic those of the prior art LAG and SCS engines. Developed around the same time, the ATAC (Active-Thermo-Atmosphere Combustion) engine also involves essentially the same TI phenomena as TS (SAE Paper No. 790501 [Onishi, et. al.]). Though radical involvement is highlighted in advancements to this engine type by Ishibashi and Asai (SAE Paper No. 980757 and U.S. Pat. No. 5,697,332), in comparison to the overall radical activity in the LAG and SCS engines, such activity has been found to be minimal in the TS and ATAC engines. Further, in contrast to the SCS engine, there is no carry over of RI species in these engines from one cycle to the next. Thus today TS and ATAC are classified together with the family of homogeneous-charge compression-ignition (HCCI) engines. HCCI is TI and thus a CI permutation.

Najt and Foster (SAE Paper No. 830264) extended the use of the thermal energy of the exhaust gases to cause TI homogeneous combustion in 4-stroke reciprocating IC engines. Their work and more recent numerical calculations with EGR (SAE Paper No. 2001-28-0048 [Blank, et. al.], which is incorporated by reference) together confirm that the TI induces a homogeneous burn through thermal heating of the charge and oxygen dilution. Additionally, the main "RI species" found responsible for autoignition inducement in the LAG and SCS engines are not found in the EGR TI combustion exhaust gases of this more recent computational study. Thus RI species are not involved in the 4-stroke HCCI variants. Various other names for HCCI combustion include premixed charge compression ignition ("PCCI") and compression-ignited homogeneous charge ("CIHC").

Much more work has been subsequently conducted to extend the applicability of TI in both 2-stroke and 4-stroke reciprocating IC engine applications. However, at certain operating conditions in the PCCI engine there are as yet unresolved problems. The combustion starts in the HCCI engine by way of compression induced "low" temperature fuel-$O_2$ chain-initiation reaction induced self-ignition. Because the fuel-air charge mixture is formed well before top dead center ("TDC"), ignition can occur at various times during the compression process. Thus, as the engine load increases, ignition timing tends to advance and the rate of combustion tends to increase. Additionally, due to early heat release before TDC the thermal efficiency may decrease, and due to the faster and earlier combustion the engine's operation may become rough. Conversely, when the load decreases, ignition timing tends to be retarded. This may eventually result in misfire, as well as in an increase in emissions. Further, when the engine speed is increased, since the time available for the low-temperature preliminary reactions of the diluted mixture becomes less, the time for the main heat release is retarded. In this case, if the time available becomes insufficient, misfiring may also occur.

These PCCI problems can be looked at from the viewpoint of the compression ratio ("CR") instead. There is one CR where autoignition (via CI) for a given set of starting conditions with a particular fuel will occur. If that CR (hereinafter called the "effective-charge CR") is the same as the "mechanical compression ratio of the engine", then combustion will occur at the "right" time, i.e., typically with combustion initiation taking place when the piston is at TDC and with peak cylinder pressure occurring generally within 10 degrees of crank angle. However, if the effective-charge CR (the autoignition CR) is lower than the mechanical CR of the engine, then combustion will start before piston TDC and the engine will knock unacceptably. If the autoignition CR is higher than the mechanical CR of the engine, then a misfire will occur and the engine will not operate. Therefore, the primary limitation of TI is the absence of an acceptable means of controlling the initiation of premixed HCCI and SCCI (stratified charge CI) (collectively PCCI) over the possible range of operating conditions (including fuel cetane or octane values, ambient temperatures, loads, engine speeds, etc.) necessary for a practical engine.

More work has also been conducted to extend the use of the RI mode. Based closely on the thermo-chemical features of the LAG concept, Oppenheim, et al., developed the Pulsed Jet Combustion (PJC) ignition system and later a second system called the Jet Plume Injection and Combustion (JPIC) system (U.S. Pat. Nos. 4,924,828; 4,926,818; 4,974,571; and 5,271,365; and SAE Paper Nos. 2000-01-0194 and 2000-01-0199). However, in their JPIC system, combustion control relies both on reactant composition and fluid mechanics and thus suffers the same restrictions found in the LAG engine.

A catalysis based extension of the LAG concept is the prior art called Smartplugs (U.S. Pat. Nos. 4,977,873; 5,109,817; 5,297,518 and 5,421,299). The smartplug insert provides the same effect as a spark ignited fuel-rich pre-chamber, but without the added complexity of a pre-chamber fuel supply. However, instead of trajecting incomplete combustion products via a mass jet, this is primarily a form of TI, projecting thermal energy via a flame jet. Thus the Smartplug does not involve RI and its advantages are primarily limited to premixed charge applications with their lower thermal efficiency potentials.

Two recent efforts to generate incomplete combustion products outside the engine combustion cylinder for immediate use in augmenting combustion control in the cylinder are noted in U.S. Pat. Nos. 6,092,512 and 6,345,610. While these both enable the tailored use of metered amounts of incomplete combustion products appropriate to each engine operating condition, the first relies on varying exhaust gas conditions and the second is simply the LAG concept itself moved to the intake manifold. These cannot be effective in high speed and load situations. Thus neither is capable of providing the control needed to make homogeneous combustion occur and work over the entire engine-operating regime. Since these, a dual-mode approach has been suggested that incorporates the LAG technology at only light loads (see U.S. Pat. No. 6,595,181). From this brief overview, several things become apparent. Primarily only RI and the TI variant (of CI) are capable of producing homogeneous combustion in IC engines. However, effective TI prior art is limited both to premixed fuel applications (and thus to lower efficiencies) and to operations over only limited portions of the engine operating regime. Whereas DI-fuel insertion IC engine variants provide higher efficiency potentials and are not engine operating regime limited, they are unfortunately not capable of homogenous combustion operations. In conventional RI engines, the only variant shown capable of single mode homogeneous operations over the entire engine operating regime with DI of the fuel is the SCS engine. However, the exercise of control over the combustion in this RI variant is far too limited, and within certain portions of the engine operating regime this variant actually degrades combustion.

The RI approach described in both U.S. Pat. No. 7,493,886 and U.S. patent application Ser. No. 12/390,800 (filed 23 Feb. 2009) included controlling of the combustion processes that result from the use of a hydroxyl radical fuel decomposition mechanism and was called HCRI (homogeneous combustion radical ignition). This technology includes controlling the general hydroxyl radical fuel decomposition process by managing the internal creation and transfer of radial ignition (RI) species. HCRI may enable controlled reductions in heat required and/or fuel concentrations required (relative to air concentrations) for main chamber fuel ignition. Responsive to the conditions of each engine operating point, the HCRI process may improve the overall combustion efficiency of an engine, allowing simultaneous pollution emissions reductions and fuel efficiency increases. Because HCRI potentially lowers the heat of compression required for autoignition, it may lower either the required engine operating compression ratios or the required fuel-to-air ratios needed for combustion (or a combination of both). Lower fuel-to-air ratios may enable both efficiency improvements and emissions reductions. Also, lower compression ratios are desirable for many of the harder to ignite fuels with autoignition compression ratios that are otherwise too high for normal compression ignition applications. However, in certain applications, lower compression ratios may not be wholly desirable for fuels that are relatively easy to ignite.

A potential advantage of HCRI is the lowering of the fuel-to-air ratios required for autoignition. Thus, like HCCI, which may also enhance an engine's fuel lean-burn capacity at the expense of its compression ratio, overall efficiencies with HCRI may instead be typically greater. But while HCCI can not be made to operate an engine over an entire engine operating regime, HCRI may be, potentially making HCRI a process for accomplishing homogenous combustion. Yet, to avoid conditions leading to engine knocking, fuels such as gasoline may necessitate the use of lower than desired compression ratios for use with HCRI, as they may require the use of lower than optimum compression ratios. Thus, it may be desirable to enable the use of both pure RI and RI augmentation with such fuels without having to pay a fuel efficiency penalty due to having to use non-optimally low compression ratios.

It would be desirable to have a more effective means for controlling the use of additives exhibiting higher volatilities and lower ignitibilities than gasoline to raise fuel efficiency. Also desirable would be technology that minimally complicates engine design and operation while enabling single mode ignition over most or all points in the engine operating regime in a manner that optimally increases fuel efficiency at each point in this overall regime. It is also desirable that such technology would not necessitate increases in the fuel richness for the ignition and combustion of the fuel-air charge. The present invention includes HCRI being potentially used as an alternative and superior technology for raising operating compression ratios. The present invention may also permit increasing (rather than lowering) the leanness at which combustion occurs and may need only make use of mixtures of a primary fuel together with an auxiliary fuel exhibiting both a higher volatility and a lower ignitability than the primary fuel. The present invention may thus enable not only efficiency gains, it may also simultaneously enable emissions reductions.

In certain RI species augmentation applications there remains the requirement to reduce the total volume of the secondary chambers employed for RI species generation. To facilitate minimization of the total volume of the secondary chambers required for RI species generation, the present invention provides extended operational control procedures for yet better RI species transfer control and/or supply augmentation.

SUMMARY

An embodiment relates generally to a method for controlling a reduction in required heat and required fuel concentrations relative to oxygen concentrations for an ignition of a fuel within a main combustion chamber of an engine. The method includes providing a plurality of radical ignition species generated in at least one prior combustion cycle in a secondary chamber associated with the main combustion chamber of the engine, where the plurality of radical ignition species is generated by at least one OH-radical ignition species driven chemical kinetic mechanism. The method also includes directing a portion of the plurality of radical ignition species to the main combustion chamber. The method further includes regulating an accumulation of the portion of the radical ignition species and a generated radical ignition species of the main combustion chamber to modulate an ignition event for fuel in the main combustion chamber.

Another embodiment pertains generally to a process for chemically modulating combustion of a fuel within an engine using a predetermined amount of a plurality of radical ignition species. The process includes providing at least one secondary chamber connected by at least one conduit to a variable volume main combustion chamber and directing the predetermined amount of the plurality of radical ignition species generated at least in part in at least one previous cycle within the engine to the variable volume main combustion chamber to mix with a new air charge of the variable volume main combustion chamber prior to an end of a main-compression event. The process also includes trapping a second portion of the variable volume main combustion chamber air and the fuel in at least one secondary chamber during the main-compression event and using the predetermined amount of the plurality of radical ignition species in the variable volume main combustion chamber to act as an agent to first activate a pre-ignition event of the fuel by driving a pre-ignition chemistry involving fuel decomposition via radicals and to then initiate a start of an ignition chemistry of an ignition event that drives fuel decomposition via OH. The method further includes using peaked pressures generated by the ignition event and a combustion of the fuel to drive OH and energy from the variable volume main combustion chamber into at least one secondary chamber. The method yet further includes using OH and an energy transferred from the variable volume main combustion chamber and a second plurality of radical ignition species resident in the secondary chambers to drive an OH-radical species driven fuel decomposition sub-mechanism or plurality of OH-radical species driven fuel decomposition sub-mechanisms in the at least one secondary chamber for a generation of additional radical ignition species.

Yet another embodiment relates generally to an apparatus in an internal combustion engine including a cylinder, where the cylinder further comprising at least one variable volume combustion chamber defined by a work-power producing component moving within a space bounded externally by a cylinder housing. The cylinder is configured to periodically receive a fuel and an air charge and to implement a combustion cycle comprising an intake, main-compression, combustion, power-expansion and exhaust portions phases. The apparatus includes at least one mini-chamber arranged about the cylinder housing of the cylinder in proximity with the at least one variable volume combustion chamber, where the at least one mini-chamber is configured to serve as origination sites for a generation of a plurality of radical ignition species. The apparatus includes at least one connecting conduit configured to couple the at least one mini-chamber with an associated the at least one variable volume combustion chamber, where the at least one connecting conduit is also configured to allow flow of the plurality of radical ignition species, the air, the fuel and chemical reaction products in and out of the at least one mini-chamber during various phases of the combustion cycle. The apparatus further includes at least one controller associated with the at least one mini-chamber configured to regulate an amount of the plurality of radical ignition species provided to the at least one variable volume combustion chamber based upon load and speed requirements applied to the engine.

Another embodiment of the present invention relates generally to a method for increasing fuel efficiency by controlling a reduction in required heat and/or a reduction in required fuel concentrations relative to oxygen concentrations for an ignition of a fuel while simultaneously increasing a compression ratio for the ignition within a main combustion chamber of an engine. The method may include a controlled insertion within a current combustion cycle of a fluid or substance of higher heat of vaporization and higher volatility but lower ignitability than the fuel in order to increase the compression ratio required for self ignition of a mass of the fuel and the fluid (substance) together (compared to a compression ratio required for self ignition with a calorifically equivalent mass of just the fuel). The method may further include providing within the current combustion cycle a plurality of radical ignition species that is generated at least in part in at least one prior combustion cycle at least in part within at least one secondary chamber associated with the main combustion chamber of the engine. The plurality of radical ignition species is generated by at least one OH-induced OH-fuel-decomposition driven chemical-kinetics mechanism. The method may also include directing a portion of the plurality of radical ignition species to the main combustion chamber for use in the current cycle. The method may also further include regulating an accumulation of the portion of the radical ignition species to modulate the ignition of the fuel in the main combustion chamber, whereby the method enables a raising of the compression ratio of the engine while simultaneously lowering the fuel-to-air ratio required for the self ignition of the fuel.

Another enhanced embodiment pertains generally to a process for chemically modulating an ignition and a combustion of a fuel within an engine by using a predetermined amount of a plurality of radical ignition species together with at least one additive exhibiting higher heats of vaporization, higher volatilities and lower ignitabilities than the fuel. The use of the radical ignition species within the process enables the fuel to be ignited more easily and under fuel leaner conditions without having to use a lower compression ratio for either self ignition, or ignition assist (augmentation). Counteractively, the use of the additive within the process instead enables the use of a higher compression ratio for self ignition (relative to the lower compression ratio). The process may include providing at least one secondary chamber connected by at least one conduit to a variable volume main combustion chamber and directing the predetermined amount of the radical ignition species generated at least in part in at least one previous cycle of the engine to the variable volume main combustion chamber to mix adequately with a new air charge of the variable volume main combustion chamber well prior to an end of a main-compression event. The process may also include a managed insertion of the fuel. The process may further include a regulated insertion of the additive via at least one method that is together or separate from the managed insertion of the fuel. The process may also include trapping a portion of the new air charge and the fuel together with the additive in at least one secondary chamber during the main-compression event. The process may include using the predetermined amount of the plurality of radical ignition species in the variable volume main combustion chamber to act as an agent to first activate a pre-ignition event of the fuel. During the pre-ignition event the predetermined amount of the plurality of radical ignition species drives or augments a pre-ignition chemistry involving fuel decomposition via radicals. Thereafter, a remainder of the predetermined amount initiates an ignition chemistry of an ignition event, where the ignition event is by or is augmented by at least one OH induced OH-fuel decomposition chemical-kinetics mechanism. A start of the pre-ignition and a start of the ignition events are both modified by the presence of the additive in such a way that each of these two events will not start before an advent of more total heat of compression (than would be required without the presence of the additive) before their respective starts can occur. The process may further include using peaked pressures generated by the ignition event and the combustion to drive a relatively large magnitude of OH and energy from the variable volume main combustion chamber into the at least one secondary chamber. The process may also further include using the relatively large magnitude and a second plurality of radical ignition species resident in the secondary chambers to impel another of the at least one OH induced OH-fuel decomposition chemical-kinetics mechanism within the at least one secondary chamber for a generation of additional radical ignition species. And, the process may then repeat itself.

Yet one more enhanced embodiment relates generally to an apparatus in an internal combustion engine which may include a cylinder, the cylinder further comprising at least one variable volume combustion chamber defined by a work-power producing component moving within a space bounded externally by a cylinder housing. The cylinder is configured to periodically receive a fuel and an air charge and to implement a combustion cycle comprising an intake, main-compression, combustion, power-expansion and exhaust portions phases. The apparatus may additionally include at least one provision for inserting into the cylinder a special fluid (or substance) of higher heat of vaporization and higher volatility but lower ignitability than the fuel, where the provision inserts the special fluid either together or separately from the receiving of the fuel. This is to increase the compression ratio required for self ignition of a combined mass of the fuel and the special fluid (compared the compression ratio required for self ignition of a calorifically equivalent mass of just the fuel). The apparatus may further include at least one mini-chamber arranged about the cylinder housing of the cylinder in proximity with the at least one variable volume combustion chamber, where the mini-chamber is configured to serve as an origination site for a generation of a plurality of radical ignition species. The apparatus may also include at least one connecting conduit configured to couple the at least one mini-chamber with an associated the at least one variable volume combustion chamber, where the at least one connecting conduit is also configured to allow flow of the radical ignition species, the air, the fuel, the special fluid and chemical reaction products in and out of the at least one mini-chamber during various phases of the combustion cycle. The apparatus may further include at least one controller configured to regulate an amount of the plurality of radical ignition species provided to the at least one variable volume combustion chamber for use in the combustion phase and based upon load and speed requirements applied to the engine. The apparatus thereby may enable a raising of the compression ratio of the engine while simultaneously lowering a fuel-to-air ratio required for the self ignition of the fuel.

An embodiment of the present invention relates generally to a method for controlling a reduction in required heat and/or required fuel concentrations relative to oxygen concentrations for an ignition of a fuel within a main combustion chamber of an engine. The method includes generating a plurality of radical ignition species in at least one prior combustion cycle in a secondary chamber associated with the main combustion chamber of the engine, where the plurality of radical ignition species is generated by at least one radical ignition species and/or OH dominantly initiated chemical kinetic mechanism driven by OH-fuel decomposition (or OH-decomposition of the fuel). In OH-fuel decomposition one hydrogen atom of the fuel molecule is abstracted by one OH radical. The method also includes directing a portion of the plurality of radical ignition species to the main combustion chamber during portions of both the prior combustion cycle and a next combustion cycle of the engine that is after the prior combustion cycle. The method further includes regulating an accumulation of this portion of the radical ignition species together with a generated radical ignition species of the main combustion chamber to modulate the ignition of the fuel in the main combustion chamber during this next combustion cycle.

Yet another embodiment of the present invention pertains generally to a process for chemically modulating combustion of a fuel within an engine using a predetermined amount of a plurality of radical ignition species. The process includes providing at least one secondary chamber connected by at least one conduit to a variable volume main combustion chamber and directing to the variable volume main combustion chamber the predetermined amount of the radical ignition species generated at least in part during at least one previous cycle. This directing of the predetermined amount may occur over multiple periods, including during portions of a previous cycle, as well as also during portions of a current cycle that is after the previous cycle. In the variable volume main combustion chamber these radical ignition species are to mix with a new air charge of the variable volume main combustion chamber prior to an end of a main-compression event of the current cycle of the engine. The process also includes entrapping a second portion or portions of the fuel and of the new air charge of the variable volume main combustion chamber in at least one secondary chamber during the main-compression event. The process also typically includes using the predetermined amount of radical ignition species in the variable volume main combustion chamber to act as an agent to first activate a pre-ignition event of the fuel by inducing a pre-ignition chemistry involving fuel decomposition via radicals (typically fuel molecule hydrogen atom abstraction via $HO_2$ radicals) and to then initiate a start of an ignition chemistry of an ignition event that is driven by fuel decomposition via OH (fuel molecule hydrogen atom abstraction via OH radicals). The process further includes using peaked pressures generated by the ignition event and a combustion of the fuel to force OH and/or radical ignition species from the variable volume main combustion chamber into at least one secondary chamber. The process yet further includes using this OH and/or radical ignition species transferred from the variable volume main combustion chamber and a second plurality of radical ignition species resident in the secondary chambers to empower an OH and/or radical ignition species induced OH-fuel decomposition sub-mechanism or plurality of OH and/or radical ignition species induced OH-fuel decomposition sub-mechanisms in the at least one secondary chamber for a generation of additional radical ignition species.

Another embodiment of the present invention relates generally to a method for controlling a reduction in required heat and/or a reduction in required fuel concentrations relative to oxygen concentrations for an ignition of a fuel within a main combustion chamber in a current combustion cycle of an engine. The method includes an earlier generation of a first quantity of a plurality of radical ignition species at least in part in at least one prior combustion cycle to the current combustion cycle. The earlier generation occurs at least in part within at least one secondary chamber associated with the main combustion chamber and is for use in enhancing the ignition of the fuel in the current cycle. Depending on engine operating conditions of the engine, the method may at times further include using part of the first quantity to facilitate a later generation of an additional quantity of the radical ignition species within the current cycle. The additional quantity, when needed, is also for use in enhancing the ignition of the current cycle. The later generation, when needed, occurs within at least one operationally unique of the at least one secondary chamber. Generally the first quantity and the additional quantity of the radical ignition species are both generated in part by at least one radical ignition species and/or OH induced (i.e., impelled) OH-fuel-decomposition driven chemical-kinetics mechanism. In OH-fuel decomposition one hydrogen atom of the fuel molecule is abstracted by one OH radical. The first generation results in cyclic origination of the radical ignition species in the secondary chambers. The method may also include directing a portion of the radical ignition species from both the earlier generation and the later generation to the main combustion chamber for combined use during the current combustion cycle. The method also further includes regulating the radical ignition species to modulate the ignition of the fuel in the main combustion chamber for an improvement of main combustion chamber combustion.

An additional embodiment of the present invention pertains generally to a process for chemically modulating an ignition event of a fuel within a current cycle of an engine by using a combination of a transferable portion of a predetermined previous-cycle-generated amount of a plurality of radical ignition species generated at least in part during at least one previous cycle of the engine and a precise same-cycle generated quantity of the radical ignition species generated during the current cycle. The precise same-cycle generated quantity results from engendered use of a part a retained portion of the predetermined previous-cycle-generated amount and/or a share of gases of a first trapping in an augmentation generation. To accomplish this, the process includes providing at least one secondary chamber connected by at least one conduit to a variable volume main combustion chamber and directing the transferable portion of the predetermined previous-cycle-generated amount of the radical ignition species to the variable volume main combustion chamber. The transferable portion is made to mix adequately with a new air charge of the combustion chamber well prior to an end of a main-compression event of the current cycle and also typically well before a pre-ignition event of the current cycle. In addition, the process includes trapping both some of the transferable portion and a first portion of the new air charge in the at least one secondary chamber during the main-compression event. These gases so trapped are accordingly the first trapping. The process requires that there be at least one uniquely equipped of the at least one secondary chamber and that it contain the part of the retained portion and/or the share of gases of the first trapping. The process additionally requires that the at least one uniquely equipped of the secondary chamber be regulated to appropriate fuel concentrations via a separate fuel augmentation and then be modulated by a thermal procedure to engender the augmentation generation of the precise same-cycle generated quantity of the radical ignition species. In the augmentation generation, it is the part of the retained portion and/or the share of gases of the first trapping that are/is used to help empower at least one radical ignition species and OH induced OH-fuel decomposition chemical-kinetics mechanism for at least in part in producing the precise same-cycle generated quantity of the radical ignition species. In OH-fuel decomposition one hydrogen atom of the fuel molecule is abstracted by one OH radical. By properly timing the thermal procedure, the precise same-cycle generated quantity is also made to join and mix with the new air charge of the main combustion chamber before or during the pre-ignition event of the cycle. Included subsequently in the process, and before the ignition event within the current cycle, a second portion of the new air charge is later trapped in the uniquely equipped secondary chamber during the main-compression event. The process then further entails that some of either only the transferable portion or all of the combination (of the transferable portion and the precise same-cycle generated quantity) of the radical ignition species be used to activate the pre-ignition event of the fuel, where the pre-ignition event is driven by a pre-ignition chemistry involving fuel decomposition via some of the radical ignition species. In fuel decomposition by radical ignition species, one hydrogen atom of the fuel molecule is abstracted by one radical ignition species (typically by the $HO_2$ radical). By design, the process further entails that a remainder of the combination (of the transferable portion and the precise same-cycle generated quantity) of the radical ignition species act to initiate a start of an ignition chemistry for the ignition event of the current cycle, where the ignition chemistry is by another radical ignition species and OH induced OH-fuel decomposition chemical-kinetics mechanism. The process further includes using peaked pressures generated by the ignition event and a combustion of the fuel to drive relatively large magnitudes of OH and/or RI Species and energy from the variable volume main combustion chamber into all of the at least one secondary chamber, including the at least one uniquely equipped secondary chamber. The process further includes using the relatively large magnitudes of OH and/or RI Species and energy to impel yet another of the at least one RI Species and OH induced OH-fuel decomposition chemical-kinetics mechanism in the at least one secondary chamber for an initiating generation of a next-new amount of the radical ignition species. The initiating generation may but need not occur in the at least one uniquely equipped secondary chamber. If the initiating generation occurs in the at least one uniquely equipped secondary chamber, it represents a second same-cycle radical ignition species generation. This next-new amount becomes the predetermined previous-cycle-generated amount of radical ignition species for at least one later cycle of the engine. And the process repeats itself.

A still further embodiment of the present invention relates generally to an apparatus in an internal combustion engine including a cylinder, the cylinder further comprising at least one variable volume combustion chamber defined by a work-power producing component moving within a space bounded externally by a cylinder housing. The cylinder is configured to periodically receive a fuel and an air charge and to implement a combustion cycle comprising an intake, main-compression, combustion, power-expansion and exhaust portions phases. The apparatus further includes at least one mini-chamber arranged about the cylinder housing of the cylinder in proximity with the at least one variable volume combustion chamber. The apparatus also includes at least one connecting conduit configured to couple the at least one mini-chamber with an associated the at least one variable volume combustion chamber, where the at least one connecting conduit allows flow of a plurality of radical ignition species, air of the air charge, the fuel and chemical reaction products in and out of the at least one mini-chamber during the portions phases of the combustion cycle. The at least one mini-chamber is configured to serve as a production site for a generation of the plurality of radical ignition species. The apparatus additionally includes at least one controller associated with at least one of the at least one mini-chamber, where the controller is configured to regulate an amount of the plurality of radical ignition species provided to the at least one variable volume combustion chamber based upon load and speed requirements applied to the engine. Also, at least one of the at least one mini-chamber is a uniquely equipped of the at least one mini-chamber so it can serve as a production site for a second round of the generation of the radical ignition species during the combustion cycle. For this, the at least one uniquely equipped mini-chamber includes a plurality of additional components and/or control to modulate a total of the radical ignition species generated therein during the main-compression phase portion of the combustion cycle. The first round of the generation of the radical ignition species occurs during the power-expansion phase portion of a prior combustion cycle to the combustion cycle. The first round of the generation of the radical ignition species may, but need not necessarily, occur in the uniquely equipped mini-chamber in which the second round of the generation of the radical ignition species is occurring. For the second round of the generation of the radical ignition species during the main-compression phase portion, the plurality of additional components and/or control for the uniquely equipped mini-chamber includes a first device and/or regulation for modulating concentrations of the fuel relative to concentrations of the air charge therein and a second device and/or regulation for thermally modulating temperatures of a gas mixture therein. Further, for the at least one uniquely equipped of the mini-chambers, the apparatus includes control logic configured to coordinate the uniquely equipped mini-chamber to serve as the production site for the second round of the generation of the radical ignition species, with a total of all the radical ignition species provided to the at least one variable volume combustion chamber for the combustion cycle being appropriate to the load and speed requirements applied to the engine.

BRIEF DESCRIPTION OF THE DRAWINGS

Various features of the embodiments can be more fully appreciated, as the same become better understood with reference to the following detailed description of the embodiments when considered in connection with the accompanying figures.

FIG. 1 describes a generalized HCRI thermo-fluid chemical-kinetics process in accordance with HCRI process 100.

FIG. 4A should also be understood to additionally depict a schematic diagram of the interior of a single engine combustion cylinder of an exemplary 4-cylinder HRCI Rotary Combustion Engine (HCRI engine 300) utilizing the Enhanced HCRI process 600 shown in FIG. 8 in accordance with HCRI engine 700.

FIG. 4B, in like manner, should also be understood to additionally depict a top view of two engine combustion cylinders of the 4-cylinder HRCI Rotary Combustion Engine shown in FIG. 4A utilizing the Enhanced HCRI process 600 shown in FIG. 8.

FIG. 4C should also be understood to additionally depict a top view of a housing periphery mounted mini-chamber assembly through section (A-A) for the 4-cylinder HRCI Rotary Combustion Engine embodiment shown in FIG. 4A utilizing the Enhanced HCRI process 600 shown in FIG. 8.

FIG. 4D should additionally be understood to also depict a side view of a rotor in one engine combustion cylinder for the 4-cylinder HRCI Rotary Combustion Engine embodiment shown in FIG. 4A utilizing the Enhanced HCRI process 600 shown in FIG. 8.

FIG. 5A should be understood to also depict a schematic of internal axial cross section diagram (section through line E-E) of one engine combustion cylinder of an exemplary HRCI Two-Stroke Reciprocating Engine (HCRI engine 400) utilizing the Enhanced HCRI process 600 shown in FIG. 8 in accordance with HCRI engine 700.

FIG. 5B should be understood to also depict a schematic diagram of internal top (radial cross section through head including the line E-E) of one engine combustion cylinder of the HRCI Two-Stroke Reciprocating Engine embodiment shown in FIG. 5A utilizing the Enhanced HCRI process 600 shown in FIG. 8.

FIG. 5C, in like manner, should be understood to also depict a schematic diagram of internal bottom (top view of radial cross section of bottom of the cylinder through lines G-G and H-H, and also showing the piston below these lines) of one engine combustion cylinder of the HRCI Two-Stroke Reciprocating Engine embodiment shown in FIG. 5A utilizing the Enhanced HCRI process 600 shown in FIG. 8.

FIG. 6A should further be understood to also depict a schematic of an internal axial cross section diagram (section through line D-D) of one engine combustion cylinder of an exemplary HRCI Four-Stroke Reciprocating Engine (HCRI engine 500) utilizing the Enhanced HCRI process 600 shown in FIG. 8 in accordance with HCRI engine 700.

FIG. 6B should also be understood to additionally depict a schematic of internal axial cross section diagram (through lines J-J and K-K) of one engine combustion cylinder of the HRCI Four-Stroke Reciprocating Engine shown in FIG. 6A utilizing the Enhanced HCRI process 600 shown in FIG. 8.

FIG. 6C should similarly be understood to also depict a schematic diagram of internal top (radial cross section through the cylinder head including lines D-D and J-J) of one engine combustion cylinder of the HRCI Four-Stroke Reciprocating Engine shown in FIG. 6A using the Enhanced HCRI process 600 shown in FIG. 8.

FIG. 6D, in like manner, should be understood to also depict a schematic diagram of internal bottom (radial cross section of bottom including lines K-K) of one engine combustion cylinder of the HRCI Four-Stroke Reciprocating Engine shown in FIG. 6A using the Enhanced HCRI process 600 shown in FIG. 8.

FIG. 8 describes a generalized Enhanced HCRI thermo-fluid chemical-kinetics process in accordance with Enhanced HCRI process 600.

FIG. 10 describes a generalized HCRI thermo-fluid chemical-kinetics process in accordance with Extended HCRI process 800.

DETAILED DESCRIPTION OF EMBODIMENTS

Figure 2A:
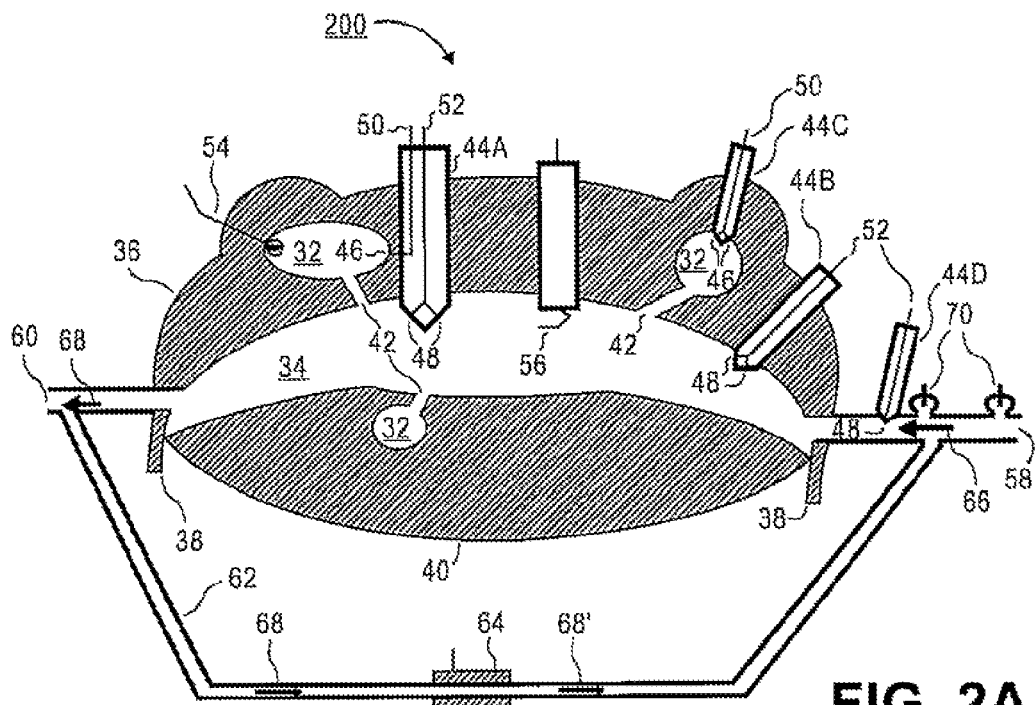
FIG. 2A is a composite schematic diagram of single engine combustion cylinder of an exemplary HCRI engine 200 utilizing the HCRI process 100 shown in FIG. 1.

For simplicity and illustrative purposes, the principles of the present invention are described by referring mainly to exemplary embodiments thereof. However, one of ordinary skill in the art would readily recognize that the same principles are equally applicable to, and can be implemented in, all types of combustion engines, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

An embodiment generally relates to an ignition control process. More particularly, the ignition control process is a thermo-fluid chemical-kinetics procedure configured to provide exacting control over the RI species initiation of homogeneous combustion and of near homogeneous combustion in cyclic IC engines using various hydrogen, alcohol and hydrocarbon fuels and fuel/aqueous-fuel mixtures. The ignition control process achieves this exacting control by making use of RI species, i.e., radicals and highly-reactive intermediate species, to "dominate" ignition and combustion in cyclic IC engines. Autoignition under such conditions can be referred as being via a radical ignition ("RI") mode.

Other embodiments pertain to regulating combustion in the cyclic (reciprocating piston and rotary) IC engines in a manner that can be tailored to any point in an engine operating regime. These other embodiments can be implemented as a cyclic IC engine modified to use the ignition control process. In addition to single-ignition mode engines using RI, embodiments of the ignition control process can also augment SI and CI within a multitude of additional cyclic IC engines. These RI species augmentation IC engines use the RI species to "assist" (rather than dominate) ignition and combustion in modified forms of the conventional IC that make primary use of these older ignition modes. In all three ignition mode cases the use of the ignition control process can enable improved combustion with increased efficiencies and decreased overall emissions.

In comparing the chemical-kinetics mechanisms responsible for the SOC via RI with the general mechanisms associated with the SOC via the other ignition modes, the TI ("thermal ignition") permutation of CI mode serves as a good reference point. The SOC with premixed fuel TI generally occurs at "low" temperatures compared to the "higher" temperatures typically associated with both DI CI and SI. Additionally, the chain-initiation reactions responsible for TI at the "low" temperatures are most typically fuel-oxidation reactions. In contrast the controlled RI process occurs at "lower" temperatures relative to the "low" temperatures of TI. Also, the chain-initiation reactions responsible for RI primarily involve RI species $H_2O_2$ and $HO_2$ rather than fuel-$O_2$ reactions. Further, the RI species based chain-initiation reactions responsible for RI at the "lower" temperatures are typically much faster than the fuel-oxidation based chain-initiation reactions responsible for TI at the "low" temperatures.

Further more, the dominant fuel-$O_2$ chain-initiation reactions of TI are highly affected by the air to fuel ratio. On the other hand, because it is based on a very different mechanism, the dominant chain-initiation reactions responsible for RI are far less dependent on the air-fuel ratio. Instead, the dominant RI chain-initiation reactions depend much more on the strength of presence of the RI species. These TI and RI comparisons apply to both the DI-fuel and the premixed-fuel sub-cases of homogeneous combustion RI ("HCRI"). Moreover, because this strength of presence is made a controllable commodity by the ignition control process, this new process invention is capable of enabling a deeper mining of the priceless potential of the prior art associated with both the SI mode and the permutations of the CI ignition mode for both the premixed and DI fuel cases.

The IC engine embodiments of the ignition control process contain one or more engine combustion cylinder(s) with means to facilitate a cyclic repetition of main-compression, main-combustion, power-expansion, exhaust and intake events common to the general family of rotary and reciprocating piston IC engines of the field. Unique to these engines are stationary secondary RI species generation chambers located in the vicinity of the primary combustion chambers of the cylinders. In 2 and 4 stroke reciprocating engines, these secondary chambers (called mini-chambers) can be located in or near the cylinder heads and/or the cylinder liners that together with the pistons surround (and thus define) the primary combustion chambers (called main chambers). In rotary combustion engines, these mini-chambers are typically located in functionally equivalent locations within or near the cylinder housing periphery that together with the rotor define the various primary (main) chambers.

These mini-chambers ("M-C's") are coupled with the primary chambers via conduits. The conduits are sized so that the flows between the M-C's and main chambers are throttled at most all-operating speeds of the IC engines embodiments. The sizes of the conduits are also configured to quench the flames within the conduits before reaching the M-Cs during a main combustion event. The M-C's and their conduits can also be located in moving portions of the cylinder (e.g., the piston or rotor).

These embodiments are configured to include control devices that are coordinated both with the RI species production in the M-C's and with the other processes that follow from this M-C production. These control devices enable regulation of the overall production and or the overall conveyance of the RI species for use in the main chamber in a later cycle. Regulation of the overall production and/or conveyance is dependent on the ultimate quantity of RI species that must be present in a given main chamber during a subsequent cycle to help facilitate the occurrence of the combustion event via RI species in the manner desired and depending on the operating conditions (combined load, fuel, speed etc.) of the engine. Thus, when production control is exercised within some of the stationary M-C's, it is regulated in these chambers in a manner that considers the total amount of RI species generated by all of the M-C's of a cylinder together with any predetermine-able main chamber generation and supplementary generation and any predetermine-able conveyance that will occur afterwards before the start of the next combustion event.

Within the M-C, the RI species are generated naturally via special "OH-RI species" driven fuel-decomposition reactions. The supply of OH for these special fuel-decomposition reactions is the large quantity generated during the main combustion event and transferred to the M-C's during the period of peak main-to-mini chamber pressure induced mass transfer during and immediately following ignition. The overall production levels of this "OH-RI species" driven RI species generation process is primarily influenced by three factors. The first is the relative concentrations of the various species within the M-C. The second is the temperatures of the reacting M-C constituents. The third is the total volume of the M-C's. In the first of these factors, it is primarily the ratios of fuel to OH and fuel to RI species that are most important. These ratios can in turn be partially regulated by adjusting the insertion of a control-fluid into a regulate-able M-C. The second factor can be controlled in part by M-C augmentation devices capable of adjusting the M-C surface or/and interior temperatures. The third can be controlled by devises capable of regulating the volume of the M-C's. Other types of M-C RI species generation-control augmentations are also employable.

At some point in the HCRI cycle, a portion of the newly created RI species resident in the M-C's will typically transition into non-reactive states of "frozen equilibrium" or into very low reactive states of "near frozen equilibrium". A fraction of this portion of the RI species will remain trapped in the M-C's until it can be used to help seed and impregnate a follow-on main chamber gas charge for the purpose of full HCRI or of the RI species augmentation (of SI or CI).

The regardless of the degree of control in regulating the M-C RI species generation process, the subsequent seeding and impregnation of the main chamber with RI species is supported by additional sub-processes that are predictable. Some of these additional sub-processes are also controllable. Starting only a short time after the completion of the main-combustion event, two of the predictable sub-processes occur in the main chamber during the expansion and the exhaust events. In the first, a large portion of the RI species discharged from the M-C's during expansion is retained for a time in the main chamber. During the same period a second RI species generation process occurs in the main chamber that is similar to the earlier M-C RI species generation process. This second generation process occurs because of the mixing of main chamber (main combustion event produced) OH with the M-C gases discharged into the main chamber (during expansion and blow-down).

Much of the RI species involved in these two sub-processes are lost during exhaust. However, between the cycles other controllable sub-processes can be invoked to adjust the retention of these RI species and to further augment the RI species presence in the main chamber. One of the means of further augmentation is additional generation that is driven in part by some portion of the RI species generated earlier. Also, during the exhaust and intake events, control measures can be evoked to further adjust the conveyance of the RI species to the main chamber. In this overall RI species generation and conveyance progression that originates with the M-C's, all of the predictable and regulate-able portions of the ignition control process are coordinated so as to enable a desired presence of RI species in the main chamber.

It is the presence of these RI species within the main chamber charge of the later cycle that enables controllable ignition and combustion. In RI species dominated engines, it is the greater strength in this presence that serves to switch the dominant chain-initiation path to one that occurs at both the "lower" temperatures and at the much faster reaction rates (than typical of the chain-initiation reactions for SI and CI with the same fuel). It is this novel general RI species induced ignition sub-mechanism that makes possible ignition under leaner conditions with less supplied heat. And in RI species augmented engines, the ignition and combustion chemistry is typically a hybrid of this RI species dominated chemistry and the chemistry of the more conventional ignition modes.

The ignition control process is based on the regulation of the RI species generation and conveyance progression that originates with the M-C's in one cycle to affect the ignition and combustion in the main chamber of another cycle. Whether serving in a dominant role or in an augmentation role, the ignition control process can simultaneously lower emissions, raise thermal efficiencies and increase the operating fuel range of the rotary and reciprocating IC engine embodiments of its field. In these IC engines this control process can do all of this for both the premixed and the DI fuel insertion cases. However, the primary achievement of this ignition control process is in making possible single-ignition mode RI with DI under homogeneous conditions (DI HCRI) in a manner that is tailored to the individual operating conditions of the cyclic IC engine.

Figure 2B:
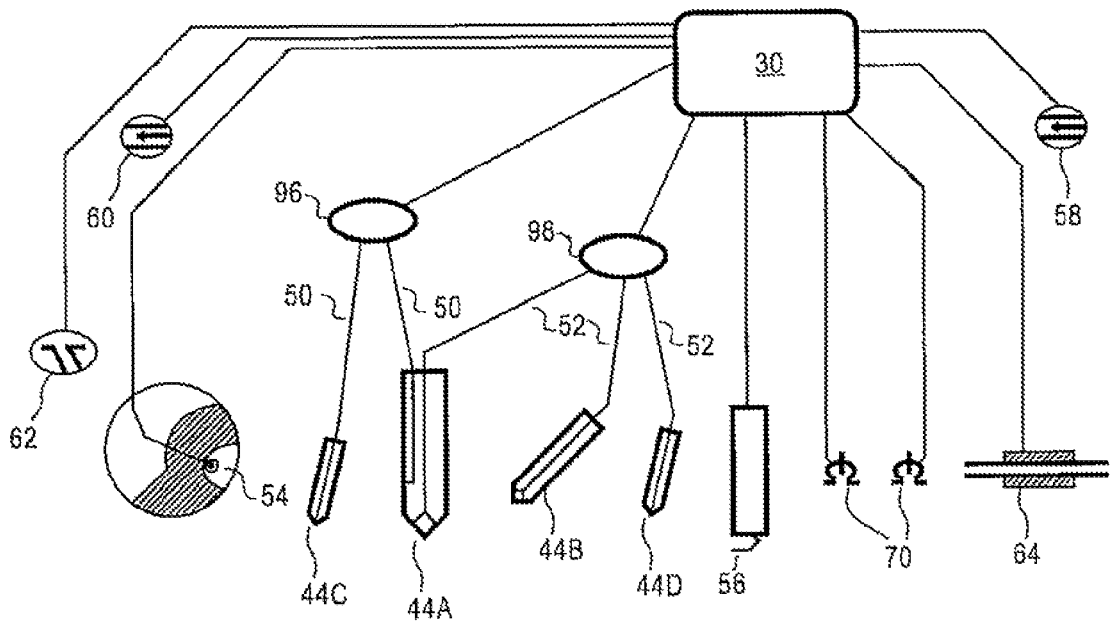
FIG. 2B is a schematic of an exemplary electronic control system for the generalized HRCI engine embodiment shown in FIG. 2A.

FIG. 1 depicts an exemplary process flow diagram for a HCRI thermo-fluid chemical-kinetics process 100 (hereinafter HCRI process 100). The HCRI process 100 is a complex series of general events that can occur in internal combustion ("IC"). FIG. 2A-2B illustrate an exemplary HCRI IC engine 200 (hereinafter HCRI engine 200) that uses the HCRI process 100 in accordance with another embodiment. Accordingly, the HCRI process 100 is explained in conjunction with FIG. 2A-2B.

The exemplary HCRI engine 200 depicted in FIG. 2A-2B is an abstraction capable of using HCRI process 100 in accordance with a plurality of other possible IC engine configurations. HCRI engine 200 is thus a generalized IC engine embodiment containing common elements with other possible IC engine embodiments employing the HCRI process 100. Discussion of various elements and their relationship to the operation of the HCRI engine 200 are described hereafter.

The HCRI process 100 makes use of radicals and highly-reactive intermediate species which are hereinafter called radical ignition ("RI") species. RI species are hereinafter understood to include $H_2O_2$ (hydrogen peroxide) and $HO_2$ (the hydroperoxyl radical) for hydrogen, hydrocarbon and alcohol fuels and fuel/aqueous-fuel mixtures. In addition, when the fuel molecules of such fuels/fuel mixtures consist of at least one carbon atom (such as the individual fuels methane and methanol), it is hereinafter understood that the RI species may also include $CH_2O$ (formaldehyde). Further, when the fuel molecules of such fuels/fuel mixtures consist of at least two or more carbon atoms (such as the individual fuels ethane, ethanol and fuels with larger molecules), it is hereinafter understood that the RI may also include $CH_3HCO$ (acetaldehyde). Hydrogen, hydrocarbon and alcohol fuel and fuel/aqueous-fuel mixtures are hereinafter called "fuel". Finally, depending on the fuel, it is hereinafter understood that RI species may also include other radicals and highly reactive intermediate species.

In one embodiment, a full HCRI engine is one in which the IC in HCRI process 100 is dominated by RI species. A radical ignition species augmented ("RIS-augmented") engine is one in which the IC in HCRI process 100 is assisted but not dominated by RI species as another embodiment. Hereinafter a main-compression event is understood to start after the completion of the exhaust and intake events. In yet other embodiments, the full HCRI engine that makes use of fuel that is inserted by some means before the beginning of the main-compression event in HCRI process 100 is called a "premixed charge HCRI engine" (or PC-HCRI engine) of HCRI process 100 and the full HCRI engine that makes use of the direct injection ("DI") of fuel that starts sometime after the beginning of the main-compression event in HCRI process 100 is called a "DI-HCRI engine" of HCRI process 100 in accordance to yet other embodiments.

Similarly, the RIS-augmented engine that makes use of fuel that is inserted by some means before the beginning of the main-compression event in HCRI process 100 is called a "premixed RIS-augmented engine" of HCRI process 100 in some embodiments and the RIS-augmented engine that makes use of the DI of fuel that starts sometime after the beginning of the main-compression event in HCRI process 100 is called a "DI RIS-augmented engine" of HCRI process 100 in other embodiments. Depending on whether the dominant ignition mode employed is spark ignition ("SI") or compression ignition ("CI"), each of these HCRI process 100 RIS-augmented fuel insertion options (premixed and DI) have sub-options associated with them. Thus there are four basic RIS-augmentation embodiments of HCRI process 100. These involve RIS-augmented PCCI, RIS-augmented PCSI, RIS-augmented DI CI, RIS-augmented DI SI.

A cycle of HCRI engine 200 consists in part of an intake event, a main-compression event, a main-combustion event, a power-expansion event and an exhaust event. Depending on the embodiment of HCRI engine 200, some of these events may co-occur.

As shown in FIG. 1, event 1 105: HCRI process 100 starts and ends with RI species from a previous cycle being conveyed to the present cycle. These are carried over to the present cycle within/by both a main chamber 34 or plurality of main chambers and a mini-chamber ("M-C") 32 or plurality of mini-chambers ("M-C's") (FIG. 2A).

At the start of the new cycle the bulk of the RI species in both the main chamber 34 and the M-C's 32 are typically in states of "frozen equilibrium" (or "near" frozen equilibrium). The RI species then typically remain non-reactive at the relatively lower temperatures prevalent early in the new cycle. In RI applications, a specie is in the state of frozen equilibrium when it has a chemical-reaction rate of zero. The full meaning and implications of "frozen equilibrium" relative to RI is discussed in SAE Transaction Paper No. 2004-01-1677 (Blank), which is incorporated by reference.

During this period, a plurality of exhaust gases 68 depart the main chamber 34 via a general exhaust-gas device 60 and a plurality of intake gases 66 enters the main chamber 34 via a general intake-gas device 58. Depending on the volumetric and mixing efficiencies of the overall exhaust-intake event process, most of the main chamber RI species contained in the exhaust gases 68 are expelled from the engine.

When there is recycling of the exhaust gases 68 via a general exhaust-gas recycling device (system) 62, additional quantities of RI species are either retained internally in the main chamber 34 or returned to the main chamber's 34 with the intake gases 66. The quantity of RI species returning with the intake gases 66 may be adjusted by a general exhaust-gas RI-species augmentation device 64 or plurality of exhaust-gas RI-species augmentation devices 64 (resulting in a plurality of modified exhaust gases 68'). Also, the quantity of RI species returning with the intake gases 66 may be adjusted by a general intake-gases RI-species generation-control augmentation device 70 or plurality of intake-gases augmentation devices 70.

When the IC engine uses premixed fuel (be it for the PC-HCRI or one of the premixed RIS-augmentation engines of HCRI process 100), fuel can be inserted into the intake gases 66 in the general intake-gas device 58 by a general intake-gas entry device fuel insertion device 44D via fuel-insertion orifices 48. The fuel is distributed to the intake-gas fuel insertion device 44D via a fuel supply distribution system 98 (FIG. 2B) through at least one fuel supply line 52. The amount fuel supplied to the intake-gas fuel insertion device 44D is regulated by a portion of the engine electronic control system 30 that controls the fuel supply distribution system 98. The amount of fuel provided and the timings of fuel insertion are in accordance with HCRI engine 200 operational requirements.

Naturally occurring pressure differences between the chambers cause some of the RI species carried over in each of the M-C's 32 to transfer to the main chamber 34 through at least one connecting conduit 42 where they are then mixed with retained gases and the intake gases 66 along with any recycled exhaust gases 68 and 68'. The manner of the mixing can vary with the operational requirements of the engine being used.

In event 2, 110, by a time somewhere in the middle of the compression event, the gases ("gas charge") in the main chamber 34 have become highly impregnated with RI species from the previous cycle(s).

In event 3 115, as compression of the gases in the main chamber 34 continues, the mix of the RI species and the main chamber gases becomes more homogeneous. This main chamber compression causes pressure rises and pressure induced temperature rises. With these temperature rises, the activity of the RI species in the main chamber 34 begins to increase. Also, pressure differences form between the main chamber 34 and M-C's 32 and a throttling of the gases being transferred into the M-C's 32 typically occurs in the conduits 42. The throttling in turn causes the pressure differences between these chambers (32 and 34) to further build, causing a high-speed mass jet or a plurality of high speed jets (one jet per conduit 42) to form. These jets transfer ("force") portions of the main chamber gases (including intake air) into the M-C 32, renewing the M-C's air (and thus oxygen) supply. If there is premixed fuel within the intake gases 66, fuel also enters the M-C's 32 through the conduits 42 via the mass jets.

In event 4 120, when there is DI of the fuel (as in the DI-HCRI and DI-RIS-augmentation engines of HCRI process 100), the timing of the start of injection ("SOI") of the fuel into the main chamber 34 is typically during the mid-to-late portion of the main-compression event. In this case, the fuel is inserted into the main chamber 34 by either a main chamber fuel sub-component or sub-components of one or more multi fluid insertion device 44A and/or by a single main chamber fuel insertion device 44B or plurality of single insertion devices 44B (for all such insertion devices 44A and 44B) at least one fuel-insertion orifice 48. The fuel is distributed to the insertion devices 44A and 44B for use in the main chamber's 34 via the fuel supply distribution system 98 through the fuel supply lines 52. The amount of fuel supplied to each of these insertion devices 44A and 44B is regulated by the portion of an engine electronic control system 30 that controls the fuel supply distribution system 98. The amounts of fuel provided and the timings of fuel insertion are in accordance with HCRI engine 200 operational requirements.

For DI-HCRI engines of HCRI process 100, the timing of the start of this DI fuel insertion is characteristically early relative to the desired timing of ignition (compared to conventional DI diesel engine operations). For these embodiments, the SOI and EOI ("end of injection") are timed so that injection is completed adequately before the start of combustion ("SOC"), and so that the autoignition (SOC) does not begin until just a little after a movable work-power producing component's 40 passing of top dead center ("TDC") (where TDC is a position of the movable work-power producing component 40 that makes the volume of the main chamber 34 a minimum). This allows time for the fuel to eventually become mixed more thoroughly with the RI species laden main chamber gas charge in at least a quasi-homogeneous layered manner. In DI applications, some of the injected main chamber fuel can enter the mass jets of M-C's 32 by both diffusion (within the main chamber gas charge) and by incidental convection. This fuel is accordingly entrained by these mass jets into the M-C 32 via the conduits 42 and trapped.

In event 5 125, in DI-HCRI embodiments of HCRI process 100, with all of the main chamber fuel being inserted early relative to the SOC (compared to conventional DI CI), well-stirred fuel conditions are also generally assured. Even under higher load conditions, by some time prior to "after TDC" autoignition, the mixing of the main chamber fuel-air gas charge to at least quasi-homogeneous levels is typically assured in DI-HCRI embodiments of HCRI process 100. However, as in the LAG engine under the influence of RI species domination, RI homogeneous combustion can occur even when the fuel-air gas charge is slightly-moderately stratified (SAE Transaction Paper No. 2004-01-1677 [Blank]). These assurances follow from two factors: the longer than normal mixing times available because of the presence of the RI species and the much higher than typical turbulence levels.

The first of these factors, the longer than normal mixing times available, is a result of the presence of the RI species. Their presence makes possible either much lower compression ratios ("CR's") or ultra-fuel lean operations. When the CR is much lower (than in "functionally equivalent" conventional CI engines), DI fuel insertion can be earlier when HCRI engine 200 is operated under moderately lean conditions. Thus the directly injected fuel can be effectively mixed to the point of homogeneity. Alternatively, when the CR is only moderately lower, the HCRI engine 200 can be operated under very lean conditions and fuel insertion can once more be earlier and again homogeneously mixed. Depending on the load and engine speed, there are conditions (higher load and speed) that necessarily require less lean operations. Under such conditions, RI species generation is accordingly reduced so that the fuel insertion can still be early relative to the desired point of autoignition.

The second of these factors, the much higher than typical turbulence levels maintained in HCRI engine 200, can have multiple causes. However, universal to all HCRI engine embodiments is the intense turbulence generated by the M-C's 32. Reasons for the intensity of this turbulence generation are given in SAE 2007-01-0047 [Blank], SAE 2007-01-0135 [Blank] and SAE 2007-01-1254 [Blank].

In event 6 130, in both the DI and premixed fuel cases, because of the high turbulence and the presence of the RI species, even at the relatively "much lower" than "normal" temperatures present in the main chamber (than are needed for conventional IC engine pre-ignition activity), typically sometime before the end of the main-compression event, the main chamber RI species, fuel and air begin significant pre-ignition activity. Depending on the characteristics of the fuel, the operating conditions and specifications of the IC engine embodiment, this activity can often even start a little earlier in the main-compression event.

Figure 3:
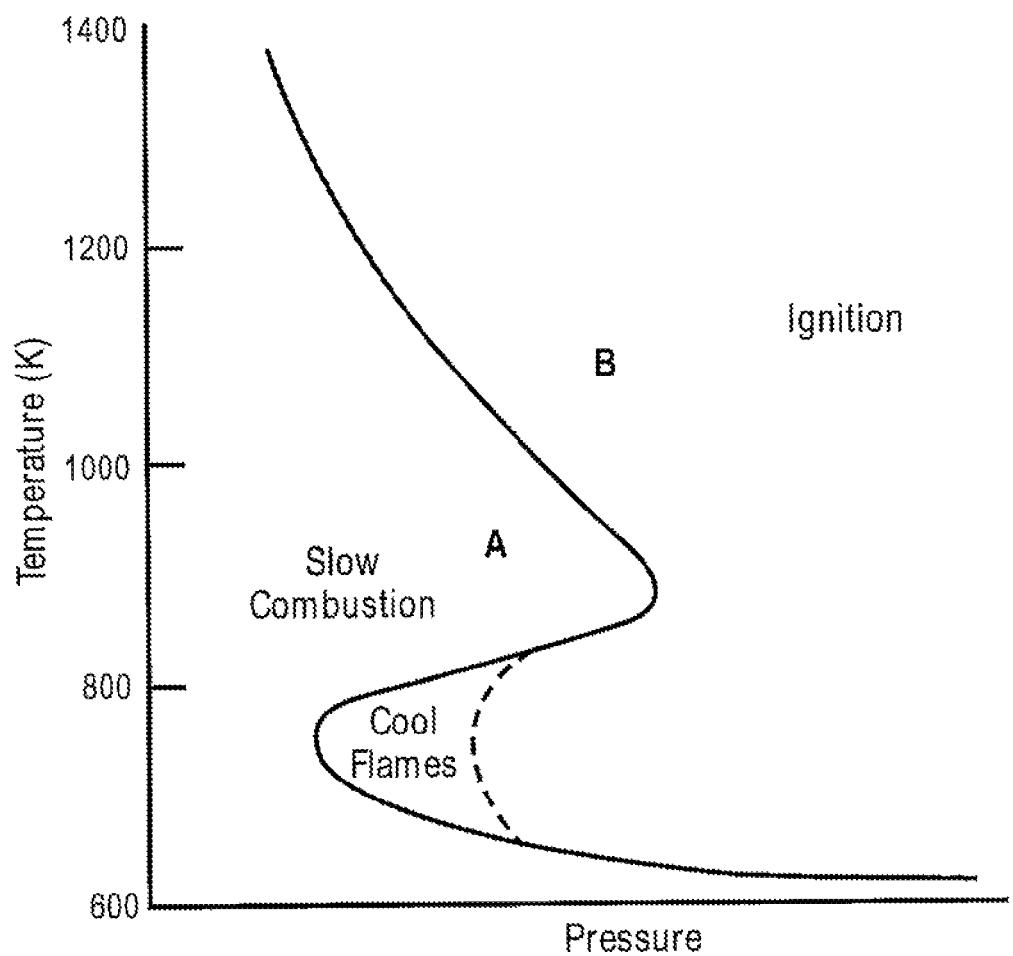
FIG. 3 is a plot depicting general ignition limits for hydrogen, alcohol and hydrocarbon fuels.

Typically during these periods of the cycle, the state of the fuel-air gas charge in the main chamber 34 is transitioning through the "Slow Combustion Region" shown in FIG. 3. This figure for the general ignition limits for fuel is based on Semenov's peninsula of low temperature ignition limits (Semenov, N. N., *Some Problems in Chemical Kinetics and Reactivity*, Princeton University Press, 1958).

For either a hydrogen molecule or a smaller molecule alcohol or a smaller molecule hydrocarbon as F, in the pre-autoignition chemistry leading up to RI and RIS-augmented ignition, the following chain-initiation reaction set:

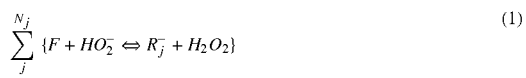

$$\sum_{j}^{N_j} \{F + HO_2^- \Leftrightarrow R_j^- + H_2O_2\} \quad (1)$$

contains some of the reactions that are among those playing a dominant role, where $R_j^-$ are molecules with one less H than F. For example, with ethanol there are two dominant reactions in the set ($N_j=2$), for which $R_j^-$ are $CH_3CHOH$ and $C_2H_4OH$ (SAE Paper No. 2007-01-0623 [Blank], which is incorporated by reference in its entirety). It is noted that this reaction set results in a build-up of the highly reactive intermediate species $H_2O_2$.

In addition to this set, the general "$H_2O_2+M$" chain-initiation reaction dominant during autoignition (Equation (2)) (and thus described later) and the chain-branching OH-fuel decomposition reaction set dominant during autoignition (Equation (3)) (and thus also described later) are both typically among the other dominant reactions in operation during pre-autoignition. These and the other dominant pre-autoignition reactions occurring during this same period of the cycle result in the slow build up of the RI species. Though the dominant pre-autoignition chain-initiation and chain-branching mechanisms become more complex with a larger hydrocarbon or a larger alcohol molecule as F, the same principles apply, with the role of the hydroperoxyl radical ($HO_2$) (in the chain-initiation reaction decomposition of the fuel) and the role of the hydroxyl radical ($OH^-$) (in the chain-branching reaction decomposition of the fuel) both dominant during the pre-ignition activity.

In general, these general $HO_2^-$ and $OH^-$ driven "much lower" temperature sub-mechanisms represent direct fuel decomposition at very low temperatures, setting the stage for "lower" temperature self ignition by the RI species (RI) in the full HCRI engines of HCRI process 100 (DI-HCRI and PC-HCRI) and for ignition assistance in the RIS-augmented engines of HCRI process 100.

This description also applies to dual-fuel (and multi-fuel) insertion operations in which the re-activities with $HO_2^-$ and $OH^-$ of all the constituents (of the fuel) are compatible. In such cases, the general mechanism is similar, with the dominant reactions for each constituent being of the same form (with of course their own F, $R_j^-$ and other species) (SAE Paper No. 2007-01-0047 [Blank]). In operations in which the re-activities of the various constituents of the fuel with $HO_2^-$ and $OH^-$ are not similar, typically at least initially, the general reaction sub-mechanisms follow the activity of the constituent whose reactivity with the more significant of either $HO_2^-$ or $OH^-$ is dominant (depending in absolute terms on which radical is decomposing which of the constituents the fastest during pre-autoignition).

In HCRI process 100 the RI species from past cycles and the RI species created during this "much lower" temperature pre-ignition activity are subsequently used together in one of three ways in the main chamber IC: (1) to dominate and thus initiate autoignition (RI) in full HCRI engines; (2) to augment the efficiency of and maintain better control over the timing of autoignition (CI) in RIS-augmented PCCI and in DI CI engines; and (3) to augment the efficiency of spark ignition (SI) in RIS-augmented PCSI and DI SI engines. In the two full HCRI cases (DI-HCRI and PC-HCRI), because of the presence of the RI species, there is exothermic pre-ignition activity that is slowly (at first) carrying the fuel-air gas charge down a predetermined chemical-kinetics path (dependent on many factors) to RI species induced autoignition. In the four RIS-augmented cases, the activity levels during this same period will not be as high, but will however be higher levels (depending on the degrees of augmentation) than in the conventional (non RIS-augmented) variants of these cases.

Returning to FIG. 2A, the exterior casing of HCRI engine 200 consists of a "top" housing periphery 36 and a "side" housing periphery 38 (or plurality of side housing peripheries 38). Starting generally at a time in the cycle that is late in the main-compression event, a control fluid can be inserted into one or more of the M-C's 32 mounted in these top and/or side housing peripheries 36 and 38. Insertion is by either a single RI-species generation control-fluid insertion device 44C or by a control fluid sub-component of the multiple or the dual-fluid insertion device 44A. Actual insertion into the M-C's 32 is through one or more M-C RI-species generation control-fluid insertion orifice 46. The control fluid is distributed to the insertion devices 44A and 44C for use in theses M-C's via a mini-chamber RI species generation control fluid supply distribution system 96 through at least one M-C RI species generation control-fluid supply line 50.

It is not necessary that the same control fluid or the same quantity of control fluid be inserted into each of the M-C's 32 using control fluids. In the three DI engine types of HCRI process 100 the control fluid is typically fuel, though not necessarily the same fuel as used in the main chamber 34. On the other hand, in the three premixed engine types of HCRI process 100 the control fluid is typically air or some other fluid that can help dilute the fuel concentrations of the M-C 32. The amount of control fluid inserted into each of the M-C's 32 is tailor measured to insure that a correct total quantity of RI species can be generated by all of the M-C's 32 to either assist in or dominate the ignition of the main chamber(s) 34 of later cycles. The amount sent by the control fluid supply distribution system 96 for each M-C 32 is regulated by another portion of the engine electronic control system 30. Generally, at higher loads (when more main chamber fuel is needed), fewer quantities of generated RI species are required for main chamber ignition and vice versa. This applies in the application of HCRI process 100 to all of the various full HCRI and the RIS-augmented cases.

In addition to the use of control fluid, there are a number of additional augmentations that can be used to effect the RI species generation process in the housing periphery mounted M-C's 32. Variable cooling control of the M-C 32 assemblies by direct means is effective in assisting in the direct control of the M-C RI species generation process in these chambers. Other control augmentations include catalytic surfaces and devices (including ones where the catalytic surface areas can be varied), fuel reformatting devices, chemical additive insertion devices, heating-cavity devices (example: via rapid electrical current discharges, etc.), rapid plasma generation devices, rapid ultraviolet-light discharge devices, micro-wave devices, rapid cooling/heating devices, M-C volume changing devices, M-C pressure regulating devices, M-C flow varying devices, M-C geometry varying devices, M-C connecting conduit geometry varying devices, M-C connecting conduit flow varying devices, M-C conduit entering-fuel regulating devices, etc. Devices such as (but not limited to) these can all be used to play a part in the control of RI species generation in M-C's (and to help indirectly control RI species generation in the main chamber's later on in the cycle). All such devices are together represented in FIGS. 2A-B as one or more general mini-chamber RI-species generation-control augmentation device 54.

Any M-C 32 receiving control-fluid or fitted with and operationally employing RI-species generation-control augmentation device 54 are also considered "control-active." These are also regulated by a portion of the engine electronic control system 30 (FIG. 2B) that controls their functions in accordance with HCRI engine 200 operational requirements.

In event 7 135, in full HCRI embodiments of HCRI process 100 self ignition (RI) is dominated by RI species. Thus, the general chemistry for these embodiments is highly definitive. Also, all of the CI and SI RIS-augmented engines of HCRI process 100 share this definitive general chemistry as a common feature. In addition these RIS-augmented engines retain elements of the "un-augmented" chemistry associated with their own conventional characteristics. The degree to which these RIS-augmented engines employ the definitive general chemistry of full HCRI is related to the degree of RI species augmentation ("RIS-augmentation").

Thus HCRI process 100 is defined in part by the common features representative of the definitive general chemistry of full HCRI. And consequently, details of this definitive chemistry for event 7 135 are herein described. For comparison purposes, the portion of the "un-augmented" chemistry associated with the conventional aspects of the RIS-augmented embodiments are presented later (within the specific individual discussions of the general distinctives of these HCRI process engines of HCRI process 100).

In full HCRI engines, the ignition process is dominated by sub-mechanisms involving fuel-OH decomposition chain-branching reaction sets at "lower" temperatures. This is in contrast with the more traditional "low" temperatures direct-$O_2$ fuel oxidation chain-initiation chemical-kinetics mechanisms typically found for the same fuel in conventional PCCI. This is also in contrast to the "higher" temperatures associated with combustion of the same fuel in conventional SI and DI CI. The chain-initiation reaction mechanisms of conventional SI and DI CI typically involve dissociation (thermal and/or via third body) reactions or and direct fuel-$O_2$ decomposition reactions.

In the general case of homogeneous combustion RI with the fuel (hydrogen, alcohol, hydrocarbon fuels and fuel/aqueous-fuel mixtures), the OH needed to sustain the 'lower' temperature fuel-OH decomposition sub-mechanisms is primarily generated by dominant chain-initiation reaction:

$$H_2O_2 + M \Leftrightarrow OH^- + OH^- + M \qquad (2)$$

(where M is a third body species and can thus be one of a number of species). This general RI chain-initiation reaction is significantly faster than the general fuel-$O_2$ chain-initiation oxidation reaction sets typical of conventional "low" temperature premixed charge compression ignition of conventional HCCI. For example, the forward rate constant for this $H_2O_2+M$ reaction is more than $10^5$ times faster at 1050 K than the forward rate constant for the dominant chain-initiation reaction for the premixed CI (HCCI) of methane at 1200 K (SAE Paper No. 2007-01-0047 [Blank]).

For the case of either a hydrogen molecule or a smaller molecule alcohol or a smaller molecule hydrocarbon as F, a $OH^-$ quantity generated by this universal HCRI process 100 chain-initiation reaction (Equation (2)) is in turn used in the general dominant chain-branching reaction set:

$$\sum_i^{N_i} \{F + OH^- \Leftrightarrow R_i^- + H_2O\} \qquad (3)$$

where $R_i^-$ are molecules with one less H than F. For full HCRI with ethanol as an example, F is $C_2H_5OH$ and the various $R_i^-$ molecules are $CH_3CH_2O$ and $CH_3CHOH$ (SAE Paper No. 2007-01-0623 [Blank]).

The general full HCRI autoignition event is also dominantly influenced by the available concentrations of the other key RI species. Though the sub-mechanisms for all of this can be rather complex (and thus more difficult to generalize), the other RI species also help in accelerating $OH^-$ generation during autoignition (as they did during pre-ignition). This in turn helps to "drive" more fuel decomposition via the dominant fuel-OH chain-branching reaction set (Equation (3)). Once a molecule of fuel is OH-decomposed, some of the $R_i^-$ molecule products of this set can be directly decomposed further by $O_2$ at these lower temperatures. Though the dominant autoignition chain-branching mechanisms become much more complex with a larger hydrocarbon or a larger alcohol molecule as F, the same principles apply, with the role of the hydroxyl radical ($OH^-$) remaining dominant in the fuel decomposition until much (if not most) of the fuel is expended.

There are several reasons why this autoignition activity (dominated by reaction Equation (2), reaction set Equation (3) and the other RI species driven reactions) can start at temperatures that are "lower" than both the "low" temperatures associated with conventional PCCI and the "higher" temperatures associated with conventional SI and DI CI. One is that these RI species related reactions require far less total energy for their activation (and thus require far less supplied heat) than the fuel-$O_2$ chain-initiation reactions generally responsible for initiating combustion in PCCI. The temperatures required for both the third body dissociation of $H_2O_2$ via Equation (2) and the $OH^-$-driven decomposition of the fuel via Equation (3) are generally well below the "low" temperatures required for direct $O_2$-driven fuel decomposition, while the temperatures required for direct thermal dissociation and third body dissociation of the same fuel are often higher than those required for $O_2$-driven fuel decomposition. Further, because these RI species related reactions are relatively more dependent on the concentrations of the RI species, they are also comparatively less dependent on the ratio of the air to fuel concentrations. This makes ignition possible under much leaner conditions than are typically possible with conventional SI, PCCI and DI CI. Also, as it progresses, the lower temperature RI autoignition activity serves to generate more RI species.

The reaction rates of the dominant reactions and reaction sets driving this RI activity are functions of both the concentrations of the key reactants and of the temperature of the reacting main chamber gases. Thus, in the full HCRI engines of process 100 the overall "tempo" of this autoignition activity builds until a point at which the tempo literally "takes off". While these dominant reactions continue to dictate for a some period of time after this "take off" point (as long as the fuel supply remains), eventually other sub-mechanisms take over, leading ultimately to high temperature chemistries that result in $H_2O$ and $CO_2$.

This generalized description of full HCRI applies to dual-fuel (and multi-fuel) RI chemistry in which the re-activities of all the constituents (of the fuel) with $OH^-$ are compatible. In such cases, the general mechanism will be the same, with the dominant reactions for each constituent of the fuel being of the same form (with of course their own F, $R_i^-$ and other species) (SAE Paper No. 2006-01-0047 [Blank] and combined SAE Paper No. 2007-01-1912 and JSAE Paper No. 20077210 [Blank], which is incorporated by reference in its entirety). In operations in which the re-activities of the fuel constituents with OH are not similar, initially at least the general reaction sub-mechanism will typically follow the activity of the fuel constituent whose reactivity with $OH^-$ is dominant.

During autoignition with homogeneous combustion, all of the fuel in the main chamber is consumed. Also, during the homogeneous combustion of the fuel, relatively large quantities of the OH radical are produced. Before the end of autoignition the concentration of the main chamber $OH^-$ peaks. Moreover, the rate of heat release is much faster than with ignition in the variants of un-augmented CI and SI. Thus, at the completion of the homogeneous combustion the specific internal energy state of the gases in the main chamber 34 is peaked. Accordingly, the pressure and temperature of the main chamber gases also peak almost immediately after the completion of autoignition. Thus an enormous pressure difference between the main chamber 34 and M-C's 32 develops. This in turn peaks the mass jet velocities and mass flow rates between these chambers 34 and 32, driving the relatively large quantities of $OH^-$ and energy into the M-C's 32 under extremely high turbulence levels.

In addition to sharing the definitive general chemistry of full HCRI, the RIS-augmented engines of HCRI process 100 also share many of the other features exhibited during full HCRI ignition and combustion. For example, the combustion is also homogeneous in the RIS-augmented PCCI engine of HCRI process 100. Additionally, during the combustion event in the four main RIS-augmented engines of HCRI process 100, the pressure, temperature, $OH^-$ concentrations and specific internal energy of the main chamber gases also peak. As a result, high mass flow rates also evolve in these embodiments, carrying relatively massive quantities of $OH^-$, other chemical reaction products and energy into the M-C's 32 under the extremely high turbulence levels.

As an optional step within the full HCRI and the PCCI RIS-augmented engines of HCRI process 100, immediately prior to the point in the cycle at which the "tempo" of the autoignition activity is about to "take off", a general main chamber ignition-timing augmentation device 56 (FIG. 2A) can be used. The purpose of the ignition-timing augmentation device 56 in the full HCRI engines and in the PCCI RIS-augmented engine is not to initiate autoignition. Rather the purpose is to assist the accuracy of the timing of the point (position in the cycle) where the "tempo" of autoignition activity literally "takes off". At this point in either a full HCRI cycle on in a PCCI RIS-augmented cycle, because the combination of the heat of compression and the RI species activity have together already made the main chamber fuel-air mixture just ready for ignition (via the extensive OH generation), any small joint rise in pressure and temperature will cause the bulk ignition of the fuel-air gas charge in one go (which by definition is homogeneous combustion). Examples of ignition-timing augmentation devices 56 may include spark plug type devices, catalytic-ignition devices, plasma-jet-generating devices, flame-jet-generating devices, etc., where the objective of such devices is in creating a relatively small (or even large) but/and very sudden internal energy increase in some portion of the main chamber fuel-air gas charge. In the two SI RIS-augmented embodiments of HCRI process 100, this step is not optional.

A key to the generation of the new RI species in the M-C's 32 is "OH-RI species induced" (driven) chemistry caused by the well-timed influx of main chamber $OH^-$ into the RI species laden gases of the M-C's 32. This influx occurs during and just after ignition. Also, this influx enables extremely high turbulence levels in the M-C's 32. Thus, there is an immediate mixing of the hydroxyl radical with the M-C gases (including fuel and RI species) at the smallest turbulent length scales. Perhaps as important to RI species generation in the M-C 32 is the relatively high quantity of enthalpy also being received in the M-C 32 from the main chamber 34, causing the M-C temperatures to start to rise rapidly.

In event 8 140, the sudden presence of this higher (and for a time, increasing) quantity of $OH^-$ in the M-C's 32 acts in effect as a "driving force" to rapidly convert the resident M-C fuel into more RI species. Also, the overall chemical activity of the M-C 32 is further accelerated by the rapidly rising temperature (due to the relatively enormous amount of enthalpy transfer). The M-C's 32 are designed and controlled so that during the last part of the main-compression event and first part of the power-expansion event the states of their gases can be thermally maintained in the "Cool Flames" and/or "Slow Combustion" regions of FIG. 3 (if the fuel has a cool flames region). Sometimes also (as in SAE Paper No. 2007-01-0623 [Blank]) it is expedient to very briefly take the state of the M-C gases slightly into area "B" or the "Ignition" region of FIG. 3 before a sudden conduit 42 flow reversal (due in part to the power-expansion event in the main chamber 34) takes the state back in area "A" (FIG. 3) without igniting the M-C gases.

In general, for a hydrogen molecule or a smaller molecule alcohol or a smaller molecule hydrocarbon as F, among the most dominant reactions found in the general sub-mechanisms for this mini-chamber OH-induced chemistry is again the general reaction set:

$$\sum_{i}^{N_i} \{F + OH^- \Leftrightarrow R_i^- + H_2O\} \quad (4)$$

where as before $R_i^-$ are molecules with one less H than molecule F. Though the dominant mechanisms for OH-fuel reduction in the M-C become much more complex for a larger hydrocarbon or a larger alcohol molecule as F, the same principles apply.

The sub-mechanisms for subsequently converting the various $R_i^-$ (and other sub-mechanism generated species) into RI species are more complex, with heavy dependence on effects of the significant concentrations of fuel and RI species already present in the mini-chamber. And as the new quantities of the RI species increase (due to these sub-mechanisms), part of the new $H_2O_2$ being created is then sacrificed to create additional $OH^-$ via exothermic reaction Equation (2) to help accelerate the $OH^-$ decomposition of the fuel into the various $R_i^-$ and other species. Similarly the other RI species resident in the M-C 32 help in both the generation of more $OH^-$ and more RI species in a complex chemical-kinetics sub-mechanism. Thus the overall RI species generation mechanism is both OH-driven and RI species-driven, or "OH-RI species driven". Though the dominant autoignition chain-branching mechanisms become much more complex with a larger hydrocarbon or a larger alcohol molecule as F, the same principles apply, with the role of the hydroxyl radical ($OH^-$) dominant in the fuel decomposition.

This generalized M-C RI species generation process is universal to all full HCRI and all RIS-augmented embodiments of HCRI process 100. Also, although this generalized description is based on the same fuel being inserted into the main chamber 34 and M-C's 32 (when the fluid being inserted into the M-C is in fact fuel), in dual-fuel or multi-fuel insertion operations the same is true for all the constituents (of the fuel) inserted into the engine. In such cases, if the re-activities of all the constituents (of the fuel) with $OH^-$ are compatible, the dominant reactions for each are of the same form (with of course their own F, $R_i^-$ and other species) (SAE Paper No. 2007-01-0047 [Blank] and JSAE Paper No. 20077210 [Blank]). In operations in which the re-activities of the fuel constituents with $OH^-$ are not similar, initially at least the general reaction sub-mechanism will typically follow the activity of the fuel constituent whose reactivity with $OH^-$ is dominant. This RI species generation process continues to strengthen until the supply of $OH^-$ from the main chamber 34 is cut off by the sudden M-C to main chamber conduit 42 flow reversal mentioned earlier (and caused in part by the power-expansion event), after which, this process dies off.

Based on this abbreviated chemical-kinetics description of the M-C RI species generation process, the role of the control fluid can be delineated. Relative to the air, the higher the concentration of fuel in the M-C 32, the faster this sub-mechanism will produce additional RI species. The reverse is also true. This is demonstrated in SAE Paper No. 2007-01-0013 [Blank], which is incorporated by reference in its entirety. This full chemical-kinetics study shows why the timing of main chamber 34 autoignition (SOC) can be directly controlled in full HCRI engines of HCRI process 100 by the regulation of the quantity of the control fluid inserted into the M-C's 32. This reference demonstrates that the quantity of the control fluid inserted into the M-C 32 precisely determines the quantity of RI-species generated in the M-C 32 (for use in the next main chamber combustion event). Thus, the RI species generation process can be directly controlled by using the engine electronic control system 30 (FIG. 2B). At the correct times (depending on a particular engine operating condition) the electronic control system 30 directs the mini-chamber RI species generation control fluid supply distribution system 96 to send proper amounts of control fluid through the control fluid supply lines 50 (FIG. 2B) to the control-fluid insertion devices 44A and/or 44C of certain M-C's 32 (FIG. 2A). These control fluid insertion devices deliver control fluid into these M-C's 32 via the control fluid insertion orifices 46.

In the PC-HCRI engine and the two premixed fuel RIS-augmented engines of HCRI process 100 the control fluid is likely to be a liquid or gas that can serve to dilute the fuel concentration of the M-C as needed (relative to the air concentration). More dilution decreases the RI species generation rates and less dilution increases the RI species generation rates. Conversely, in the DI-HCRI embodiment and the two DI fuel RIS-augmented engines of HCRI process 100, the control fluid is best the fuel (or a constituent of the fuel). With such as the control fluid, when it is necessary to increase or decrease the RI species generation, the fuel concentrations of the M-C are strengthened or weakened accordingly.

Based on the abbreviated chemical-kinetics description of the M-C RI species generation process, the role of the general M-C RI-species generation-control augmentation device 54 can also be delineated. The general M-C RI-species generation-control augmentation device 54 can be an apparatus capable of increasing or decreasing the overall rates of the M-C RI species generation chemical-kinetics process by some means. Specifically, these M-C augmentation devices 54 either speed or slow the overall reaction rates of reaction set

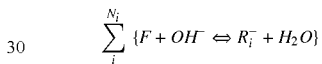

(when F is a smaller molecule) (Equation (4)) or its more complex equivalents (when F is a larger molecule) along with the sub-mechanisms for subsequently converting the $R_i^-$ species (and other sub-mechanism generated species) into additional RI species and more OH. In particular, the overall reaction rate of dominant exothermal reaction $H_2O_2+M \Leftrightarrow OH^-+OH^-+M$ (Equation (2)) contained within the RI species generation mechanisms is highly sensitive to temperature and to the concentration of $H_2O_2$. Also, the overall reaction rates of the reactions of Equation (4) and its more complex equivalents (for the larger molecule fuel constituents) are highly sensitive to both temperature and to the concentration of $OH^-$. Finally, the dominant follow-on reactions for converting the products of reaction set Equation (4) into new RI species are highly sensitive to the temperature and the existing concentrations of the RI species.

Thus, various apparatus capable of affecting the temperature of gases of the M-C in a controlled manner and/or of augmenting the concentrations of $OH^-$ and/or any of the RI species within the M-C in a controlled manner, are among those considered to be M-C RI-species generation-control augmentation devices 54. For example, one full chemical-kinetics experiment has shown that the regulation of the M-C wall temperatures alone can be used to both control the quantity of RI species generated in the M-C 32 and control the timing of autoignition in the main chamber 34 (SAE Paper No. 2007-01-0047 [Blank], which is incorporated by reference in its entirety). Alternatively, devices capable of changing the volume of the M-C 32, or of inserting other chemical additives into the M-C 32 or of any other function that can help in regulating the quantity of RI species generated by the M-C 32, are also considered to be M-C RI-species generation-control augmentation devices 54. These M-C augmentation devices 54 can be used alone (or in conjunction with proper regulation of the control fluid insertion) to directly control the quantity of RI species generated by the M-C's 32. Under the direct control of the engine electronic control system 30, these augmentation devices 54 are used (either together with synchronized control fluid insertion or alone) to regulate the rate of RI species generation process in the control-active M-C's 32.

In event 9 145, at some point (typically within the "well before mid" portions of the power-expansion event) the sudden conduit 42 flow reversal (mentioned earlier) occurs. Generally this occurs as a combined result of main chamber power-expansion and rising temperatures and pressures in the M-C (due to the exothermic RI species generation process). These naturally opposing developments cause the pressure ratio to reverse (so that M-C 32 pressure is greater than that of the main chamber 34). Immediately after this point a highly turbulent mass jet evolves, carrying RI species, unused fuel, unused oxygen, enthalpy, other chemical reaction products, etc., out of the M-C's 32 and into the main chamber 34 with which they are in thermo-fluid communications. Depending on the HCRI engine embodiment and physical location of the M-C 32, while this transfer is typically to the same main chamber in which ignition and combustion occurred, in some IC engines it may also be to another main chamber 34. In such a case the flow reversal may be due instead to the pressure drop that occurs when the M-C's conduit 42 shifts communication to the other main chamber 34. In either case, after this and because of the rapid transfer of enthalpy, the pressures in the affected M-C's 32 begin to drop more rapidly. This pressure drop during the "before mid" power-expansion period results in a drop in temperature of these M-C's 32. The bulk of the radial species in the affected M-C's 32 subsequently go into states of frozen (or near frozen) equilibrium.

Though there is a rapid temperature drop in the main chamber 34 that accompanies the main chamber pressure drop during the "well before mid to late" portion of the power-expansion event, the temperatures in the main chamber 34 are still high enough for main chamber RI species activity. Also, although the OH$^-$ concentration in the main chamber is dropping with temperature, during the "mid-to-late" portion of the power-expansion process, its concentration remains significant. Thus, because of the pressure differences between the chambers (32 and 34), unconsumed M-C fuel and oxygen together with quantities of mini-chamber RI species, etc. are transferred into the main chamber 34 from those M-C's 32 that are discharging mass via high-speed highly-turbulent jets. These quantities are thus discharged directly into the heavily OH$^-$ laden gases of the main chamber 34 and rapidly mixed. This situation results in a second OH-RI species induced (driven) RI species generation process of the cycle, producing new main chamber RI species. This process continues on through (and often beyond) the blow-down portion of the exhaust event. Thus the supply of RI species needed for radical ignition in the later cycle(s) falls also on the two post-autoignition processes taking place in the main chamber 34.

A first post-autoignition process is RI species retention. Typically, much of the RI species (especially the CH$_3$HCO and CH$_2$O, depending on the fuel) exiting the M-C 32 (during the power stroke and blow down) are not consumed as they are expelled to the main chamber 34, but are retained and serve as part of the driving force for the second process. However, because of the initially high temperatures (when the state of the main chamber gases is still in area "B" of the Ignition Region of FIG. 3), typically a portion of the discharged M-C RI species (including some of the HO$_2$ and more of the H$_2$O$_2$) is lost (consumed) between the time of well before mid-to-mid power-expansion flow reversal and the transition of the main chamber gases from Area "B" of the "Ignition Region" back into area "A" of the "Slow Combustion Region".

A second process (of the post-autoignition processes) is main chamber RI species generation. This begins sometime during the transition of the state of the gases in the main chamber back into area "A" (see FIG. 3), resulting primarily in H$_2$O$_2$, but also in more HO$_2^-$ (initially) and in more of the other RI species. This generation process is fueled and driven by the relatively high quantities of fuel and RI species coming out of the M-C 32 and the adequately high OH$^-$ concentrations still retained in the main chamber 34. Generally this generation process takes place in two phases, each with its own unique sub-mechanisms. The first phase sub-mechanism starts during the transition into area "A" and continues until the start of main chamber blow-down. The second phase mechanism begins after the start of main chamber blow down and continues for awhile.

In this relatively high OH$^-$ environment, for a hydrogen molecule or a smaller molecule alcohol or a smaller molecule hydrocarbon as F, the dominant general reaction throughout both phases of the main chamber 34 RI species generation process is again (as in the M-C RI species generation process) the reaction set:

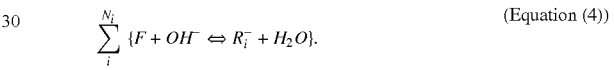

$$\sum_{i}^{N_i} \{F + OH^- \Leftrightarrow R_i^- + H_2O\}. \qquad \text{(Equation (4))}$$

Though the dominant mechanisms for OH-fuel reduction in the main chamber 34 become much more complex for a larger hydrocarbon or a larger alcohol molecule as F, the same principles apply. The sub-mechanisms for subsequently converting the R$_i^-$ species (and other sub-mechanism generated species) into the RI species are however typically different from those of the M-C RI species generation process. Also, the sub-mechanisms for converting the R$_i^-$ species (and other sub-mechanism generated species) into the RI species are generally different for the two main chamber phases. The differences in these sub-mechanisms are due primarily to the difference in the temperature values prevailing in the main chamber 34 during the respective phases.

In addition to occurring in all full HCRI engines of HCRI process 100, when the degree of RIS-augmentation is above a meaningful threshold, this generalized main chamber RI species generation process occurs as well in all RIS-augmented embodiments of HCRI process 100. And although this generalized description is based on the same fuel constituent being inserted into the main chamber 34 and M-C's 32 (if a fuel constituent is in fact the control fluid for the control-active M-C's), in dual-fuel or multi-fuel insertion operations the same can be true for each fuel constituent inserted. In multiple fuel constituent cases, some of the M-C fuel constituents being discharged (during power-expansion and blow down) are in any case earlier main chamber fuel constituents that were trapped in the M-C's 32 during the main-compression event. Moreover, if the reactivities of all the fuel constituents with OH$^-$ are compatible, the dominant reactions for each constituent are of the same form (with of course their own F, R$_i^-$ and other species). However, in operations in which the reactivities of the fuel constituents with OH$^-$ are not similar, initially at least the general reaction sub-mechanism will typically follow the fuel constituent whose reactivity with OH⁻ is dominant.

During some point in the exhaust process, the main chamber RI species still remaining in the main chamber 34 will also typically go into states of frozen (or near frozen) equilibrium. Subsequently, the cycle is repeated, starting with event 1 105.

Of its inherent general design features, HCRI engine 200's ability to operationally enable HCRI process 100 and other embodiments is predicated on the exemplary engine electronic control system 30 depicted schematically in FIG. 2B. The engine electronic control system 30 helps to enable the HCRI engine embodiments of HCRI engine 200 to both use and enable the various embodiments of HCRI process 100, including the full HCRI embodiments and the RIS-augmented embodiments.

It is hereinafter understood that the general engine control system 30 is capable of those functions necessary for the operation of HCRI engine 200 that are represented in the engine control system prior art. In addition to those functions represented in the prior art, the general engine control system 30 is capable of regulating the placement of the small amounts of RI-species generation control fluid in the concerned control-active M-C's 32 for a purpose of controlling both the M-C RI species generation process (directly) and the main chamber RI species generation process (indirectly) to in turn enable the controlled RI species enhancement of combustion in the main chamber's 34. For precisely the same purpose (of controlling), the general engine control system 30 is also capable of regulating the general M-C RI-species generation-control augmentation devices 54. Finally, the general engine control system 30 is capable of controlling the other RI-species generation-control augmentation devices 64 and 70 and/or the ignition-timing augmentation devices 56 that may be employed for the same purpose (of controlling). Though this general control system 30 may make use of sensor directed logic and/or a combustion-history aided management sub-system, the use of RI species to help control the combustion will typically lessen its required overall sophistication (in comparison to some of the latest of the conventional control systems of the field and related fields).

HCRI engine 200 includes a number of additional general design features that are inherent to its ability to operationally use and enable HCRI process 100. Especially important are those features that help determine the chemical compositions and production capacity of the M-C's 32. For example, the chemical composition of the mixtures in these secondary chambers is in part determined by the parameters affecting the hydrodynamic filling and emptying rates of the M-C's 32. The volume of the M-C 32 and the height (or effective diameter), length, placement and configuration of the conduits 42 are dominant parameters in setting these rates.

Concerning M-C volume, when the movable power-producing component 40 within a engine combustion cylinder of HCRI engine 200 is at the top dead center ("TDC") position for a given main combustion chamber 34, the ratio of the combined volumes of all of the M-C's 32 in communication with the given main chamber 34 to the minimum volume that the given main chamber 34 can have, will be a value generally between (but not limited to) 0.01 and 0.25 to 1.0. Thus, in general—

$$0.01:1 \leq \sum_{i=1}^{N} V_{M-C}^{i} : V_{M.C.}^{min} \leq 0.25:1, \quad (5)$$

where, $V_{M-C}^{i}$ is the volume of the $i^{th}$ mini-chamber in the cylinder that are in communication with the main combustion chamber, N is the total number of mini-chambers in the cylinder in communication with the t main combustion chamber, $V_{M.C.}^{min}$ is the minimum volume the given main combustion chamber 34 can have during its combustion cycle, and the symbol ":" indicates ratio. The minimum volume the given main chamber 34 can have is its volume when the movable work-power producing component 40 is in the TDC position. The breadth in this range of volume ratios (0.01:1 to 0.25:1) is due in part to the diversity in the fuel and in part to the accompanying wide range of compression ratios (CR's) required for the autoignition of fuel via RI species. The volumes of each of the M-C's 32 in a single engine combustion cylinder need not be the same. Further, for the purpose of control, the volumes of some or all of the M-C's 32 may be reduced (or expanded) via employments of one of the general M-C RI-species generation-control augmentation devices 54 during the operation of HCRI engine 200, thus reducing (or increasing) the ratio (and changing the M-C geometry).

The conduits 42 themselves can be vents, orifices, channels, slots, adequately-porous meshes, membranes, etc. Depending on the fuel, the selection of the dimensions, configuration and location of these conduits 42 can have different considerations. The conduits are typically designed such that combustion flames from the main chamber 34 are quenched before such flames can be extended into the M-C's 32. And for all operating conditions of the engine, these mini-to-main chamber-connecting conduits 42 are best designed so that at the higher pressures, the inflows and outflows of compressible gases through them (to and from the M-C's 32) are throttled (though not necessarily). It is typically preferred that the pressure conditions in the M-C's 32 lag behind main chamber 34 pressure conditions (as shown by SAE Paper No. 2007-01-0047 [Blank]). It is also typically best that the flows in the conduits 42 not to be choked, though in certain physical configurations they can be choked in for periods of time. An example of a full DI HCRI engines in which there is a required period of choked conduit flow is described in SAE Paper No. 2007-01-1254 (Blank), which is incorporated by reference in its entirety.

Additionally, the placement of the conduits 42 and the number of conduits 42 per M-C 32 are important factors (SAE Paper No. 2007-01-0013 [Blank]). The inclination of these conduits in relation to the M-C's 32 has an effect on the turbulence mixing rates of the constituents within the M-C's 32. Similarly, the positioning of the conduits 42 is also often predicated on the "aiming" of the occasionally exiting outflow mass jets. This is because a second major function of the M-C's 32 is to generate large quantities of additional turbulence for main chamber mixing. In this regard the mass jets are often best aimed by the conduits 42 into optimum locations in the main chamber 34 to help maximize the effects of the turbulence generated by these mass jets.

As referenced above in the description of HCRI process 100 in event 1 105 of FIG. 1, the role of recycled gases in RI species augmentation can be very important. If there is recycling back to the main combustion chamber 34 of some percent of the exhaust gases (either internally of externally) via the general exhaust-gas recycling device (system) 62, generally the same or some proportional percent of exhausted RI species can be recovered (depending on the treatment of these gases as they are recycled). This follows from the relatively lower temperatures of the exhaust gases and the fact that some of the RI species within them may have also gone into frozen equilibrium or near frozen equilibrium.

Also in relation to the exhaust gases 68, the exhaust-gas RI-species generation-control augmentation device 64 can be located either alongside or within the exhaust-gas recycling device 62 to help control/augment the RI species made available for future cycles. The most typical functions of the exhaust-gas RI-species generation-control augmentation device 64 include stabilizing and/or increasing/reducing the RI species concentrations in the recycled exhaust gases (68 or 68'). When no control-active M-C's 32 are being employed, the RI-species generation-control augmentation devices 64 can be used to play a more major role. Thus, use can be made of the general exhaust-gas recycling device (system) 62, together with its augmentation device 64, and under the direct regulation of the engine electronic control system 30, to help control the quantity of RI species made available to the combustion event of a main chamber 34 of a future cycle.

An example of the stabilizing function of augmentation device 64 is given in joint SAE Paper No. 2007-01-1887 and JSAE Paper No. 20077212 (Blank), which is incorporated by reference in its entirety. The HCRI engine of these references passes the exhaust gases through a heat exchanger device (serving as an example of the exhaust-gas RI-species generation-control augmentation device 64). This cools the returning exhaust to the temperature of the intake gases 66 to insure that there is no reaction activity during the mixing of the returned exhaust gases 68' and the intake gases 66. Also, this reference demonstrates that the regulation (via device 62) of the RI species return component of these recycled exhaust gases can be used alone to control the timing of autoignition in the main chamber 34 of 4-stroke reciprocating DI-HCRI embodiment of HCRI engine 200.

These features of the exhaust-gas recycling device 62 are further illustrated by the full chemical-kinetics simulation demonstration given in SAE Paper No. 2007-01-0135 (Blank), which is incorporated by reference in its entirety. In this reference the internal retention of the exhaust gases 68 (from cycle to cycle) is controlled by regulation of boost pressures of the intake gases 66 in coordination with exhaust pressures being maintained. In this reference it is shown why the control of the internal retention of the exhaust gases (and thus the RI species retained in the main chamber 34) by the regulation of the intake gas boost pressures can alone be used to control the timing of autoignition in 2-stroke reciprocating DI-HCRI embodiments of HCRI engine 200. Similar results can be obtained instead by operational management of other aspects of the intake-gas entry devices 58 and exhaust-gas exit devices 60. For example, geometries and other factors affecting flow patterns and flow rates in these devices (58 and 60) can be operationally managed.

Also, the RI species and the waste heat in the exhaust gases may be used in augmentation device 64 to generate additional RI species and/or other species for inclusion in the intake gases 66. Because relatively high concentrations of RI species are already present in the recycled exhaust gases of the HCRI engine, one example means for augmenting the RI species concentration is to simply insert additional fuel into the exhaust gases. Depending on the temperatures in play, this will cause a general reaction sub-mechanism sequence akin to that found in the general main chamber pre-autoignition processes (starting with $HO_2$ and/or $OH^-$ driven fuel decomposition) in event 6 130 of FIG. 1. Alternatively, another means is to inject oxygen-laden air into the recycled exhaust gases to oxidize (and thus consume) some portion of the exhaust gas RI species content. The functions of this augmentation device 64 can also include adding other chemical species (including fuel additives) into the recycled exhaust gases (68 or 68'). To these ends, RI species sensor devices (that are a part of the engine electronic control system 30) can be incorporated into these augmentation devices 64 to help in the regulation of their functions.

Further, there is a rationale for the plurality of general intake-gases RI-species generation-control augmentation devices 70 is shown in FIG. 2A-2B. This augmentation device 70 may be placed before and/or after the return of the recycled exhaust gases 68 or 68' to the intake gases 66. Such devices 70 can make use of the RI species returning with the recycled exhaust gases (68 or 68') to augment an external process (external to the engine combustion cylinder) that produces additional RI species and/or other species for addition to the new intake gases 66. Often such devices 70 make use of to the intake gases 66 to help effect these augmentations. In addition to devices similar to or identical to those capable of carrying out the function of the exhaust-gas RI-species generation-control augmentation device 64, examples of general intake-gases RI-species generation-control augmentation devices 70 are micro-wave devices, fuel reformatting devices, LAG type devices, etc. Alternatively the general intake-gases RI-species generation-control augmentation device 70 can be used to reduce the quantity of RI species going into the main chamber 34. To these ends, RI species sensor devices may be included in these augmentation devices 70, to help in the regulation of their functions. In the premixed fuel case these augmentation devices may be placed before and/or after the fuel insertion device 44D within the intake gas entry device 58. Such intake-gases RI-species generation-control augmentation devices 70, if employed, are regulated by a part of the engine electronic control system 30.

There are other general design features inherent to HCRI engine 200's ability to operationally enable HCRI process 100 and other embodiments. One is that in most instances within DI HCRI IC engines of HCRI engine 200, fuel is often best inserted into the main chamber 34 (via insertion devices 44A and 44B) in directions that are away from the housing periphery mounted M-C conduits 42. This is optimally done in such a way that the injected spray is "directed" away from currents leading to any of the M-C's. The principle is to avoid direct entrainment of the DI fuel streams within the pressure driven jets carrying the intake gases 66 into these M-C's 32 (and to even avoid entrainment into the internal flow currents that might lead to these jets). If one or more M-C's 32 are located within the movable work-power producing device 40 the same is also true (to the extent possible). This enables such M-C's 32 to function as control-passive M-C's 32. In general, control-passive M-C's 32 contain no internal or external means for the regulation of RI species generation. Use is sometimes made of control passive M-C's 32 to take some of the load off of the control-active M-C's 32 and to make the overall control of the RI species generation process more accurate (while also reducing design tolerances). When such is desirable, control-passive M-C's 32 may also be mounted within the side housing periphery 38 or top housing periphery 36.

Finally, it must be emphasized that functionally the M-C's 32 are not for use in assisting ignition and combustion in the main chamber air-fuel gas-charge of the "current" main chamber 34 of the "current" operating cycle of an engine combustion cylinder. Rather the M-C's 32 serve as the originating generation sites in one cycle for the production of RI species for specific use in main chamber ignition and combustion in "later" combustion cycles. Therefore the M-C's 32 are not "pre-combustion" chambers.

FIG. 4A-4D collectively illustrate an exemplary rotary HCRI IC engine (hereinafter HCRI engine 300) that is an implementation of HCRI engine 200 and that embodies the HCRI process 100. HCRI engine 300 is thus also capable of using and enabling the two full HCRI and the four RIS-augmented embodiments of HCRI process 100. FIG. 2A-2B for HCRI engine 200 and FIG. 4A-4D for HCRI engine 300 share common features. Accordingly, in the interest of clarity, the description of some of the common features of HCRI engine 300 and its schematic depiction in FIG. 4A-4D are omitted and the description of these features with respect to HCRI engine 200 and its schematic depiction in FIG. 2A-2B are being relied upon to provide adequate descriptions of the common features. While the nomenclatures for HCRI engine 200 and HCRI engine 300 are generally the same, there are several differences for the HCRI engine 300.

For example, the movable work-power producing component 40 is also called a rotor 86. In HCRI engine 300, the main chamber 34 is the primary chamber consisting of the space (volume) formed by the rotor 86 and by portions of the "top" housing periphery 36, the "side" housing periphery 38 and by either an "end" housing periphery 94 and a "separating" housing periphery 90 or by two of the separating housing peripheries 90.

Figure 4A:
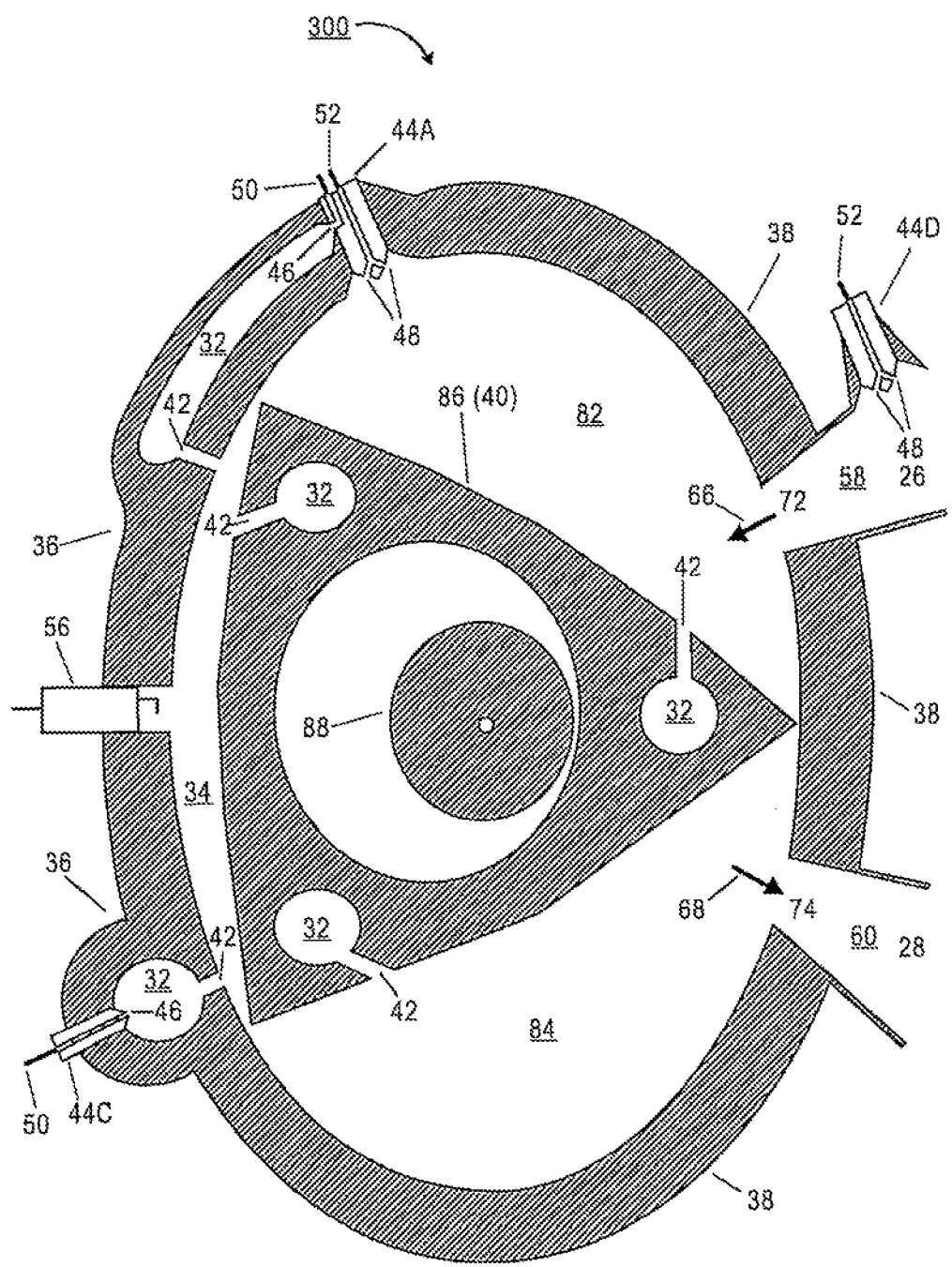
FIG. 4A depicts a schematic diagram of the interior of a single engine combustion cylinder of an exemplary 4-cylinder HRCI Rotary Combustion Engine (HCRI engine 300) utilizing the HCRI process 100 shown in FIG. 1 in accordance with HCRI engine 200.
Figure 4B:
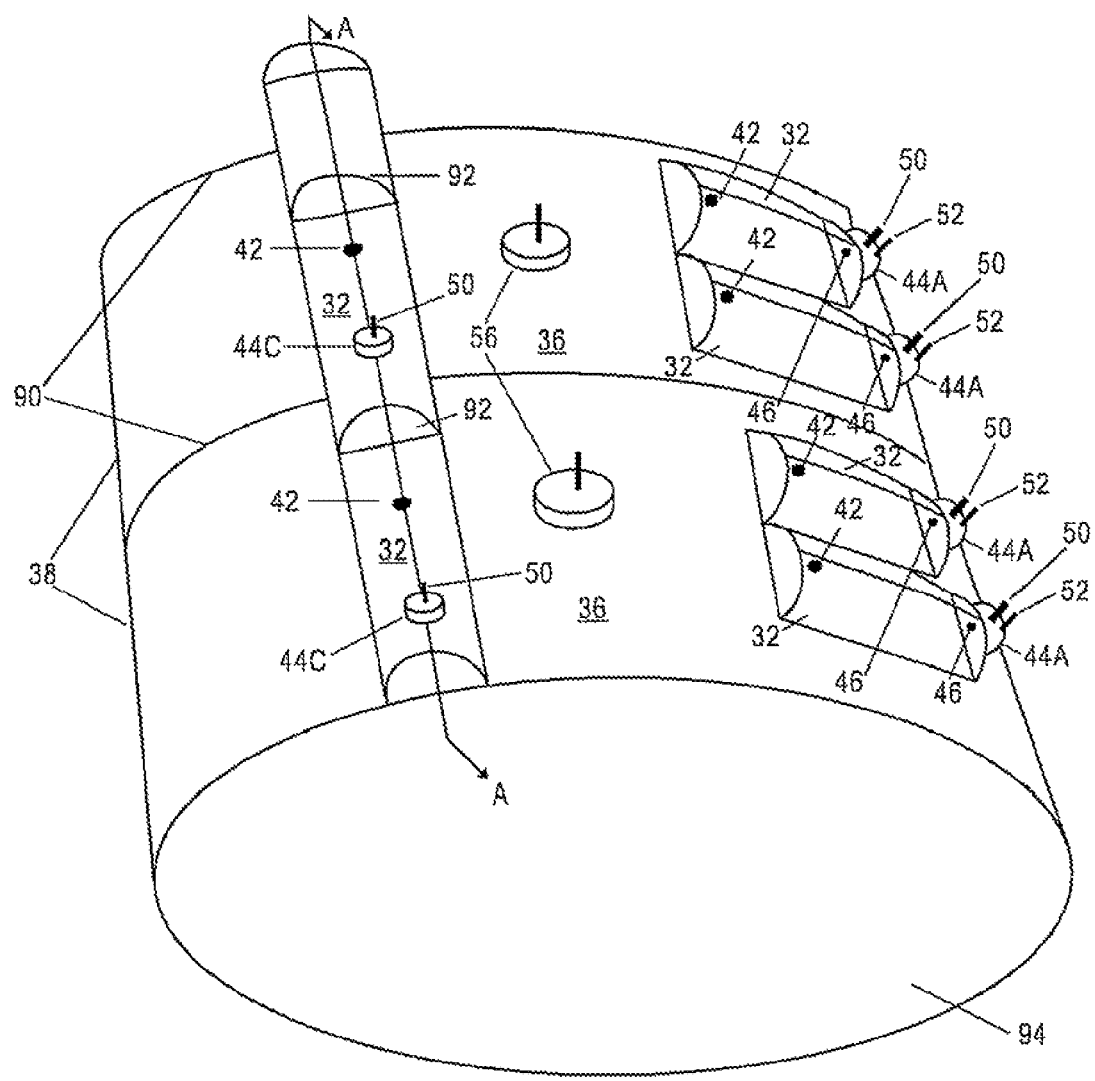
FIG. 4B depicts a top view of two engine combustion cylinders of the 4-cylinder HRCI Rotary Combustion Engine shown in FIG. 4A utilizing the HCRI process.
Figure 4C:
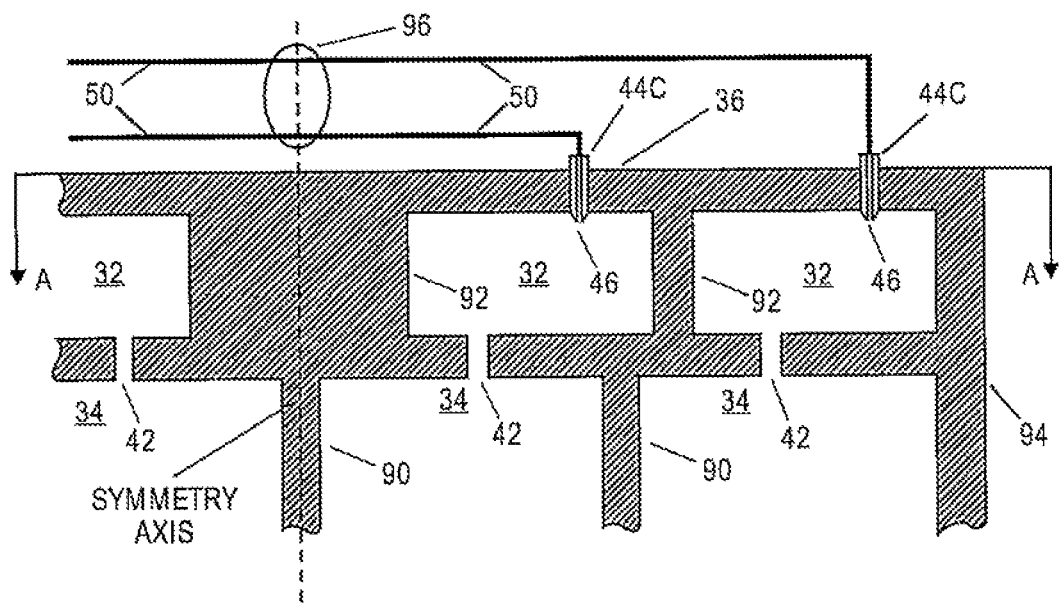
FIG. 4C depicts a top view of a housing periphery mounted mini-chamber assembly through section (A-A) for the 4-cylinder HRCI Rotary Combustion Engine embodiment shown in FIG. 4A utilizing the HCRI process.
Figure 4D:
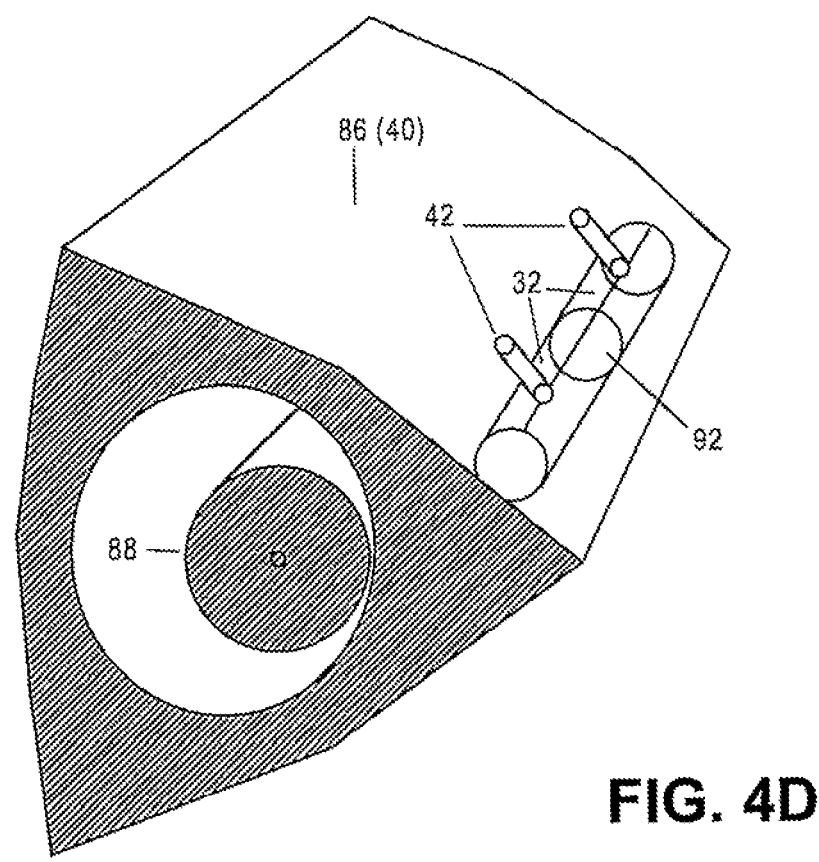
FIG. 4D depicts a side view a rotor in one engine combustion cylinder for the 4-cylinder HRCI Rotary Combustion Engine embodiment shown in FIG. 4A utilizing the HCRI process.

From FIG. 4A it can be seen that in HCRI engine 300, the rotor 86 creates three primary chambers. Depending on the position of the rotor 86, these primary chambers can have three different functions. These can either be serving in the capacity of an intake chamber 82, an exhaust chamber 84 or the main combustion chamber 34. When any of these primary chambers is involved in main-combustion pre-ignition, main-combustion ignition or main-combustion post-ignition chemical-kinetics activities, they are considered to be in a "combustion position". Further, when any of HCRI engine 300's primary chambers are in the combustion position they are considered to be one of the main chambers 34. Thus, in rotary engines the term "main chamber" 34 is understood to include the functionally equivalent portion of one or two (depending on the rotor position) of the three (or more, as in the case of the Quasiturbine engine) single primary chambers when any of the primary chambers in question are in "combustion positions".

In HCRI engine 300, the "top housing periphery" 36 is considered to be the "radially outward" (outward in relation to a shaft 88) portion of the engine housing periphery adjacent to the volume formed by the rotor and the housing periphery when one of the three budging sides of the rotor is in the "TDC" (top dead center) position (as is the left "rotor side" shown in FIG. 4A). By definition, the rotor side is in its TDC position in HCRI engine 300 when the volume between it and the inner surface of the housing periphery is at its minimum and the primary chamber it helps to form is in one of the "combustion positions" (as opposed to being in the combined exhaust-intake position in the opposite "quadrant" of the engine combustion cylinder). Thus, in FIG. 4A and FIG. 4B the "side housing periphery" 38 is considered to be the remainder of the "radially outward" housing periphery surrounding the engine combustion cylinder that is not considered part of the top housing periphery 36.

The angular motion of the rotor 86 is considered to be in the counter-clockwise direction. Thus the M-C 32 depicted in the upper left of this figure is hereinafter considered to be a "leading" M-C 32. The periphery mounted M-C 32 located at the lower left in FIG. 4A is instead consider a "lagging"

M-C 32. It should be noted that FIG. 4B and FIG. 4C both depict schematic information for more than one engine combustion cylinder. The lagging M-C 32 in FIG. 4A is depicted within the engine combustion cylinder in the A-A plane shown in FIG. 4B, with details of the M-C assembly for the A-A plane (for more than two engine combustion cylinders) shown in FIG. 4C.

The intake gases 66 enter an engine cylinder via an intake port 72 from an engine intake manifold 26 (these components being parts of the intake-gas entry device 58) and the exhaust gases 68 exit an engine cylinder via an exhaust port 74 into an engine exhaust manifold 28 (these components being parts of the exhaust-gas exit device 60).

Each engine cylinder of HCRI engine 300 makes use of a pair of leading control-active M-C's 32. Each of the leading M-C's 32 in these pairs is control fluid fed by multi or dual-fluid insertion devices 44A. Also, the single lagging control-active M-C 32 of each engine combustion cylinder is control-fluid fed by the single RI-species generation control-fluid insertion device 44C (FIG. 4A). Finally, pairs of rotor mounted control-passive M-C's 32 are embedded in each of the three sides of the rotor 86 (as shown via the combination of FIG. 4A and FIG. 4D).

Though not shown, each of the control-active M-C's are considered to have one or more mini-chamber RI-species generation-control augmentation devices 54. Also, HCRI engine 300 is considered to have (and to be operationally able to employ) exhaust-gas recycling devices 62 (with their exhaust-gas RI-species generation-control augmentation devices 64) and intake-gases RI-species generation-control augmentation devices 70.

The inclusion of both the general intake-gas entry device fuel insertion device 44D into the intake-gas entry device 58 (directly into the engine intake manifold 26 in this case) and the dual-fluid insertion device 44A into the main chamber, for pre-mixed and DI fuel insertion, respectively, and the inclusion of one ignition-timing augmentation device 56, together enable HCRI engine 300 to use and enable the two full HCRI and the four RIS-augmentation embodiments of HCRI process 100. Operations within these various process embodiments are directed by the electronic engine control system's 30 regulating of the various fuel and control fluid inserters (44A, 44C and 44D) and the various RI-species generation-control augmentation devices (54, 64 and 70), the exhaust-gas recycling devices 62 and the ignition-timing augmentation devices 56 in manners appropriate the engine operating conditions.

It should be readily apparent to those of ordinary skill in the art that exemplary HCRI engine 300 (as depicted in FIG. 4A-4D) represents a generalized rotary engine schematic illustration, and that in addition to those mentioned, other components can be added or existing components can be removed or modified. In addition, many other rotary HCRI engine variations are possible that are also capable of both using and enabling the HCRI process 100.

Figure 5A:
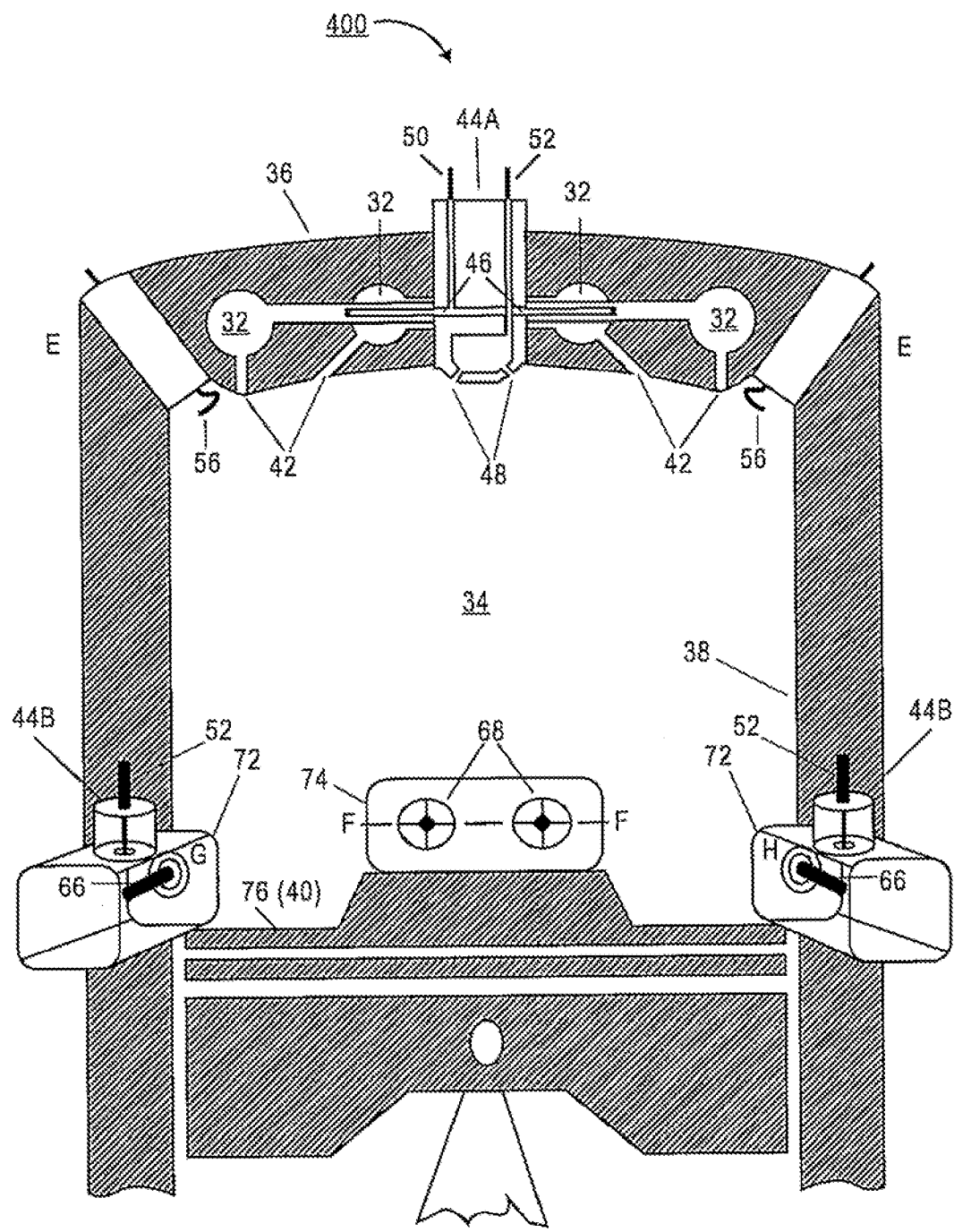
FIG. 5A depicts a schematic of internal axial cross section diagram (section through line E-E) of one engine combustion cylinder of an exemplary HRCI Two-Stroke Reciprocating Engine (HCRI engine 400) utilizing the HCRI process 100 shown in FIG. 1 in accordance with HCRI engine 200.
Figure 5B:
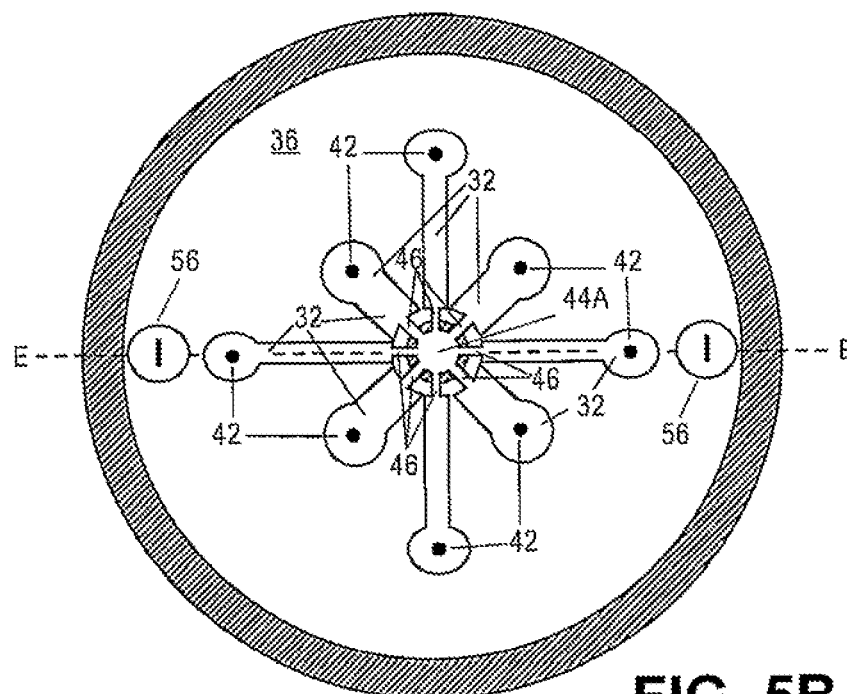
FIG. 5B depicts a schematic diagram of internal top (radial cross section through head including the line E-E) of one engine combustion cylinder of the HRCI Two-Stroke Reciprocating Engine embodiment shown in FIG. 5A utilizing the HCRI process.
Figure 5C:
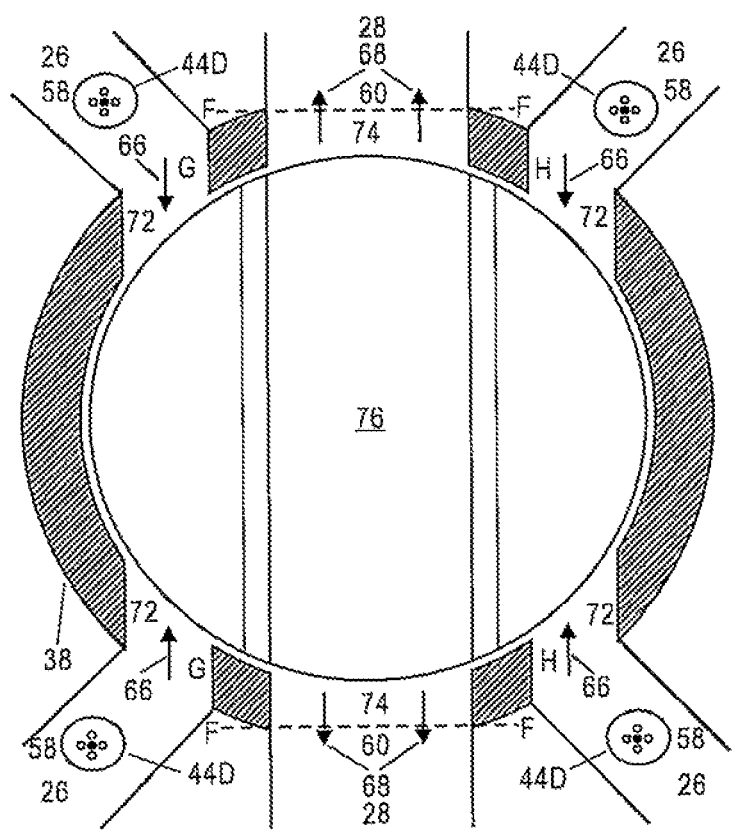
FIG. 5C depicts a schematic diagram of internal bottom (top view of radial cross section of bottom of the cylinder through lines G-G and H-H, and also showing the piston below these lines) of one engine combustion cylinder of the HRCI Two-Stroke Reciprocating Engine embodiment shown in FIG. 5A utilizing the HCRI process.

FIG. 5A-5C collectively illustrate an exemplary 2-stroke reciprocating piston HCRI IC engine (hereinafter HCRI engine 400) that is an implementation of HCRI engine 200 and that can both use and enable the HCRI process 100. HCRI engine 400 is thus also capable of the two full HCRI and the four RIS-augmented embodiments of HCRI process 100. FIG. 2A-2B for HCRI engine 200 and FIG. 5A-5C for HCRI engine 400 share common features. Accordingly, in the interest of clarity, the description of some of the common features of HCRI engine 400 and its schematic depiction in FIG. 5A-5C are omitted and the description of these features with respect to HCRI engine 200 and its schematic depiction in FIG. 2A-2B are being relied upon to provide adequate descriptions of the common features. While the nomenclatures for HCRI engine 200 and HCRI engine 400 are generally the same, there are several differences for HCRI engine 400.

For example, in HCRI engine 400 the movable work-power producing component 40 is also called a piston 76. The piston 76 is in the "TDC" position in HCRI engine 400 when the volume of the main chamber 34 is at its minimum. Though this specific nomenclature is not used in the depiction in FIG. 5A, the top housing periphery 36 in this 2-stroke reciprocating piston engine embodiment can also be called the "cylinder head" and the side housing periphery 38 can also be called the "cylinder liner". The top housing periphery 36 in exemplary HCRI engine 400 is a disk shaped segment of the housing periphery. This disk shaped section spans the upper portion of the engine combustion cylinder. It caps the cylinder from an axial position corresponding approximately to the bottom of the ignition-timing augmentation devices 56. The side housing periphery 38 is that part of the housing periphery of the engine combustion cylinder that starts just immediately below this axial position.

A top down view of the top periphery 36 is shown in FIG. 5B. This view passes through the axial line connecting positions E-E shown in FIG. 5A. As seen via FIG. 5B, the same dual-fluid injector 44A feeds control fluid to eight control-active M-C's 32. While four of these M-C's are of a different geometry than the other four, they all are assumed to be (though they need not be) of the same volume in the simulation experiment conducted with this embodiment in SAE Paper No. 2007-01-0135 (Blank). This figure is a functional schematic, not a detailed or scaled depiction.

FIG. 5C is a radial cross-section schematic of this engine's simple intake port 72, exhaust port 74 and piston 76 top arrangements when the piston is near its BCD ("bottom dead center") position. This is again a functional "top down view" representation, not a precise radial cross-section. Similar to the HCRI engine 300, in HCRI engine 400 the intake gases 66 enter via the intake ports 72 from parts of the engine intake manifold 26 (these components being parts of the intake-gas entry device 58) and the exhaust gases 68 exit via the exhaust ports 74 into parts of the engine exhaust manifold 28 (these components being parts of the exhaust-gas exit device 60). Similar also to HCRI engine 300 is the insertion of fuel directly into the engine intake manifold 26 via the intake-gas entry device fuel insertion device 44D. The advantage of the intake port 72 and exhaust port 74 arrangement of HCRI engine 400 with the two-tiered piston surface (FIG. 5A and FIG. 5C) is the generation of highly symmetric internal flow patterns that help avoid excessive mixing of the exiting exhaust gases 68 with the incoming intake gases 66 during the intake-exhaust event (as described in some detail in SAE Paper No. 2007-01-0135 [Blank]).

As in HCRI engine 200, the HCRI engine 400 can be configured with various RI-species generation-control augmentation devices (54, 64 and 70) and the inclusion of exhaust-gas recycling devices 62 are assumed. One example of the exhaust-gas recycling device 62 applicable to this embodiment is given in SAE Paper No. 2007-01-0135 (Blank). The electronic engine control system's 30 regulation of these and the various fuel and control fluid inserters (44A, 44C and 44D) and the ignition-timing augmentation devices 56 is also assumed. Regulation via control system 30 is in manners appropriate the range of operating conditions for HCRI engine 400. Thus HCRI engine 400 can both use and enable the two full HCRI and the four RIS-augmentation embodiments of HCRI process 100.

It should be readily apparent to those of ordinary skill in the art that exemplary HCRI engine 400 as depicted in FIG. 5A-5C represents a generalized 2-stroke reciprocating piston engine schematic illustration, and that in addition to those mentioned, other components can be added or existing components can be removed or modified. In addition, many other 2-stroke reciprocating piston engine HCRI engine embodiments of HCRI engine 400 are possible that are also capable of both using and enabling the HCRI process 100.

FIG. 6A-6D collectively illustrate an exemplary 4-stroke reciprocating piston HCRI IC engine (hereinafter HCRI engine 500) that is an embodiment of HCRI engine 200 and that uses the HCRI process 100. HCRI engine 500 is thus also capable of the two full HCRI and four RIS-augmented embodiments of HCRI process 100. FIG. 2A-2B for HCRI engine 200 and FIG. 6A-6D for HCRI engine 500 share common features. Accordingly, in the interest of clarity, the description of some of the common features of HCRI engine 500 and its schematic depiction in FIG. 6A-6D are omitted and the description of these features with respect to HCRI engine 200 and its schematic depiction in FIG. 2A-2B are being relied upon to provide adequate descriptions of the common features omitted. While the nomenclatures for HCRI engine 200 and HCRI engine 500 are generally the same, there are several refinements for HCRI engine 500.

For example, like in HCRI engine 400, in HCRI engine 500 the movable work-power producing component 40 is also called the piston 76, with the piston 76 at the "TDC" position when the volume of the main chamber 34 is at its minimum. Also similar to HCRI engine 400, the top housing periphery 36 in this 4-stroke reciprocating piston engine embodiment can also be called the "cylinder head" and the side housing periphery 38 can also be called the "cylinder liner". The top housing periphery 36 in exemplary HCRI engine 500 is the disk shaped segment of the housing periphery spanning the upper portion of the engine combustion cylinder. It caps the cylinder from axial positions corresponding to the two 90 degree axial-plane corners shown in the main chamber 34 in each of FIG. 6A and FIG. 6B (just slightly above the highest possible point of travel of the example 'bowl-in-piston' shaped piston 76). The side housing periphery 38 is that part of the housing periphery of the engine combustion cylinder that starts just immediately below these axial positions.

Figure 6A:
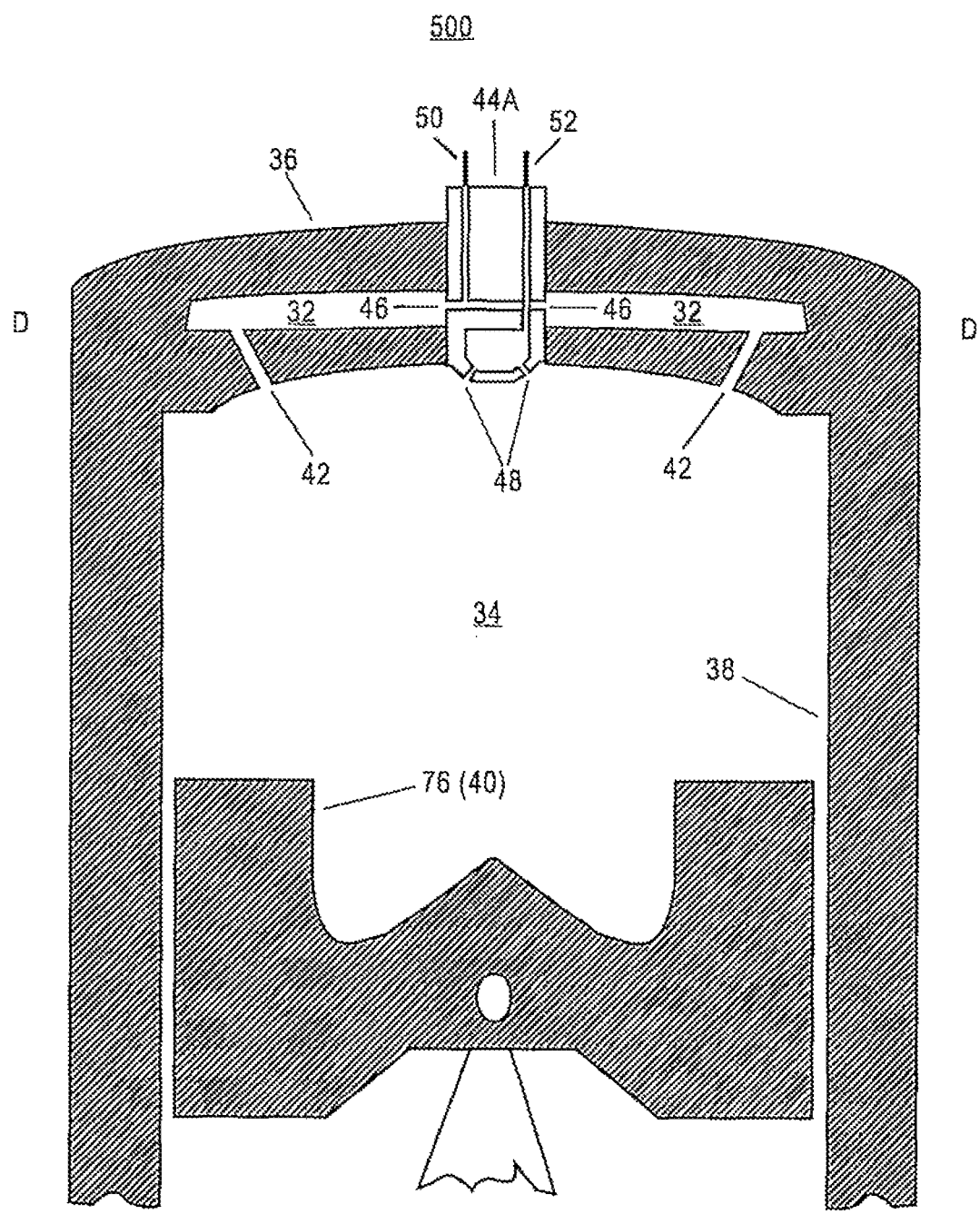
FIG. 6A depicts a schematic of an internal axial cross section diagram (section through line D-D) of one engine combustion cylinder of an exemplary HRCI Four-Stroke Reciprocating Engine (HCRI engine 500) utilizing the HCRI process 100 shown in FIG. 1 in accordance with HCRI engine 200.
Figure 6B:
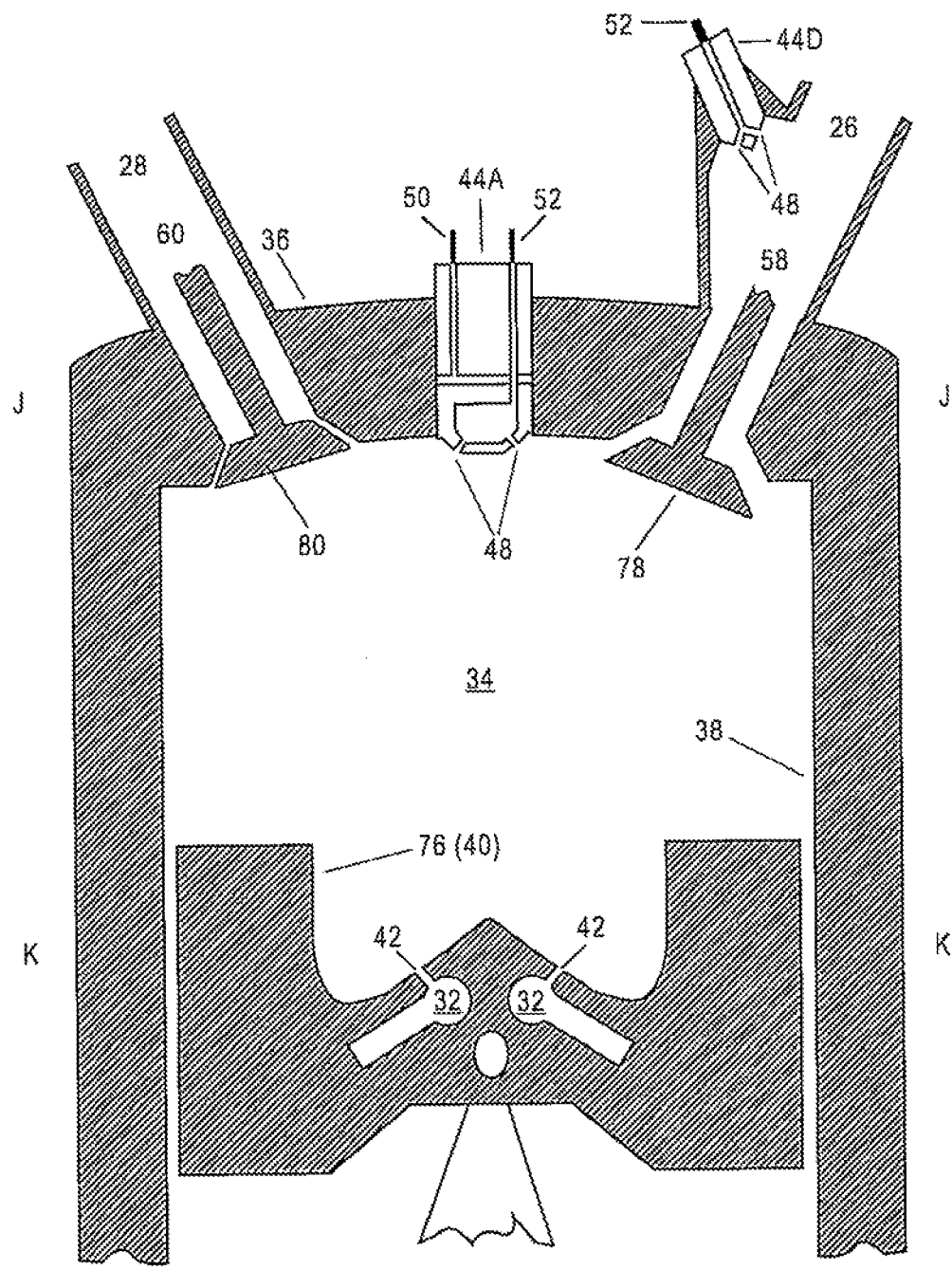
FIG. 6B depicts a schematic of internal axial cross section diagram (through lines J-J and K-K) of one engine combustion cylinder of the HRCI Four-Stroke Reciprocating Engine shown in FIG. 6A utilizing the HCRI process.
Figure 6C:
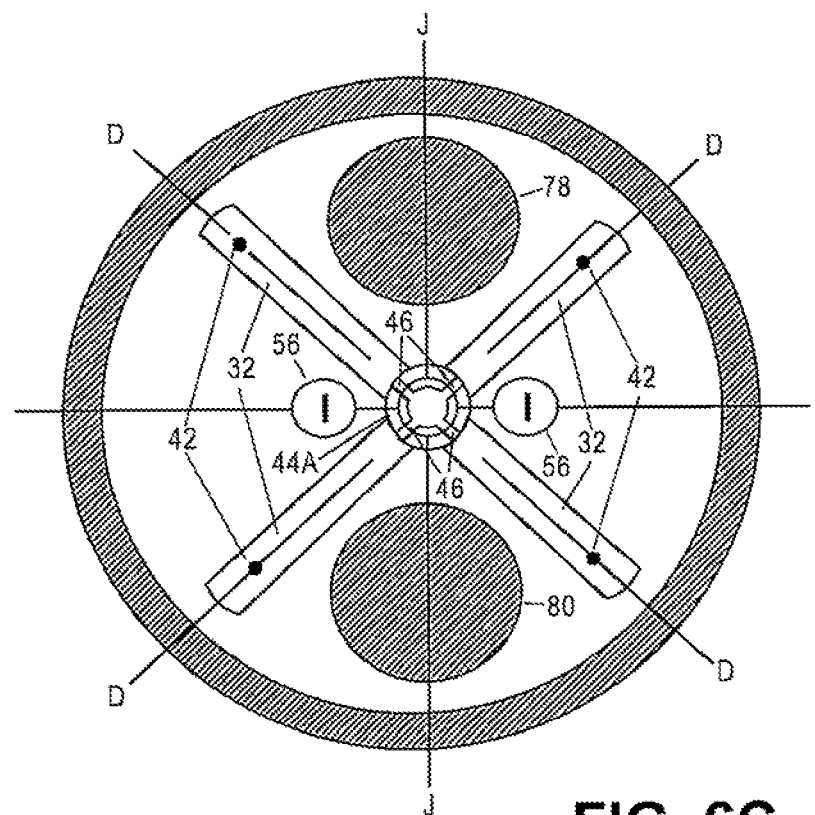
FIG. 6C depicts a schematic diagram of internal top (radial cross section through the cylinder head including lines D-D and J-J) of one engine combustion cylinder of the HRCI Four-Stroke Reciprocating Engine shown in FIG. 6A using the HCRI process.

There are two axial cross-section views of HCRI engine 500 depicted. FIG. 6A is an axial cross-section passing though lines D-D that highlights the positioning of the top housing periphery mounted control-active M-C's 32. FIG. 6B is an axial cross-section passing though the plane containing lines J-J and K-K. This figure highlights the positioning of an intake valve 78 and an exhaust valve 80. The intake gases 66 from the engine intake manifold 26 can enter the main chamber 34 via the intake valve 78 and the exhaust gases 68 from the main chamber can exit to the exhaust manifold 28 via the exhaust valve 80. The inclusion of the general intake-gas entry device fuel insertion device 44D to insert fuel directly into the engine intake manifold 26 (of the intake-gas entry device 58) is also shown in FIG. 6B.

Figure 6D:
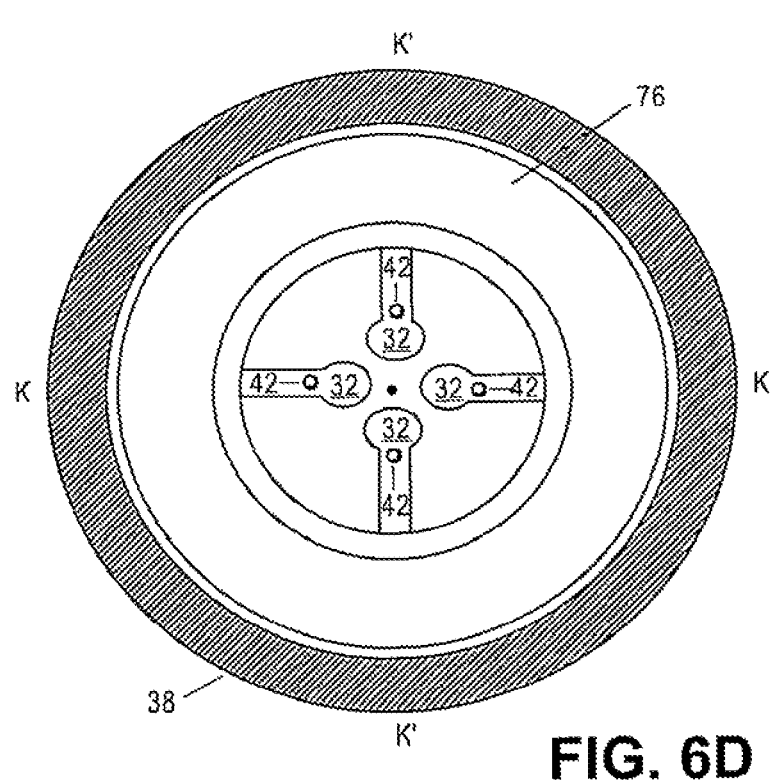
FIG. 6D depicts a schematic diagram of internal bottom (radial cross section of bottom including lines K-K) of one engine combustion cylinder of the HRCI Four-Stroke Reciprocating Engine shown in FIG. 6A using the HCRI process.

There are also two radial cross-section views. The first is FIG. 6C, which is a top down view of the top periphery 36. The plane of this view passes through lines D-D (of FIG. 6A) and line J-J (of FIG. 6B). As seen via FIG. 6A, the same dual-fluid injector 44A feeds control fluid to four control-active M-C's 32. As with FIG. 6A and FIG. 6B, this figure (FIG. 6C) is a functional schematic, not a detailed or scaled depiction. The second, FIG. 6D is a schematic of this engine's simple piston 76 arrangement when the piston is near its BCD (bottom dead center) position. This is again a functional "top down view" representation, not a precise radial cross-section.

HCRI engine 500 is another example in which control-passive M-C's 32 are mounted in the movable work-power producing component 40. The arrangement of these passive chambers is make clear by comparing FIG. 6B and FIG. 6D. From FIG. 6D it is understood that four passive M-C's 32 are symmetrically arranged in the central section of the bowl of the piston 76. Though their function is very different, the positioning of these piston-mounted passive-control M-C's 32 is very similar to the optimum positioning of the "air-cells" in SAE Paper No. 952359 (Reitz, et. al.). In this earlier work the inlet/exit conduits to the air cells were constructed with much larger diameters so that there is no radical species generation in the engine. SAE Paper No. 2007-01-0013 (Blank) highlights the ability of HCRI engine 500 to make use of valve actions and extra valve actions facilitated via use of special valve travel schedules to assist in the transfer of RI species between the M-C's 32 and the main chamber 34.

As in exemplary HCRI engine 200, the HCRI engine 500 can be configured with various RI-species generation-control augmentation devices (54, 64 and 70) and exhaust-gas recycling devices 62. An example of the use of the mini-chamber RI-species generation-control augmentation device 54 for sole control of the timing of combustion in a 4-stroke HCRI engine embodiment that is very similar to HCRI engine 500 is given in SAE Paper No. 2007-01-0047 [Blank]. An example also applicable to HCRI engine 500 of the combined and coordinated use of the exhaust-gas recycling device 62 and the exhaust-gas RI-species generation-control augmentation device 64 is given in Joint SAE Paper No. 2007-01-1887 and JSAE Paper No. 20077212 (Blank). The electronic engine control system 30 regulates these and the various fuel and control fluid inserters (44A, 44C and 44D) and the ignition-timing augmentation devices 56. This regulation via control system 30 is in manners appropriate the range of operating conditions for HCRI engine 500. Thus HCRI engine 500 can both use and enable the two full HCRI and the four RIS-augmentation embodiments of the HCRI process 100.

It should be readily apparent to those of ordinary skill in the art that exemplary HCRI engine 500 as depicted in FIG. 6A-6D represents a generalized 4-stroke reciprocating piston engine schematic illustration, and that in addition to those mentioned, other components can be added or existing components can be removed or modified. In addition, many other 4-stroke reciprocating piston engine HCRI engine embodiments of HCRI engine 500 are possible that are also capable of both enabling and using the HCRI process 100.

Figure 7A:
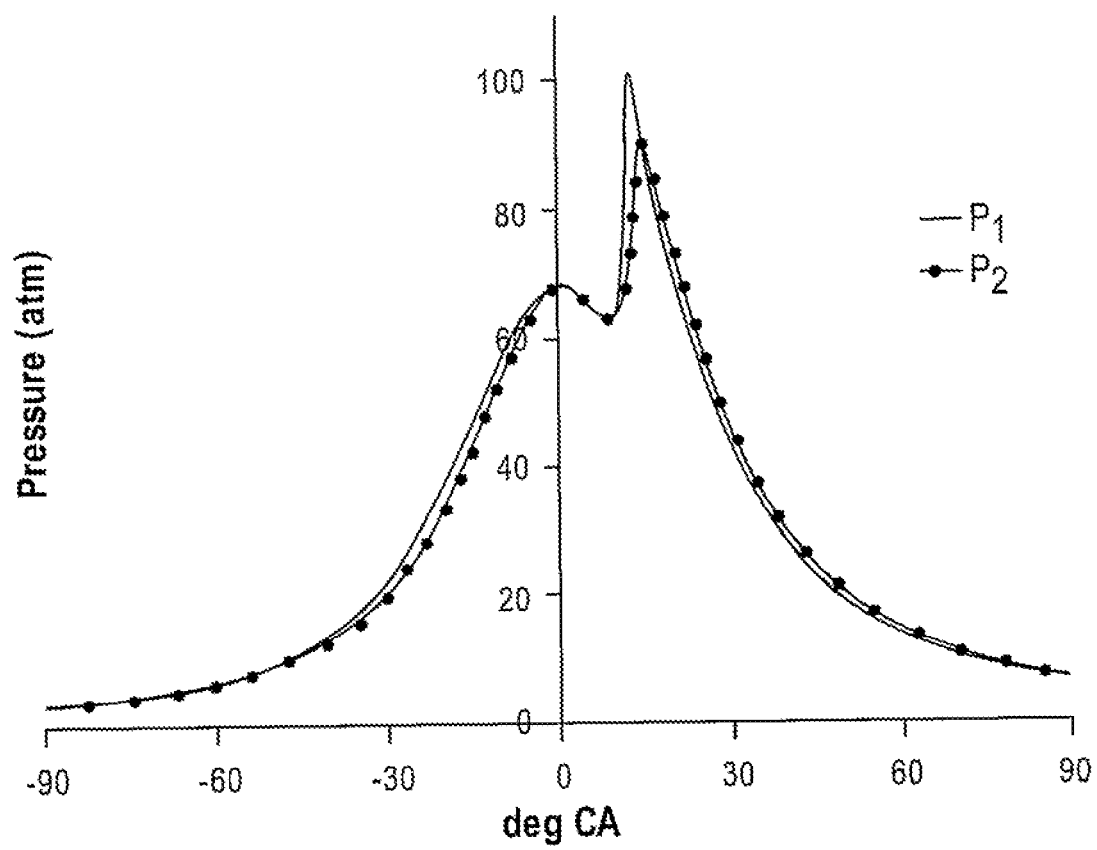
FIG. 7A is a graph showing sample Pressure vs. Crank Angle ("CA") values for the primary and secondary chambers of a Full DI HRCI Four-Stroke Reciprocating Engine for $C_2H_5OH$ Fuel and a 17.5:1 CR (Pi-Main Chamber, $P_2$-Mini-Chamber).
Figure 7B:
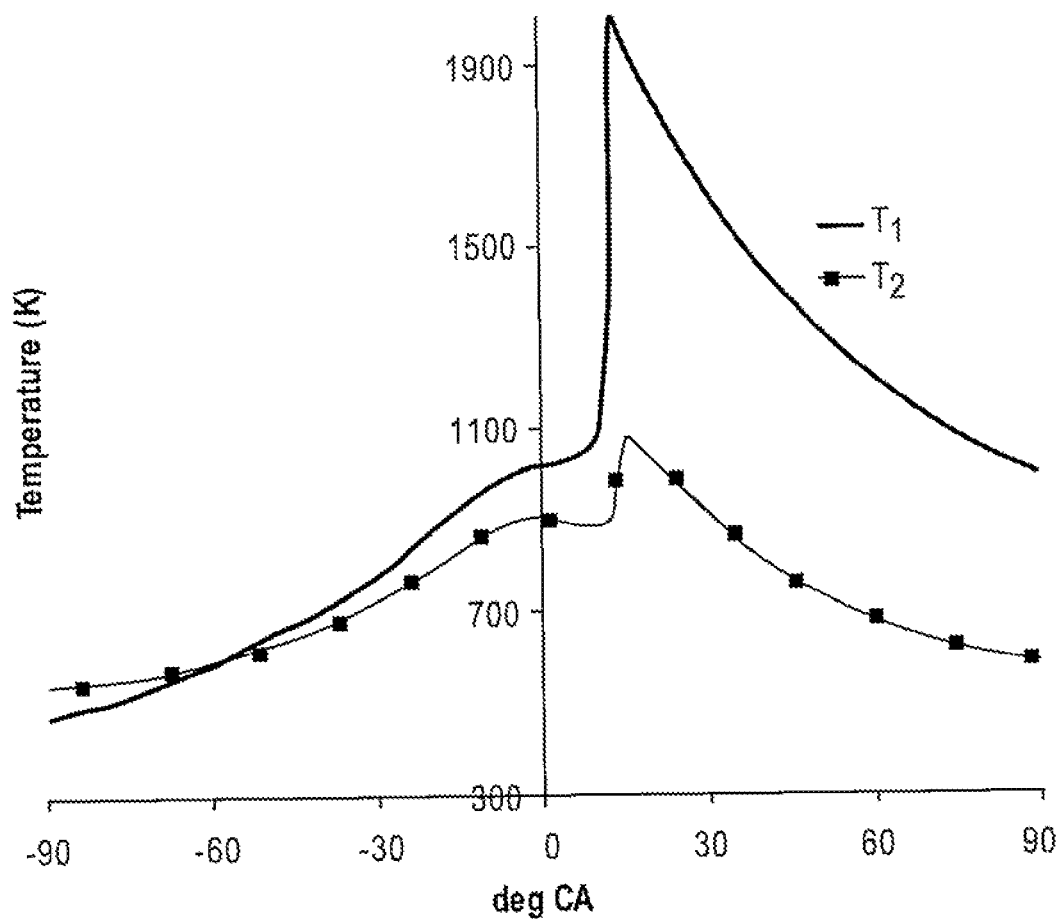
FIG. 7B is a graph showing sample Temperature vs. Crank Angle ("CA") values for the primary and secondary chambers of a Full DI HRCI Four-Stroke Reciprocating Engine for $C_2H_5OH$ Fuel and a 17.5:1 CR (Ti-Main Chamber, $T_2$-Mini-Chamber).

Full DI HCRI process embodiments of HCRI process 100 within these three HCRI engine embodiments of HCRI engine 200 show universally similar pressure and temperature trends during the portion of HCRI process between a little before event 2 110 and a little after event 8 140 of FIG. 1. Example plots for these two properties of the combustion are given in FIG. 7A-7B for the main chamber 32 and the control-active mini-chambers 34 for the 4-stroke reciprocating IC engine studied in SAE Paper No. 2007-01-0623 (Blank). This engine is similar to HCRI engine 500 except that it has no control-passive M-C's 32 in the piston 76. Important to note from FIG. 7A is the rapid drop off in the pressures in both the main chamber 34 and the M-C's 32 immediately following TDC (0 degrees of CA). This indicates that compression alone has not provided nearly enough heat for self ignition of the main chamber gases. Thus, were it not for the OH-RI species empowered exothermal pre-ignition activity occurring after TDC (as described above for event 7 135 of FIG. 1), a misfire would certainly have resulted. However, FIG. 7B shows that during this period, despite the drops in pressures (in both chambers 34 and 32), the temperature is rising in the main chamber 34 due to this pre-ignition activity. Thus, robust autoignition occurs at 11 degrees of CA after TDC.

In general and simplistic terms, with a given fuel, the criteria for homogenous combustion autoignition can be considered to be dependent on the combination of five factors:

$$AI_{HC,crit} = F[a*T_{mix}/T_{eff}; b*G(A/F_{rat}); c*R_{conc}; d*(1.0-D_{mix}); e*R_{res}] \quad (6)$$

Interpreted as being relevant for understanding, this general criteria implies that the circumstances under which homogeneous combustion autoignition will occur ($AI_{HC,crit}$) is roughly based on the weighted amalgamation (not the sum) of the following key factors: the temperature of the air charge-fuel mixture ($T_{mix}$), the air to fuel ratio of the mixture ($A/F_{rat}$), the initial (i.e., prior to the point of the start of RI species pre-autoignition activity during compression) combined concentration of select RI species in the air charge-fuel mixture ($R_{conc}$), the degree of mixing of the air charge-fuel mixture (at the global/chamber level) ($D_{mix}$) and the reactive RI species residence time with the fuel after the fuel is sufficiently mixed ($R_{res}$). $T_{eff}$ is the temperature corresponding to the "effective" charge CR for the given fuel and $A/F_{rat}$ of the main chamber mixture. Depending on the fuel, the $A/F_{rat}$ and the inlet conditions of the charge, etc., $T_{eff}$ is in turn based on the "effective" charge CR. Thus $T_{eff}$ corresponds to that temperature needed for a given fuel and $A/F_{rat}$ for autoignition by CI alone. The leaner the $A/F_{rat}$, the higher the $T_{eff}$ required for homogenous autoignition to assuredly occur. A misfire will occur if this general criterion is not met during the cycle (and usually by sometime not much after TDC). There are a number of other factors neglected in this simplified explanation.

In full PCCI (and thus without the use of any RI species from a previous cycle) the formulation for autoignition is simply $AI_{HC,crit} = a*T_{mix}/T_{eff}$. By definition of terms, for a given air-fuel ratio $A/F_{rat}$ and fuel, autoignition will occur for PCCI as $T_{mix}/T_{eff}$ reaches 1.0. Thus, for this case the criteria for autoignition is reached when $AI_{HC,crit} = a$.

General Distinctives of full HCRI Engines: The main difference between the full HCRI engines and the RIS-augmented engines of HCRI process 100 is the extent of the use of the RI species. The generalized process embodiment of the thermo-fluid chemical-kinetics process for radical ignition (HCRI process 100) as illustrated in FIG. 1 and as implemented via HCRI engine 200 (FIG. 2A-2B) has been defined and described in the foregoing with both the full HCRI embodiments and RIS-augmented embodiments in mind. Thus, though this earlier discussion is tilted more toward the full HCRI case, it is not exclusive to this case. Also, because of its inclusiveness, this earlier discussion gives limited attention to the distinctives of the two full HCRI sub-cases themselves.

Though the general full HCRI engine of HCRI process 100 can employ manifold (or carburetor) fuel insertion, direct fuel injection or a combination of the two, embodiments with only the DI of the fuel provides better overall efficiencies. Also, the HCRI IC engine embodiments of the DI fuel full HCRI sub-case can enable slightly better SOC control than the premixed fuel full HCRI sub-case. However, in both sub-cases of full HCRI, the appropriate maximum use of RI species is employed to both pre-induce and induce autoignition. Thus, as in conventional PCCI, the combustion in the full HCRI process embodiments is homogeneous. This is in sharp contrast to the time-extended diffusion reaction processes occurring during both SI combustion (with its flame front combustion) and DI CI combustion (with its premixed and turbulence-mixing phases) (*Internal Combustion Engine Fundamentals*, 1988 [Heywood]).

In general, the value for $R_{res}$ is controlled primarily via two factors: the time that the RI species become reactive and the fuel insertion timings: start and duration. Thus this value remains zero until two things happen: (1) there has been some fuel insertion that has become effectively mixed with the other main chamber gases, and (2) the RI species have become meaningfully reactive. Further, for both full HCRI sub-cases, the degree of RI species augmentation ($R_{conc}$) is understood to be at its maximum value ($R_{conc,max}$).

In comparison to the general criteria for homogeneous combustion given by Equation (6), for the DI full HCRI sub-case (herein called the "DI-HCRI" process embodiment of HCRI process 100) $T_{mix}$ need not reach $T_{eff}$ before autoignition is assured. For a given fuel and a given air-fuel ratio $A/F_{rat}$, the autoignition criteria may even be met if/when $T_{mix}$ reaches a value that is markedly less than $T_{eff}$ (with autoignition itself starting to take place at typical temperatures of 100-150° C. lower than $T_{eff}$). Also, the value for $D_{mix}$ need not be at its maximum value of 1.0, though it should normally be moderately close for the combustion to be homogeneous.

For the DI-HCRI sub-case of full HCRI, at various mass locations in the moving main chamber gases, RI species residence time starts as the fuel, oxygen and RI species become mixed at the lowest turbulent length scales. Compression causes $T_{mix}$ to rise. The quantity of fuel insertion is set according to a given engine speed and engine load so that the air charge-fuel mixture still remains leaner (than typical of conventional PCCI and DI CI engines). The CR of the engine is set lower than that required for attaining $T_{eff}$ (corresponding to the $A/F_{rat}$ and intake gas conditions of the charge mixture, etc.). The initial RI species concentration Ro and the overall average (global average) of the RI species residence times $R_{res}$ (controlled primarily via the fuel insertion timings: start and duration) are coordinated with the temperature rise (due to compression and pre-autoignition chemistry) and the mixing rate in such a way so as to ensure that ignition occurs at the desired time.

For the DI-HCRI sub-case we can think of these factors as being set so that the criteria for autoignition for a given air-fuel ratio $A/F_{rat}$ and a given fuel is $F[a*T_{mix}/T_{eff}; c*R_{conc,max}; d*(1.0-D_{mix}); e*R_{res}]$. Thus autoignition occurs for DI-HCRI when this function reaches a. Stated in semi-analytic form, for DI-HCRI:

$$\{AI_{HC,crit}\}_{DI-HCRI}=F[a*T_{mix}/T_{eff}; c*R_{conc,max}; d*(1.0-D_{mix}); e*R_{res}]=a \quad (7)$$

where a is the necessity value for autoignition in the conventional PCCI formulation (corresponding to the "effective" charge CR for conventional PCCI). Whereas for understanding purposes, the three other coefficients may be simplistically viewed as constants, in reality they (c, d and e) are non-linear functions of $T_{mix}$, $R_{conc}$, $D_{mix}$ and $R_{res}$. It is noted that $R_{conc,max}$ is the initial concentration of the key RI species and is not changing during the pre-ignition process.

Thus, over an engine's entire operating regime in the DI-HCRI process embodiment of HCRI process 100, combustion control in the main chamber 34 is strictly maintained through RI species by a combination of means. The two main means of controlling the "effective" SOC in the DI-HCRI process embodiment of HCRI process 100 are: (1) the precise regulation of the quantity (mass per engine combustion cylinder) of RI species generated and passed on to the next cycle and (2) the amount of residence time these RI species are allowed with the fuel in the main chamber 34 prior to ignition.

In the premixed charge full HCRI sub-case (herein called the "PC-HCRI" process embodiment of HCRI process 100) all of the fuel injection can be into the general intake-gas entry device 58 (as is typical in conventional HCCI) or there can be some combination of this and DI into the main chamber 34 at timings typically earlier than the start of the main-compression event. In all incidences of this premixed fuel sub-case, the autoignition criterion is ideally insensitive to $D_{mix}$ (which is in any case generally constant at its maximum value of 1.0 well before the SOC). Thus, for a PC-HCRI process embodiment of HCRI process 100, the criteria for autoignition for a given air-fuel ratio $A/F_{rat}$ and a given fuel is:

$$\{AI_{HC,crit}\}_{PC-HCRI}=F[a*T_{mix}/T_{eff}; c*R_{conc,max}; e*R_{res}]=a \quad (8)$$

where a is again the necessity value for conventional PCCI autoignition. In this process, the regulation of the RI species-fuel residence (interaction) time ($R_{res}$) is not an available option in the control strategy. Control over the timing of the SOC is primarily via regulation of the quantity of RI species generated in the previous cycle(s) and conveyed to the main chamber 34.

It is emphasized that the above depictions of the criteria required for autoignition for these two full HCRI process embodiments of HCRI process 100 are simplistic. Nonetheless, for the purpose of comparing these full HCRI embodiments of HCRI process 100 with the RIS-augmented PCCI and RIS-augmented DI CI embodiments of HCRI process 100, the understanding provided by the above descriptions is adequately sufficient.

Subject to the applicable portions of the earlier general descriptions, the IC engine embodiments schematically depicted in FIG. 2A-2B (for HCRI engine 200), FIG. 4A-4D (for HCRI engine 300), FIG. 5A-5C (for HCRI engine 400) and FIG. 6A-6D (for HCRI engine 500) are all examples of engine configurations capable of using and enabling the DI-HCRI and PC-HCRI process embodiments of HCRI process 100. A general means exist for the operation of all three of these IC engine embodiments (300, 400 and 500) as full HCRI process embodiments. This general means is the operation of the generalized process embodiment of the general thermo-fluid chemical-kinetics process invention (HCRI process 100) in the exemplary IC engine embodiment (HCRI engine 200) provided earlier in detail and applied to the general distinctions of these two full HCRI process embodiments. In the interest of both brevity and clarity, the description of some of the common features of operation in the three example IC engine embodiments (HCRI engine 300, HCRI engine 400 and HCRI engine 500) are thus omitted and the description of these features of operation with respect to HCRI process 100 depicted in FIG. 1 and its detailed description of operation in HCRI engine 200 are being relied upon to provide adequate descriptions of the common features of operation omitted. In particular, the thrust of the HCRI process 100's detailed description is applied to full HCRI, and its description, as given, fully explains both the DI-HCRI and the PC-HCRI process embodiments of HCRI process 100.

Further, for clarity of the general description, the aims of the engine electronic control system 30 must be considered in the operation of the HCRI engine 200 and its three example HCRI IC engine embodiments (300, 400 and 500) as either the DI-HCRI process embodiment of HCRI process 100 or the PC-HCRI process embodiment of HCRI process 100. The engine electronic control system 30 must ensure the total amount and timings of fuel inserted into the main chamber 34, the timings and amounts of control insertion into the M-C's 32 and the use of all RI-species generation augmentation-control devices 54, 64 and 70 (if any or all are employed) are all consummated with the engine operating conditions and specifications in manners that are appropriate to these two full HCRI embodiments. For both the DI-HCRI process embodiment and the PC-HCRI process embodiment, the total amount of RI species generated, carried over, recycled and conveyed to assist ignition is that amount needed to fully dominate the autoignition event, resulting (in comparison with the conventional ignition modes) in reductions in required heat and required fuel concentrations relative to oxygen concentrations for the ignition of the fuel. Also these control devices are to be operated in ways that together ensure autoignition at the desired time and so that the work-power output of the engine is in accordance with operational load and speed requirements.

The HCRI process 100 is not an "either-or" technology. In full HCRI IC engine embodiments (those using DI-HCRI and PC-HCRI), RI is used exclusively so as to make optimum use of the HCRI process 100's unique "full HCRI" process advantages. However, HCRI process 100 can also be used to augment and improve other conventional technologies. Thus, the remainder of this section provides details of four main RIS-augmentation applications of the HCRI technology. These are presented as additional process embodiments of HCRI process 100 as depicted in FIG. 1 and are described generally as embodiment permutations of HCRI engine 200 depicted in FIGS. 2A-B. Two of these embodiments involve ignition via CI and two involve ignition via SI. Alternatively, two of these embodiments involve pre-mixed charges and two involve the DI of the fuel.

General Distinctives of the RIS-Augmented PCCI Embodiments: Among the drawbacks associated with conventional PCCI (HCCI and SCCI) are the difficulties in extending homogenous combustion via CI to the entire operating regime of an engine. Also, within the engine operating regimes where PCCI utilization can be made effective, there are difficulties associated with controlling the SOC. To accomplish the latter, extensive controls are typically necessary, usually using multiple sensors, extensive sensor directed logic and combustion-history aided management.

Conventional PCCI relies primarily on only two of the several main factors available for the control of autoignition for homogeneous combustion. One of these factors is the requirement that the fuel and air be mixed thoroughly at the lowest turbulent length scales. By definition, in PCCI this is accomplished simply by pre-mixing of the fuel with the air charge long before the point of SOC. The second factor is the thermal (or "effective" charge CR) requirement. For autoignition to occur at a specific time, the mixture must (at that time) have been brought to the precise "effective" charge CR applicable for the engine combustion cylinder's starting charge conditions. If the effective charge CR is the same as the "mechanical compression ratio of the engine", then combustion will occur at the desired time.

As discussed earlier, in general PCCI autoignition relies on "low" temperature CI chemical-kinetics sub-mechanisms that start with fuel-oxidation chain-initiation reactions at substantially higher temperatures (though called "low" temperatures) compared to the "lower" temperatures involved in full HCRI (SAE Paper No. 2007-01-0047[Blank], SAE Paper No. 2007-01-0135[Blank] and SAE Paper No. 2007-01-0623 [Blank]).

The combustion of a fuel with PCCI also involves the use of RI species. However, it is normally only after the start of these fuel-oxidation chain-initiation reactions (at the higher "low" temperatures) that the concentrations of the RI species begin to build up and accelerate. Soon afterwards in PCCI the RI species begin to sacrifice themselves at higher temperatures to produce an abundance of the radical $OH^-$.

This stands in contrast to the general "lower" temperature "OH-RI species" driven fuel decomposition sub-mechanism for autoignition employed in the full HCRI ignition process, where, due to the carry-over, the recycling and the conveyance of the RI species generated during previous cycles, the RI species are already present in the charge in relative abundance. Thus, the higher "low" temperatures (or higher "effective" charge CR's) associated with PCCI are not needed for the production of these species. The pre-ignition and ignition processes (with a given fuel) in full HCRI IC engines (both DI-HCRI and PC-HCRI) are dominated by the sub-mechanisms given in events 6 130 and 7 135 of FIG. 1 at below "lower" and "lower" temperatures, respectively. At these lesser temperatures, during pre-ignition $HO_2^-$ is used in dominant chain-initiation reaction Equation (1). Also a supply of $OH^-$ is generated via chain-initiation reaction Equation (2) from the carried over and pre-ignition generated $H_2O_2$ supply. This reaction (Equation (2)) is highly exothermic and eventually becomes the dominant reaction driving RI species induced autoignition (RI). The $OH^-$ is predominantly used during pre-ignition and autoignition in dominant chain-branching reaction Equation (3).

Despite its starting at the relatively lower temperatures, this general RI chain-initiation and chain-branching reaction process for full HCRI is significantly faster than the general direct-$O_2$ fuel oxidation driven chain-initiation (and chain-branching) reaction processes of PCCI starting at the higher "low" temperatures. And when these two chemistries are joined to enable the RIS-augmented PCCI process embodiment (hereinafter called a "RIS-PCCI" process embodiment of HCRI process 100), many of the problems associated with "conventional" PCCI are overcome.

Depending on the degree of augmentation, in the RIS-PCCI process embodiment (as in full HCRI), $OH^-$ is generated by highly exothermic reaction Equation (2) in the main chamber 34 from the pre-supplied $H_2O_2$ (carried-over, the recycled and conveyed by the HCRI process 100) well prior to RIS-PCCI autoignition. Though the mechanisms are rather complex, the other RI species also greatly help in accelerating this much earlier (than in conventional PCCI) $OH^-$ generation. Also, during much of this pre-ignition process the concentrations of all RI species generally grow. In addition to the internal energy provided by exothermal reaction Equation (2), the $OH^-$ radical is then used to generate additional internal energy via chain-branching reaction Equation (3) and the general sub-mechanisms that are activated via the availability of the various $R_i^-$ radicals. Thus, as in full HCRI, in RIS-augmented PCCI the $R_i^-$ radical is created during the early autoignition activity (but in lesser quantities, depending on the degree of RI species augmentation).

The main characteristic of the RIS-PCCI process embodiment that distinguish it from the PC-HCRI process embodiment is the fact that not enough of the RI species are initially present in the main chamber 34 in sufficient quantities ($R_{conc}$) to cause full RI. Yet enough RI species are initially present to promote their own growth rates and to in turn feed the exothermic reaction sub-mechanisms to sufficiently raise the temperature of the main charge up to or near the new RIS-PCCI value of $T_{eff}$ so that the conventional sub-mechanisms (those primarily involving fuel oxidation reactions at higher "low" temperatures) can take over. Thus the criterion for eventual autoignition is set by a combination of RI and PCCI.

For a given air fuel ratio $A/F_{rat}$ and fuel type, the essential criterion is met for the RIS-PCCI process embodiment when:

$$\{AI_{HC,crit}\}_{RIS\text{-}PCCI} = F[a*T_{mix}/T_{eff}; c*R_{conc}; e*R_{res}] = a \quad (9)$$

where (as in cases before) a is the necessary value corresponding to the "effective" charge CR (and thus a function of all the factors affecting the "effective" charge CR for the given fuel and $A/F_{rat}$). Thus, here a is again the necessity value for conventional PCCI autoignition. Whereas, the three weighting functions may again be simplistically viewed as constants, the weighting factors a, c and e (as well as $T_{eff}$) are in reality non-linear functions of $T_{mix}$ and $R_{conc}$. As with full HCRI, changes in $T_{mix}$ are not brought about by compression alone, but by a combination of compression and pre-ignition activity initiated by the presence of the RI species (as well as other species). The only difference between the PC-HCRI process embodiment and the RIS-PCCI process embodiment is the degree of RI species augmentation. The value of $R_{conc}$ is less than the value $R_{conc,max}$.

Increased control over the timing of autoignition in RIS-PCCI process can be gained in the following way. First, the $A/F_{rat}$ is kept leaner than in conventional PCCI. Because of this the value of $T_{eff}$ is raised (to a value higher than that needed for conventional PCCI under its typically less lean conditions). The criteria for assured autoignition is in any case not as sensitive to $T_{mix}$, but is driven also by the values of $T_{mix}$, $R_{conc}$ and $R_{res}$. During pre-combustion the presence of the RI species influences the rise in $T_{mix}$ itself via the "lower" temperature sub-mechanisms. Thus, depending on the degree of augmentation, though some percentage of the later pre-autoignition chemical-kinetics process may still be via the higher "low" temperature fuel oxidation sub-mechanisms (generally associated with conventional PCCI), the remainder of the chemical-kinetics is due to the earlier pre-ignition and ignition processes via the same sub-mechanisms associated with PC-HCRI process embodiment. And it is the sequenced use of these two sub-mechanisms (and thus the additional chemistry made possible by the initial presence of the RI species) that enables the enhanced control of the timing of the autoignition in RIS-PCCI engines.

Alternatively and less preferably, the RIS-PCCI process can be controlled by lowering the CR of the engine, rather than making the $A/F_{rat}$ leaner. In this case the value for $T_{eff}$ is not raised. Obviously, because of the lower CR, compression itself will not be able to bring the charge to $T_{eff}$. Yet, the RI species activity again serves to supplement the autoignition process by providing the additional internal energy required to bring $T_{mix}$ up to the conventional PCCI $T_{eff}$ value. Obviously, a third option for controlling the RIS-PCCI process is by both lowering the CR (but not as much) and making the mixture leaner (but not as lean).

For completeness, it should be mentioned that to the degree that there is RI species augmentation, there will most always be some proportional drop in the actual temperature at which autoignition takes place (below $T_{eff}$, the value required in equivalent conventional PCCI engines for autoignition). This is because, in the RIS-PCCI process embodiment of HCRI process 100, the effect of the RI species pre-ignition chemistry is more than just in adding internal energy to the main charge by the recycling of the exhaust gases (as in the case of PCCI). This pre-ignition chemistry results in the creation of more of the main precursor species required for autoignition. Many of these precursor species are ultimately required in autoignition. These species are used/required in both the higher "low" temperature fuel oxidation sub-mechanism of conventional PCCI and in the "lower" temperature OH-RI species driven fuel decomposition chain-initiation and chain-branching sub-mechanism of the PC-HCRI process embodiment of HCRI process 100. In RIS-PCCI, after the completion of some of the same sub-mechanisms associated with the PC-HCRI process embodiment of HCRI process 100 at the "lower" temperatures (and resulting in internal energy generation), there are also actually both more key RI species and more OH$^-$ present than in conventional PCCI. In conventional PCCI operations these RI species and OH$^-$ could not be present in such meaningful quantities at these "lower" temperatures, but are generated primarily as the charge gets close to attaining $T_{eff}$. Thus, the initial presence of these RI species results in a general but very complex hybrid sub-mechanism.

General Distinctives of the RIS-Augmented DI CI Embodiments: As an augmentation to conventional CI DI engines (i.e., Diesel engines), HCRI process 100 can enable autoignition and more complete follow-on combustion at conventional diesel CR's but under leaner conditions. The resulting new art RIS-augmented DI CI embodiment (hereinafter called a "RIS-DICI" process embodiment of HCRI process 100) has advantages over conventional DI Diesel engines with or without EGR.

In conventional DI CI engines (with or without EGR) the autoignition and subsequent combustion of the fuel is in two phases (the premixed phase and the mixing-control phase). In both phases the process reactions occur via high temperature oxidation and/or dissociation sub-mechanisms. In the premixed phase the autoignition and premixed combustion is controlled more by chemical kinetics. The charge is typically brought to temperatures that are above the value of $T_{eff}$ (corresponding to the conventional PCCI case) by compression (but not usually with the help of the thermal component of the EGR—which if used is typically cooled) prior to injection of the fuel. Afterward, during the mixing control phase the combustion of the remaining fuel is controlled more by the turbulence mixing levels at the high temperatures of the charge. Diffusion thus plays a major role in both phases. Unfortunately, this combustion sequence serves also to maximize the formation of nitric oxides. As the process continues and oxygen becomes locally depleted (to the extent that the diffusion and turbulent mixing can not keep up), if the fuel consists of large molecules it may be pyrolized to generate soot as it approaches the high temperature zones in the absence of oxygen.

In the RIS-DICI process embodiment of HCRI process 100 the RI species are instead premixed with the oxygen stream and serve within this stream as "combustion enhancers" so that the diffusion combustion in the first phase and also normally (but not necessarily always) in the second phase (depending on the fuel, the operating conditions and the degree of RI species augmentation) can both occur under leaner (rather than under stoichiometric) conditions. Thus the engine can be (and typically is) operated at higher $A/F_{rat}$'s. The increased leanness of the fuel lowers the peak flame temperatures and helps reduce the overall production of $NO_x$.

When slightly-to-moderately lower than normal conventional DI CI CR's are used, the criteria for autoignition for the RIS-DICI process embodiment is nearly identical to that for full DI HCRI, except that the air fuel ratio ($A/F_{rat}$) is growing with time after the SOI. Thus, instead the most general criteria applies, namely:

$$\{AI_{HC,crit}\}_{RIS\text{-}DICI} = F[a*T_{mix}/T_{eff}; b*G(A/F_{rat}); c*R_{conc}; d*(1.0-D_{mix}); e*R_{res}] = a \quad (10)$$

In this case (with slightly-to-moderately lower than normal conventional DI CI CR's), depending on the CR, fuel insertion can be earlier and there can be more mixing of the fuel before autoignition occurs. The continuation of fuel insertion can be (and generally is) such that the EOI still occurs sometime after the SOC. During autoignition itself, as a flame becomes established in the envelopes surrounding the sets of droplets still being inserted and driven across the main chamber 34, the RI species assist the diffusion-combustion processes taking place in these fronts. Just as not all of the oxygen is consumed in the first phase, normally also not all the RI species are consumed during this first phase. And because the RI species and oxygen are well mixed with each other prior to autoignition, the remaining RI species continue to operate together with the unused oxygen streams. These remaining RI species are thus available to assist in the next part of the cycle, the mixing-control phase. Thus, in the mixing-control phase diffusion, the combustion also can and generally does occur under slightly-leaner than normal (conventional) DI CI engine air-fuel ratio conditions.

However, when normal DI CI CR's are used and the SOI (start of injection) occurs only after $T_{max}$ has reached (or nearly reached) $T_{eff}$, the role of the RI species in autoignition is different. In this case they have little effect on the timing of autoignition (which is instead set by injection timing). Instead they serve in making the autoignition more rapid, with more stable flame envelopes forming around the sets of inserted droplets. The RI species assist the diffusion combustion process occurring under substantially leaner conditions in both of the cycle's combustion phases (leaner in comparison with "conventional" DI CI engines).

Regardless of the whether or not lower CR's are used, both within the premixed and the mixing-control phases, the reactions given by Equation (2) and Equation (3) play major roles. Like in the RIS-PCCI process embodiment of HCRI process 100, the higher temperature fuel dissociation and oxidation sub-mechanisms normally associated with both combustion phases of conventional DI CI are accordingly modified. A generalization of the modified sub-mechanism with various fuels are complex pseudo-hybrids of the general sub-mechanisms associated with conventional DI CI pre-ignition, ignition and combustion and the sub-mechanisms associated with full DI HCRI pre-ignition and autoignition. The degrees of modification are comparative to the degrees of RI species augmentation.

Also, during power-expansion high-speed RI species laden jets are emitted from the mini-chambers. Among other things, these jets carry additional RI species and oxygen. They also serve to generate relatively enormous turbulence levels. Thus, though the presence of the original main chamber RI species (from the previous cycle(s)) has already served to nullify most of soot formation (by increasing the efficiency of the combustion process), when properly aimed, these jets also help to further demolish any pockets of soot that may have inadvertently been formed.

Finally, it should be mentioned that the conventional DI CI ignition mode must rely on the momentum of the spray to drive the flame across the compressed air charge. This requires that the fuel for DI CI have a relatively high cetane number (i.e., that they auto-ignite relatively fast) so that the premixed phase combustion can keep up with the injection flow rate. Otherwise (with lower cetane values), there could be excessive noise, and under certain operating conditions there could be knocking. However, (as shown in SAE Transaction Paper No. 2004-01-1677 [Blank] and SAE Paper No. 2004-01-1847 [Blank], which is incorporated by reference) the presence of the RI species in sufficient quantities serves as a cetane enhancer.

General Distinctives of the RIS-Augmented PCSI Embodiments: Among the problems associated with the use of conventional PCSI (HCSI) are the difficulties at the limits of PCSI operating regime, namely knock at high loads and throttling at low loads. While comparison of the chemical-kinetics of the ignition of full HCRI engines with the ignition of conventional PCSI engines is more difficult than its comparison with the ignition of conventional PCCI engines, some of the foregoing discussion concerning the RIS-PCCI process embodiment can be extended to RIS-augmented PCSI.

Similar to conventional PCCI and RIS-PCCI, neither conventional PCSI nor RIS-augmented PCSI (hereinafter called "RIS-PCSI" of HCRI process 100) involve diffusion-flame combustion. Similar instead to conventional DI CI, the combustion within the flame front in conventional PCSI occurs at "higher" temperatures relative to the "low" temperatures of conventional PCCI and the "lower" temperatures of full HCRI. However, because the SOC for both conventional PCSI and RIS-augmented PCSI is due to a spark, a comparison for the criteria for autoignition can not be made. Also PCSI primarily involves a flame front to propagate the combustion and is not as much dependent on either chemical-kinetics or turbulent mixing.

Depending on the fuel, conventional PCSI uses higher temperature fuel dissociation (thermal and/or via third body) and fuel oxidation chemical-kinetics sub-mechanisms. None-the-less, the effect of the presence of the RI species in the RIS-PCSI process embodiment is analogous to the effect of the RI species in the RIS-PCCI process embodiment. The ignition sub-mechanism in the RIS-PCSI process embodiment is again a semi-sequenced hybrid sub-mechanism, though one that generally happens somewhat faster than the hybrid ignition sub-mechanism in the RIS-PCCI process embodiment.

A simplistic way to visualize the effect of RI species in the RIS-PCSI process embodiment is to see these RI species as being responsible for increasing two things. First they increase the ignitability of the fuel. Secondly, their presence increases the rate of combustion of the fuel-air mixture within the flame front. And depending on the fuel, the CR and the air-fuel ratio, there can be a third effect outside the flame front.

Equation (2) and reaction Equation (3) both occur over a range of temperatures that include the "lower" temperatures of full HCRI and the "higher" temperatures of conventional SI. Thus, inside the front reaction Equation (2) and reaction Equation (3) play major roles in combination with the normal high temperature oxidation reaction or/and fuel dissociation mechanism of conventional PCSI. In the flame front, once the higher temperatures are finally reached, these two reactions are in any case also a part of the conventional PCSI high temperature oxidation reaction mechanism. Thus, in the high temperature mechanism of the conventional PCSI case, the RI species are in any case all also playing major roles. But, in conventional PCSI, these species can only play their roles after they have been generated at the higher temperatures via the oxidation driven chain-initiation mechanism.

In the RIS-PCSI process embodiment these select RI species are instead already present and can "go to work" much sooner via reaction Equations (1)-(3) (and the other more complex sub-mechanisms typical of the RI for both the smaller and larger molecule fuel). Yet, because the temperatures become higher much more quickly (than in the case of full HCRI), mechanisms akin to those of conventional PCSI soon take over.

With the RI species already present, the combustion within the flame front is overall faster. The speed of the front varies, depending on the leanness and degree of RI species presence of the charge. Thus, while this overall new flame-front RIS-PCSI mechanism is a semi-sequenced hybrid (of the full HCRI and conventional PCSI mechanisms), it is an overall faster and a more simultaneously occurring hybrid (though not completely simultaneous) than the hybrid for the RIS-PCCI embodiment of HCRI process 100.

Due to the increased ignitability of the fuel, the air-fuel ratios ($A/F_{rat}$'s) employed over the entire engine-operating regime can be made uniformly leaner in operations with the RIS-PCSI process embodiment of HCRI process 100. Further, the ignitability of the fuel at the various loads (and thus $A/F_{rat}$'s) can then be controlled with some precision by $R_{conc}$ (the concentration of RI species in the main chamber charge). Under high loads, when much more fuel is being added, less RI species are required. The ratio of RI species to fuel can thus be controlled to insure that knock cannot normally occur. At low loads, when throttling is normally required to prevent misfire, more RI species are added instead to increase the ignitability of the charge. Thus, even without the throttling, misfire is made relatively less possible by the presence of the RI species. Also, the ratio of RI species to both the fuel and the air can be used to gain some control over the flame front propagation speed.

Finally, the hybrid of chemical-kinetics sub-mechanisms in play within the RIS-PCSI process embodiment flame front enables more rapid combustion under leaner fuel conditions. Thus, even though the local expansion (within the combustion zone) may be faster, there is generally less opportunity for the reacting particles to be expelled prematurely from the combustion zone (the degree of improvement being dependent in part on the fuel). However, reacting particles that are expelled find themselves in an environment that is quite different from what they would normally find in conventional PCSI engines. In engine embodiments using the RIS-PCSI process embodiment these particles are expelled into a relatively air-rich main chamber charge outside the front (in comparison to the stoichiometric-combustion-caused conditions of conventional PCSI). Depending on the fuel and the engine operating condition, in some cases some of the expelled incomplete combustion products can continue to burn.

General Distinctives of the RIS-Augmented DI SI Embodiments: Instead of burning controllably, gasoline normally detonates when it sees too much heat of compression, causing a sudden rise in the cylinder pressure that hammers the pistons with excessive force. This can also be true of other fuels with high octane and low cetane values. Thus, because a slow controlled burn is necessary with gasoline and other fuel with similar combustion characteristics, until the recent conventional GDI ("gasoline direct injection") means was found that insures such control via a stratified charge, DI with such fuels was not feasible.

Recent prior art DI SCSI with gasoline ("GDI") makes use of a layered fuel distribution in the main chamber charge. The charge is made fuel-rich in the vicinity of the spark plug and is then made progressively leaner as the distance from the spark plug increases. This is found to make lower load SCSI possible with gasoline without throttling under ultra lean fuel conditions. Though the spark plug initiates ignition, a varying of both the injection timings and of the injection rates within an injection is used to maintain control of the stratification. However, this prior art development cannot be extended to higher load conditions.

In RIS-augmented DI SI embodiments of the HCRI process (hereinafter called a "RIS-DISI" process embodiment of HCRI process 100), the two main problems associated with DI SCRI are overcome via several steps. First, with the homogenous pre-placement of RI species in the charge, the fuel distribution is made significantly leaner at low loads. Because of the RI species this distribution need not be stratified. Then, both the average fuel leanness of the charge and the initial concentration of RI species in the air charge ($R_{conc}$) are each adjusted (almost proportionally in opposite directions) to enable the RIS-DISI engine to function over the entire engine-operating regime. Why this works follows from the same explanation given above for how the presence of the RI species the RIS-PCSI process embodiment accomplishes the following four things simultaneously: (1) increases the ignitability of the fuel, (2) increases the rate of combustion of the fuel-air mixture within the flame front, (3) facilitates a measure of control over the speed of the flame front and (4) sometimes enables additional combustion outside the flame front.

Additionally, the RIS-DISI process embodiment of HCRI process 100 does not normally produce much if any soot when running on gasoline and fuel with similar characteristics. Rationale for why this is so follows from the same reasons given above for how the RIS-DICI embodiment accomplishes the following three things: (1) enables leaner fuel operations and thus richer air combustion (reducing soot creation), (2) demolishes soot formations that are still inadvertently generated via high-speed RI species-oxygen laden highly-turbulent jets strategically aimed into the main combustion chamber, (3) produces and distributes RI species that serve as "cetane improvers."

Subject to the applicable portions of the earlier general descriptions, the IC engine embodiments schematically depicted in FIG. 2A-2B (for HCRI engine 200), FIG. 4A-4D (for HCRI engine 300), FIG. 5A-5C (for HCRI engine 400) and FIG. 6A-6D (for HCRI engine 500) are all examples of engine configurations capable of using and enabling all four of the RIS-augmentation process embodiments of HCRI process 100 described in the foregoing (the RIS-PCCI process embodiment, the RIS-DICI process embodiment, the RIS-PCSI process embodiment and the RIS-DISI process embodiment). A general means exist for the operation of all three of these IC engine embodiments of HCRI engine 200 (300, 400 and 500) as any of the four RIS-augmented process embodiments of HCRI process 100. The general means for this is the operation of the generalized process embodiment of the general thermo-fluid chemical-kinetics process invention (HCRI process 100) in the exemplary IC engine embodiment (HCRI engine 200) provided earlier in detail and applied to the general distinctions of the RIS-PCCI process embodiment, the RIS-DICI process embodiment, the RIS-PCSI process embodiment and the RIS-DISI process embodiment described in the foregoing. In the interest of both brevity and clarity, the description of some of the common features of operation in the three example IC engine embodiments (HCRI engine 300, HCRI engine 400 and HCRI engine 500) are omitted and the description of these features of operation with respect HCRI process 100 depicted in FIG. 1 and its detailed description of operation in HCRI engine 200 are being relied upon to provide adequate descriptions of the common features of operation omitted for these four RIS-augmented process embodiments. In particular, the thrust of the HCRI process 100's detailed description is applied to the RIS-augmented PCCI, DI CI, PCSI and DI SI cases, and its description, as given, fully explains the RIS-PCCI, RIS-DICI, RIS-PCSI and RIS-DISI process embodiments of HCRI process 100.

Further, for clarity of the general description, aims of the engine electronic control system 30 must be considered in the operation of the HCRI engine 200 and its three example HCRI engine embodiments (300, 400 and 500) with the RIS-PCCI, RIS-DICI, RIS-PCSI and RIS-DISI process embodiments of HCRI process 100. The engine electronic control system 30 must ensure the total amount and timings of fuel inserted into the main chamber 34, the timings and amounts of control fluid insertion into the M-C's 32 and the use of all RI-species generation augmentation-control devices 54, 64 and 70 (if any or all are employed) are all consummated with the engine operating conditions and specifications in manners appropriate to these embodiments. For all of these embodiments, the total amount of RI species generated, carried over, recycled and conveyed to assist ignition in later cycles must be that amount needed to assist in the manner desired (without dominating) in the ignition event in those cycles, resulting (in comparison with the conventional ignition modes) in reductions in required heat and required fuel concentrations relative to oxygen concentrations for ignition of the fuel. Also these control devices are to be operated in ways that together ensure that the work-power output of the engine is in accordance with operational load and speed requirements. For the two CI RIS-augmentation variants these control devices must also ensure ignition at the right timings.

From the foregoing discussions concerning the four RIS-augmentations of HCRI process 100, it should now be clear how the ignition mechanisms of these augmentation embodiments of HCRI process 100 are hybrids of the sub-mechanisms of the conventional technologies being augmented and of the sub-mechanisms of full HCRI. In the premixed CI augmentation variant (RIS-PCCI) the combustion is homogeneous and in the DI fuel augmentation (RIS-DICI) and in the SI augmentation RIS variants (RIS-DISI and RIS-PCSI) the combustion is locally (but not globally/chamber-wide) more homogeneous than it is in their conventional counterparts.

The present invention may also include IC engine embodiments of an enhanced ignition control process containing one or more engine combustion cylinder(s) with a system to facilitate the cyclic repetition of main-compression, main-combustion, power-expansion, exhaust and intake events common to the general family of rotary and reciprocating piston IC engines of the field, where such common events together constitute a full combustion cycle.

Another embodiment of the present invention generally relates to an enhanced ignition control process, and may include a thermo-fluid chemical-kinetics procedure configured to provide exacting control over an RI species initiation of homogeneous combustion and of near homogeneous combustion in cyclic IC engines using various hydrogen, alcohol, hydrocarbon, nitrogen and sulfur fuel derivatives and fuel/aqueous-fuel mixtures called the "fuel". The ignition control process may achieve this control by making use of RI species, i.e., radicals and highly-reactive species, to "dominate" ignition and combustion of said fuel in cyclic IC engines. This exacting ignition control may be enhanced by including within the fuel mixture a fuel component that increases the compression ratio required for the autoignition, where the fuel component is of higher heat of vaporization and higher volatility but lower ignitability than the fuel mixture without this fuel component. Hereinafter this "special fuel component" is also referred to as an "additive". While the special fuel component, or "additive," may be another fuel, it may also be some other chemical substance. For simplicity of the nomenclature, an insertion of this combination consisting of the fuel and the additive is considered and treated hereinafter as being part of an overall fuel insertion sub-process of the particular embodiment, though at various junctures in the detailed description, distinctive insertion effects of the fuel and the additive are delineated.

Other embodiments of the present invention may pertain to regulating combustion in the cyclic (reciprocating piston and rotary) IC engines in a manner that can be tailored to any point in an engine operating regime. These other embodiments can be implemented as a cyclic IC engine modified to use the enhanced ignition control process. In addition to single-ignition mode engines using RI, embodiments of the enhanced ignition control process can also augment SI and CI within an assortment of additional cyclic IC engines. These RI species augmentation IC engines may use the RI species and the additive to "assist" (rather than dominate) ignition and combustion in modified forms of conventional IC that make primary use of these older ignition modes. In all three ignition mode cases the use of the enhanced ignition control process can potentially enable improved combustion with increased efficiencies and decreased overall emissions.

Both with and without the use of the special fluid the controlled RI process may occur at "lower" temperatures relative to the "low" temperatures of TI ("thermal ignition") (with and without the use of the special fluid) applicable to the overall fuel mixture. Chain-initiation reactions responsible for RI primarily involve OH-induced OH-fuel decomposition reactions (and also fuel-$HO_2$ reactions) rather than fuel-$O_2$ oxidation reactions. Further, chain-initiation reactions responsible for RI at the "lower" temperatures are typically much faster than corresponding fuel-oxidation based chain-initiation reactions responsible for TI at the "low" temperatures applicable to the overall fuel mixture. If the special fluid is itself also a fuel composite, it itself, by definition, requires an even higher temperature for TI than is required for TI of the fuel without it. Thus, the effect of adding the special fluid is to adjust back upward the overall temperature at which autoignition occurs. However, even with the special fluid added, the controlled RI process will generally always occur at "lower" temperatures relative to the "low" temperatures of TI applicable to the fuel and special fluid mix. And thus, even with the use of the special fluid to raise the compression ratio of engine operation, the RI chain-initiation reactions are also typically much faster that those for TI of the overall fuel with the special fluid added.

Furthermore, the dominant fuel-$O_2$ chain-initiation reactions of TI are highly affected by the air to fuel ratio. On the other hand, because it is based on a very different mechanism, the dominant chain-initiation reactions responsible for both RI and RI species augmentation are far less dependent on the air-fuel ratio. Instead, as explained earlier, the dominant RI chain-initiation reactions depend much more on the strength of presence of the RI species. This is true with or without an inclusion of the additive. Thus, while RI is capable, TI is typically not capable of taking advantage of the use of the special fluid to raise the compression ratio of engine operation while simultaneously lowering the air to fuel ratio required for autoignition. Such simultaneous co-benefits happen with the concurrent use of RI species. These TI and RI comparisons apply to both the DI-fuel and the premixed-fuel sub-cases of homogeneous combustion RI, near homogeneous combustion RI, and the various RI combustion augmentations.

Embodiments of the enhanced ignition control process are configured to include control devices that are coordinated with both the RI species production in the M-C's and with the other sub-processes that follow from this M-C production. These control devices enable regulation of the overall production and/or the overall conveyance of the RI species whose generation begins in an earlier full combustion cycle or in earlier full combustion cycles for use in the main chamber in at least one subsequent full combustion cycle to said earlier cycle. Regulation of the overall production and/or conveyance is dependent on the ultimate quantity of RI species that must be present in a given main chamber during said subsequent cycle to help facilitate the occurrence of the combustion event via RI species in the manner desired and depending on the operating conditions (combined load, fuel, speed, etc.) of the engine. Thus, when production control is exercised within some of the stationary M-C's in an earlier cycle or cycles, it may be regulated in these chambers in a manner that considers the total amount of RI species generated by all of the M-C's of a cylinder together with any predetermine-able main chamber generation and supplementary generation, as well as any predeterminable conveyance that will occur afterwards, before the start of a next main-combustion event of said subsequent cycle.

The enhanced ignition control process of the present invention may thus be based on the regulation of the RI species generation and conveyance progression that originates with the M-C's in one cycle to affect the ignition and combustion in the main chamber of another cycle. Whether serving in a dominant role or in a combustion augmentation role, the enhanced ignition control process can simultaneously lower emissions, raise thermal efficiencies and increase the operating fuel range (fuel tolerance) of the rotary and reciprocating IC engine embodiments of its field. This is true whether or not the CR is raised via the special fuel (additive). It is the presence of the RI species within the main chamber charge of said subsequent cycle just before a start of an ignition event that enables controllable enhanced ignition and enhanced combustion therein. In RI species dominated engines, it is the greater strength in this presence that serves to switch the dominant chain-initiation path to one that occurs at both the "lower" temperatures and at the much faster reaction rates (than typical of the chain-initiation reactions for SI, CI and TI with the same fuel). It is this general RI species induced ignition sub-mechanism driven by the OH radical that makes possible ignition under leaner conditions with less supplied heat, even when the CR is raised via the special fluid (additive). And in RI species augmented engines, the ignition and combustion chemistry is typically a hybrid of this RI species-dominated chemistry and the chemistry of the more conventional ignition modes, with the RI species still typically dominating the pre-combustion chemistry and early ignition chemistry of the ignition event.

Hereinafter the special fuel or additive of higher heat of vaporization and higher volatility (but lower ignitability compared to the fuel) is referred to as a CRA (compression ratio adjustment) fluid. The choice of the CRA fluid will generally vary with the fuel (or fuel mixture) being consumed during the autoignition process. This is because the comparison in the critical properties of the CRA fluid (heat of vaporization, volatility and ignitability) is with the properties of the fuel (or fuel mixture). Typically the alcohols ethanol and methanol make excellent CRA fluids. For certain fuels, even water can be a good choice. Also, hereinafter the fuel without the additive will be called "the base fuel," and a mixture of the fuel and the additive (CRA fluid) will be called "fuel" or "the fuel". Additionally, hereinafter the base fuel is understood to include any constituent combination (including an individual constituent) of hydrogen, hydrocarbons, ketones, alcohols, nitrogen and sulfur fuel derivatives and/or water. This includes, but is not limited to, gasoline derivatives, kerosene derivatives, diesel derivatives, alcohol and renewable-alcohol derivatives, Fischer-Tropsch derivatives, natural gas derivatives, liquefied coal derivatives, gasified coal derivatives, bio-fuel (including bio-diesel) derivatives, fossil fuel derivatives, heavy aviation fuel derivatives (such as JP-5 and JP-8), sulfur fuel derivatives, nitro-methane, other nitrogen fuel derivatives and any natural or synthesized isomer of the following alkanes: ethane, propane, butane, pentane, hexane, heptane, octane, decane, undecane, dodecane, tridecane, pentadecane and hexadecane. This also includes fuel of these previously listed types that also contain other elements as additives or impurities.

Figures 9A, 9B:
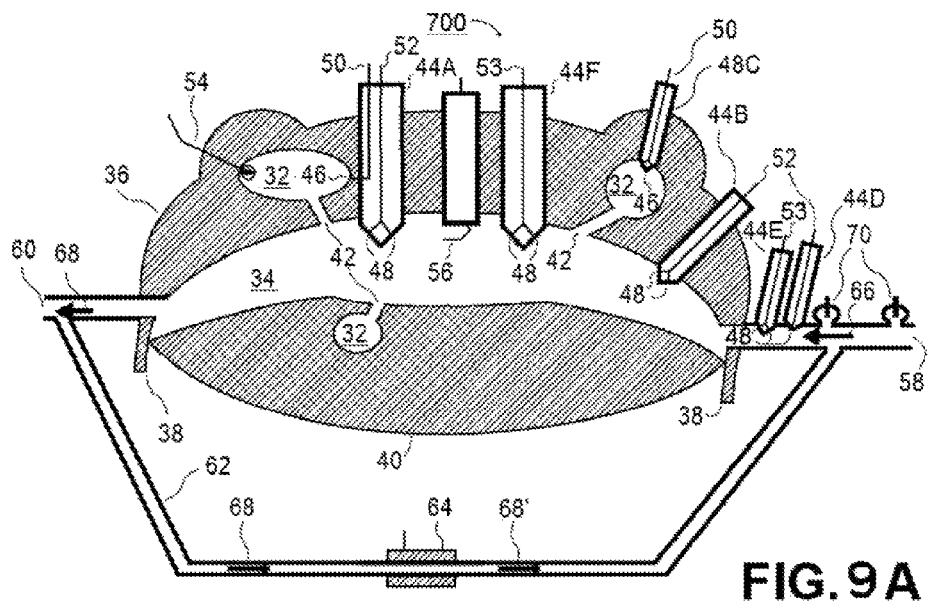
FIG. 9A is a composite schematic diagram of single engine combustion cylinder of an exemplary HRCI engine 700 utilizing the Enhanced HCRI process 600 shown in FIG. 8.
FIG. 9B is a schematic of an exemplary electronic control system for the generalized Enhanced HCRI engine embodiment shown in FIG. 9A.

FIG. 8 depicts an exemplary process flow diagram for an enhanced HCRI thermo-fluid chemical-kinetics process 600 (hereinafter "Enhanced HCRI process 600"). Enhanced HCRI process 600 is a complex series of general events that can occur in internal combustion. FIGS. 9A-9B illustrate an exemplary HCRI IC engine 700 (hereinafter "HCRI engine 700") that uses Enhanced HCRI process 600 in accordance with another embodiment. Accordingly, Enhanced HCRI process 600 is explained in conjunction with FIG. 9A-9B.

The exemplary HCRI engine 700 depicted in FIG. 9A-9B is an abstraction capable of using Enhanced HCRI process 600 in accordance with a plurality of other possible IC engine configurations. HCRI engine 700 may thus be a generalized IC engine embodiment containing common elements with other possible IC engine embodiments employing the Enhanced HCRI process 600. The various elements and their relationship to the operation of the HCRI engine 700 are substantially identically as described earlier for HCRI engine 200, along with several new elements needed to accommodate the enhanced embodiments, as described hereafter. Further, Enhanced HCRI process 600 makes use of the same radicals and highly-reactive species (radical ignition ("RI") species as are used in HCRI process 100, and in substantially the same manner.

In one embodiment of the present invention, an enhanced full HCRI engine is one in which the IC in Enhanced HCRI process 600 is dominated by RI species. Additionally, in another embodiment of the present invention, an enhanced radical ignition species augmented ("RIS-augmented") engine is one in which the IC in Enhanced HCRI process 600 is assisted, but not dominated, by RI species. In yet other embodiments of the present invention, the enhanced full HCRI engine that makes use of fuel that is inserted in a suitable manner before the beginning of the main-compression event in Enhanced HCRI process 600 is called an enhanced "premixed charge HCRI engine" (or "PC-HCRI engine") of Enhanced HCRI process 600, and the full HCRI engine that makes use of the direct injection ("DI") of fuel that starts sometime after the beginning of the main-compression event in Enhanced HCRI process 600 is called an enhanced "DI-HCRI engine" of Enhanced HCRI process 600 in accordance to yet other embodiments.

Similarly, the enhanced RIS-augmented engine that makes use of fuel that is inserted in a suitable manner prior to the beginning of the main-compression event in Enhanced HCRI process 600 is called a enhanced "premixed RIS-augmented engine" of Enhanced HCRI process 600 in some embodiments, and the RIS-augmented engine that makes use of the DI of fuel that starts sometime after the beginning of the main-compression event in Enhanced HCRI process 600 is called an enhanced "DI RIS-augmented engine" of Enhanced HCRI process 600 in other embodiments. Depending on whether the dominant ignition mode employed is spark ignition ("SI") or compression ignition ("CI"), each of these Enhanced HCRI process 600 RIS-augmented fuel insertion options (premixed and DI) have sub-options associated with them. Thus, there are four basic enhanced RIS-augmentation embodiments of Enhanced HCRI process 600. These are enhanced RIS-augmented PCCI, enhanced RIS-augmented PCSI, enhanced RIS-augmented DI CI, and enhanced RIS-augmented DI SI. With the exception of the use of the CRA fluid, these four enhanced RIS-augmented embodiments of Enhanced HCRI process 600 are substantially identical to the RIS-augmented embodiments of HCRI process 100 provided earlier. Accordingly, and for the sake of brevity, the earlier descriptions herein of the four RIS-augmented embodiments of HCRI process 100 are relied upon and incorporated herein by reference in their entirety (together with the forthcoming description of Enhanced HCRI process 600 with HCRI engine 700 herein) for and as descriptions of these four new enhanced RIS-augmented embodiments of Enhanced HCRI process 600.

A cycle of HCRI engine 700 consists in part of the intake event, the main-compression event, the main-combustion event, the power-expansion event and the exhaust event. As with HCRI engine 200, depending on the embodiment of HCRI engine 700, some of these events may co-occur, i.e., occur simultaneously.

As shown in FIG. 8, event 1, 605: Enhanced HCRI process 600 starts with RI species from the earlier full combustion cycle being conveyed to said full combustion cycle, with said full combustion cycle being both a new cycle and at least one of the said subsequent full combustion cycle. These are carried over to said full combustion cycle within/by both the main chamber 34 or plurality of main chambers and the mini-chamber 32 or plurality of mini-chambers (FIG. 9A).

At the start of the new cycle the bulk of the RI species in both the main chamber 34 and the M-C's 32 are typically in states of frozen equilibrium (or "near" frozen equilibrium). The RI species then typically remain non-reactive at the relatively lower temperatures prevalent early in the new cycle. During this period, the plurality of exhaust gases 68 depart the main chamber 34 via the general exhaust-gas device 60 and the plurality of intake gases 66 enters the main chamber 34 via the general intake-gas device 58.

When there is recycling of the exhaust gases 68 via the general exhaust-gas recycling device, or system, 62, additional quantities of RI species are either retained internally in the main chamber 34, or returned to the main chamber 34 with the intake gases 66. The quantity of RI species returning with the intake gases 66 may be adjusted by the general exhaust-gas RI-species augmentation device 64 or plurality of exhaust-gas RI-species augmentation devices 64 (resulting in the plurality of modified exhaust gases 68'). Also, the quantity of RI species returning with the intake gases 66 may be adjusted by the general intake-gases RI-species generation-control augmentation device 70 or plurality of intake-gases augmentation devices 70.

When the IC engine uses premixed fuel (be it for the enhanced PC-HCRI or one of the enhanced premixed RIS-augmentation engines of Enhanced HCRI process 600), base fuel can be inserted into the intake gases 66 in the general intake-gas device 58 by the general intake-gas entry device fuel insertion device 44D via general fuel-insertion orifices 48. When it is also desirous in a premixed fuel HCRI engine variant, some portion, or all, of the CRA fluid can be mixed with the base fuel and injected together with the base fuel by this device (44D) via the same fuel-insertion orifices 48. Alternatively, some portion or all of the CRA fluid can be separately inserted into the intake gases 66 in the general intake-gas device 58 by a general intake-gas entry CRA fluid insertion device 44E via one or more of the general fuel-insertion orifices 48.

When the base fuel and the CRA fluid are mixed prior to this early fuel insertion, the fuel is distributed to the intake-gas fuel insertion device 44D via the fuel supply distribution system 98 (FIG. 8B) through said at least one fuel supply line 52. When the base fuel and CRA fluid are not mixed for early co-insertion, only the base fuel uses this supply routing via said fuel supply line 52. In such case, the CRA fluid for early insertion is instead supplied to the general intake-gas entry CRA fluid insertion devices 44E via the CRA supply distribution system 97 through a CRA fluid supply line 53 or plurality of CRA fluid supply lines 53, and enters the general intake-gas device 58 via the general fuel-insertion orifices 48.

Depending on the fuel insertion requirement, a total amount of fuel (combination of base fuel and CRA fluid) and a ratio of the base fuel and the CRA fluid (relative to one other) so supplied to the general intake-gas entry CRA fluid insertion device 44E and/or the intake-gas fuel insertion device 44D are regulated by the portion or portions of the engine electronic control system 30 that controls the fuel supply distribution system 98 and the CRA supply distribution system 97. The amount and ratio, as well as the timings of fuel insertions, are in accordance with HCRI engine 700 operational requirements.

Naturally occurring pressure differences between the chambers cause some of the RI species carried over in each of the M-C's 32 to transfer to the main chamber 34 through the at least one connecting conduit 42 where they are then mixed with retained gases and the intake gases 66 along with any recycled exhaust gases 68 and 68'. The manner of the mixing can vary with operational requirements and characteristics of the engine being used.

In event 2, 610, during approximately the middle of the compression event, the gases ("gas charge") in the main chamber 34 become highly impregnated with RI species from the earlier cycle(s).

In event 3, 615, as compression of the gases in the main chamber 34 continues, the mix of the RI species and the main chamber gases becomes more homogeneous. This main chamber compression causes pressure to rise, and pressure induced temperature rises. With these temperature increases, the activity of the RI species in the main chamber 34 begins to increase. Also, pressure differences form between the main chamber 34 and M-C's 32, and throttling of the gases being transferred into the M-C's 32 typically occurs in the conduits 42. The throttling in turn causes the pressure differences between these chambers (32 and 34) to further build, causing high-speed mass jet or the plurality of high speed jets to form (one jet per conduit 42). These jets transfer, or force, portions of the main chamber gases (including intake air) into the M-C 32, renewing the M-C's air (and thus oxygen) supply. If there is premixed fuel within the intake gases 66, or early direct or indirect injection of at least some of the fuel, fuel also enters the M-C's 32 through the conduits 42 via the mass jets.

In event 4, 620, when there is DI of the fuel (as in the enhanced DI-HCRI and enhanced DI-RIS-augmentation engines of Enhanced HCRI process 600), the timing of the SOI (start of injection) of the fuel into the main chamber 34 is typically during the mid-to-late portion of the main-compression event. In this case, the fuel is inserted into the main chamber 34 by either the main chamber fuel sub-component or sub-components of one or more multi-fluid insertion device 44A and/or by the single main chamber fuel insertion device 44B or plurality of single insertion devices 44B via (for all such insertion devices 44A and 44B) at least one fuel-insertion orifice 48. When some portion of the base fuel and CRA fluid are mixed and injected together, either or both insertion devices 44A and 44B are also used for that portion of the CRA fluid. Depending on the base fuel, it is sometimes better to inject the CRA fluid separately, and in advance of base fuel insertion. In such case, a single main chamber CRA fluid main chamber insertion device 44F or plurality of single insertion devices 44F is used for the CRA fluid insertion via at least one fuel-insertion orifice 48. When the base fuel and the CRA fluid are mixed and injected together, the fuel is distributed to the insertion devices 44A and 44B for use in the main chambers 34 via the fuel supply distribution system 98 through the fuel supply lines 52. When they are injected separately, the base fuel is supplied via fuel supply lines 52 and the CRA fluid is supplied via the CRA supply distribution system 97 through the CRA fluid supply lines 53. The amount of fuel supplied to each of the insertion devices 44A, 44B and 44F is regulated by the portion of the engine electronic control system 30 that controls the fuel supply distribution system 98 and the CRA supply distribution system 97. The amounts of fuel provided and the timings of fuel insertion are in accordance with HCRI engine 700 operational requirements.

For DI-HCRI engines of Enhanced HCRI process 600, the timing of the start of this DI fuel insertion is characteristically early relative to the desired timing of ignition (compared to conventional DI diesel engine operations). For these embodiments, the SOI (start of injection) and EOI (end of injection) are typically timed so that injection is completed adequately before the SOC (start of combustion), and typically so that the autoignition (SOC) does not begin until just a little after a movable work-power producing component's 40 passing of TDC (top dead center). This is regardless of the use of CRA fluids and thus typically allows time for the fuel to eventually become mixed more thoroughly with the RI species-laden main chamber gas charge in at least a quasi-homogeneous layered manner. In DI applications, some of the injected main chamber fuel can enter the mass jets of M-C's 32 by both diffusion (within the main chamber gas charge) and by incidental convection. This fuel is accordingly entrained by these mass jets into the M-C 32 via the conduits 42 and trapped.

In event 5, 625, in DI-HCRI embodiments of Enhanced HCRI process 600, with all of the main chamber fuel being inserted early relative to the SOC (compared to conventional DI CI), well-stirred fuel conditions are also generally assured. This condition can be further aided by the CRA fluid, which is being used in such embodiments to raise the CR required for self ignition while at the same time enabling ignition under leaner fuel conditions. Thus, even under higher load conditions, by some time prior to "after TDC" autoignition, the mixing of the main chamber fuel-air gas charge to at least quasi-homogeneous levels is typically assured in enhanced DI-HCRI embodiments of Enhanced HCRI process 600. However, RI homogeneous combustion can occur even when the fuel-air gas charge is slightly-moderately stratified. These assurances follow from three factors: the longer than normal mixing times available because of the presence of the RI species, the relatively higher CR's required for self ignition because of the CRA fluids and the much higher than typical turbulence levels. The rational for these factors has been provided earlier herein.

In event 6, 630, in both the DI and premixed fuel cases, because of the high turbulence and the presence of the RI species, even at the relatively "much lower" than "normal" temperatures present in the main chamber (than are needed for conventional IC engine pre-ignition activity), typically sometime before the end of the main-compression event, the main chamber RI species, fuel and air begin significant pre-ignition activity. Depending on the characteristics of the fuel, the operating conditions and specifications of the IC engine embodiment, this activity can often even start a little earlier in the main-compression event. The presence of the CRA fluid raises the relative CR at which all of this activity will start. Thus, compared with combustion of these same fuels without the use of the CRA fluids, highly ignitable base fuels are enabled to ignite at higher CR's under leaner fuel conditions for higher overall fuel efficiencies.

Typically during these periods of the cycle, the state of the fuel-air gas charge in the main chamber 34 is transitioning through the "Slow Combustion Region" shown in FIG. 3. For smaller molecule base fuels mixed with CRA fluids, in the pre-autoignition chemistry leading up to RI and RIS-augmented ignition, chain-initiation is again via the reaction set given earlier via Equation (1) (with F the fuel). In addition, the same general "$H_2O_2$+M" chain-initiation reaction dominant during autoignition (Equation (2)) and the same chain-branching OH-fuel decomposition reaction set (Equation (3)) (with F the fuel) are again typically among the other dominant reactions in operation during pre-autoignition for fuel combinations of CRA fluids and base fuels. These and the other dominant pre-autoignition reactions occurring during this same period of the cycle result in the slow build up of the additional RI species in the main chamber 34. Though the dominant pre-autoignition chain-initiation and chain-branching mechanisms become more complex with a larger molecule base fuels, the same principles apply, with the role of the hydroperoxyl radical ($HO_2$) (in the chain-initiation reaction decomposition of the fuel) and the role of the hydroxyl radical (OH) (in the chain-branching reaction decomposition of the fuel) both being dominant during the pre-ignition activity.

In effect, the CRA fluid slows the temperature rise of the main charge during compression, requiring more overall compression before the base fuel reaches the temperatures required for this general chemistry (represented via Equations (1)-(3)) to occur. And thus, the general chemistry itself remains essentially the same as that occurring in HCRI process 100. In general, these general $HO_2^-$ and $OH^-$ drive "much lower" temperature sub-mechanisms (Equations (1)-(3)) represent direct fuel decomposition at very low temperatures, setting the stage for "lower" temperature self ignition by the RI species (RI) in the enhanced full HCRI engines of Enhanced HCRI process 600 (DI-HCRI and PC-HCRI) and for ignition assistance in the enhanced RIS-augmented engines of Enhanced HCRI process 600. The effect of the use of CRA fluids is simply to raise the relative CR's at which this general chemistry occurs. This is made possible by the cooling effect of the CRA fluid on the overall main chamber charge as it vaporizes and the fact that the base fuel still requires essentially the same temperatures as without the use for the CRA fluids for self ignition.

As was introduced in HCRI process 100, this description for Enhanced HCRI process 600 applies to dual-base fuel (and multi-base fuel) insertion operations in which the re-activities with $HO_2^-$ and $OH^-$ of all the constituents (of the fuel) are compatible. In such cases (as for the mixture of the base fuel and CRA fluid itself) the general mechanism is similar, with the dominant reactions for each constituent being of the same form (Equations (1)-(3)). In operations in which the re-activities of the various constituents of the fuel with $HO_2^-$ and $OH^-$ are not similar, typically at least initially, the general reaction sub-mechanisms follow the activity of the constituent whose reactivity with the more significant of either $HO_2^-$ or $OH^-$ is dominant (depending in absolute terms on which radical is decomposing which of the fuel constituents the fastest during pre-autoignition).

In Enhanced HCRI process 600 the RI species from past cycles and the RI species created during this "much lower" temperature pre-ignition activity are subsequently used together in one of three ways in the main chamber IC: (1) to dominate and thus initiate autoignition (RI) in enhanced full HCRI engines; (2) to augment the efficiency of and maintain better control over the timing of autoignition (CI) in enhanced RIS-augmented PCCI and DI CI engines; and (3) to augment the efficiency of spark ignition (SI) in enhanced RIS-augmented PCSI and DI SI engines. In the two enhanced full HCRI cases (DI-HCRI and PC-HCRI), because of the presence of the RI species, there is exothermic pre-ignition activity that is slowly (at first) carrying the fuel-air gas charge down a predetermined chemical-kinetics path (dependent on many factors) to RI species induced autoignition. In the four enhanced RIS-augmented cases, the RI species activity levels during this same period will generally not be as high, but will generally however be at higher levels (depending on the degrees of augmentation) than in the conventional (non RIS-augmented) variants of these cases.

Returning to FIG. 9A, the exterior casing of HCRI engine 700 consists of the "top" housing" periphery 36 and the "side" housing periphery 38 (or plurality of side housing peripheries 38). Starting generally at a time in the cycle that is late in the main-compression event, the control fluid (described in detail for HCRI process 100) can be inserted into one or more of the M-C's 32 mounted in these top and/or side housing peripheries 36 and 38. Insertion is by either the single RI-species generation control-fluid insertion device 44C or by the control fluid sub-component of the multiple or the dual-fluid insertion device 44A. Actual insertion into the M-C's 32 is through one or more M-C RI-species generation control-fluid insertion orifice 46. The control fluid is distributed to the insertion devices 44A and 44C for use in theses M-C's via the mini-chamber RI species generation control fluid supply distribution system 96 through the at least one M-C RI species generation control-fluid supply line 50. The rationale and control strategy for the use of the control fluid is substantially the same as described earlier for HCRI process 100.

As in HCRI process 100, there are a number of additional augmentations other than the use of control fluid that can be used to affect the RI species generation process in the housing periphery mounted M-C's 32. Variable cooling control of the M-C 32 assemblies by direct in a suitable manner is effective in assisting in the direct control of the M-C RI species generation process in these chambers. Other control augmentations include catalytic surfaces and devices (including ones where the catalytic surface areas can be varied), fuel reformatting devices, chemical additive insertion devices, heating-cavity devices (example: via rapid electrical current discharges, laser beam discharges, etc.), rapid plasma generation devices, rapid ultraviolet-light discharge devices, micro-wave devices, rapid cooling/heating devices, M-C volume changing devices, M-C pressure regulating devices, M-C flow varying devices, M-C geometry varying devices, M-C connecting conduit geometry varying devices, M-C connecting conduit flow varying devices, M-C conduit entering-fuel regulating devices, etc. Devices such as, but not limited to, these can all be used to play a part in the control of RI species generation in M-C's (and to help indirectly control RI species generation in the main chambers later on in the cycle). All such devices are together represented in FIGS. 9A-B as one or more general mini-chamber RI-species generation-control augmentation device 54. Any M-C 32 receiving control-fluid or fitted with and operationally employing RI-species generation-control augmentation device 54 are also considered "control-active." These are also regulated by a portion of the engine electronic control system 30 (FIG. 9B) that controls their functions in accordance with HCRI engine 700 operational requirements.

In event 7, 635, self ignition (RI) in enhanced full HCRI embodiments of Enhanced HCRI process 600 is dominated by RI species. Also, all of the enhanced CI and SI RIS-augmented engines of Enhanced HCRI process 600 share the main aspects of this definitive general chemistry as a common feature. In addition, these enhanced RIS-augmented engines retain elements of the "un-augmented" chemistry associated with their own conventional characteristics. The degree to which these enhanced RIS-augmented engines employ the definitive general chemistry of full HCRI is generally related to the degree of RI species augmentation ("RIS-augmentation").

Thus Enhanced HCRI process 600 is defined in part by the common features representative of the definitive general chemistry of enhanced full HCRI. This definitive general chemistry is essentially the same as the full HCRI chemistry for dual and multi-component fuels of HCRI process 100 as described for event 7, 135. For comparison purposes, the portion of the "un-augmented" chemistry associated with the conventional aspects of the four enhanced RIS-augmented embodiments are also essentially the same as presented earlier herein for their four RIS-augmented (non-enhanced) embodiment counterparts with dual and multi-component fuels. For the sake of brevity, these earlier descriptions (for the non-enhanced RIS-augmented process embodiments) are relied upon are incorporated herein by reference in their entireties for the case of the dual and multi-fuel employments of these six new HCRI process embodiments of Enhanced HCRI process 600. For their dual (and multi) fuel case, these six counterpart HCRI process engines (embodiments) of HCRI process 100 fully describe these six new enhanced HCRI process engines (embodiments) of Enhanced HCRI process 600. Thus, for their employments with dual or multiple fuel components, the earlier detailed description given herein for the HCRI process 100 combined with the special descriptions for (a) the HCRI process 100 "General Distinctives of full HCRI Engines:", (b) the HCRI process 100 "General Distinctives of the RIS-Augmented PCCI Embodiments:", (c) the HCRI process 100 "General Distinctives of the RIS-Augmented DI CI Embodiments:", (d) the HCRI process 100 "General Distinctives of the RIS-Augmented PCSI Embodiments:" and (e) the HCRI process 100 "General Distinctives of the RIS-Augmented DI SI Embodiments:" all apply as descriptives of their respective Enhanced HCRI process 600 counterparts. For the sake of both brevity and clarity, these earlier HCRI process 100 descriptions are thus incorporated herein by reference and are being relied upon as descriptives for these respective newer Enhanced HCRI process 600 enhanced full HCRI engine and enhanced RIS-Augmented embodiments.

In enhanced full HCRI engines, the ignition process is generally dominated by sub-mechanisms involving fuel-OH decomposition chain-branching reaction sets at "lower" temperatures. This is in contrast with the more traditional "low" temperatures direct-$O_2$ fuel oxidation chain-initiation chemical-kinetics mechanisms typically found for the same fuel in conventional PCCI. This is also in contrast to the "higher" temperatures associated with combustion of the same fuel in conventional SI and DI CI. The chain-initiation reaction mechanisms of conventional SI and DI CI typically involve dissociation (thermal and/or via third body) reactions and/or direct fuel-$O_2$ decomposition reactions. In the general case of homogeneous combustion RI with the fuel (hydrogen, alcohol, hydrocarbon, nitrogen and sulfur fuel derivatives and fuel/aqueous-fuel mixtures), the OH needed to sustain the 'lower' temperature fuel-OH decomposition sub-mechanisms is primarily generated by the dominant chain-initiation reaction given by Equation (2). For smaller molecule fuels, the $OH^-$ quantity generated by this reaction is in turn used in the general dominant chain-branching reaction set represented by Equation (3) (with F the fuel). The general enhanced full HCRI autoignition event is also dominantly influenced by the available concentrations of the other key RI species. And though the sub-mechanisms for all of this can be rather complex (and thus more difficult to generalize), the other RI species also help in accelerating $OH^-$ generation during autoignition (as they did during pre-ignition). This in turn helps to "drive" more fuel decomposition via the dominant fuel-OH chain-branching reaction set (Equation (3)) (with F the fuel). Once a molecule of fuel is OH-decomposed, some of the resultant $R_i^-$ molecule products of this set are then directly decomposed further by $O_2$ at these lower temperatures.

Though the dominant autoignition chain-branching mechanisms become more complex with a larger molecule fuel, the same principles apply, with the role of the hydroxyl radical ($OH^-$) remaining dominant in the fuel decomposition until much (if not most) of the fuel is expended. Reasons for why this autoignition activity can start at temperatures that are "lower" than both the "low" temperatures associated with conventional PCCI and the "higher" temperatures associated with conventional SI and DI CI are given earlier in the description of HCRI 100 process event 6, 130 and apply here. Again, the main effect of the use of the CRA fluid is to delay the start of Enhanced HCRI process 600 event 6, 630 until additional heat of compression (by way of the higher required CR's) enables the main chamber charge to reach essentially the same temperatures as are required by the base fuel for autoignition in HCRI process 100 event 6, 130 (with a dual or multi component fuel). (See HCRI process 100 event 6, 130 for more details on the autoignition process).

During autoignition with homogeneous combustion, all of the fuel in the main chamber is consumed. Also, during the homogeneous combustion of the fuel, relatively large quantities of the OH radical are produced. Before the end of autoignition the concentration of the main chamber $OH^-$ peaks. Moreover, the rate of heat release is much faster than with ignition in the variants of un-augmented CI and SI. Thus, at the completion of the homogeneous combustion the specific internal energy state of the gases in the main chamber 34 is peaked. Accordingly, the pressure and temperature of the main chamber gases also peak almost immediately after the completion of autoignition. Thus an enormous pressure difference between the main chamber 34 and M-C's 32 develops. This in turn peaks the mass jet velocities and mass flow rates between these chambers 34 and 32, driving the relatively large quantities of $OH^-$ and energy into the M-C's 32 under extremely high turbulence levels.

In addition to sharing the definitive general chemistry of enhanced full HCRI, the enhanced RIS-augmented engines of Enhanced HCRI process 600 may also share many of the other features exhibited during enhanced full HCRI ignition and combustion. For example, the combustion is also homogeneous in the enhanced RIS-augmented PCCI engine of Enhanced HCRI process 600. Additionally, during the combustion event in the four main enhanced RIS-augmented engines of Enhanced HCRI process 600, the pressure, temperature, $OH^-$ concentrations and specific internal energy of the main chamber gases also peak. As a result, high mass flow rates also evolve in these embodiments, carrying relatively massive quantities of $OH^-$, other chemical reaction products and energy into the M-C's 32 under the extremely high turbulence levels.

As an optional step within the enhanced full HCRI and the enhanced PCCI RIS-augmented engines of Enhanced HCRI process 600, immediately prior to the point in the cycle at which the "tempo" of the autoignition activity is about to "take off", the general main chamber ignition-timing augmentation device 56 (FIG. 9A) can be used. The primary purpose of the ignition-timing augmentation device 56 in the enhanced full HCRI engines and in the enhanced PCCI RIS-augmented engine is not to initiate autoignition. Rather the purpose is to assist the accuracy of the timing of the point (position in the cycle) where the "tempo" of autoignition activity literally "takes off". At this point in either a full HCRI cycle on in a PCCI RIS-augmented cycle, because the combination of the heat of compression and the RI species activity have together already made the main chamber fuel-air mixture just ready for ignition (via the extensive $OH^-$ generation), any small joint increase in pressure and temperature will generally cause the bulk ignition of the fuel-air gas charge in one event (which by definition is homogeneous combustion). Examples of ignition-timing augmentation devices 56 may include spark plug type devices, catalytic-ignition devices, plasma-jet-generating devices, flame-jet-generating devices, laser devices, etc., where the objective of such devices is in creating a relatively small (or even large) but/and very sudden internal energy increase in some portion of the main chamber fuel-air gas charge. In the two SI enhanced RIS-augmented embodiments of Enhanced HCRI process 600, this step is not optional.

A key to the generation of the new RI species in the M-C's 32 is "OH-RI species induced" (driven) chemistry caused by the well-timed influx of main chamber $OH^-$ into the RI species laden gases of the M-C's 32. This influx occurs during and just after ignition. Also, this influx enables extremely high turbulence levels in the M-C's 32. Thus, there is an immediate mixing of the hydroxyl radical with the M-C gases (including fuel and RI species) at the smallest turbulent length scales. Perhaps as important to RI species generation in the M-C 32 is the relatively high quantity of enthalpy also being received in the M-C 32 from the main chamber 34, causing the M-C temperatures to start to rise rapidly.

In event 8, 640, the sudden presence of this higher (and for a time, increasing) quantity of $OH^-$ in the M-C's 32 acts in effect as a "driving force" to rapidly convert the resident M-C fuel into more RI species. Also, the overall chemical activity of the M-C 32 is further accelerated by the rapidly rising temperature (due to the relatively enormous amount of enthalpy transfer). The M-C's 32 are designed and controlled so that during the last part of the main-compression event, and first part of the power-expansion event the states of their gases can be thermally maintained in the "Cool Flames" and/or "Slow Combustion" regions of FIG. 3 (if the fuel has a cool flames region). Sometimes it is also expedient to very briefly take the state of the M-C gases slightly into area "B" or the "Ignition" region of FIG. 3 before a sudden conduit 42 flow reversal (due in part to the power-expansion event in the main chamber 34) takes the state back in area "A" (FIG. 3) without igniting the M-C gases.

The essence of the chemistry occurring in the M-C's during this event are as described in event 8, 140 for HCRI process 100 for the case of dual and multi-component fuels. If the re-activities of all the constituents (of the fuel) with $OH^-$ are compatible, the dominant reactions for each are of fundamentally the same form as the single component chemistry of event 8, 140 for HCRI process 100. In operations in which the re-activities of the fuel constituents with $OH^-$ are not similar, initially at least, the general reaction sub-mechanism will typically follow the activity of the fuel constituent whose reactivity with $OH^-$ is dominant. In general, for smaller molecule base fuels, among the most dominant reactions found in the general sub-mechanisms for this mini-chamber OH-induced chemistry is the general reaction set given by Equation (4) (where F is fuel).

Though the dominant mechanisms for OH-fuel reduction in the M-C become more complex for larger molecule fuels, the same principles apply. The sub-mechanisms for subsequently converting the various $R_i^-$ (and other sub-mechanism generated species) into RI species are more complex, with heavy dependence on effects of the significant concentrations of fuel and RI species already present in the mini-chamber. And, as the new quantities of the RI species increase (due to these sub-mechanisms), part of the new $H_2O_2$ being created is then sacrificed to create additional $OH^-$ via exothermic reaction Equation (2) to help accelerate the $OH^-$ decomposition of the fuel into the various $R_i^-$ and other species. Similarly the other RI species resident in the M-C 32 help in both the generation of more $OH^-$ and more RI species in a complex chemical-kinetics sub-mechanism. Thus the overall RI species generation mechanism is both OH-driven and RI species-driven, or "OH-RI species driven". Though the dominant chain-branching mechanisms become more complex with larger molecules as fuel, the same principles apply, with the role of the hydroxyl radical (OH) dominant in the fuel decomposition.

This generalized M-C RI species generation process is fundamentally universal to all enhanced full HCRI and all enhanced RIS-augmented embodiments of the present invention, including Enhanced HCRI process 600. This RI species generation process continues to strengthen until the supply of $OH^-$ from the main chamber 34 is cut off by the sudden M-C to main chamber conduit 42 flow reversal caused in part by the power-expansion event, after which, this process dies off.

The role of the M-C control fluid in Enhanced HCRI process 600 is for practical purposes substantially the same as in HCRI process 100. Relative to the air, the higher the concentration of fuel in the M-C 32, the faster this sub-mechanism will produce additional RI species. The reverse is also true. As explained earlier for HCRI process 100, the timing of main chamber 34 autoignition (SOC) can be directly controlled in enhanced full HCRI engines of Enhanced HCRI process 600 by the regulation of the quantity of the control fluid inserted into the M-C's 32 by using the engine electronic control system 30 (FIG. 9B). At the correct times (depending on a particular engine operating condition) the electronic control system 30 directs the mini-chamber RI species generation control fluid supply distribution system 96 to send proper amounts of control fluid through the control fluid supply lines 50 (FIG. 9B) to the control-fluid insertion devices 44A and/or 44C of certain M-C's 32 (FIG. 9A). These control fluid insertion devices deliver control fluid into these M-C's 32 via the control fluid insertion orifices 46.

In the enhanced PC-HCRI engine and the two enhanced premixed fuel RIS-augmented engines of Enhanced HCRI process 600 the control fluid is likely to be a liquid or gas that can serve to dilute the fuel concentration of the M-C as needed (relative to the air concentration). More dilution decreases the RI species generation rates and less dilution increases the RI species generation rates. Conversely, in the enhanced DI-HCRI embodiment and the two enhanced DI fuel RIS-augmented engines of Enhanced HCRI process 600, the control fluid is preferably the fuel (or a constituent of the fuel). With such as the control fluid, when it is necessary to increase or decrease the RI species generation, the fuel concentrations of the M-C are strengthened or weakened accordingly.

Based on this abbreviated chemical-kinetics description for the M-C RI species generation process, the role of the general M-C RI-species generation-control augmentation device 54 can also be delineated. The general M-C RI-species generation-control augmentation device 54 can be an apparatus capable of increasing or decreasing the overall rates of the M-C RI species generation chemical-kinetics process in a suitable manner. Specifically, these M-C augmentation devices 54 either speed or slow the overall reaction rates of reaction set given by Equation (4) (with F the fuel), or its more complex equivalents for larger molecule fuels, along with the sub-mechanisms for subsequently converting the $R_i^-$ species (and other sub-mechanism generated species) into additional RI species and more $OH^-$. In particular, the overall reaction rate of dominant exothermal reaction given by Equation (2) is highly sensitive to temperature and to the concentration of $H_2O_2$. Also, the overall reaction rates of the reactions of Equation (4) (with F the fuel) and its more complex equivalents (for the larger molecule fuel constituents) are highly sensitive to both temperature and to the concentration of $OH^-$. Finally, the dominant follow-on reactions for converting the products of reaction set Equation (4) (with F the fuel) into new RI species are highly sensitive to the temperature and the existing concentrations of the RI species.

Thus, various apparatus capable of affecting the temperature of gases of the M-C in a controlled manner and/or of augmenting the concentrations of $OH^-$ and/or any of the RI species within the M-C in a controlled manner, are among those considered to be M-C RI-species generation-control augmentation devices 54. Alternatively, devices capable of changing the volume of the M-C 32, the flow into or out of the M-C, or of inserting other chemical additives into the M-C 32 or of any other function that can help in regulating the quantity of RI species generated by the M-C 32 (pressure variation, heat addition or removal, plasma generation, light addition, laser energy addition, adding microwaves, varying flow geometry, varying catalytic surface areas, fuel reformation, etc.) are also considered for use in M-C RI-species generation-control augmentation devices 54. These M-C augmentation devices 54 can be used alone or in conjunction with proper regulation of the control fluid insertion to directly control the quantity of RI species generated by the M-C's 32. Under the direct control of the engine electronic control system 30, these augmentation devices 54 are used either together with synchronized control fluid insertion or alone to regulate the rate of RI species generation process in the control-active M-C's 32.

In event 9, 645, at some point (typically within the "well before mid" portions of the power-expansion event) the sudden conduit 42 flow reversal (mentioned earlier) occurs. Generally this occurs as a combined result of main chamber power-expansion and rising temperatures and pressures in the M-C (due to the exothermic RI species generation process). These naturally opposing developments cause the pressure ratio to reverse (so that M-C 32 pressure is greater than that of the main chamber 34). Immediately after this point a highly turbulent mass jet evolves, carrying RI species, unused fuel, unused oxygen, enthalpy, other chemical reaction products, etc., out of the M-C's 32 and into the main chamber 34 with which they are in thermo-fluid communications. Depending on the enhanced HCRI engine embodiment and physical location of the M-C 32, this transfer is typically to the same main chamber in which ignition and combustion occurred. However, in some IC engines the transfer may also be to another main chamber 34. In such a case the flow reversal may be due instead to the pressure drop that occurs when the M-C's conduit 42 shifts communication to the other main chamber 34. In either case, after this and because of the rapid transfer of enthalpy, the pressures in the affected M-C's 32 begin to drop more rapidly. This pressure drop during the "before mid" power-expansion period results in a drop in temperature of these M-C's 32. The bulk of the radical species in the affected M-C's 32 subsequently go into states of frozen (or near frozen) equilibrium.

Though there is a rapid temperature drop in the main chamber 34 that accompanies the main chamber pressure drop during the "well before mid to late" portion of the power-expansion event, the temperatures in the main chamber 34 are still high enough for main chamber RI species activity. Also, although the $OH^-$ concentration in the main chamber is dropping with temperature, during the "mid-to-late" portion of the power-expansion process, its concentration remains significant. Thus, because of the pressure differences between the chambers (32 and 34), unconsumed M-C fuel and oxygen together with quantities of mini-chamber RI species, etc. are transferred into the main chamber 34 from those M-C's 32 that are discharging mass via high-speed highly-turbulent jets. These quantities are thus discharged directly into the heavily OH laden gases of the main chamber 34 and rapidly mixed. This situation results in not only additional combustion of the M-C stored fuel, but also a second OH-RI species induced (driven) RI species generation process of the cycle, producing new main chamber RI species. This process continues on through (and often beyond) the blow-down portion of the exhaust event. Thus, the supply of RI species needed for radical ignition in the later cycle(s) falls also on the two post-autoignition processes taking place in the main chamber 34.

A first post-autoignition process is RI species retention. Typically, much of the RI species (especially the $CH_3HCO$ and $CH_2O$, depending on the fuel) exiting the M-C 32 (during the power stroke and blow down) are not consumed as they are expelled to the main chamber 34, but are retained and serve as part of the driving force for the second process. However, because of the initially high temperatures (when the state of the main chamber gases is still in area "B" of the Ignition Region of FIG. 3), typically a portion of the discharged M-C RI species (including some of the $HO_2$ and more of the $H_2O_2$) is lost (consumed) between the time of well before mid-to-mid power-expansion flow reversal and the transition of the main chamber gases from Area "B" of the "Ignition Region" back into area "A" of the "Slow Combustion Region".

A second process (of the post-autoignition processes) is main chamber RI species generation. This begins sometime during the transition of the state of the gases in the main chamber back into area "A" (see FIG. 3), resulting primarily in $H_2O_2$, but also in more $HO_2$ (initially) and in more of the other RI species. This generation process is fueled and driven by the relatively high quantities of fuel and RI species coming out of the M-C 32 and the adequately high OH concentrations still retained in the main chamber 34. Generally, this generation process takes place in two phases, each with its own unique sub-mechanisms. The first phase sub-mechanism starts during the transition into area "A" and continues until the start of main chamber blow-down. The second phase mechanism begins after the start of main chamber blow down and continues for awhile. Details of the chemistry or these later main chamber 34 processes are the fundamentally the same as described in event 9, 145 for HCRI process 100 for dual and multi-component fuel applications.

In addition to occurring in all enhanced full HCRI engines of Enhanced HCRI process 600, when the degree of RIS-augmentation is above a meaningful threshold, this generalized main chamber RI species generation process occurs as well in all enhanced RIS-augmented embodiments of Enhanced HCRI process 600.

During some point in the exhaust process, the main chamber RI species still remaining in the main chamber 34 will also typically go into states of frozen (or near frozen) equilibrium. Subsequently, the full combustion cycle is repeated, starting with event 1, 605 and with the full combustion cycle just described now understood to be at least one of said earlier full combustion cycles.

Of its general design features, HCRI engine 700's ability to operationally enable Enhanced HCRI process 600 and other embodiments may be predicated on the exemplary engine electronic control system 30 depicted schematically in FIG. 9B. The engine electronic control system 30 helps to enable the enhanced HCRI engine embodiments of HCRI engine 700 to both use and enable the various embodiments of Enhanced HCRI process 600, including the enhanced full HCRI embodiments and the enhanced RIS-augmented embodiments.

It is hereinafter understood that the general engine control system 30 is preferably capable of those functions necessary for the operation of HCRI engine 700 as discussed herein. The general engine control system 30 is also preferably capable of regulating the placement of the small amounts of RI-species generation control fluid in the concerned control-active M-C's 32 for a purpose of controlling both the M-C RI species generation process directly and the main chamber RI species generation process (indirectly) to in turn enable the controlled RI species enhancement of combustion in the main chamber 34. For precisely the same purpose of controlling, the general engine control system 30 is also preferably capable of regulating the general M-C RI-species generation-control augmentation devices 54. Finally, the general engine control system 30 is preferably capable of controlling the other RI-species generation-control augmentation devices 64 and 70 and/or the ignition-timing augmentation devices 56 that may be employed for the same purpose of controlling. Though this general control system 30 may make use of sensor directed logic and/or a combustion-history aided management sub-system, the use of RI species to help control the combustion will typically lessen its required overall sophistication, in comparison to some of the latest of the conventional control systems of the field and related fields.

HCRI engine 700 is configured to operationally use and enable Enhanced HCRI process 600. Such configuration of HCRI engine 700 is substantially similar to that described earlier herein for Enhanced HCRI engine 200 for operational use in enabling HCRI process 100.

HCRI engine 300 described earlier by FIG. 4A-4D also collectively illustrates an exemplary rotary HCRI IC engine that can additionally serve as an implementation of HCRI engine 700 and that can thus both use and enable Enhanced HCRI process 600. In this capacity HCRI engine 300 is thus also preferably capable of using and enabling the two enhanced full HCRI and the four enhanced RIS-augmented embodiments of Enhanced HCRI process 600. FIG. 9A-9B for HCRI engine 700 and FIG. 4A-4D for HCRI engine 300 share common features. Accordingly, in the interest of both brevity and clarity, the description of some of the common features of HCRI engine 300 and its schematic depiction in FIG. 4A-4D are omitted and the description of these features with respect to HCRI engine 700 and its schematic depiction in FIG. 9A-9B are being relied upon to provide adequate descriptions of the common features. While the nomenclatures for HCRI engine 700 and HCRI engine 300 are generally the same, nomenclature refinements for HCRI engine 300 are as presented earlier herein in the description of its relationship to HCRI engine 200.

HCRI engine 400 described earlier by FIG. 5A-5C also collectively illustrates an exemplary 2-stroke reciprocating piston HCRI IC engine that can additionally serve as an embodiment of HCRI engine 700 and that can thus both use and enable Enhanced HCRI process 600. HCRI engine 400 is thus also preferably capable of the two enhanced full HCRI and the four enhanced RIS-augmented embodiments of Enhanced HCRI process 600. FIG. 9A-9B for HCRI engine 700 and FIG. 5A-5C for HCRI engine 400 share common features. Accordingly, in the interest of both brevity and clarity, the description of some of the common features of HCRI engine 400 and its schematic depiction in FIG. 5A-5C are omitted and the description of these features with respect to HCRI engine 700 and its schematic depiction in FIG. 9A-9B are being relied upon to provide adequate descriptions of the common features. While the nomenclatures for HCRI engine 700 and HCRI engine 400 are generally the same, the refinements for HCRI engine 400 are as presented earlier herein in the description of its relationship to HCRI engine 200.

HCRI engine 500 described earlier by FIG. 6A-6D also collectively illustrates an exemplary 4-stroke reciprocating piston HCRI IC engine that can additionally serve as an embodiment of HCRI engine 700 and that can thus both use and enable Enhanced HCRI process 600. HCRI engine 500 is thus also preferably capable of the two enhanced full HCRI and four enhanced RIS-augmented embodiments of Enhanced HCRI process 600. FIG. 9A-9B for HCRI engine 700 and FIG. 6A-6D for HCRI engine 500 share common features. Accordingly, in the interest of both brevity and clarity, the description of some of the common features of HCRI engine 500 and its schematic depiction in FIG. 6A-6D are omitted and the description of these features with respect to Enhanced HCRI engine 600 and its schematic depiction in FIG. 9A-9B are relied upon to provide adequate descriptions of the common features omitted. While the nomenclatures for HCRI engine 700 and HCRI engine 500 are generally the same, the refinements for HCRI engine 500 are as presented earlier herein in the description of its relationship to HCRI engine 200.

Subject to the applicable portions of the earlier general descriptions, the IC engine embodiments schematically depicted in FIG. 9A-9B (for HCRI engine 700), FIG. 4A-4D (for HCRI engine 300), FIG. 5A-5C (for HCRI engine 400) and FIG. 6A-6D (for HCRI engine 500) are all examples of engine configurations capable of using and enabling all four of the enhanced RIS-augmentation process embodiments of Enhanced HCRI process 600 described in the foregoing (the enhanced RIS-PCCI process embodiment, and the enhanced RIS-DICI process embodiment, the enhanced RIS-PCSI process embodiment and the enhanced RIS-DISI process embodiment). A general configuration exists for the operation of all three of these IC engine embodiments of HCRI engine 700 (300, 400 and 500) as any of the four enhanced RIS-augmented process embodiments of Enhanced HCRI process 600. The general configuration for the operation of the generalized process embodiment of the general thermo-fluid chemical-kinetics process invention Enhanced HCRI process 600 in the exemplary IC engine embodiment HCRI engine 700 is provided earlier in detail and applied to the general distinctions of the enhanced RIS-PCCI process embodiment, the enhanced RIS-DICI process embodiment, the enhanced RIS-PCSI process embodiment and the enhanced RIS-DISI process embodiment described in the foregoing. In the interest of both brevity and clarity, the description of some of the common features of operation in the three example IC engine embodiments (HCRI engine 300, HCRI engine 400 and HCRI engine 500) are omitted and the description of these features of operation with respect Enhanced HCRI process 600 depicted in FIG. 8 and its detailed description of operation in HCRI engine 700 are being relied upon to provide adequate descriptions of the common features of operation omitted for these four enhanced RIS-augmented process embodiments. In particular, the thrust of the Enhanced HCRI process 600's detailed description is applied to the enhanced RIS-augmented PCCI, DI CI, PCSI and DI SI cases, and its description, as given, fully explains the enhanced RIS-PCCI, RIS-DICI, RIS-PCSI and RIS-DISI process embodiments of Enhanced HCRI process 600.

Further, for clarity of their general descriptions (as are being relied upon from the descriptions of the respective counterpart embodiments of HCRI 100 employed in the various embodiments of HCRI engine 200 described earlier herein), the engine electronic control system 30 may be used in the operation of the HCRI engine 700 and its three example HCRI engine embodiments (300, 400 and 500) with the enhanced RIS-PCCI, RIS-DICI, RIS-PCSI and RIS-DISI process embodiments of Enhanced HCRI process 600. The engine electronic control system 30 ensures the total amount and timings of CRA fluid and base fuel inserted into the main chamber 34, the timings and amounts of control fluid insertion into the M-C's 32 and the use of all RI-species generation augmentation-control devices 54, 64 and 70 (if any or all are employed) are all consummated with the engine operating conditions and specifications in manners appropriate to these embodiments. For all of these embodiments, the total amount of RI species generated, carried over, recycled and conveyed to assist ignition in later cycles is preferably that amount needed to assist in the manner desired (without dominating) in the ignition event in those cycles, resulting (in comparison with the conventional ignition modes) in reductions in required heat and required fuel concentrations relative to oxygen concentrations for ignition of the fuel. Also these control devices are to be operated in ways that together ensure that the work-power output of the engine is preferably in accordance with operational load and speed requirements. For the two enhanced CI RIS-augmentation variants these control devices must also ensure ignition at the right timings.

The present invention may also include IC engine embodiments of an extended ignition control process containing one or more engine combustion cylinder(s) with a system to facilitate the cyclic repetition of main-compression, main-combustion, power-expansion, exhaust and intake events common to the general family of rotary and reciprocating piston IC engines of the field, where such common events together constitute the full combustion cycle. More particularly, the extended ignition control process is a thermo-fluid chemical-kinetics procedure configured to provide exacting control over an RI species initiation of homogeneous combustion and/or of near homogeneous combustion in cyclic IC engines using either base fuels or combinations of CRA fluids and/or base fuels for the "fuel". The extended ignition control process achieves this exacting control by making use of RI species to either "dominate" or to "augment" ignition and combustion in cyclic IC engines. Thereby, and as a continuation in part to Enhanced HCRI process 600, the extended ignition control process contains any or all possible features of Enhanced HCRI process 600 employed in the various embodiments of HCRI engine 700 (and its three example HCRI engine embodiments (300, 400 and 500) for any of the enhanced DI-HCRI, enhanced PC-HCRI, enhanced RIS-PCCI, enhanced RIS-DICI, enhanced RIS-PCSI and enhanced RIS-DISI process embodiments of Enhanced HCRI process 600) which in turn can contain any or all possible features of HCRI 100 employed in the various embodiments of HCRI engine 200 (and its three example HCRI engine embodiments (300, 400 and 500) for any of the enhanced DI-HCRI, enhanced PC-HCRI, RIS-PCCI, RIS-DICI, RIS-PCSI and RIS-DISI process embodiments of HCRI process 100). In addition, the extended ignition control process is "extended" by allocating at least one additional function to at least one of the mini-chamber 32 sites during the intake event and/or during the compression event. In some engine types, portions of the intake and exhaust events can co-occur.

One of the additional functions, herein a first of the additional functions (or a first additional function) can involve empowering a utilization arrangement of mini-chamber 32 sites (or plurality of utilization arrangements of mini-chamber 32 sites) employed in generating the RI species to provide at least two RI species generation sub-cycles within the full combustion cycle. Thereby, with the first additional function, the generation of the RI species typically starts, and thus typically physically originates, in an earlier of the sub-cycles, so that it also starts in an early full combustion cycle to the full combustion cycle in which the RI species so produced (by the two sub-cycles) are actually used in the main-combustion event. Also, with the first additional function, a latter of the two RI species generation sub-cycles is in part dependent on the earlier of the sub-cycles for at least some portion of its own RI generation. Because additional quantities of RI species are produced by the utilization arrangement of mini-chamber 32 sites, the first additional function is thus a configuration for reducing a total required volume of secondary chambers needed for adequate RI species generation.

Many utilization arrangements exist. One example involves empowering at least one exclusive mini-chamber 32 site to provide two of the at least two RI species generation sub-cycles within the full combustion cycle of the engine. Thereby, within this example, both the earlier of the sub-cycles for generation of the RI species in the early full combustion cycle and the latter of the two RI species generation sub-cycles are occurring in the at least one exclusive mini-chamber 32 site. This example arrangement may greatly reduce the total required volume of secondary chambers needed for adequate RI species generation.

In the general progression of the first additional function, within at least some of the M-C's 32, RI species are originating naturally in the earlier cycle via special OH and RI species initiated (impelled) OH-fuel decomposition (i.e., "OH-decomposition of the fuel" wherein one of the fuel molecule's hydrogen atoms is abstraction by OH) driven chemical-kinetics mechanisms for use in the subsequent cycle. Hereinafter a sub-process originating RI species in the earlier cycle is referred to as a "M-C RI species generation sub-process for the subsequent cycle" and is considered a "beginning sub-process" for the overall RI species generation sequence. In the first addition function, extra RI species are generated within at least one "operationally select of the M-C's 32" (or "operationally select M-C's" 32) in the subsequent cycle for immediate use in the subsequent cycle. For understanding and clarification purposes, the subsequent cycle is also considered a new same cycle. Supplementary generation of these additional RI species within the operationally select M-C's 32 for the subsequent cycle is also at least in part via OH and RI species initiated OH-fuel decomposition (i.e., "OH-decomposition of the fuel" involving fuel molecule hydrogen atom abstraction by OH) dominated chemical-kinetics mechanisms. Thus hereinafter, this supplementary generation sub-process is instead referred to as an "M-C RI species generation sub-process for the new same cycle" and is considered an "end sub-process" for the overall RI species generation sequence.

For this additional generation, the operationally select M-C's 32 are earlier brought to proper fuel-concentration conditions via a regulated fuel augmentation. Later, but well before a start of any pre-ignition chemistry in the main chamber 34, the operationally select M-C's 32 are then modulated by at least one rapid thermal energy addition procedure to engender the at least one additional OH and RI species initiated OH-fuel decomposition chemical-kinetics mechanism that produces the additional RI species for immediate transfer via pressure differences into the main combustion chamber 34. While the chemistry of the end sub-process results in the additional production and transfer of the RI species to the main combustion chamber 34 in the subsequent cycle (i.e., in the new same cycle), some of the RI species, including $H_2O_2$ and $HO_2$ may be partially depleted within the operationally select M-C's 32 themselves during the end sub-process. This is in part why in the operationally select M-C's 32, the M-C RI species generation sub-process for the new same cycle is considered the end sub-process.

For clarity, this novel RI species supply augmentation is typically not the sole source of RI species supply to the new same cycle. Thus, this RI species supply augmentation enhancement may help overcome RI species generation capacity limitations of the RI prior art. Further, it may help to further ensure the robustness of HCRI for single ignition-mode operations without the hydrodynamic and control limitations of the RI prior art preceding HCRI. This additional function thus may extend the scope of RI species generation and transfer into the new same cycle, so that while both generation and transfer start in the earlier cycle and can continue to occur during the earlier cycle (during power-expansion and exhaust), they may also continue during and intake and main-compression events of the same new cycle (i.e., they may be "starting in and continuing from a prior combustion cycle").

Another of the additional functions, herein a second of the additional functions (or a second additional function), involves enabling at least one of the mini-chamber 32 sites used in generating the RI species to transfer RI species to the main chamber 34 during the intake and/or main-compression events. This can enable better control and/or can also enable additional RI species to be made available to the main chamber 34 for main chamber ignition. This enabling of the additional RI species via the second additional function is in turn another approach for reducing the total required volume of secondary chambers needed for adequate RI species generation.

Though the second additional function is distinctive, it also has many similarities with the first additional function. In its progression, during desired timings in the subsequent (new same) cycle, some of the RI species of the earlier (previous) cycle are hydro-dynamically expelled from the M-C's 32 into the main chambers 34. Some of the many available procedures for facilitating this expulsion involve rapid heat addition. While this expulsion also occurs during the progression of the first additional function, expulsion is not the only aim of the first additional function. Expulsion is however the main aim of the second addition function. Thus, within a M-C 32 used as a locations (or site) for the second additional function, hereinafter called an operationally choice M-C 32, there is typically only one major RI species generation sub-cycle occurring within the full combustion cycle of the engine. As before in the operationally choice M-C's 32, the RI species are originating naturally in the earlier cycle via special OH and RI species "initiated" (i.e., both RI species of the fuel and OH radicals serve to start and thus impel the mechanism) OH-fuel decomposition (i.e., a hydrogen atom of a fuel molecule is abstracted by OH) driven chemical-kinetics mechanisms and are for use in the subsequent cycle. In the case of the second additional function this M-C RI species generation sub-process is occurring in the earlier cycle for the subsequent cycle and is again considered as the "beginning sub-process" for the overall RI species generation sequence.

While the aim of the second additional function is not the supplementary generation of more RI species for the subsequent cycle, when expulsion of the RI species is accomplished via rapid heat addition, some additional RI species may still be generated via the OH and/or RI species initiated OH-fuel decomposition (i.e., fuel hydrogen atom abstraction by OH) driven chemical-kinetics mechanisms. When this happens, such generation is considered a smaller consequent sub-process occurring during the second additional function for the new same cycle. And in instances where the second additional function is in fact facilitated by rapid heat insertion, the smaller consequent sub-process can result in a depletion of most M-C RI species within the operationally choice M-C's 32. In such case this smaller consequent sub-process may also again be referred to as the M-C RI species generation sub-process for the new same cycle and may accordingly be considered the end sub-process for the overall RI species generation sequence specifically originating from within the operationally choice M-C's 32 that are facilitating the second additional function. However, the smaller consequent sub-process typically does not need to occur on a significant scale, nor does it necessarily need to result in full M-C RI species depletion. As mentioned, such is not among the defining aims of the second additional function. Instead, as illustrated via studies on both 2-stroke RIS-PCSI and a 4-stroke RIS-DISI reciprocating engines, among aims of the second additional function are the rapid and time accurate expulsion of more of the residual M-C RI species (that were generated during the earlier cycle (or cycles)) into the main chamber 34 during the new same cycle (see respectively, SAE Paper No. 2011-01-2025 [Blank](also published as JSAE Paper No. 20119326) and SAE Paper No. 2011-01-1895 [Blank](also published as JSAE Paper No. 20119330)).

As illustrated in the studies in SAE Paper No. 2011-01-2025 (which is incorporated herein by reference in its entirety) and SAE Paper No. 2011-01-1895 (which is incorporated herein by reference in its entirety), the operationally choice M-C's 32 enabling the second additional function are be brought to proper fuel-concentration conditions via a regulated fuel augmentation. Then, typically during the early main-compression event (as in SAE Paper No. 2011-01-1895), or instead during the later part of the intake event (SAE Paper No. 2011-01-2025) or during the overlap of both events, the operationally choice M-C's 32 enabling the second additional function can be modulated by one of a number of rapid thermal energy addition procedures to engender an expansion of the gases therein. This expansion of gases can be augmented by the presence of the RI species still resident in the operationally choice M-C's 32. In such cases, it is the expansion of the gases within the operationally choice M-C's 32 that literally hydro-dynamically push much of the resident RI species still remaining therein into the main chamber 34. This expansion of gases sub-process in the subsequent cycle (i.e., in the new same cycle) can thus results in a precisely timed transfer of the RI species to the main combustion chamber 34 for use in the main-combustion event.

As illustrated in SAE Paper No. 2007-01-0047 (Blank) (already incorporated herein by reference in its entirety), the second additional function can also be carried out via a mechanical approach involving extra intake valve functions and not involving any expansion of the gases of the operationally choice M-C's 32. This is also illustrated in U.S. Provisional Application Ser. No. 60/865,709 (referred above and incorporated herein by reference in its entirety). Many other non-thermal and thermal approaches for the second additional function exist. If the expansion of gases is involved in the operationally choice M-C's 32, and if this expansion is caused by M-C ignition and combustion (as in the case of the examples provided in SAE Paper No. 2011-01-2025 and SAE Paper No. 2011-01-1895), the resident RI species within the second additional function empowered of the operationally choice M-C's 32 are typically partially or totally depleted. In such cases, this RI species expulsion sub-process is also considered as the end process for RI species generation. It is obvious in such cases therefore that within the operationally choice M-C's 32, it is the earlier cycle "M-C RI species generation sub-process for the subsequent cycle" that is the beginning sub-process for the overall RI species generation sequence that originates thereby and that the M-C RI species of the operationally choice M-C's 32 are for the most part expelled but also sometimes consumed in part (as possibly more RI species are also generated and similarly expelled) during the second additional function.

Further, this novel RI species additional augmentation is generally not and/or need not be the sole source of RI species supply to the new same cycle. Thus, this RI species supply augmentation enhancement may help overcome RI species generation capacity limitations of the RI prior art. Further, it may help ensure the robustness of HCRI for single ignition-mode operations without the hydrodynamic and control limitations of the RI prior art previous to HCRI.

By the limited examples provided, it is clear that embodiments of the extended ignition control process may employ some combination of the first additional function and the second additional function. Additionally, in other embodiments, some portion of the M-C's 32 can be devoted to the first additional function and some other portion of the M-C's 32 can be devoted to the second additional function. In the operation of such embodiments, these different additional functions may typically only be employed when needed. Alternatively, certain of the M-C's 32 may be configured to enable both of these additional functions (i.e., in and by the same M-C 32). In the operation of such embodiments, if the second additional function uses a thermal approach, typically only one of these additional functions may be employed at a time when needed. Any M-C 32 capable of the first additional function and/or the second additional is hereinafter considered an operationally special M-C 32, whether or not it is actually operationally acting in the capacity of either the operationally select M-C 32 or the operationally choice M-C 32. Depending on the particular engine operating condition, M-C's 32 capable of the first additional function and/or the second additional function need not operationally employ either the first additional function or the second additional function while facilitating the Enhanced HCRI process 800. It is also clear that either individually or together, the additional functions can extend the scope of RI species generation and or transfer into the same new cycle, so that while both generation and transfer start in the previous cycle, they can also continue to occur even into the main-compression event of the same new cycle (and thus they may be "starting in and continuing from a prior combustion cycle").

In the extended ignition control process the additional functions are coordinated together along any employed measures of the generalized HCRI thermo-fluid chemical-kinetics processes of HCRI 100 and/or enhanced thermo-fluid chemical-kinetics processes of HCRI 600 for the generation and conveyance progression of the RI species. These are coordinated to enable the desired presence of RI species in the main chamber in the subsequent cycle. It is the desired presence of these RI species within the main chamber charge of the subsequent cycle just before a start of the main-combustion event that enables controllable improved ignition and enhanced combustion therein. The generated RI species are used to either "dominate" or augment main chamber ignition and combustion. In RI species dominated engines, it is the greater strength in this presence that serves to switch the dominant chain-initiation path to one that occurs at both the "lower" temperatures and at the much faster reaction rates (than typical of the conventional chain-initiation reactions for SI, CI and TI with the same fuel). It is this general RI species induced ignition sub-mechanism driven by the OH radical that makes possible ignition under leaner conditions with less supplied heat. And in RI species augmented engines, the ignition and combustion chemistry is typically a hybrid of this RI species dominated chemistry and the chemistry of the more conventional ignition modes.

Embodiments of the extended ignition control process may also pertain to regulating combustion in the cyclic (reciprocating piston and rotary) IC engines in a manner that can be tailored to any point in an engine operating regime. These other embodiments can be implemented as cyclic IC engines modified to use the extended ignition control process. For instance, depending on the application, embodiments of the above and similar examples of the second additional function may use similar hardware, with the differences being more due how the engine is operated by the engine electronic control system 30. In such example cases, the main operational differences could thus possibly be in the timings and quantities of fuel augmentation and the rapid thermal energy addition. In addition to single-ignition mode engines using RI, embodiments of the extended ignition control process can also augment SI (see SAE Paper Nos. 2011-01-2025 and 2011-01-1895) and CI within an assortment of additional cyclic IC engines. These RI species augmentation IC engines may use the RI species and CRA fluids to "assist" (rather than dominate) ignition and combustion in modified forms of conventional IC that make primary use of these older ignition modes. In all three ignition mode cases the use of the extended ignition control process can potentially enable improved combustion with increased efficiencies and decreased overall emissions.

Other aims of the extended ignition control process include further refining SOC timing control and further enhancing main combustion in the subsequent cycle. These aims are why some of the RI species transfer to the main chamber and/or some of the supplementary RI species generation for the subsequent cycle are made to occur within the subsequent cycle itself.

Figure 11A:
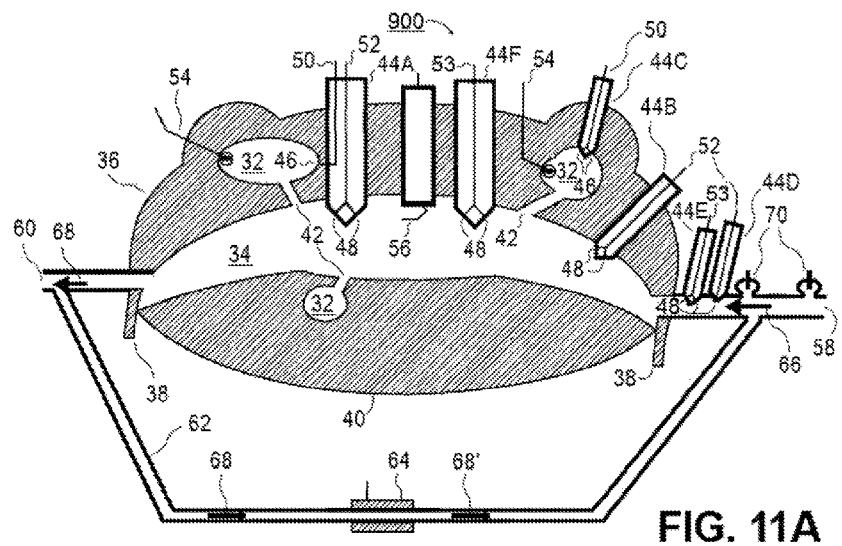
FIG. 11A is a composite schematic diagram of single engine combustion cylinder of an exemplary HRCI engine 900 utilizing the Extended HCRI process 800 shown in FIG. 10.
Figure 11B:
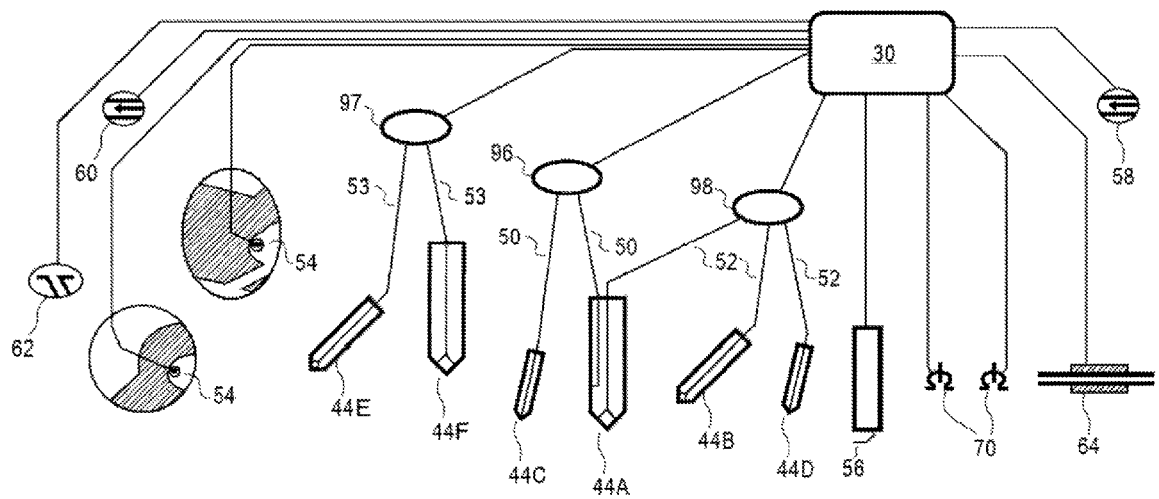
FIG. 11B is a schematic of an exemplary electronic control system for the generalized exemplary HRCI engine 900 embodiment shown in FIG. 11A.

FIG. 10 depicts an exemplary process flow diagram for an Extended HCRI thermo-fluid chemical-kinetics process 800 (hereinafter Extended HCRI process 800). The Extended HCRI process 800 is a complex series of general events that may occur in internal combustion employing the extended ignition control process. FIG. 11A-11B illustrate an exemplary HCRI IC engine 900 (hereinafter HCRI engine 900) that uses the Extended HCRI process 800 in accordance with another embodiment. Accordingly, the Extended HCRI process 800 is explained in conjunction with FIG. 11A-11B.

The exemplary HCRI engine 900 depicted in FIG. 11A-11B is an abstraction capable of using Extended HCRI process 800 in accordance with a plurality of other possible IC engine configurations. HCRI engine 900 is thus a generalized IC engine embodiment containing common elements with other possible IC engine embodiments employing the Extended HCRI process 800. Discussion of various elements and their relationship to the operation of the HCRI engine 900 are described hereafter. The Extended HCRI process 800 makes use of radical ignition species.

In one embodiment of the present invention, an extended full HCRI engine is one in which the IC in Extended HCRI process 800 is dominated by RI species. An extended radical ignition species augmented (RIS-augmented) engine is one in which the IC in Extended HCRI process 800 is assisted but not dominated by RI species as another embodiment. In yet other embodiments, the extended full HCRI engine that makes use of fuel that is inserted by some approach before the beginning of the main-compression event in Extended HCRI process 800 is called an extended premixed charge HCRI engine (or PC-HCRI engine) of Extended HCRI process 800 and the extended full HCRI engine that makes use of the direct injection of fuel that starts sometime after the beginning of the main-compression event in Extended HCRI process 800 is called an extended DI-HCRI engine of Extended HCRI process 800 in accordance to yet other embodiments.

Similarly, the extended RIS-augmented engine that makes use of fuel that is inserted by some approach before the beginning of the main-compression event in Extended HCRI process 800 is called an extended "premixed RIS-augmented engine" of Extended HCRI process 800 in some embodiments and the RIS-augmented engine that makes use of the DI of fuel that starts sometime after the beginning of the main-compression event in Extended HCRI process 800 is called an extended DI RIS-augmented engine of Extended HCRI process 800 in other embodiments. Depending on whether the dominant ignition mode employed is spark ignition or compression ignition, each of these Extended HCRI process 800 RIS-augmented fuel insertion options (premixed and DI) have sub-options associated with them. Thus there are four basic extended RIS-augmentation embodiments of Extended HCRI process 800. These include extended RIS-augmented PCCI, extended RIS-augmented PCSI, extended RIS-augmented DI CI, and extended RIS-augmented DI SI.

Except for inclusion of one or more of the additional functions, these four basic extended RIS-augmentation embodiments are understood to be equivalent embodiments of enhanced RIS-augmented PCCI, enhanced RIS-augmented PCSI, enhanced RIS-augmented DI CI, and enhanced RIS-augmented DI SI, respectively, and/or RIS-augmented PCCI, RIS-augmented PCSI, RIS-augmented DI CI, and RIS-augmented DI SI, respectively. Thus, for simplicity of the nomenclature, the embodiment expressions RIS-augmented PCCI, RIS-augmented PCSI, RIS-augmented DI CI, and RIS-augmented DI SI, are herein interchangeably understood to include the respective extended RIS-augmented PCCI, extended RIS-augmented PCSI, extended RIS-augmented DI CI, and extended RIS-augmented DI SI embodiments. In like manner, for simplicity of the nomenclature, the embodiment expressions PC-HCRI engine and DI-HCRI engine are herein interchangeably understood to be include the extended PC-HCRI engine and the extended DI-HCRI engine, respectively.

A cycle of HCRI engine 900 consists in part of the intake event, the main-compression event, the main-combustion event, the power-expansion event and the exhaust event. Depending on the embodiment of the present invention HCRI engine 900, some of these events may co-occur.

As shown in FIG. 10, event 1, 805: Extended HCRI process 800 starts with RI species from the earlier full combustion cycle being conveyed to the at least one of the subsequent full combustion cycles, where at this juncture the earlier cycle is also understood to be the early combustion cycle. These RI species are carried over to the subsequent full combustion cycle within/by both the main chamber 34 or plurality of main chambers and by the mini-chamber 32 or plurality of mini-chambers (FIG. 11A), where the subsequent full cycle is also understood here to be the new same cycle.

At the start of the new same cycle the bulk of the RI species carried over in/by both the main chamber 34 and the M-C's 32 are typically in states of frozen equilibrium (or near frozen equilibrium). The RI species then typically remain non-reactive at the relatively lower temperatures prevalent in these chambers (i.e., the main chamber 34 and the M-C's 32) early in the new cycle. During this period, the plurality of exhaust gases 68 depart the main chamber 34 via the general exhaust-gas device 60 and the plurality of intake gases 66 enters the main chamber 34 via the general intake-gas device 58.

When there is recycling of the exhaust gases 68 via the general exhaust-gas recycling device (system) 62, additional quantities of RI species are either retained internally in the main chamber 34 or returned to the main chamber 34 with the intake gases 66. The quantity of RI species returning with the intake gases 66 may be adjusted by the general exhaust-gas RI-species augmentation device 64 or plurality of exhaust-gas RI-species augmentation devices 64 (resulting in the plurality of modified exhaust gases 68'). Also, the quantity of RI species returning with the intake gases 66 may be adjusted by the general intake-gases RI-species generation-control augmentation device 70 or plurality of intake-gases augmentation devices 70.

When the IC engine uses premixed fuel (be it for the PC-HCRI or one of the premixed RIS-augmentation engines of Extended HCRI process 800), base fuel can be inserted into the intake gases 66 in the general intake-gas device 58 by the general intake-gas entry device fuel insertion device 44D via general fuel-insertion orifices 48. When it is also desirous in, premixed fuel HCRI engine variant, some portion, or all, of the CRA fluid can be mixed with the base fuel and injected together with the base fuel by this device (44D) via the same fuel-insertion orifices 48. Alternatively, some portion or all of the CRA fluid can be separately inserted into the intake gases 66 in the general intake-gas device 58 by a general intake-gas entry CRA fluid insertion device 44E via one or more of the general fuel-insertion orifices 48. When the base fuel and the CRA fluid are mixed prior to this early fuel insertion, the fuel is distributed to the intake-gas fuel insertion device 44D via the fuel supply distribution system 98 (FIG. 11B) through the at least one fuel supply line 52. When the base fuel and CRA fluid are not mixed for early co-insertion, only the base fuel uses this supply routing via the fuel supply line 52. In such case, the CRA fluid for early insertion is instead supplied to the general intake-gas entry CRA fluid insertion devices 44E via the CRA supply distribution system 97 through a CRA fluid supply line 53 or plurality of CRA fluid supply lines 53, and enters the general intake-gas device 58 via the general fuel-insertion orifices 48.

Depending on the fuel insertion requirement, a total amount of fuel (combination of base fuel and CRA fluid) and a ratio of the base fuel and the CRA fluid (relative to one other) so supplied to the general intake-gas entry CRA fluid insertion device 44E and/or the intake-gas fuel insertion device 44D are regulated by the portion or portions of the engine electronic control system 30 that controls the fuel supply distribution system 98 and the CRA supply distribution system 97. The amount and ratio, as well as the timings of fuel insertions, are in accordance with HCRI engine 900 operational requirements.

Naturally occurring pressure differences between the chambers typically cause some of the RI species carried over in each of the M-C's 32 to transfer to the main chamber 34 through the least one connecting conduit (vent) 42 or conduits (vents) where they are then mixed with retained gases and the intake gases 66 along with any recycled exhaust gases 68 and 68'. The manner of the mixing can vary with the operational requirements of the engine being used.

Some quantity of the RI species carried over in each of the M-C's 32 is typically remaining therein at the end of the intake event. Thus this quantity is also typically still resident in the M-C's 32 during the early main-compression portion of event 1, 805 (FIG. 10). In certain engine variants and/or engine operations, the early part of the main-compression event and the end of the intake event can co-occur. However, at this juncture, when more RI species are needed in the main chamber 34 for the control and/or facilitation of combustion, or when it is desirous to employ smaller total M-C's 32 volumes (i.e., smaller combined volume or all the M-C's 32 associated with the main chamber 34), other approaches may be employed. To this end, SAE Paper No. 2007-01-0013 (Blank) (already incorporated herein by reference in its entirety) highlights the use of extra valve actions, facilitated via special valve travel schedules, to increase the quantity transfer of RI species during the new same cycle. In this 4-stroke reciprocating engine example, the extra action of the intake valve 78 (see FIG. 6B) causes it to partially close at the same time the piston 76 (see FIG. 6B) is increasing the volume of the main chamber 34, causing the main chamber pressure to drop a little below the pressures in mini-chambers 32, and thus drawing more RI species out of the M-C's 32 and into the main chamber 34 during the new same cycle. This is also illustrated in U.S. Provisional Application Ser. No. 60/865,709.

At this same juncture and/or later in the full combustion cycle (late intake and/or early compression) special auxiliary use may also or instead be made of one or more RI-species generation-control augmentation devices 54 to facilitate an additional transfer of RI species in the new same cycle. Depending on the engine and/or fuel, this may be a best time for the additional transfer during the new same cycle. Alternatively, during certain operating conditions of a same engine, the additional transfer may be best conducted at this juncture, and under other operating conditions of the same engine the additional transfer may be best conducted later within the main-compression event of the new same cycle. In some engines the additional function may in general be best always used instead later within the main-compression event of the new same cycle. Spark and laser discharge devices are examples of devices that can be used as control augmentation devices 54 for the additional transfer of RI species. Other examples of control augmentation devices 54 capable of facilitating the additional transfer of RI species are given earlier herein.

For 2-stroke SI reciprocating engine applications, an example of the additional transfer of RI species during the new same cycle is provided in U.S. Provisional Application Ser. No. 61/484,179 (referred above and incorporated herein by reference in its entirety). During the latter part of the combined intake and exhaust events in the example, generation-control augmentation devices 54 were used that were capable of rapidly inserting heat into the M-C's 32 to ignite their charges. In the example, the control devices 54 were positioned at the opposite ends of the M-C's 32 from the vents (conduits) 42, and were used to initiate flame front propagation. The expansion occurring during flame propagation served to push most of the RI species still resident in the operationally choice M-C's 32 through the conduits 42 and into the main chamber 34. In the RI species laden gases ahead of the flame front, pre-combustion activity did result in some additional RI species generation in the operationally choice M-C's 32. However, with this overall sub-process occurring very quickly, and with the gases ahead of the flame front remaining at fairly "low" temperatures (fairly "low" compared with the "high" temperatures of conventional hydrocarbon oxidation and/or dissociation) in this example, there was not much RI species generation (compared to the quantity of resident M-C RI species expelled to the main chamber).

Also, a 4-stroke SI reciprocating engine example of the additional transfer of RI species during the new same cycle is provided in U.S. Provisional Application Ser. No. 61/484, 179. The approach used in the 4-stroke example is identical to that of the 2-stroke SI engine example, with the RI transfer to the main chamber 34 occurring during the period of the latter part of the intake event and the early part of the main-compression event.

In both these RIS-augmented SI additional transfer examples, it was found that the total volume of M-C's 32 required for RI species generation could be reduced by two thirds (relative to the same respective RIS SI engines without the additional transfer of RI species) while maintaining equivalent presences of RI species in their main chambers 34 for RIS-augmented SI. These examples of the additional transfer of RI species are accordingly examples of the second additional function.

As found in the case of both these RIS-augmented SI examples, in general embodiments of Extended HCRI process 800 in which rapid heat addition is employed to accomplishing the additional transfer, the expansion occurring during flame propagation in the operationally choice M-C's 32 can be better visualized with the help of FIG. 3. As the flame front propagates across the mini-chamber 32 for the additional transfer, the chemistry occurring within a mass sliver of the gases at the beginning interface of the flame front typically follows the same pre-ignition chemistry generally found in main chamber ignition with RI species augmentation. The state of the M-C gases ahead of the flame front is typically within or below and to the left of the slow-combustion region A of FIG. 3 (or sometimes in the cool-flames region). Typically dominant during this pre-ignition chemistry is the reaction set given earlier via Equation (1) (with F the fuel). Then, as the advancing high temperature flame front physically encompasses same the mass sliver of gas in the flame front interface between the burned and unburned portion or the M-C gas mixture, the general "$H_2O_2+M$" chain-initiation reaction dominant during main chamber radical ignition (Equation (2)) and the chain-branching OH-fuel decomposition (i.e., "OH-decomposition of the fuel" involving fuel molecule hydrogen atom abstraction by OH) reaction set (Equation (3)) (with F the fuel) are again typically among the other dominant reactions in operation. The state of the mass sliver of the M-C gases involved in these reactions within the flame front interface will then typically transition into region B of FIG. 3. If and as soon as the temperature becomes high enough within the mass sliver to support direct oxidation, the ignition mechanism in this mass portion of the flame front typically begins to transition to more conventional thermal decomposition and/or oxidation based flame front chemical-kinetics.

The burned mass behind the flame front is at much higher temperatures than the unburned mass ahead of the flame front. Thus, after it has been consumed, a mass quantity behind the flame front has more volume than it (the mass quantity) possessed beforehand. Therefore, as the flame front moves progressively through the operationally choice M-C 32, creating a growing zone of burned gases, it is the expansion of the burned gases that is forcing the unburned RI species laden gases ahead of the flame front to transfer into the main chamber 34. Additionally, though the gases ahead of the flame front will generally remain at lower temperatures, there can be some pre-ignition activity ahead of the flame front that, in such case, may typically result in RI species generation of a relatively much smaller quantity (than the total quantity of the additional transfer) for transfer together with the RI species still resident in the operationally choice M-C's 32.

In general, it is not necessary that the gases of the employed M-C's 32 of the additional transfer be ignited. The additional transfer can be accomplished via may other approaches employing variants of the RI-species generation-control augmentation devices 54 that are capable of forcing the RI species still resident in the operationally choice M-C's 32 out and into the main chamber 34. It is also important to note that the M-C's 32 employed for the additional transfer are thereby acting to facilitate the additional transfer. Because the additional transfer is occurring at this early juncture, the M-C's 32 it employs are not acting as pre-combustion chambers.

In event 2, 810, by the time somewhere in the middle of the compression event, the gases (gas charge) in the main chamber 34 have typically become highly impregnated with RI species from the earlier cycle(s). Some of the RI species resident within the M-C's 32 at this juncture in the new same cycle may be a carryover portion of main chamber RI species that are being forced into the M-C's 32 by main-compression. The carryover portion was generated in and/or carried over from the previous cycle(s).

Depending on HCRI engine 900 operational requirements, in parallel if desired, a latter of the two M-C RI species generation sub-processes, which is also the end sub-process, may now be employed in the operationally select M-C's 32 for an additional supply augmentation of RI species to the main chamber 34. The latter sub-process typically makes use of what remains of the RI species carried over by the operationally select M-C's 32 together with an early addition of control fluid. The early addition of control fluid into the operationally select M-C's 32 may typically be by direct insertion and may generally start sometime before the middle of the main-compression event. To accommodate the early addition of control fluid for the latter generation sub-process, each of the operationally select M-C's 32 may be fitted with a single RI-species generation control-fluid insertion device 44C or with a control fluid sub-component of a multiple (or dual-fluid) insertion device 44A, or with some equivalent of these devices (44C and 44A). As discussed earlier in detail (and again later), these components (44A and 44C) are also often also in other of the M-C's 32 for use in RI species generation and control. In Extended HCRI process 800 the operationally select of the M-C's 32 fitted with at least one of these devices (44C, or the control fluid sub-component of a multiple insertion device 44A) is eventually brought to a proper fuel-air ratio condition by the early addition of control fluid. Normally, a control fluid employed for the latter sub-process is either a same fuel as is used in the main-combustion event or another fuel. Actual insertion of the control fluid into the operationally select M-C's 32 to create the proper fuel-air ratio condition is through one or more M-C RI-species generation control-fluid insertion orifice 46. The control fluid is distributed to the insertion devices 44A and 44C for use in the operationally select M-C's via a mini-chamber RI species generation control fluid supply distribution system 96 (FIG. 11B) through at least one M-C RI species generation control-fluid supply line 50 (FIG. 11A-B).

In event 3, 815, as compression of the gases in the main chamber 34 continues, the mix of the RI species and the main chamber gases typically becomes more homogeneous. This main chamber compression causes pressure rises and pressure induced temperature rises. With these temperature rises, the activity of the RI species in the main chamber 34 begins to increase. Also, pressure differences form between the main chamber 34 and M-C's 32 and a throttling of the gases being transferred into the M-C's 32 typically occurs in the conduits 42. The throttling in turn causes the pressure differences between these chambers (32 and 34) to further build, causing a high-speed mass jet or a plurality of high speed jets to form (one jet per conduit 42). These jets transfer ("force") portions of the main chamber gases (including intake air and resident RI species) into the M-C's 32, further renewing the M-C's air (and thus oxygen) supply and increasing the M-C RI species. If there is premixed fuel within the intake gases 66 or early direct or indirect injection of at least some of the fuel, fuel also enters the M-C's 32 through the conduits 42 via the mass jets.

In parallel, when desired as part of a further enhancement or plurality of further enhancements for better control, the gas mixture in the operationally select M-C's 32 may be heated for the additional supply augmentation by use of at least one general mini-chamber RI-species generation-control augmentation device 54 installed in these M-C's 32. The gas mixture in the operationally select M-C's 32 also contains a remaining of the RI species carried over by the select of the M-C's 32 from the earlier cycle. Thus, together with control fluid that was added previously in the select of the M-C's 32 (added typically, but not necessarily, during event 2, 810), the resident quantities of the RI species (earlier carried over and/or just added by transfer via the high speed jets) in the operationally select of the M-C's 32 are heated.

At this juncture there is a plurality of thermo-chemical paths by which the latter sub-process can be accomplished for the additional supply augmentation. Benefits derived from employing any of the thermo-chemical paths include additional RI species augmentation and additional RI species transfer for the main-combustion event. The thermo-chemical paths have their own range of choices of control augmentation devices 54 for empowering the latter sub-process. Two examples of the thermo-chemical paths will be presented. A first the thermo-chemical path involves RI under fuel-rich conditions in the operationally select M-C's 32. A second the thermo-chemical path involves RIS-augmented SI in the operationally select M-C's 32 under fuel-rich conditions When the thermo-chemical path is the first path, thus involving RI of the select M-C's 32 under fuel-rich conditions, the device 54 must simultaneously bring a large portion of gas mixture (if not all mass) in each of the operationally select M-C's 32 to high enough temperature for both highly exothermic "$H_2O_2+M$" chain-initiation reaction (Equation (2)) and the chain-branching OH-fuel decomposition (i.e., fuel hydrogen atom abstraction by OH) reaction set (Equation (3)) (with F the fuel) to begin to occur at rigorous rates. Subsequently, some of the remaining RI carried over species also interact with some of the products of this chain-branching reaction set and establish a series of other reactions. Though the dominant ignition chain-branching mechanisms become much more complex with larger molecule fuels as F, the same principles apply, with the role of the hydroxyl radical ($OH^-$) remaining dominant in the fuel decomposition (fuel hydrogen atom abstraction by OH). The latter sub-process can continue until much (if not all) of the oxygen is expended. Because the proper fuel-air ratio condition of the gas mixture in the operationally select M-C's 32 is fuel rich in the first path, the consequential overall chemical-kinetics sub-mechanisms that occur (sum of chain-initiation, chain-branching and the series of other reactions) in turn result ultimately in the additional supply augmentation of RI species within the operationally select M-C's 32. The heat released during this overall chemical-kinetics sub-mechanism causes a rapid pressure rise within the operationally select M-C's 32, resulting in an almost immediate start in transfer of much of the additional supply augmentation of RI species to the main chamber 34. Finally, because of a paucity of oxygen relative to fuel with the gas mixture being fuel rich, some level of depletion of $H_2O_2$ and $HO_2$ may eventually occur as the temperatures rise in the operationally select M-C's 32, while the levels of the fuel and of the RI species that are aldehydes (such as $CH_2O$ and $CH_3CHO$) may remain high therein.

When the thermo-chemical path is the second path, thus involving RIS-augmented SI of the select M-C's 32 under fuel-rich conditions, the device 54 need only bring a small portion of the select M-C gases to a high enough temperature for the highly exothermic reaction "$H_2O_2$+M" chain-initiation reaction (Equation (2)) and the chain-branching OH-fuel decomposition (fuel hydrogen atom abstraction by OH) reaction set (Equation (3)) (with F the fuel) to initially begin to occur at a rate that is rigorous enough to establish a flame front capable of propagating in a sustained manner through a pre-desired portion of gases the select M-C 32. As the flame so front propagates and first encounters each new mass sliver along its way, the reactions of Equations (2) and (3) again typically dominate. Subsequently, in each new mass sliver, some of the remaining RI carried over species also interact with some of the products of the chain-branching reaction set (Equation (3)), and establish a series of further reactions. Initially, with a paucity of oxygen relative to fuel, $H_2O_2$ and $HO_2$ depletion may typically occur within mass slivers being encountered by the flame front, while the levels of the RI species that are aldehydes (such as $CH_2O$ and $CH_3CHO$) may remain higher therein. However, because of oxygen diffusion toward the flame front from the unburned gases ahead of the flame front, the paucity of oxygen relative to fuel will typically be increasing in each new mass sliver along the path of the flame front. Thus, even though temperatures are rising, rather than be depleted or partially depleted just as they are generated in the flame front, the levels of $H_2O_2$ and $HO_2$ being generated along the flame front's advance will start to rise. Because the proper fuel-air ratio condition of the gas mixture in the operationally select M-C's 32 is fuel rich, as the flame front propagates through each new mass sliver, the consequential overall chemical-kinetics sub-mechanisms (sum chain-initiation, chain-branching and the series of further reactions) will continue to occur over and over again (with each new mass sliver), until the oxygen within mass slivers being encountered has been expended. A net result is generation of a first meaningful quantity of RI species for the additional supply augmentation. Perhaps as significantly, there will also normally be pre-ignition activity in the unburned RI species laden gases ahead of the flame front that will typically result in generation of a second meaningful quantity of RI species for the additional supply augmentation. Further, the heat released during RIS-augmented M-C SI causes a brisk pressure rise within the operationally select M-C's 32, resulting in a transferring of the additional supply augmentation of RI species to the main chamber 34. The second meaningful quantity is pushed out into the main chamber 34 first and the first meaningful quantity follows.

The additional supply augmentation of RI species to the main chamber 34 by either the first path or the second path is the first additional function, with the first path or the second path being variations of the first additional function. It should be obvious from the foregoing that when the first additional function is employed, thermal variants of the second additional function cannot have been employed in the operationally select M-C's 32 just earlier in the previous cycle or/and new same cycle. Unless the second additional function is accomplished via a non-thermal approach (such as the approach illustrated in U.S. Provisional Application Ser. No. 60/865,709), the second additional function and the first additional function typically cannot co-occur in the same M-C's 32 during a same operation of the engine.

In event 4, 820, when there is DI of the fuel (as in the extended DI-HCRI and extended DI-RIS-augmentation engines of Extended HCRI process 800), the timing of the SOI (start of injection) of the fuel into the main chamber 34 is typically (though not necessarily) during the mid-to-late portion of the main-compression event. In this case (DI), the fuel is inserted into the main chamber 34 by either the main chamber fuel sub-component or sub-components of one or more multi-fluid insertion device 44A and/or by the single main chamber fuel insertion device 44B or plurality of single insertion devices 44B via (for all such insertion devices 44A and 44B) at least one fuel-insertion orifice 48. When some portion of the base fuel and CRA fluid are mixed and injected together, either or both insertion devices 44A and 44B are also used for that portion of the CRA fluid. Depending on the base fuel, it is sometimes better to inject the CRA fluid separately, and sometimes also in advance of base fuel insertion. In such cases, a single main chamber CRA fluid main chamber insertion device 44F or plurality of single insertion devices 44F is used for the CRA fluid insertion via at least one fuel-insertion orifice 48. When the base fuel and the CRA fluid are mixed and injected together, the fuel is distributed to the insertion devices 44A and 44B for use in the main chambers 34 via the fuel supply distribution system 98 through the fuel supply lines 52. When they are injected separately, the base fuel is supplied via fuel supply lines 52 and the CRA fluid is supplied via the CRA supply distribution system 97 through the CRA fluid supply lines 53. The amount of fuel (including CRA fluid) supplied to each of the insertion devices 44A, 44B and 44F is regulated by the portion of the engine electronic control system 30 that controls the fuel supply distribution system 98 and the CRA supply distribution system 97. The amounts of fuel provided and the timings of fuel insertion are in accordance with HCRI engine 900 operational requirements.

For DI-HCRI engines of Extended HCRI process 800, the timing of the start of this DI fuel insertion is characteristically (though not necessarily) early relative to the desired timing of ignition (compared to conventional DI diesel engine operations). For these embodiments, the SOI (start of injection) and EOI (end of injection) are typically timed so that injection is completed (or mostly completed) adequately before the SOC (start of combustion), and typically so that the autoignition (SOC) does not begin until just a little after a movable work-power producing component's 40 passing of TDC (top dead center). In general this is regardless of the use of CRA fluids and thus typically allows time for the fuel to eventually become mixed more thoroughly with the RI species-laden main chamber gas charge in at least a quasi-homogeneous layered manner. In DI applications, some of the injected main chamber fuel can enter incoming mass jets of the M-C's 32 by both diffusion (within the main chamber gas charge) and by incidental convection. This fuel is accordingly entrained by these mass jets into the M-C's 32 via the conduits 42 and trapped.

In event 5, 825, in DI-HCRI embodiments of Extended HCRI process 800, with all of the main chamber fuel being typically inserted early relative to the SOC (compared to conventional DI CI), well-stirred fuel conditions are also generally assured. This condition can be further aided by the CRA fluid, which is being used in such embodiments to raise the CR required for self ignition while at the same time enabling ignition under leaner fuel conditions. Thus, even under higher load conditions, by some time prior to "after TDC autoignition", the mixing of the main chamber fuel-air gas charge to at least quasi-homogeneous levels is typically assured in enhanced DI-HCRI embodiments of Extended HCRI process 800. However, RI homogeneous combustion can also occur even when the fuel-air gas charge is slightly-to-moderately stratified. These assurances follow from three factors: the relatively higher CR's required for self ignition because of the CRA fluids, the longer than normal mixing times available because of the presence of the RI species, and the much higher than typical turbulence levels.

The first of these factors, the relatively higher CR's, is due to the presence of the CRA fluids. The heats of vaporization and the volatility of these fluids are higher than those of the base fuel while ignitability of these fluids is lower. As a result of the first two qualities, when CRA fluids are directly injected, they evaporate more readily while also absorbing more energy than droplets of a liquid base fuel (if the base fuel is liquid) during their phase change. They thus cool the main chamber gases more than an equivalent amount of directly injected base fuel (regardless of whether the base fuel is injected as liquid phase, gas phase or mixed phase), so that at compatible fuel-air ratios, more heat of compression (provided by higher CR's) is needed to reach the same main chamber gases temperature (compared to when the fuel consists of only the base fuel). In both the direct injection and premixed charge insertion of the CRA fluids, at compatible fuel-air ratios, the base fuel concentrations are themselves relatively leaner when they are mixed with CRA fluids (than when there are no CRA fluids). Under such "fuel-leaner" base fuel conditions, at the same temperature, the base fuel is thus less ignitable. Since the CRA fluid is by definition already less ignitable than the base fuel, a mixture of base fuel and CRA fluid is less ignitable than when there is only the base fuel at compatible fuel-air ratios. Thus again, relatively higher CR's are needed to ignite "fuel-air ratio compatible" base fuel and CRA fluid mixtures (compared to when "the fuel" is only the base fuel). While the CRA fluids enable the higher CR's, it is the presence of the RI species within the main chamber charge of the subsequent cycle just before a start of an ignition event that enables the ignition to occur under fuel-leaner conditions. In RI species dominated engines, it is the greater strength in this presence of RI species that serves to switch the dominant chain-initiation path to one that occurs at both the "lower" temperatures and at the much faster reaction rates (than typical of the chain-initiation reactions for SI, CI and TI with the same fuel). It is this general RI species induced ignition sub-mechanism driven by the OH radical that makes possible ignition under leaner conditions with less supplied heat, even when the CR is raised via the CRA fluid. And in the various RI species augmented engine and process embodiments of Extended HCRI process 800 (RIS-PCCI, RIS-DICI, RIS-PCSI and RIS-DISI), the ignition and combustion chemistry is typically a hybrid of both this RI species-dominated chemistry and the chemistry of the more conventional ignition modes, with the RI species still typically dominating the pre-combustion chemistry and early ignition chemistry of the ignition event.

The second of these factors, the longer than normal mixing times available, is a result of the presence of the RI species. Their presence makes simultaneously possible both lower compression ratios and fuel lean operations. When the CR is much lower (than in "functionally equivalent" conventional CI engines), DI fuel insertion can be earlier when HCRI engine 900 is operated under moderately lean conditions. Thus the directly injected fuel can be effectively mixed to the point of homogeneity. Alternatively, when the CR is only moderately lower, the HCRI engine 900 can be operated under very lean conditions and fuel insertion can once more be earlier and again homogeneously mixed. Depending on the load and engine speed, there are conditions (for example: higher load and speed) that necessarily require less lean (fuel-lean) operations. Under such conditions, RI species generation is accordingly reduced so that the fuel insertion can still be early relative to the desired point of autoignition. It is important to note that the CRA fluid is in effect being used here to restore back upwards the overall CR's that are otherwise being lowered by the presence of the RI species. Typically, in conventional applications, when use is made of CRA fluids, the fuel-air-mixtures must be made less fuel lean. But with the combined use of CRA fluids and RI species in Extended HCRI process 800, the fuel-air-mixtures can be made more fuel lean (fuel leaner), rather than less fuel lean.

The third of these factors, the much higher than typical turbulence levels maintained in HCRI engine 900, can have multiple causes. However, universal to all HCRI engine embodiments is the intense turbulence generated by the M-C's 32.

In event 6, 830, in both the DI and premixed fuel cases, because of the high turbulence and the presence of the RI species, even at the relatively "much lower" than "normal" temperatures present in the main chamber ("much lower" than are needed for conventional IC engine pre-ignition activity), typically sometime before the end of the main-compression event, the main chamber RI species, fuel and air begin significant pre-ignition activity. Depending on the characteristics of the fuel, the operating conditions and specifications of the IC engine embodiment, this activity can often even start a little earlier in the main-compression event. However, the presence of the CRA fluid raises back the relative CR at which all of this activity will start. Thus, compared with combustion of these same fuels without the use of the CRA fluids, highly ignitable base fuels are enabled to ignite at higher CR's under leaner fuel conditions for typically higher overall fuel efficiencies.

Typically during these periods of the cycle, the state of the fuel-air gas charge in the main chamber 34 is transitioning through the "Slow Combustion Region" shown in FIG. 3. For smaller molecule base fuels mixed with CRA fluids, in the pre-autoignition chemistry leading up to RI and RIS-augmented ignition, chain-initiation is again (as in HCRI process 100) via the reaction set given earlier via Equation (1) (with F the fuel). Westbrook and Dryer define to the physics of the Equation (1) reaction set for the fuel as hydrogen atom abstraction by $HO_2$ (Westbrook, C. K. and Dryer, F. L, "Chemical Kinetic Modeling of Hydrocarbon Combustion", Prog. Energy Combust. Sci. 1984, Vol. 19, pp. 1-57, which is incorporated herein by reference in its entirety). In this reference, Westbrook and Dryer archive the participation of this reaction set in the decomposition (fuel molecule hydrogen abstraction) by $HO_2$ of a number of smaller molecule fuels (including $CH_4$, $CH_3OH$, $C_2H_5OH$, $C_3H_6$, $C_4H_{10}$, $C_6H_6$, $C_7H_{16}$ and HBr) and aldehydes ($CH_2O$ and $CH_3CHO$) in conventional combustion. However, the dominance of the Equation (1) reaction set in event 6, 830 of Extended HCRI process 800 is not primarily due to its general prevalence in conventional combustion with these and other fuels, but is rather primarily due to the higher than normal presence of the hydroperoxyl radical ($HO_2^-$). This discussion concerning these observations of Westbrook and Dryer with $HO_2$ also apply to the fuel decomposition chemistries occurring in the M-C's 32 during mini-chamber ignition (in event 1, 805 and event 3, 815). Accordingly, this discussion (concerning these observations of Westbrook and Dryer with $HO_2$) is also considered to be included in its entirety in the discussions earlier for these two M-C 32 Extended HCRI process 800 events.

In addition, the same general "$H_2O_2+M$" chain-initiation reaction dominant during autoignition (Equation (2)) and the same chain-branching OH-fuel decomposition (i.e., abstraction of a hydrogen atom of the fuel by OH) reaction set (Equation (3)) (with F the fuel) are again typically among the other dominant reactions in operation during pre-autoignition for fuel combinations of CRA fluids and base fuels. These and the other dominant pre-autoignition reactions occurring during this same period of the cycle result in the slow build up of the additional RI species in the main chamber 34. Though the dominant pre-autoignition chain-initiation and chain-branching mechanisms become more complex with larger molecule base fuels, the same principles typically apply, with the role of the hydroperoxyl radical ($HO_2^-$) (in the chain-initiation reaction decomposition of the fuel [i.e., abstraction of a hydrogen atom of the fuel by $HO_2$]) and the role of the hydroxyl radical ($OH^-$) (in the chain-branching reaction decomposition of the fuel [i.e., abstraction of a hydrogen atom of the fuel by OH]) both being dominant during the pre-ignition activity.

In effect, the CRA fluid slows the temperature rise of the main charge during compression, requiring more overall compression before the base fuel reaches the temperatures required for this general chemistry (represented via Equations (1)-(3)) to occur. And thus, the general chemistry itself remains essentially the same as that occurring in HCRI process 100. In general, these general $HO_2^-$ and $OH^-$ driven and "much lower" temperature sub-mechanisms (Equations (1)-(3)) represent direct fuel decomnposition (fuel hydrogen atom abstraction) at relatively "very low" temperatures (relatively "very low" compared with the "low" temperatures of HCCI and the "high" temperatures of conventional hydrocarbon oxidation and/or thermal dissociation), setting the stage for "lower" temperature self ignition by the RI species (RI) in the extended full HCRI engines of Extended HCRI process 800 (DI-HCRI and PC-HCRI) and for ignition assistance in the extended RIS-augmented engines of Extended HCRI process 800. The effect of the use of CRA fluids is simply to raise the relative CR's at which this general chemistry occurs. This is made possible by the cooling effect of the CRA fluid on the overall main chamber charge as it vaporizes and the fact that the base fuel still requires essentially the same temperatures for self ignition as without the use for the CRA fluids (or slightly higher temperatures for self ignition when there is a fuel-air leaning effect by the CRA fluids).

As was introduced in HCRI process 100, this description for Extended HCRI process 800 applies to single-component, dual and multi-component base fuel insertion operations in which the re-activities with $HO_2^-$ and $OH^-$ of all the constituents (of the fuel) are compatible. In such cases (as for the mixture of the base fuel and CRA fluid itself) the general mechanism is similar, with the dominant reactions for each constituent being of the same form (Equations (1)-(3)). In operations in which the re-activities of the various constituents of the fuel with $HO_2^-$ and $OH^-$ are not similar, typically at least initially, the general reaction sub-mechanisms follow the activity of the constituent whose reactivity with the more significant of either $HO_2^-$ or $OH^-$ is dominant (depending in absolute terms on which radical is decomposing which of the fuel constituents the fastest during pre-autoignition).

In Extended HCRI process 800 the RI species from past cycles and the RI species created during this relatively "much lower" temperature pre-ignition activity are subsequently used together in one of three ways in the main chamber IC: (1) to dominate and thus initiate autoignition (RI) in extended full HCRI engines; (2) to augment the efficiency of and maintain better control over the timing of autoignition (CI) in extended RIS-augmented PCCI and DI CI engines; and (3) to augment the efficiency of spark ignition (SI) in extended RIS-augmented PCSI (see example in joint SAE Paper No. 2011-01-2025 [Blank] and JSAE Paper No. 20119326) and DI SI (see example in joint SAE Paper No. 2011-01-1895 [Blank] and JSAE Paper No. 20119330) engines. In the two extended full HCRI cases (DI-HCRI and PC-HCRI), because of the presence of the RI species, there is exothermic pre-ignition activity that is slowly (at first) carrying the fuel-air gas charge down a predetermined chemical-kinetics path (dependent on many factors) to RI species induced autoignition. In the four extended RIS-augmented cases, the RI species activity levels during this same period will generally not be as high, but will generally however be at higher levels (depending on the degrees of augmentation) than in the conventional (non RIS-augmented) variants of these cases.

Returning to FIG. 11A, the exterior casing of HCRI engine 900 consists of the "top" housing" periphery 36 and the "side" housing periphery 38 (or plurality of side housing peripheries 38). Starting generally at a time in the cycle that is late in the main-compression event, the control fluid (described in detail for HCRI process 100) can be inserted into one or more of the M-C's 32 mounted in these top and/or side housing peripheries 36 and 38. Insertion is by either the single RI-species generation control-fluid insertion device 44C or by the control fluid sub-component of the multiple or the dual-fluid insertion device 44A. Actual insertion into the M-C's 32 is through one or more M-C RI-species generation control-fluid insertion orifice 46. The control fluid is distributed to the insertion devices 44A and 44C for use in theses M-C's via the mini-chamber RI species generation control fluid supply distribution system 96 through the at least one M-C RI species generation control-fluid supply line 50. The rationale and control strategy for the use of the control fluid is substantially the same as described earlier for HCRI process 100.

As in HCRI process 100, there are a number of additional augmentations other than the use of control fluid that can be used to affect the RI species generation process in the housing periphery mounted M-C's 32. Variable cooling or/and heating control of the M-C 32 assemblies is effective in assisting in the direct control of the M-C RI species generation process in these chambers. Other control augmentations include catalytic surfaces and devices (including ones where the catalytic surface areas can be varied), fuel reformatting devices, chemical additive insertion devices, heating and heating-cavity devices (example: via rapid electrical current discharges, laser beam discharges, etc.), rapid plasma generation devices, rapid ultraviolet-light discharge devices, micro-wave devices, rapid cooling/heating devices, M-C volume changing devices, M-C pressure regulating devices, M-C flow varying devices, M-C geometry varying devices, M-C connecting conduit geometry varying devices, M-C connecting conduit flow varying devices, M-C conduit entering-fuel regulating devices, etc. Devices such as, but not limited to, these can all be used to play a part in the control of RI species generation in M-C's (and to help indirectly control RI species generation in the main chambers later on in the cycle). All such devices are together represented in FIGS. 11A-B as one or more general mini-chamber RI-species generation-control augmentation device 54. While the control augmentations within different M-C's 32, including the operationally select of the M-C's 32, need not be uniform from M-C 32 to M-C 32, a collective effect of these augmentations may be regulated. Any M-C 32 receiving control-fluid or fitted with and operationally employing RI-species generation-control augmentation devices 54 are also considered "control-active." These are also regulated by a portion of the engine electronic control system 30 (FIG. 11B) that controls their functions in accordance typically with HCRI engine 900 operational requirements.

In event 7, 835, in full HCRI embodiments of Extended HCRI process 800 self ignition (RI) is dominated by RI species. Thus, the general chemistry for these embodiments can be highly definitive. Also, all of the CI and SI RIS-augmented engines and process embodiments of Extended HCRI process 800 share this definitive general chemistry as a common feature. In addition these RIS-augmented engines and process embodiments retain elements of the "un-augmented" chemistry associated with their own conventional characteristics. The degree to which these RIS-augmented engines and process embodiments employ the definitive general chemistry of full HCRI is related to the degree of RI species augmentation ("RIS-augmentation").

Thus Extended HCRI process 800 is defined in part by the common features representative of the definitive general chemistry of extended full HCRI. This definitive general chemistry is essentially the same as the full HCRI chemistry for single-component, dual and multi-component fuels of HCRI process 100 as described for event 7, 135. For comparison purposes, the portion of the "un-augmented" chemistry associated with the conventional aspects of the four extended RIS-augmented embodiments are also essentially the same as presented earlier herein for their four RIS-augmented (non-enhanced and non-extended) embodiment counterparts with single-component, dual and multi-component fuels. For the sake of brevity, these earlier descriptions (for the non-enhanced and non-extended RIS-augmented process embodiments) are relied upon and are incorporated here by reference in their entireties for the case of the single-component, dual and multi-fuel employments of these six new HCRI process embodiments of Extended HCRI process 800. For their single-component, dual, and multi-component fuel cases, these six counterpart HCRI process engines (embodiments) of HCRI process 100 fully describe these six new extended HCRI process engines (embodiments) of Extended HCRI process 800. Thus, for their employments with single-component, dual and multi-component fuels, the earlier detailed description given herein for the HCRI process 100 combined with the special descriptions for (a) the HCRI process 100 "General Distinctives of full HCRI Engines:", (b) the HCRI process 100 "General Distinctives of the RIS-Augmented PCCI Embodiments:", (c) the HCRI process 100 "General Distinctives of the RIS-Augmented DI CI Embodiments:", (d) the HCRI process 100 "General Distinctives of the RIS-Augmented PCSI Embodiments:" and (e) the HCRI process 100 "General Distinctives of the RIS-Augmented DI SI Embodiments:" all apply as descriptives of their respective Extended HCRI process 800 counterparts. For the sake of both brevity and clarity, these earlier HCRI process 100 descriptions are thus incorporated here also by reference in their entirety and are being relied upon as descriptives for these respective newer Extended HCRI process 800 extended full HCRI engine and extended RIS-Augmented embodiments.

In extended full HCRI engines, the ignition process is generally dominated by sub-mechanisms involving fuel-OH decomposition (fuel hydrogen atom abstraction by OH) chain-branching reaction sets at "lower" temperatures. This is in contrast with the more traditional "low" temperatures direct-$O_2$ fuel oxidation chain-initiation chemical-kinetics mechanisms typically found for the same fuel in conventional PCCI. This is also in contrast to the "higher" temperatures associated with combustion of the same fuel in conventional SI and DI CI. The chain-initiation reaction mechanisms of conventional SI and DI CI typically involve dissociation (thermal and/or via third body) reactions and/or direct fuel-$O_2$ decomposition (oxidation) reactions. In the general case of homogeneous combustion RI with the fuel (hydrogen, alcohol, hydrocarbon, nitrogen and sulfur fuel derivatives and fuel/aqueous-fuel mixtures), the OH needed to sustain the 'lower' temperature fuel-OH decomposition (fuel hydrogen atom abstraction by OH) sub-mechanisms is primarily generated by the dominant chain-initiation reaction given by Equation (2). For smaller molecule fuels, the $OH^-$ quantity generated by this reaction is in turn used in the general dominant chain-branching reaction set represented by Equation (3) (with F the fuel). The general extended full HCRI autoignition event is also dominantly influenced by the available concentrations of the other key RI species. And though the sub-mechanisms for all of this can be rather complex (and thus more difficult to generalize), the other RI species also help in accelerating $OH^-$ generation during autoignition (as they did during pre-ignition). This in turn helps to "drive" more fuel decomposition via the dominant fuel-OH chain-branching reaction set (Equation (3)) (with F the fuel). Once a molecule of fuel is OH-decomposed, some of the resultant $R_f^-$ molecule products of this set are then directly decomposed further by $O_2$ at these lower temperatures.

Westbrook and Dyer refer to the physics of the Equation (3) reaction set with the fuel as "hydrogen atom abstraction" by OH, and specifically note the dominance of this reaction set in conventional lean combustion with $C_2H_4$. $CH_3OH$ and $C_3H$ (Westbrook and Dyer, 1984, which has been incorporated herein by reference in its entirety). In this pioneering reference, Westbrook and Dyer further archive the participation of this reaction set (Equation (3)) in the conventional combustion of a number of smaller molecule fuels (including $H_2$, $CH_4$, $C_2H_6$, $C_2H_2$, $CH_2CO$ [ketene], $C_2H_5OH$, $C_4H_{10}$, $C_6H_6$, $C_7H_{16}$ and HBr) and aldehydes ($CH_2O$ and $CH_3CHO$), However, the dominance of the Equation (3) reaction set in event 7, 835 of Extended HCRI process 800 is not primarily due to its general prevalence in conventional combustion with these and other fuels, but rather is primarily due to the higher than normal presence of the hydroxyl radical (OH). This discussion (concerning these observations of Westbrook and Dyer with OH) also applies to the fuel decomposition chemistries occurring in the M-C's 32 for mini-chamber ignition presented earlier herein (in event 1, 805 and event 3, 815). This discussion further applies to the role of Equation (3) in mini-chamber RI species generation (in event 1, 805, event 3, 815 and event 8, 840).

Finally, this discussion applies to the role of Equation (3) in later RI species generation in the main chamber 34 during event 9, 845. Accordingly, this discussion (concerning these observations of Westbrook and Dryer with OH) is also considered to be included in its entirety within the discussions of these other four Extended HCRI process 800 events (event 1, 805, event 3, 815, event 8, 840, and event 9, 845).

Though the dominant autoignition chain-branching mechanisms become more complex with a larger molecule fuels, the same principles apply, with the role of the hydroxyl radical ($OH^-$) remaining dominant in the fuel decomposition until much (if not most) of the fuel is expended. At the same time, once the temperatures in the main chamber 34 have risen to above that needed for conventional combustion, higher temperature fuel-oxidation reactions and/or fuel-"thermal dissociation" reactions will typically start and become more dominant.

Reasons for why this autoignition activity can start at temperatures that are "lower" than both the "low" temperatures associated with conventional PCCI and the "higher" temperatures associated with conventional SI and DI CI are given earlier in the description of HCRI 100 process event 6, 130 and apply here. Again, the main effect of the use of the CRA fluid is to delay the start of Extended HCRI 800 process event 6, 830 until additional heat of compression (by way of the higher required CR's) enables the main chamber charge to reach essentially the same or slightly higher temperatures as are required by the base fuel for autoignition in HCRI 100 process event 6, 130 (with single-component, dual or multi-component fuels). (See HCRI 100 process event 6, 130 for more details on the autoignition process).

During autoignition with homogeneous combustion (i.e., in the full HCRI embodiments of Extended HCRI process 800), most if not "most all" of the fuel in the main chamber 34 may be consumed. Also, during the homogeneous combustion of the fuel, relatively large quantities of the OH radical are produced. Typically near the end of autoignition the concentration of the main chamber $OH^-$ peaks. Moreover, the rate of heat release is much faster than with ignition in the variants of non-RI augmented CI and SI. Thus, at the completion of the homogeneous combustion the specific internal energy state of the gases in the main chamber 34 is typically peaked. Accordingly, the pressure and temperature of the main chamber gases also typically peak almost immediately after the completion of autoignition. Thus an enormous pressure difference between the main chamber 34 and M-C's 32 develops. This in turn peaks the mass jet velocities and mass flow rates between these chambers 34 and 32, driving the relatively large quantities of $OH^-$ and energy into the M-C's 32 under extremely high turbulence levels.

In addition to sharing the definitive general chemistry of extended full HCRI, the extended RIS-augmented engines of Extended HCRI process 800 may also share many of the other features exhibited during extended full HCRI ignition and combustion. For example, the combustion can also be homogeneous in the extended RIS-augmented PCCI engine of Extended HCRI process 800. Additionally, during the combustion event in the four main extended RIS-augmented engines of Extended HCRI process 800, the pressure, temperature, $OH^-$ concentrations and specific internal energy of the main chamber gases also typically peak. As a result, high mass flow rates may also evolve in these embodiments, carrying relatively massive quantities of $OH^-$, other chemical reaction products and energy into the M-C's 32 under the extremely high turbulence levels. Alternatively, in some embodiments of extended RIS-augmented SI engines, at this juncture in the cycle, there may be relatively more transfer of RI species into the M-C's 32.

As an optional step within the extended full HCRI and the extended PCCI RIS-augmented engines of Extended HCRI process 800, immediately prior to the point in the cycle at which the "tempo" of the autoignition activity is about to "take off", the general main chamber ignition-timing augmentation device 56 (FIG. 11A) can be used. The primary purpose of the ignition-timing augmentation device 56 in the extended full HCRI engines and in the extended PCCI RIS-augmented engine is not to initiate autoignition. Rather the purpose is to assist the accuracy of the timing of the point (position in the cycle) where the "tempo" of autoignition activity literally "takes off". At this point in either an extended full HCRI cycle on in an extended PCCI RIS-augmented cycle, because the combination of the heat of compression and the RI species activity have together already made the main chamber fuel-air mixture just ready for ignition (via the extensive $OH^-$ generation), any small joint increase in pressure and temperature will generally cause the bulk ignition of the fuel-air gas charge in one rapid episode (which by definition is homogeneous combustion). Examples of ignition-timing augmentation devices 56 may include spark plug type devices, catalytic-ignition devices, plasma-jet-generating devices, flame-jet-generating devices, laser devices, etc., where the objective of such devices is in creating a relatively small (or even large) but/and very sudden internal energy increase in some portion of the main chamber fuel-air gas charge. In the two SI extended RIS-augmented embodiments of Extended HCRI process 800, this step is not optional. The examples included herein earlier of the two SI extended RIS-augmented embodiments are based on experimental data from a third RIS-augmented PCSI 4-stroke engine embodiment of HCRI process 100 described in SAE Paper No. 2011-26-0005 (Blank).

Though the RIS-augmented PCSI 4-stroke engine embodiment of HCRI process 100 (of SAE Paper No. 2011-26-0005 [Blank], which is incorporated herein by reference in its entirety) makes use of control passive M-C's 32, it was found to simultaneously reduced NOx and CO (compared to the same engine without M-C's 32) during one series of high-load tests conducted at the Argonne National Laboratory with natural gas as the fuel. During ignition in this embodiment, as the flame front propagates across the main-chamber 34, the pattern of chemistry occurring at local levels follows the same pattern of chemistry occurring at global levels in the main chamber ignition of extended full HCRI engines. These same local level chemistry patterns are also observed in both the 2-stroke RIS-augmented PCSI example and the 4-stroke RIS-augmented DISI example given in U.S. Provisional Application Ser. No. 61/484,179.

As a spark initiated flame front approaches a mass sliver of the main chamber gases in RIS-augmented SI embodiments, the state of the mass sliver of the main chamber gases ahead of the flame front is typically within the slow-combustion region A of FIG. 3 (or sometimes in the cool-flames region). Then, as the flame front begins to warm the mass sliver of the main chamber gases, typically dominant during the pre-ignition chemistry therein is the reaction set given earlier herein via Equation (1) (with F the fuel). Depending on the fuel, the CR, the degree of the rising temperatures caused by flame propagation and other factors, this pre-ignition chemistry may occur in the sliver long before the flame front reaches it. Then, as the advancing high temperature flame front physically encompasses the mass sliver of the main chamber gases within the flame front interface between the burned and unburned portion or the main chamber gas mixture, the general "$H_2O_2$+M" chain-initiation reaction dominant during main chamber ignition (Equation (2)) and the chain-branching OH-fuel decomposition reaction set (Equation (3)) (with F the fuel) are typically among the dominant reactions in operation. The state of the mass silver involved in these reactions within the flame front interface will then typically transition into region B of FIG. 3. This local level combustion initiation pattern is essentially the same as the global level (i.e., throughout and entire main chamber 34) combustion initiation patterns typical of extended full HCRI engines. Then, as soon as the temperature becomes high enough within the mass sliver of the main chamber gases to support direct oxidation, the ignition mechanism in the mass sliver portion within the flame front typically begins to transition to more conventional oxidation based flame front chemical-kinetics. This local level pattern continues over and over again in new mass slivers of the main chamber gases as the flame front propagates.

Figure 12:
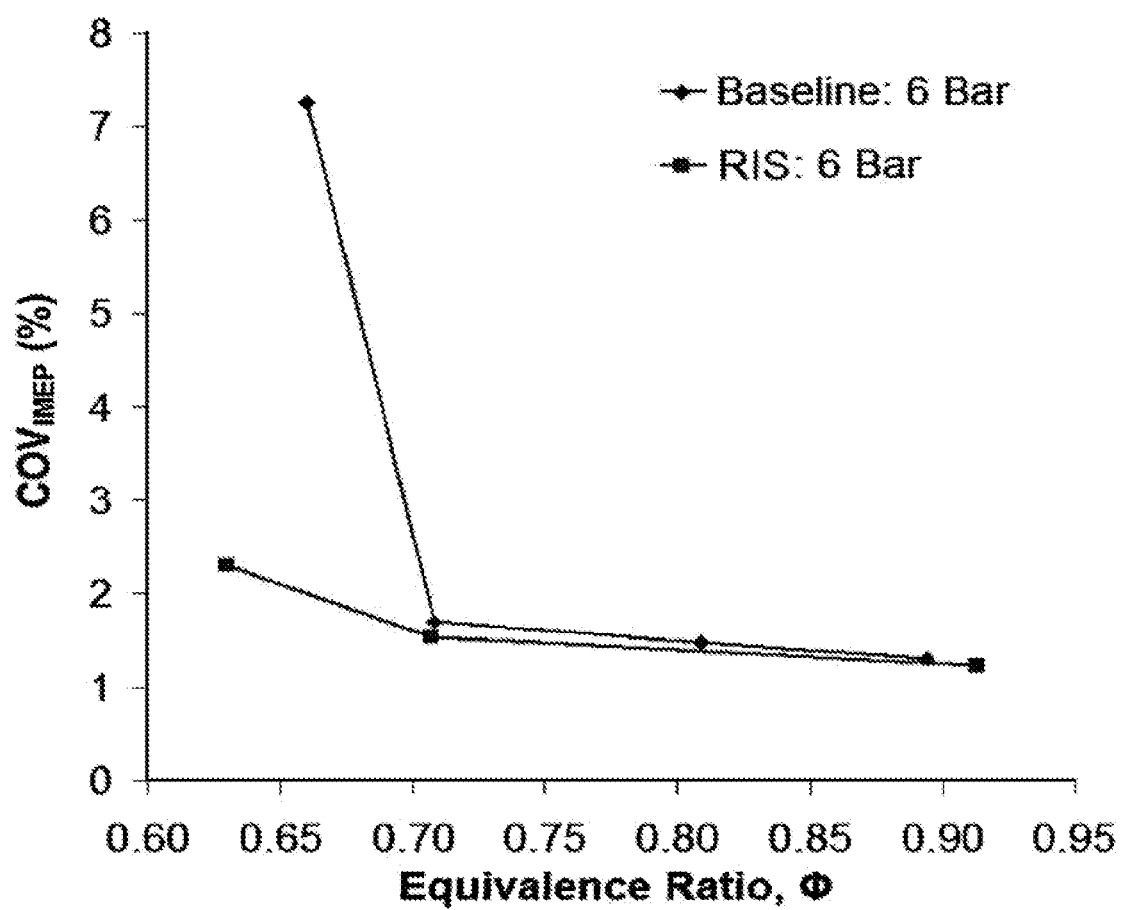
FIG. 12 is a graph showing an Argonne National Laboratory experimental comparison at half load (6 bar BMEP) of $COV_{IMEP}$ values for a baseline 4-stroke SI engine and a 4-stroke RIS augmented PCSI embodiment of extended HRCI engine 900 with control-passive mini-chambers.

One of the experimentally observed effects of RIS-augmented SI flame front chemistry is demonstrated by the FIG. 12 results for a series of low-load tests in the RIS-augmented PCSI engine of SAE Paper No. 2011-26-0005 (Blank) (also provided in U.S. Provisional Application Ser. No. 61/426,503 (referred above and incorporated herein by reference in its entirety)). The engine in these runs used natural gas as the fuel and the tests were conducted at the Argonne National Laboratory. Observable is the influence of the strong presence of the RI species on ignition and combustion in the main chamber 34 of this engine as it approaches its low-load fuel-lean limit. For the run series in this figure, the baseline engine uses a conventional head 36 without any M-C's 32. As the baseline engine approaches its fuel-lean limit, its $COV_{IMEP}$ (coefficient of variance of the indicated mean effective pressure) starts to increase rapidly. In contrast, the $COV_{IMEP}$ of the RIS-augmented PCSI engine hardly increases, despite the fact that its fuel-lean limit is 4.4% "leaner" than the baseline engine at this same low-load condition. Spark timing is the same for both the baseline and RIS-augmented SI engines in this fuel-lean limit comparison (35 degrees of crank angle before TDC) at their respective fuel-lean limits (an equivalence ratio ϕ of 0.63 and 0.65 for the RIS-augmented and baseline, respectively). Also, analysis of over 200 samplings of PFP (peak firing pressure) low-load data points for both the baseline and RIS-augmented PCSI shows the $COV_{PFP}$ (coefficient of variance of the peak firing pressure) for the RIS-augmented PCSI embodiment to be 4.9% lower than that of the baseline. These experimental results show the effects of RI species on the combustion stability and the SI fuel-lean limit.

In the M-C's of extended full HCRI engines during event 7, 835, a key to the generation of the new RI species in the M-C's 32 is generally "OH and RI species impelled" chemistry. This chemistry is typically caused by the well-timed influx of main chamber OH⁻ into the RI species laden fuel-air gas mixture in the M-C's 32. This chemistry is also generally the key in the case of extended RIS-augmented CI engines and also often the key in the case of extended RIS-augmented SI engines. The OH⁻ influx typically occurs for a period of time beginning soon after the start of combustion (SOC). Also, this influx is typically accompanied by extremely high turbulence levels. Thus, there is typically an immediate mixing of the hydroxyl radical with the M-C gases (including fuel and RI species) to the smallest turbulent length scales. Perhaps as important to RI species generation in the M-C 32 is the relatively high quantity of enthalpy also being received in the M-C 32 from the main chamber 34, causing the M-C temperatures to start to rise rapidly.

In some embodiments of extended RIS-augmented SI engines however, the key to the generation of the new RI species in the M-C's 32 is "OH and RI species induced" chemistry caused instead by a prolonged influx of main chamber RI species into the M-C's 32. This is observed in both the 2-stroke RIS-augmented PCSI studies of SAE Paper No. 2011-01-2025 (Blank) and the 4-stroke RIS-augmented DISI studies of SAE Paper No. 2011-01-1895 (Blank). Via Equation (2) this RI species influx is also able to provide the OH⁻ needed for RI species generation in the M-C's 32. In the case of RIS-augmented SI, whether or not an influx from the main chamber 34 has more OH⁻ or more RI species is generally dependent on several things. One is the position of the conduits 42 relative to the position of the main chamber ignition-timing augmentation device 56 (FIG. 11A). Another is the timing of spark ignition. Also, among other things, the flame speed of the propagating flame front is important.

As demonstrated via SAE Paper No. 2011-26-0005 (Blank), SAE Paper No. 2011-01-2025 (Blank) and SAE Paper No. 2011-01-1895 (Blank), in the burned gases behind the propagating flame front in RIS-augmented SI engines, the concentration of the OH⁻ is typically peaked. On the other hand, the pre-combustion chemistry occurring well ahead of the flame front is typically dominated by the reaction Equation (1), affecting a chemistry that typically results in a build up of more main chamber $H_2O_2$ and also sets in motion a generation of other of the RI species of the fuel (including $HO_2$ and the aldehydes $CH_2O$ and $CH_3CHO$). When the location of the conduits 42 of a given M-C 32 are beyond the flame front, the pressure rise due to compression and/or main chamber combustion forces transfer of portions of this main chamber build up of RI species into the M-C's 32. However, once the flame front passes the conduit 42 of a M-C 32 (leaving the conduit 42 behind), as long as the pressure is greater in the main chamber 34 than in the M-C 32, there will typically be an influx of main chamber OH⁻ into the M-C 32 instead.

In event 8, 840, for extended full HCRI engines, typically the sudden presence of the higher (and for a time, increasing) quantity of OH⁻ in the M-C's 32 acts in effect as a "driving force" to rapidly convert the resident M-C fuel into more RI species. This is generally the case for RIS-augmented CI engines also and often "directly" the case as well for RIS-augmented SI engines when the conduits 42 of a given M-C 32 are behind the path of the flame front. As explained in the preceding, this is also "indirectly" the case for RIS-augmented SI engines when the conduits 42 of the given M-C 32 are ahead of the path of the flame front (with the OH⁻ being provided indirectly by the rapid dissociation of the $H_2O_2$ (via Equation (2)) that is instead being transferred into the M-C 32). Also, in most of these full HCRI engine and RIS-augmented engine embodiments of Extended HCRI process 800, the overall chemical activity of the M-C 32 is further accelerated by the rapidly rising temperature. This rising temperature is in turn in part due to the relatively enormous amount of enthalpy transfer. While the enthalpy transfer into a given M-C 32 will be a bit less in RIS-augmented SI engines wherein the conduits (vents) 42 of the given M-C 32 are ahead of the path of the flame front, the enthalpy transfer in such case can still be significant. The M-C's 32 are typically best designed and controlled so that during the last part of the main-compression event and first part of the power-expansion event the states of their gases can be thermally maintained in the "Cool Flames" (if the fuel has a cool flames region) and/or "Slow Combustion" regions of FIG. 3. Sometimes also it is expedient to very briefly take the state of the M-C gases slightly into area "B" or the "Ignition" region of FIG. 3 before a sudden conduit 42 flow reversal (due in part to the power-expansion event in the main chamber 34) takes the state back in area "A" (FIG. 3) without igniting the M-C gases.

At this juncture in the new same cycle of the Extended HCRI process 800 of HCRI engine 900, species concentration constituency ratios of the RI species still resident in the operationally select M-C's 32 (if employed in the new same cycle) and/or the operationally choice M-C's 32 (if employed in the new same cycle) may differ slightly from species concentration constituency ratios of the RI species still resident in the M-C's 32 that are neither operationally select nor operationally choice. The operationally choice M-C's 32 (when in use in the new same cycle) are typically employed early enough during event 1, 805, so that they are naturally "hydro-dynamically cooled" during early to early-mid main-compression (via the cooler gases forced into these M-C's by compression). Thus, as demonstrated by the embodiments of SAE Paper No. 2011-01-2025 (Blank) and SAE Paper No. 2011-01-1895 (Blank), the species concentration constituency ratios in operationally choice M-C's 32 can be typically similar enough to those of M-C's 32 that are neither operationally select nor operationally choice. Also, between the secondary RI species generation occurring during event 3, 815, and or event 4, 820, and the current event (event 8, 840), the operationally select M-C's 32 (when employed in the new same cycle) can be cooled and "cleansed" by other operational approaches. For example, one viable operational approach is by using sub-process timings (controlled by using the engine electronic control system 30) that enable the operationally select M-C's 32 to be both naturally "hydro-dynamically cooled" and naturally "hydro-dynamically purged" of excess fuel concentrations. In concert with this for cooling, one of the at least one general mini-chamber RI-species generation-control augmentation devices 54 may also be used. When this is done, the species consistency ratios and temperatures of these M-C's 32 can to be closer to the same as in M-C's 32 that are neither operationally select nor operationally choice. Alternatively, if the secondary RI species generation described in event 3, 815 (FIG. 10) for the operationally select M-C's 32 is timed to occur late in that event (or instead early to late in event 4, 820), there may instead be a delay in the timing of the next RI species generation sub-cycle in the operationally select M-C's 32 ("Main RI Species Generation", FIG. 10). In such case, the next RI species generation sub-cycle in the operationally select M-C's 32 may occur either in a later event of the new same cycle, or not at all.

At the start of event 8, 840 the gases in the various M-C's 32 consist of mass that has, for the most part, entered therein during mid-to-late main-compression (event 4, 820, event 5, 825 and event 6, 830) and early expansion (event 7, 835). Thus, in general, and when proper cooling has been applied to the M-C's 32 that are employing either the first additional function (if used) and/or the second additional function (if used), the dominant sub-mechanisms for OH-fuel reduction (i.e., decomposition, fuel molecule hydrogen atom abstraction by OH) occurring in the M-C's 32 remain essentially the same as those in event 8, 140, of HCRI process 100 and/or as in event 8, 640, of Enhanced HCRI process 600. Among the most dominant reactions found in the general sub-mechanisms for this mini-chamber OH-induced chemistry are the general dominant chain-branching reaction set represented by Equation (3) (with F the fuel). Although the dominant mechanisms for OH-fuel reduction (decomposition) in the M-C 32 become much more complex with larger molecules as F, the same principles apply.

As mentioned, in some embodiments of extended RIS-augmented SI engines, during and before event 7, 835 there can be a prolonged influx of main chamber RI species into the M-C's 32, and not as much influx of $OH^-$. For example, this is observed in both the 2-stroke RIS-augmented PCSI studies of SAE Paper No. 2011-01-2025 (Blank) and the 4-stroke RIS-augmented DISI studies of SAE Paper No. 2011-01-1895 (Blank). Typically in such embodiments, exothermic reaction Equation (2) is also highly dominant in event 8, 840, thermally dissociating the higher than (generally otherwise) concentrations of $H_2O_2$ into the $OH^-$ needed for this mini-chamber OH-induced chemistry to proceed. With adequate OH present, the general chain-branching reaction set, represented by Equation (3), is able to be highly dominant for RI species generation in the M-C's 32 of RIS-augmented SI engines when the conduits 42 of the M-C's 32 are ahead of the path of propagating flame fronts of the main-chamber 34.

The sub-mechanisms for subsequently converting the various $R_i^-$ (and other sub-mechanism generated species) of Equation (3) into RI species are more complex, with heavy dependence on effects of the significant concentrations of fuel and RI species already present in the mini-chamber 32. And as the new quantities of the RI species increase (due to these sub-mechanisms), part of the new $H_2O_2$ being created is then sacrificed to create additional $OH^-$ via exothermic reaction Equation (2) to help accelerate the $OH^-$ decomposition of the fuel into the various $R_i^-$ and other species. Similarly the other RI species resident in the M-C 32 help in both the generation of more $OH^-$ and more RI species in a complex chemical-kinetics sub-mechanism. Thus the overall RI species generation mechanism is both OH-driven and RI species-driven, or "OH-RI species driven". In other words, it is "the radical ignition species of said fuel and OH" that are being used both to impel Equation (3) for "OH-decomposition of said fuel" and to set in motion complex mechanisms (or series of reactions) that result in buildup ("generation") of "new radical ignition species". Though the dominant chain-branching mechanisms may become much more complex with larger molecule fuels, the same principles apply, with the role of the hydroxyl radical (OH) dominant in the fuel decomposition.

This generalized M-C RI species generation process is universal to all full HCRI and all RIS-augmented embodiments of Extended HCRI process 800. Also, although this generalized description is based on the same fuel being inserted into the main chamber 34 and M-C's 32 (when the fluid being inserted into the M-C 32 is in fact fuel), in dual-fuel or multi-fuel insertion operations the same is true for all the constituents (of the fuel) inserted into the engine. In such cases, if the re-activities of all the constituents (of the fuel) with $OH^-$ are compatible, the dominant reactions for each are of the same form (with of course their own F, $R_i^-$ and other species). In operations in which the re-activities of the fuel constituents with $OH^-$ are not similar, initially at least the general reaction sub-mechanism will typically follow the activity of the fuel constituent whose reactivity with $OH^-$ is dominant. This main RI species generation process continues to strengthen until the supply of $OH^-$ (or in some RIS-augmented SI cases, the supply of RI species resulting in more OH) from the main chamber 34 is cut off by the sudden M-C to main chamber conduit 42 flow reversal mentioned earlier (and caused in part by the power-expansion event), after which, this process dies off.

Based on this abbreviated chemical-kinetics description of the M-C RI species generation process, the role of the control fluid can again be delineated. Relative to the air, the higher the concentration of fuel in the M-C 32, the faster this sub-mechanism will produce additional RI species. The reverse is also true. As explained in event 8, 140, of HCRI process 100, the timing of main chamber 34 autoignition (SOC) can typically be directly controlled in full HCRI engines of Extended HCRI process 800 by the regulation of the quantity of the control fluid inserted into the M-C's 32. This is because the quantity of the control fluid inserted into the M-C 32 may precisely determine the quantity of RI-species generated in the M-C 32 (for use in the next main chamber combustion event). Thus, the beginning sub-process for RI species generation can typically be controlled by using the engine electronic control system 30 (FIG. 11B). At the correct times (depending on a particular engine operating condition) the electronic control system 30 can direct the mini-chamber RI species generation control fluid supply distribution system 96 to send proper amounts of control fluid through the control fluid supply lines 50 (FIG. 11B) to the control-fluid insertion devices 44A and/or 44C of certain M-C's 32 (FIG. 11A). These control fluid insertion devices deliver control fluid into these M-C's 32 via the control fluid insertion orifices 46.

When used in the PC-HCRI engine and the two premixed fuel RIS-augmented engines of Extended HCRI process 800 the control fluid is likely to be a liquid or gas that can serve to dilute the fuel concentration of the M-C 32 as needed (relative to the air concentration). More dilution decreases the RI species generation rates and less dilution increases the RI species generation rates. Conversely, when used in the DI-HCRI embodiment and the two DI fuel RIS-augmented engines of Extended HCRI process 800, the best choice for the control fluid is typically the fuel (or a constituent of the fuel). With such as the control fluid, when it is necessary to increase or decrease the RI species generation, the fuel concentrations of the M-C are strengthened or weakened accordingly. However, typically in the operationally select M-C's 32 the only time the control fluid is added is for facilitating the secondary RI species generation process (as explained in event 2, 810).

Based on the abbreviated chemical-kinetics description of the M-C RI species generation process, the role of the general M-C RI-species generation-control augmentation device 54 can also be delineated. The general M-C RI-species generation-control augmentation device 54 can be an apparatus capable of increasing or decreasing the overall rates of the M-C RI species generation chemical-kinetics process by some approach. Specifically, these M-C augmentation devices 54 either speed or slow the overall reaction rates of reaction set $$\sum_{i}^{N_i}\{F+OH^-\Leftrightarrow R_i^-+H_2O\}$$

(when F is a smaller molecule) (Equation (4)) or its more complex equivalents (when F is a larger molecule) along with the sub-mechanisms for subsequently converting the $R_i^-$ species (and other sub-mechanism generated species) into additional RI species and more $OH^-$. In particular, the overall reaction rate of dominant exothermal reaction $H_2O_2+M\Leftrightarrow OH^-+OH^-+M$ (Equation (2)) contained within the RI species generation mechanisms is highly sensitive to temperature and to the concentration of $H_2O_2$. Also, the overall reaction rates of the reactions of Equation (4) and its more complex equivalents (for the larger molecule fuel constituents) are highly sensitive to both temperature and to the concentration of $OH^-$. Finally, the dominant follow-on reactions for converting the products of reaction set Equation (4) into new RI species are highly sensitive to the temperature and the existing (resident) M-C concentrations of the RI species.

Thus, various apparatus capable of affecting the temperature of gases of the M-C in a controlled manner and/or of augmenting the concentrations of $OH^-$ and/or any of the RI species within the M-C in a controlled manner, are among those considered to be M-C RI-species generation-control augmentation devices 54. For example, one full chemical-kinetics simulation experiment has shown that the regulation of the M-C wall temperatures alone can be used to both control the quantity of RI species generated in the M-C 32 and control the timing of autoignition in the main chamber 34 (see SAE Paper No. 2007-01-0047 (Blank), which has already been incorporated by reference in its entirety). Alternatively, devices capable of changing the volume of the M-C 32, or of inserting other chemical additives into the M-C 32 or of any other function that can help in regulating the quantity of RI species generated by the M-C 32, are also considered to be M-C RI-species generation-control augmentation devices 54. These M-C augmentation devices 54 can be used alone (or in conjunction with proper regulation of the control fluid insertion) to directly control the quantity of RI species generated by the M-C's 32. Under the direct control of the engine electronic control system 30, these augmentation devices 54 are used (either together with synchronized control fluid insertion or alone) to regulate the rate of RI species generation process in the control-active M-C's 32.

In event 9 845, at some point (typically within the "well before mid" portions of the power-expansion event) the sudden conduit 42 flow reversal (mentioned earlier) occurs. Generally this occurs as a combined result of main chamber power-expansion and rising temperatures and pressures in the M-C 32 (due to the exothermic RI species generation process). These naturally opposing developments cause the pressure ratio to reverse (so that M-C pressure is greater than that of the main chamber 34). Immediately after this point a highly turbulent mass jet typically evolves, carrying RI species, unused fuel, unused oxygen, enthalpy, other chemical reaction products, etc., out of the M-C's 32 and into the main chamber 34 with which they are in thermo-fluid communications. Depending on the HCRI engine embodiment and physical location of the M-C 32, while this transfer is typically to the same main chamber in which the ignition event (event 7, 835) occurred, in some IC engines it may also be to another main chamber 34. In such a case the flow reversal may be due instead to the pressure drop that occurs when the M-C's conduit 42 shifts communication to the other main chamber 34. In either case, after this and because of the rapid transfer of enthalpy, the pressures in the affected M-C's 32 begin to drop more rapidly. This pressure drop during the "before mid" power-expansion period results in a drop in temperature of these M-C's 32. The bulk of the radial species in the affected M-C's 32 subsequently go into states of frozen (or near frozen) equilibrium.

Though there is also the rapid temperature drop in the main chamber 34 that accompanies the main chamber pressure drop during the "well before mid to late" portion of the power-expansion event, the temperatures in the main chamber 34 are still high enough for main chamber RI species activity. Also, although the $OH^-$ concentration in the main chamber is dropping with temperature, during the "mid-to-late" portion of the power-expansion process, its concentration remains significant. Thus, because of the pressure differences between the chambers (32 and 34), unconsumed M-C fuel and oxygen together with quantities of mini-chamber RI species, etc. are transferred into the main chamber 34 from those M-C's 32 that are discharging mass via high-speed highly-turbulent jets. These quantities are thus discharged directly into the heavily $OH^-$ laden gases of the main chamber 34 and rapidly mixed. This situation results in a second "OH-RI species" induced and OH-driven RI species generation process of the cycle, producing new main chamber RI species. This process continues on through (and often beyond) the blow-down portion of the exhaust event. Thus a burden for part of the supply of RI species needed for radical ignition in the later cycle(s) may also fall on the two post-autoignition processes taking place in the main chamber 34.

The first post-autoignition process is RI species retention. Typically, much of the RI species (especially the $CH_3HCO$ and $CH_2O$, depending on the fuel) exiting the M-C 32 (during the power stroke and blow down) are not consumed as they are expelled to the main chamber 34, but are retained and serve as part of the driving force for the second process. However, because of the initially high temperatures (when the state of the main chamber gases is still in area "B" of the Ignition Region of FIG. 3), typically the portion of the discharged M-C RI species (including some of the $HO_2$ and more of the $H_2O_2$) is lost (consumed) between the time of well before mid-to-mid power-expansion flow reversal and the transition of the main chamber gases from Area "B" of the "Ignition Region" back into area "A" of the "Slow Combustion Region".

The second process (of the post-autoignition processes) is main chamber RI species generation. This begins sometime during the transition of the state of the gases in the main chamber back into area "A" (see FIG. 3), resulting primarily in $H_2O_2$, but also in more $HO_2^-$ (initially) and in more of the other RI species. This generation process is fueled and driven by the relatively high quantities of fuel and RI species coming out of the M-C's 32 and the adequately high $OH^-$ concentrations still retained in the main chamber 34. Generally this generation process can take place in two phases, each with its own unique sub-mechanisms. The first phase sub-mechanism can start during the transition into area "A" and continues until the start of main chamber blow-down. The second phase mechanism may begin after the start of main chamber blow down and can continue for awhile.

In this relatively high $OH^-$ environment, for smaller molecules as F, the dominant general reaction throughout both phases of the main chamber 34 RI species generation process is typically again (as in the M-C RI species generation process) the reaction set:

(Equation (3))

$$\sum_{i}^{N_i} \{F + OH^- \Leftrightarrow R_i^- + H_2O\}.$$

Though the dominant mechanisms for OH-fuel reduction (fuel molecule H atom abstraction by OH) in the main chamber 34 become much more complex for larger molecules as F, the same principles apply. The sub-mechanisms for subsequently converting the $R_i^-$ species (and other sub-mechanism generated species) into the RI species can be a bit different from those of the M-C RI species generation process. Also, the sub-mechanisms for converting the RI species (and other sub-mechanism generated species) into the RI species can be a bit different for the two main chamber phases. If there are differences in these sub-mechanisms, they may be due primarily to the difference in the temperature values prevailing in the main chamber 34 during these respective phases.

In addition to occurring in all full HCRI engines of Extended HCRI process 800, when the degree of RIS-augmentation is above a meaningful threshold, this generalized main chamber RI species generation process occurs as well in all RIS-augmented embodiments of Extended HCRI process 800. And although this generalized description is based on the same fuel constituent being inserted into the main chamber 34 and M-C's 32 (if a fuel constituent is in fact the control fluid for the control-active M-C's), in dual-fuel or multi-fuel insertion operations the same can be true for each fuel constituent inserted. In multiple fuel constituent cases, some of the M-C fuel constituents being discharged (during power-expansion and blow down) are in any case earlier main chamber fuel constituents that were trapped in the M-C's 32 during the main-compression event. Moreover, if the reactivities of all the fuel constituents with $OH^-$ are compatible, the dominant reactions for each constituent are of the same form (with of course their own F, $R_i^-$ and other species). However, in operations in which the reactivities of the fuel constituents with $OH^-$ are not similar, initially at least the general reaction sub-mechanism will typically follow the fuel constituent whose reactivity with $OH^-$ is dominant.

During some point in the exhaust process, the main chamber RI species still remaining in the main chamber 34 will also typically go into states of frozen (or near frozen) equilibrium. Subsequently, the full combustion cycle is repeated, starting with event 1, 805 and with the full combustion cycle just described (the new same cycle) now and hereafter understood to be at least one of the earlier full combustion cycles.

HCRI engine 900 is configured to operationally use and enable Extended HCRI process 800. Such configuration of HCRI engine 900 is substantially similar to that described earlier herein for both Enhanced HCRI engine 200 for operational use in enabling HCRI process 100 and for Enhanced HCRI engine 700 for operational use in enabling HCRI process 600. The main advance in Extended HCRI process 800 with HCRI engine 900 is in the defining of expanded realms for the operation of HCRI process 100 in embodiments of HCRI engine 100 under the direction of the exemplary engine electronic control system 30. Thus, herein it is understood that embodiments of Extended HCRI process 800 and of HCRI engine 900 need not simultaneously employ the use of all or any of the following: CRA fluids, operationally select M-C's 32 and operationally choice M-C's 32. This understanding is established in general by the fact that HCRI process 100 already contains all the features necessary for the enablement of both Enhanced HCRI process 600 and Extended HCRI process 800 and that HCRI engine 200 already contains all of the same means of HCRI engine 700 and HCRI engine 900. This understanding generally prevails for example when the CRA fluid is fuel, with the CRA fluid insertion devices 44E and 44F also being fuel insertion devices akin to fuel insertion devices 44D and 44B, respectively, and with the CRA supply distribution system 97 is akin to the fuel supply distribution system 98.

Of its inherent general design features, HCRI engine 900's ability to operationally enable Extended HCRI process 800 and other embodiments is accordingly predicated on the exemplary engine electronic control system 30 depicted schematically in FIG. 11B. The engine electronic control system 30 helps to enable the HCRI engine embodiments of HCRI engine 900 to both use and enable the various embodiments of Extended HCRI process 800, including the full HCRI embodiments, the enhanced full HCRI embodiments, the extended full HCRI embodiments, the RIS-augmented embodiments, the enhanced RIS-augmented embodiments and the extended RIS-augmented embodiments.

Thus it is hereinafter understood that the general engine control system 30 is preferably capable of those functions necessary for the operation of HCRI engine 900 as discussed herein. The general engine control system 30 is also preferably capable of regulating the placement of the small amounts of RI-species generation control fluid in the concerned control-active M-C's 32 for a purpose of controlling both the M-C RI species generation process directly and the main chamber RI species generation process (indirectly) to in turn enable the controlled RI species enhancement of combustion in the main chamber 34. For precisely the same purpose of controlling, the general engine control system 30 is also preferably capable of regulating the general M-C RI-species generation-control augmentation devices 54. Finally, the general engine control system 30 is preferably capable of controlling the other RI-species generation-control augmentation devices 64 and 70 and/or the ignition-timing augmentation devices 56 that may be employed for the same purpose of controlling.

For facilitating these various capabilities, the general control system 30 may typically make use of sensor directed logic that is in some cases also guided by a combustion-history aided management sub-system. The combustion-history aided management subsystem may in turn contain data structures appropriate to a number of process characteristics and process histories typical of components of HCRI engine 900 with various combinations of fuel, RI species, air and product mixtures. The data structures may also or alternatively be logically related to various engine operating conditions, including load, speed and boost, as well as various intake and exhaust conditions, including temperature, pressure, humidity, emissions, etc. Approaches for facilitating the sensor directed logic may include various processors, sub-processors, computers, micro-computers and even mechanical methods. Guided by such data structures and engine conditions as well as by various component sensor inputs, approaches for implementing the sensor directed logic may include mechanical and electronic workings and their combinations to guide the various control devices of HCRI engine 900.

HCRI engine 300 described earlier by FIG. 4A-4D also collectively illustrates an exemplary rotary HCRI IC engine that can additionally serve as an implementation of HCRI engine 900 and that can thus both use and enable Enhanced HCRI process 800. In this capacity HCRI engine 300 is thus also preferably capable of using and enabling the two extended full HCRI and the four extended RIS-augmented embodiments of Extended HCRI process 800. FIG. 11A-11B for HCRI engine 900 and FIG. 4A-4D for HCRI engine 300 share common features. Accordingly, in the interest of both brevity and clarity, the description of some of the common features of HCRI engine 300 and its schematic depiction in FIG. 4A-4D are omitted and the description of these features with respect to HCRI engine 900 and its schematic depiction in FIG. 9A-9B are being relied upon to provide adequate descriptions of the common features. While the nomenclatures for HCRI engine 900 and HCRI engine 300 are generally the same, nomenclature refinements for HCRI engine 300 are as presented earlier herein in the description of its relationship to HCRI engine 200.

HCRI engine 400 described earlier by FIG. 5A-5C also collectively illustrates an exemplary 2-stroke reciprocating piston HCRI IC engine that can additionally serve as an embodiment of HCRI engine 900 and that can thus both use and enable Extended HCRI process 800. HCRI engine 400 is thus also preferably capable of the two extended full HCRI and the four extended RIS-augmented embodiments of Extended HCRI process 800. FIG. 11A-11B for HCRI engine 900 and FIG. 5A-5C for HCRI engine 400 share common features. Accordingly, in the interest of both brevity and clarity, the description of some of the common features of HCRI engine 400 and its schematic depiction in FIG. 5A-5C are omitted and the description of these features with respect to HCRI engine 900 and its schematic depiction in FIG. 11A-11B are being relied upon to provide adequate descriptions of the common features. While the nomenclatures for HCRI engine 900 and HCRI engine 400 are generally the same, the refinements for HCRI engine 400 are as presented earlier herein in the description of its relationship to HCRI engine 200.

HCRI engine 500 described earlier by FIG. 6A-6D also collectively illustrates an exemplary 4-stroke reciprocating piston HCRI IC engine that can additionally serve as an embodiment of HCRI engine 900 and that can thus both use and enable Extended HCRI process 800. HCRI engine 500 is thus also preferably capable of the two extended full HCRI and four extended RIS-augmented embodiments of Extended HCRI process 800. FIG. 11A-11B for HCRI engine 900 and FIG. 6A-6D for HCRI engine 500 share common features. Accordingly, in the interest of both brevity and clarity, the description of some of the common features of HCRI engine 500 and its schematic depiction in FIG. 6A-6D are omitted and the description of these features with respect to Extended HCRI engine 800 and its schematic depiction in FIG. 11A-1B are relied upon to provide adequate descriptions of the common features omitted. While the nomenclatures for HCRI engine 900 and HCRI engine 500 are generally the same, the refinements for HCRI engine 500 are as presented earlier herein in the description of its relationship to HCRI engine 200.

Subject to the applicable portions of the earlier general descriptions, the IC engine embodiments schematically depicted in FIG. 11A-11B for (HCRI engine 900), FIG. 4A-4D (for HCRI engine 300), FIG. 5A-5C (for HCRI engine 400) and FIG. 6A-6D (for HCRI engine 500) are all examples of engine configurations capable of using and enabling all four of the extended RIS-augmentation process embodiments of Extended HCRI process 800 described in the foregoing (the extended RIS-PCCI process embodiment, and the extended RIS-DICI process embodiment, the extended RIS-PCSI process embodiment and the extended RIS-DISI process embodiment). A general configuration exists for the operation of all three of these IC engine embodiments of HCRI engine 900 (300, 400 and 500) as any of the four extended RIS-augmented process embodiments of Extended HCRI process 800. The general configuration for the operation of the generalized process embodiment of the general thermo-fluid chemical-kinetics process invention Extended HCRI process 800 in the exemplary IC engine embodiment HCRI engine 900 is provided earlier in detail and applied to the general distinctions of the extended RIS-PCCI process embodiment, the extended RIS-DICI process embodiment, the extended RIS-PCSI process embodiment and the extended RIS-DISI process embodiment described in the foregoing. In the interest of both brevity and clarity, the description of some of the common features of operation in the three example IC engine embodiments (HCRI engine 300, HCRI engine 400 and HCRI engine 500) are omitted and the description of these features of operation with respect Extended HCRI process 800 depicted in FIG. 10 and its detailed description of operation in HCRI engine 900 are being relied upon to provide adequate descriptions of the common features of operation omitted for these four extended RIS-augmented process embodiments. In particular, the thrust of the Extended HCRI process 800's detailed description is applied to the extended RIS-augmented PCCI, DI CI, PCSI and DI SI cases, and its description, as given, explains the extended RIS-PCCI, RIS-DICI, RIS-PCSI and RIS-DISI process embodiments of Extended HCRI process 800.

Further, for clarity of their general descriptions (as are being relied upon from the descriptions of the respective counterpart embodiments of HCRI 100 employed in the various embodiments of HCRI engine 200 described earlier herein), the engine electronic control system 30 may be used in the operation of the HCRI engine 900 and its three example HCRI engine embodiments (300, 400 and 500) with the extended DI-HCRI and extended PC-HCRI process embodiments of Extended HCRI process 800. The engine electronic control system 30 ensures the total amount and timings of CRA fluid (when used) and base fuel inserted into the main chamber 34, the timings and amounts of control fluid insertion into the M-C's 32 (including into the operationally select M-C's 32 (when used) and into the operationally choice M-C's 32 (when used)) and the use of all RI-species generation augmentation-control devices 54, 64 and 70 (if any or all are employed) are all consummated with the engine operating conditions and specifications in manners appropriate to these embodiments. For all of these embodiments, the total amount of RI species generated, carried over, recycled and conveyed to assist ignition in later cycles is preferably that amount needed to dominate in the ignition event in those cycles, resulting (in comparison with the conventional ignition modes) in reductions in required heat and required fuel concentrations relative to oxygen concentrations for ignition of the fuel. Also these control devices are to be operated in ways that together ensure that the work-power output of the engine is preferably in accordance with operational load and speed requirements. For these two extended full HCRI variants these control devices preferably also ensure ignition at the right timings.

Further, for clarity of their general descriptions (as are being relied upon from the descriptions of the respective counterpart embodiments of HCRI 100 employed in the various embodiments of HCRI engine 200 described earlier herein), the engine electronic control system 30 may be used in the operation of the HCRI engine 900 and its three example HCRI engine embodiments (300, 400 and 500) with the extended RIS-PCCI, RIS-DICI, RIS-PCSI and RIS-DISI process embodiments of Extended HCRI process 800. The engine electronic control system 30 ensures the total amount and timings of CRA fluid (when used) and base fuel inserted into the main chamber 34, the timings and amounts of control fluid insertion into the M-C's 32 (including into the operationally select M-C's 32 (when used) and into the operationally choice M-C's 32 (when used)) and the use of all RI-species generation augmentation-control devices 54, 64 and 70 (if any or all are employed) are all consummated with the engine operating conditions and specifications in manners appropriate to these embodiments. For all of these embodiments, the total amount of RI species generated, carried over, recycled and conveyed to assist ignition in later cycles is preferably that amount needed to assist in the manner desired (without dominating) in the ignition event in those cycles, resulting (in comparison with the conventional ignition modes) in reductions in required heat and required fuel concentrations relative to oxygen concentrations for ignition of the fuel. Also these control devices are to be operated in ways that together ensure that the work-power output of the engine is preferably in accordance with operational load and speed requirements. For the two extended CI RIS-augmentation variants these control devices preferably also ensure ignition at the right timings.

While preferred embodiments of the invention have been described using specific terms, such description is for present illustrative purposes only, and it is to be understood that changes and variations to such embodiments, including but not limited to the substitution of equivalent features or parts, and the reversal of various features thereof, may be practiced by those of ordinary skill in the art without departing from the spirit or scope of the following claims.

What is claimed is:

1. A cyclic engine for combustion of a fuel, said engine comprising:
    at least one combustion chamber that receives the fuel and air for said combustion;
    means for providing said fuel and said air to said combustion chamber;
    at least one work-power producing component that moves responsive to said combustion;
    means for generating radical ignition species starting in and continuing from a prior combustion cycle; and
    at least one regulator that selectively modulates a portion of said radical ignition species for use in said combustion chamber in a combustion cycle occurring after said prior combustion cycle.

2. The cyclic engine of claim 1, wherein said means for generating radical ignition species uses radical ignition species of said fuel and OH to impel OH hydrogen atom abstraction from molecules of said fuel for decomposition of said fuel and said generation starts in and continues from said prior cycle.

3. The cyclic engine of claim 1, wherein said means for means for means for generating radical ignition species uses radical ignition species of said fuel and OH to impel $HO_2$ and OH hydrogen atom abstraction from molecules of said fuel for decomposition of said fuel and said generation starts in and continues from said prior cycle.

4. The cyclic engine of claim 1, wherein for at least a portion of said generating, said means for said generating radical ignition species includes a mini-chamber connected to said at least one combustion chamber via a plurality of conduits, wherein the plurality of conduits enables throttled flow between said mini-chamber and said at least one combustion chamber during a time period when said portion of said generating is occurring within said prior cycle.

5. The cyclic engine of claim 4, where said mini-chamber is control-passive.

6. The cyclic engine of claim 1, wherein, for facilitating at least one part of said generating radical ignition species, said means for generating radical ignition species includes at least one of the following:
    a. a control-active mini-chamber connected to said at least one combustion chamber via a plurality of conduits that together ensures throttled flow between said control-active mini-chamber and said combustion chamber during said prior cycle;
b. a control-active mini-chamber connected to said at least one combustion chamber via a plurality of conduits that together facilitates throttled flow between said control-active mini-chamber and said combustion chamber while said control-active mini-chamber is performing said at least one part of said generating radical ignition species during said prior cycle;
c. a control-passive mini-chamber connected to said combustion chamber via a plurality of conduits that together ensures throttled flow between said control-passive mini-chamber and said at least one combustion chamber during said prior cycle;
d. a control-passive mini-chamber connected to said at least one combustion chamber via a plurality of conduits that together facilitates throttled flow between said control-passive mini-chamber and said combustion chamber while said control-passive mini-chamber is performing said at least one part of said generating radical ignition species during said prior cycle;
e. said at least one combustion chamber of said engine during a period after starting of an ignition of said prior cycle and before completion of said ignition of said prior cycle, where said ignition is via a propagating flame front;
f. said at least one combustion chamber of said engine during said prior cycle but after a combustion event of said prior cycle;
g. said at least one combustion chamber of said engine during said later cycle but before said combustion of said later cycle;
h. a volume within said at least one combustion chamber, said volume containing an unburned quantity of a mixture of said fuel and said air, where said volume is located ahead of a path of a flame front as said flame front is propagating within said combustion chamber during said combustion occurring in said combustion chamber during said prior cycle;
i. said at least one combustion chamber of said engine during a period before start of an ignition of said later cycle; and
j. said at least one combustion chamber of said engine during a period after starting of an ignition of said later cycle and before completion of said ignition of said later cycle, where said ignition is via a propagating flame front.

7. The cyclic engine of claim 1, wherein said at least one regulator is a radical ignition species generation regulating device used to modulate a segment of said portion by affecting at least one part of said generating, where said radical ignition species generation regulating device is configured to accomplish at least one of the following functions:
a. affect magnitudes of said part of said generating occurring in at least one secondary chamber associated with said combustion chamber;
b. affect at least one thermo-fluid chemical-kinetic sub-process effecting said part of said generating occurring in at least one secondary chamber associated with said combustion chamber;
c. affect timings of transfer of said radical ignition species into at least one secondary chamber associated with said combustion chamber;
d. affect the timings of transfer of said OH into at least one secondary chamber associated with said combustion chamber;
e. affect flows of quantities of said radical ignition species into at least one secondary chamber associated with said combustion chamber;
f. affect flows of quantities of said radical ignition species out of at least one secondary chamber associated with said combustion chamber; and
g. affect flows of quantities of unconsumed fuel and oxygen out of at least one secondary chamber associated with said combustion chamber.

8. The cyclic engine of claim 1, wherein said means for generating radical ignition species includes at least one of the following chambers or chamber volumes for use together with said at least one regulator to moderate a segment of said portion:
a. a control-active mini-chamber wherein, during an intake event of said later cycle, a mini-chamber RI-species generation-control augmentation device serving as an ignition means is employed to kindle and burn gases of said mini-chamber to push at least some percentage of said segment heretofore resident within said mini-chamber out into said combustion chamber via at least one conduit while also facilitating within said mini-chamber a part of said generating;
b. a control-active mini-chamber wherein, during an intake event of said later cycle, a mini-chamber RI-species generation-control augmentation device serving as an ignition means is employed to kindle and burn fuel-rich gases of said mini-chamber to push at least some percentage of said segment heretofore resident within said mini-chamber out into said combustion chamber via at least one conduit while also facilitating within said mini-chamber a part of said generating;
c. a control-active mini-chamber wherein, during a main-compression event of said later cycle, a mini-chamber RI-species generation-control augmentation device serving as an ignition means is employed to kindle and burn gases of said mini-chamber to push at least some percentage of said segment heretofore resident within said mini-chamber out into said combustion chamber via at least one conduit while also facilitating within said mini-chamber a part of said generating; and
d. a control-active mini-chamber wherein, during a main-compression event of said later cycle, a mini-chamber RI-species generation-control augmentation device serving as an ignition means is employed to kindle and burn fuel-rich gases of said mini-chamber to push at least some percentage of said segment heretofore resident within said mini-chamber out into said combustion chamber via at least one conduit while also facilitating within said mini-chamber a part of said generating.

9. The cyclic engine defined in claim 1, wherein said engine makes use of at least one logic for managing at least one apparatus in communication with at least one data structure appropriate to characteristics of a mixture of said fuel and said air, wherein data stored in said data structure is related to an operation of said engine under varying engine operating conditions including load and speed conditions, and wherein at least one of the following further applies:
a. at least one of said data structure includes combustion history;
b. at least one of said data structure supports a combustion-history aided management sub-system;
c. at least one of said logic is sensor directed;
d. at least one of said data structure is in contact with a microcomputer as said apparatus;

e. at least one of said data structure is in contact with a computer as said apparatus;
f. at least one of said data structure is in contact with a processor as said apparatus;
g. at least one of said data structure facilitates direction of said regulator;
h. at least one of said apparatus directs mechanically;
i. at least one of said data structure facilitates mechanical direction of said regulator;
j. at least one of said logic responsive to at least one exhaust emissions condition of said engine;
k. at least one of said logic responsive to at least one temperature condition of said engine; and
l. at least one of said logic responsive to at least one pressure condition of said engine.

10. The engine of claim 9, wherein said logic directs said engine in implementing at least one of the following homogeneous combustion radical ignition sub-processes:
a. a direct fuel injection full homogeneous combustion radical ignition process, wherein said radical ignition species are dominating ignition in said engine;
b. a premixed charge full homogeneous combustion radical ignition process, wherein said radical ignition species are dominating ignition in said engine;
c. a combined direct fuel injection and premixed charge full homogeneous combustion radical ignition process, wherein said radical ignition species are dominating ignition in said engine;
d. a radical ignition species augmented premixed charge compression ignition process, PCCI, wherein said radical ignition species are augmenting premixed charge compression ignition in said engine;
e. a radical ignition species augmented homogeneous charge compression ignition process, HCCI, wherein said radical ignition species are augmenting homogeneous charge compression ignition in said engine;
f. a radical ignition species augmented stratified charge compression ignition process, SCCI, wherein said radical ignition species are augmenting stratified charge compression ignition in said engine;
g. a radical ignition species augmented direct injection compression ignition process, DI CI, wherein said radical ignition species are augmenting direct injection compression ignition in said engine;
h. a radical ignition species augmented premixed charge spark ignition process, PCSI, wherein said radical ignition species are augmenting premixed charge spark ignition in said engine;
i. a radical ignition species augmented homogeneous charge spark ignition process, HCSI, wherein said radical ignition species are augmenting homogeneous charge spark ignition in said engine;
j. a radical ignition species augmented conventional diesel combustion process, wherein said radical ignition species are augmenting conventional diesel combustion in said engine;
k. a radical ignition species augmented low temperature combustion process, LTC, wherein said radical ignition species are augmenting low temperature combustion in said engine;
l. a radical ignition species augmented stratified charge spark ignition process, SCSI, wherein said radical ignition species are augmenting stratified charge spark ignition in said engine; and
m. a radical ignition species augmented direct injection spark ignition process, DI SI, wherein said radical ignition species are augmenting direct injection spark ignition in said engine.

11. A combustion system for combustion of a fuel in a cyclic internal combustion engine, the combustion system comprising:
at least one combustion chamber that receives the fuel and air for said combustion;
means for providing the fuel to said combustion chamber;
at least one work-power producing component that moves responsive to said combustion;
means for generating radical ignition species, said generating starting in and continuing from a prior combustion cycle; and
at least one regulator that selectively modulates a portion of said radical ignition species for said combustion in a later combustion cycle occurring after said prior combustion cycle.

12. The combustion system as defined in claim 11, wherein combustion stability of said combustion of said fuel is improved.

13. The combustion system as defined in claim 11, wherein combustion efficiency of said combustion of said fuel is increased.

14. The combustion system as defined in claim 11, wherein said generating radical ignition species uses OH to impel OH-decomposition of said fuel, where said generating with said OH-decomposition of said fuel starts in and continues from said prior cycle.

15. The combustion system as defined in claim 11, wherein said generating radical ignition species uses radical ignition species of said fuel and OH to impel OH-decomposition of said fuel, where said generating with said OH-decomposition of said fuel starts in and continues from said prior cycle.

16. The combustion system as defined in claim 11, wherein said combustion of said fuel is facilitated while both decreasing heat required and decreasing fuel to air ratios of said fuel required for an ignition of said fuel within said at least one combustion chamber.

17. The combustion system as defined in claim 11, wherein said fuel consist of a base fuel and at least one fluid, where said fluid of said fuel has a heat of vaporization and a volatility higher than that of the base fuel and an ignitability that is lower than that of the base fuel.

18. The combustion system as defined in claim 11, wherein said fuel consist of a base fuel and at least one fluid, where said fluid of said fuel has a heat of vaporization and a volatility higher than that of the base fuel and an ignitability that is lower than that of the base fuel and wherein said combustion of said fuel is facilitated while both decreasing heat required and decreasing fuel to air ratios of said fuel required for an ignition of said fuel within said at least one combustion chamber.

19. The combustion system as defined in claim 18, wherein also an effective compression ratio of said engine is elevated to higher than is otherwise practical with only use of said base fuel alone, and thus without use of said fluid.

20. The combustion system as defined in claim 18, whereby an effective compression ratio of said engine is caused to be elevated for said ignition of said fuel under fuel to air ratios of said fuel that can be leaner than otherwise without use of said portion.

21. A process for combustion of a fuel in at least one combustion chamber of a cyclic internal combustion engine, the process comprising:

inserting said fuel and air into said at least one combustion chamber;

generating radical ignition species of said fuel, said generating starting in and continuing from a prior combustion cycle;

regulating at least one portion of said radical ignition species; and selectively modulating ignition of said fuel in said combustion chamber during a later combustion cycle than said prior combustion cycle using at least some of said at least one portion.

22. The process of claim 21, whereby fuel efficiency of said combustion of said fuel is increased.

23. The process of claim 21, whereby combustion efficiency of said combustion of said fuel is increased.

24. The process of claim 21, wherein said generating of said radical ignition species uses radical ignition species of said fuel and OH to impel OH-decomposition of said fuel, where said generating with said OH-decomposition of said fuel starts in and continues from said prior cycle.

25. The process of claim 21, wherein said means for generating radical ignition species uses radical ignition species of said fuel and OH to impel hydrogen atom abstraction from molecules of said fuel by $HO_2$ and OH for decomposition of said fuel and said generation starts in and continues from said prior cycle.

26. The process of claim 21, whereby said combustion of said fuel is facilitated while both decreasing heat required and decreasing fuel to air ratios of said fuel required for said ignition of said fuel within said combustion chamber.

27. The process of claim 26, where said process additionally includes use of boost pressure.

28. The process of claim 21, wherein said fuel is a mixture of a base fuel and at least one fluid, where said fluid of said fuel has a heat of vaporization and a volatility higher than that of the base fuel and an ignitability that is lower than that of the base fuel.

29. The process of claim 21, wherein said fuel is a mixture of a base fuel and at least one fluid, where said fluid of said fuel has a heat of vaporization and a volatility higher than that of the base fuel and an ignitability that is lower than that of the base fuel and wherein said combustion of said fuel is facilitated while both decreasing heat required and decreasing fuel to air ratios of said fuel required for said ignition of said fuel within said combustion chamber.

30. The process of claim 29, wherein also an effective compression ratio of said engine is caused to be elevated to higher than is otherwise practical with only use of said base fuel alone, and thus without use of said fluid.

31. The process of claim 29, wherein also an effective compression ratio of said engine is caused to be elevated for said ignition of said fuel under fuel to air ratios of said fuel that can be leaner than otherwise without using said at least some of said portion.

32. The process of claim 21, whereby combustion stability of said combustion of said fuel is increased.

33. The process of claim 21, wherein said generating radical ignition species uses radical ignition species of said fuel and OH to impel hydrogen atom abstraction from molecules of said fuel by OH for decomposition of said fuel and said generation starts in and continues from said prior cycle.

34. The process of claim 33, where said generating during said prior cycle is occurring both within said combustion chamber and within at least one control-passive mini-chamber connected to said combustion chamber via a plurality of conduits, and where said plurality of conduits together ensures throttled flow between said combustion chamber and said control-passive mini-chamber both during said generating occurring within said combustion chamber before completion of an ignition event of said prior cycle and during said generating occurring within said control-passive mini-chamber in said prior cycle.

35. The process of claim 33, where said generating during said prior cycle is occurring both within said combustion chamber and within at least one control-passive mini-chamber connected to said combustion chamber via a plurality of conduits, and where said plurality of conduits together facilitates throttled flow between said combustion chamber and said control-passive mini-chamber both during said generating occurring within said combustion chamber before completion of an ignition event of said prior cycle and during said generating occurring within said control-passive mini-chamber in said prior cycle.

36. The process of claim 21, wherein:

said regulating at least one portion of said radical ignition species involves transferring said at least one portion; and said transferring results in at least one of the following transfer exchanges:

a. an in flux of said at least one portion from said combustion chamber into a mini-chamber of said engine during a part of said generating occurring in said combustion chamber during said prior cycle, where said mini-chamber is connected to said combustion chamber via a plurality of conduits, and where said part of said generating is occurring in said combustion chamber during said prior cycle;

b. an in flux of said at least one portion from said combustion chamber into a mini-chamber of said engine during a part of said generating occurring in said combustion chamber during said prior cycle, where said mini-chamber is connected to said combustion chamber via a plurality of conduits that together facilitates throttled flow between said combustion chamber and said mini-chamber during said part of said generating, and where said part of said generating is occurring in said combustion chamber during said prior cycle;

c. an in flux of said at least one portion from said combustion chamber into a mini-chamber of said engine during a part of said generating occurring in said combustion chamber during said prior cycle, where said mini-chamber is connected to said combustion chamber via a plurality of conduits, and where said part of said generating is occurring within said combustion chamber in a volume of an unburned quantity of a mixture of said fuel and said air ahead of a path of a flame front as said flame front is propagating during an ignition event of said prior cycle, with said in flux being taken from said volume;

d. an in flux of said at least one portion from said combustion chamber into a mini-chamber of said engine during a part of said generating occurring in said combustion chamber during said prior cycle, where said mini-chamber is connected to said combustion chamber via a plurality of conduits that together facilitates throttled flow between said combustion chamber and said mini-chamber during said part of said generating, and where said part of said generating is occurring within said combustion chamber in a volume of an unburned quantity of a mixture of said fuel and said air ahead of a path of a flame front as said flame front is propagating during an ignition event of said prior cycle, with said in flux being taken from said volume;
e. an out flux of said at least one portion into said combustion chamber after completion of said combustion occurring during said prior cycle, where said out flux is through discharging of said at least one portion from a mini-chamber of said engine to said combustion chamber via a plurality of conduits;
f. an out flux of said at least one portion into said combustion chamber after completion of said combustion occurring during said prior cycle, where said out flux is through discharging of said at least one portion from a mini-chamber that is a control-passive mini-chamber mounted in a periphery forming at least part of said at least one combustion chamber of said engine, and where said discharging is into said combustion chamber via a plurality of conduits;
g. an out flux of said at least one portion into an other of said at least one combustion chamber during said combustion occurring during said prior cycle, where said out flux is through discharging of said at least one portion from a mini-chamber of said engine to said other of said at least one combustion chamber via a plurality of conduits;
h. an out flux of said at least one portion into said combustion chamber after completion of said combustion occurring during said prior cycle, where said out flux is through discharging of said at least one portion from a mini-chamber of said engine to said combustion chamber via a plurality of conduits that together facilitates throttled flow between said combustion chamber and said mini-chamber during at least a percentage of said out flux; and
i. an out flux of said at least one portion into said combustion chamber after completion of said combustion occurring during said prior cycle, where said out flux is through discharging of said at least one portion from a mini-chamber of said engine to said combustion chamber via a plurality of conduits that together facilitates throttled flow between said mini-chamber and said combustion chamber during said out flux.

37. The process of claim 36, wherein timings and durations of said in flux involved in said regulating of said at least one portion is adjusted by setting at least one of the following:
a. position placement of said plurality of conduits relative to position placements of ignition-timing augmentation devices of said combustion chamber;
b. timing of a start of said ignition event of said combustion chamber during said prior cycle, where said start of said ignition event in said prior cycle is facilitated by an ignition-timing augmentation device associated with said combustion chamber;
c. timing of a start of said ignition event of said combustion chamber during said prior cycle, where said start of said ignition event in said prior cycle is facilitated by an ignition-timing augmentation device located within said combustion chamber;
d. timing of a start of an ignition event of said combustion chamber during said prior cycle, where said start of said ignition event in said prior cycle is facilitated by an ignition-timing augmentation device associated with said combustion chamber, and
e. timing of a start of an ignition event of said combustion chamber during said prior cycle, where said start of said ignition event in said prior cycle is facilitated by an ignition-timing augmentation device located within said combustion chamber.

38. The process of claim 36, wherein timings and durations of said flux included in said regulating of said at least one portion are adjusted by controlling at least one of the following:
a. timing of a start of said flux,
b. timing of a completion of said flux,
c. mass flow rate of said flux,
d. position placements of said plurality of conduits relative to position placements of ignition-timing augmentation devices of said combustion chamber;
e. timing of a start of an ignition event of said combustion chamber during said prior cycle, where said start of said ignition event is facilitated by an ignition-timing augmentation device;
f. timing of a start of said ignition event of said combustion chamber during said prior cycle, where said start of said ignition event is facilitated by an ignition-timing augmentation device;
g. timing of a start of said an ignition event in said combustion chamber during said prior cycle, where said timing of said start of said ignition event is facilitated via adjusting a presence of said radical ignition species in said combustion chamber during said prior cycle;
h. timing of a start of said ignition event in said combustion chamber during said prior cycle, where said timing of said start of said ignition event is facilitated via adjusting a presence of said radical ignition species in said combustion chamber during said prior cycle; and
i. timing of a start of burning in a secondary chamber that is different from said mini-chamber, where said secondary chamber is a control-active mini-chamber that is also connected to said combustion chamber, where said controlling of said timing is by a mini-chamber RI-species generation-control augmentation device serving as an initiation device for a flame front propagated burning within said secondary chamber during said prior cycle.

39. The process of claim 21, wherein at least part of said generating occurs within at least one of the following:
a. a control-active mini-chamber, wherein during an intake event of said prior cycle a means is employed to kindle and burn gases of said control-active mini-chamber;
b. a control-active mini-chamber, wherein during an intake event of said later cycle a means is employed to kindle and burn gases of said control-active mini-chamber to push at least some percentage of heretofore resident radical ignition species of said control-active mini-chamber out into said combustion chamber via at least one conduit while also engendering more of said generating within said control-active mini-chamber during said later cycle;
c. a control-active mini-chamber, wherein during an intake event of said later cycle a means is employed to kindle and burn fuel-rich gases of said control-active mini-chamber to push at least some percentage of heretofore resident radical ignition species of said control-active mini-chamber out into said combustion chamber via at least one conduit while engendering more of said generating within said control-active mini-chamber during said later cycle;

d. a control-active mini-chamber, wherein during a main-compression event of said prior cycle a means is employed to kindle and burn gases of said control-active mini-chamber;
e. a control-active mini-chamber, wherein during a main-compression event of said later cycle a means is employed to kindle and burn gases of said control-active mini-chamber to push at least some percentage of heretofore resident radical ignition species of said control-active mini-chamber out into said combustion chamber via at least one conduit while also engendering more of said generating within said control-active mini-chamber during said later cycle;
f. a control-active mini-chamber, wherein during a main-compression event of said later cycle a means is employed to kindle and burn fuel-rich gases of said control-active mini-chamber to push at least some percentage of heretofore resident radical ignition species of said control-active mini-chamber out into said combustion chamber via at least one conduit while engendering more of said generating within said control-active mini-chamber during said later cycle;
g. a mini-chamber connected to said combustion chamber via a plurality of conduits that together facilitate throttled flow between said combustion chamber and said mini-chamber;
h. a mini-chamber connected to said combustion chamber via a plurality of conduits that together facilitate throttled flow between said mini-chamber and said combustion chamber during said prior cycle;
i. a mini-chamber connected to said combustion chamber via a plurality of conduits that together facilitate throttled flow between said combustion chamber and said mini-chamber during said at least part of said generating;
j. a mini-chamber connected to said combustion chamber via a plurality of conduits that together facilitate throttled flow between said mini-chamber and said combustion chamber while said mini-chamber is performing said at least one part of said generating during said prior cycle;
k. a mini-chamber connected to said combustion chamber via at least one conduit;
l. a control-passive mini-chamber located in a periphery forming at least part of said combustion chamber and connected to said combustion chamber via a plurality of conduits;
m. said combustion chamber of said engine during said later cycle prior to start of said ignition;
n. said combustion chamber of said engine during said later cycle prior to completion of said ignition of said later cycle when said ignition is via a propagating flame front;
o. said combustion chamber of said engine during said ignition of said later cycle when said ignition is via said propagating flame front;
p. said combustion chamber of said engine during said prior cycle after a combustion event of said prior cycle;
q. said combustion chamber of said engine during said prior cycle during an ignition event of said prior cycle;
r. said combustion chamber of said engine during said prior cycle after completion of an ignition event of said prior cycle;
s. a volume within said combustion chamber during said prior cycle, said volume containing an unburned mixture of previous fuel and previous air of said prior cycle, and where said volume is located ahead of a path of a flame front as said flame front is propagating in said combustion chamber during an ignition event of said prior cycle occurring within said combustion chamber of said engine; and
t. a volume within said combustion chamber during said later cycle, said volume containing an unburned mixture of said air and said fuel of said later cycle, and where said volume is located ahead of a path of a flame front as said flame front is propagating in said combustion chamber during said ignition.

40. The process of claim 21, wherein said generating radical ignition species uses radical ignition species of said fuel and OH to impel hydrogen atom abstraction from molecules of said fuel by OH for decomposition of said fuel, and said generation starts in and continues from said prior cycle.

41. The process of claim 40, wherein said generating occurs during earlier periods and later periods, with said earlier periods of said generating occurring during said prior cycle and resulting in shares of said at least one portion, with said regulating including utilizing at least part of said shares for said generating of said later periods, and with said generating of said later periods resulting in additions to said at least one portion for at least partial inclusion within said at least some of said at least one portion in said later cycle, wherein said generating of said later periods is occurring within at least one of the following chambers of said cyclic engine during said later cycle:
a. a control-active mini-chamber, wherein during an intake event of said later cycle means are employed to kindle and burn gases of said control-active mini-chamber for said generating of said later periods resulting in said additions to said at least one portion, and also to a discharge of said radical ignition species resident within said control-active mini-chamber out into said combustion chamber via at least one connecting conduit;
b. a control-active mini-chamber, wherein during an intake event of said later cycle means are employed to kindle and burn gases of said control-active mini-chamber for said generating of said later periods resulting in said additions to said at least one portion, and also to a discharge of said radical ignition species heretofore resident within said control-active mini-chamber out into said combustion chamber via at least one connecting conduit;
c. a control-active mini-chamber, wherein during an intake event of said later cycle means are employed to kindle and burn fuel-rich gases of said control-active mini-chamber for said generating of said later periods resulting in said additions to said at least one portion, and also to a discharge of said radical ignition species resident within said control-active mini-chamber out into said combustion chamber via at least one connecting conduit;
d. a control-active mini-chamber, wherein during a main-compression event of said later cycle means are employed to kindle and burn gases of said control-active mini-chamber for said generating of said later periods resulting in said additions to said at least one portion, and also to a discharge of said radical ignition species resident within said control-active mini-chamber out into said combustion chamber via at least one connecting conduit;
e. a control-active mini-chamber, wherein during a main-compression event of said later cycle means are employed to kindle and burn gases of said control-active mini-chamber for said generating of said later periods resulting in said additions to said at least one portion, and also to a discharge of said radical ignition species heretofore resident within said control-active mini-chamber out into said combustion chamber via at least one connecting conduit;
f. a control-active mini-chamber, wherein during a main-compression event of said later cycle means are employed to kindle and burn fuel-rich gases of said control-active mini-chamber for said generating of said later periods resulting in said additions, and to also a discharge of said radical ignition species resident within said control-active mini-chamber out into said combustion chamber via at least one connecting conduit;
g. said combustion chamber, during a main-compression event of said later cycle;
h. said combustion chamber, during said ignition of said later cycle; and
i. said combustion chamber, during an early period within an expansion event of said later cycle.

42. The process of claim 41, where at least some part of said radical ignition species resident within said control-active mini-chamber are from said generating occurring in said prior cycle.

43. The process of claim 21, where said engine contains at least one control-passive mini-chamber and where additionally:
some amount of said generating in said prior cycle is occurring inside volumes within said combustion chamber positioned ahead of a path of a propagating flame front during an ignition event of said combustion chamber in said prior cycle, where unburned masses of said air and said fuel are located within said volumes, and where said some amount of said generating occurring within said volumes is resulting in unburned masses generated quantities of said radical ignition species;
said regulating includes transferring partials of said unburned masses generated quantities of said radical ignition species into said at least one control-passive mini-chamber via conduits during said generating of said unburned masses generated quantities;
said partials are being transferred from said volumes ahead of said path of said flame front as said flame front is propagating; and
thereby said partials are being re-located to within said at least one control-passive mini-chamber during said prior cycle for facilitating further of said generating radical ignition species therein and thereafter.

44. The process of claim 43, where said regulating by said transferring partials of said unburned masses generated quantities of said radical ignition species into said at least one control-passive mini-chamber is further controlled by adjusting timings of a start of said ignition event of said combustion chamber in said prior cycle by an ignition-timing augmentation device.

45. The process of claim 43, where said engine additionally contains at least one control-active mini-chamber connected to said combustion chamber via conduits and where said control-active mini-chamber is configured with a plurality of species generation-control augmentation devices.

46. The process of claim 45, wherein said plurality of species generation-control augmentation devices are accomplishing at least one of the following functions:
a. adding quantities oxygen to said control-active mini-chamber;
b. adding controlled quantities oxygen to said control-active mini-chamber;
c. adding quantities said fuel to said control-active mini-chamber;
d. adding controlled quantities said fuel to said control-active mini-chamber;
e. adding quantities of said radical ignition species to said control-active mini-chamber;
f. controlling additions of said radical ignition species to said control-active mini-chamber;
g. adding controlled quantities said OH to said control-active mini-chamber;
h. controlling additions of quantities of the OH to said control-active mini-chamber
i. adding quantities of heat to said control-active mini-chamber;
j. adding controlled quantities of heat to said control-active mini-chamber;
k. adding quantities of heat to said control-active mini-chamber using a mini-chamber RI-species generation-control augmentation device serving as an ignition initiation device;
l. controlling start of combustion timings in said control-active mini-chamber using a mini-chamber RI-species generation-control augmentation device serving as an ignition initiation device for a flame front propagated burning therein;
m. adding quantities of heat to said control-active mini-chamber using a mini-chamber RI-species generation-control augmentation device serving as a spark initiation device;
n. controlling start of combustion timings in said control-active mini-chamber using a mini-chamber RI-species generation-control augmentation device serving as a spark initiation device for a flame front propagated burning therein;
o. adding controlled quantities of heat to said control-active mini-chamber using a mini-chamber RI-species generation-control augmentation device serving as a laser discharge device;
p. controlling start of combustion timings in said control-active mini-chamber using a mini-chamber RI-species generation-control augmentation device serving as a laser discharge device for a flame front propagated burning therein;
q. adding quantities of heat using a mini-chamber RI-species generation-control augmentation device serving as a plasma generating device; and
r. controlling start of combustion timings in said control-active mini-chamber using a mini-chamber RI-species generation-control augmentation device serving as a plasma generating device for a flame front propagated burning therein.

47. The process of claim 45, wherein said plurality of species generation-control augmentation devices are accomplishing the following:
a. adding quantities of said air to said control-active mini-chamber,
b. add quantities of said fuel to said control-active mini-chamber, and
c. add quantities of heat using a mini-chamber RI-species generation-control augmentation device serving as serving as an initiation means for a timed flame front propagated burning of said air and said fuel within said control-active mini-chamber,
whereby also a resultant quantity of said radical ignition species, consequence of said generating occurring due to said timed flame front propagated burning within said control-active mini-chamber, are subsequently transfer out into said combustion chamber via an out flux discharge through said conduits.

48. The process of claim 47, where said regulating by said transferring partials of said unburned masses generated quantities into said control-passive mini-chambers is further controlled by adjusting timings of a start of an ignition event of said combustion chamber in said prior cycle by an ignition-timing augmentation device.

49. The process of claim 47, where said timed flame front propagated burning occurs within said control-active mini-chamber during said later cycle for said modulating of said ignition during said later cycle.

50. The process of claim 49, wherein in addition to said quantities of said air and said quantities of said fuel, there are at the same time also quantities of said radical ignition species heretofore resident in said control-active mini-chamber from said prior cycle.

51. The process of claim 47, where said timed flame front propagated burning occurs within said control-active mini-chamber during said prior cycle.

52. The process of claim 51, wherein in addition to said quantities of said air and said quantities of said fuel, there are at the same time also quantities of said radical ignition species heretofore resident in said control-active mini-chamber from an equivalent combustion cycle to said later cycle but occurring before said prior cycle.

53. The process of claim 43, where said process additionally includes use of recycled exhaust gases.

54. The process of claim 43, where said process additionally includes use of boost pressure.

55. The process of claim 21 utilizing both control-active and control-passive mini-chambers during said prior cycle,
wherefore said engine contains at least one control-active mini-chamber having a plurality of species generation-control augmentation devices for utilization by said at least one control-active mini-chamber for both providing therein and igniting therein quantities of said air and said fuel for facilitating one part of said generating radical ignition species, where said one part of said generating is occurring in said at least one control-active mini-chamber during said prior cycle for transfer by conduits into said combustion chamber during said prior cycle for use in a combustion event therein during said prior cycle, and
wherefore also, as a part of said regulating of said at least one portion, said cyclic engine contains at least one control-passive mini-chamber connected to said combustion chamber via conduits, where for affecting said later cycle, said part of said regulating includes receiving within said at least one control-passive mini-chamber an influx by transfer during said prior cycle and sometime after said facilitating of said one part of said generating, and where included in said influx is at least one of the following:
percentages of said radical ignition species from an other part of said generating where said other part is occurring in said combustion chamber within an ignition event of said prior cycle;
fractions of OH created during a combustion event started by an ignition event in said combustion chamber during said prior cycle;
quantities of combustion gases created during a combustion event started by an ignition event in said combustion chamber during said prior cycle; and
partials of said radical ignition species from said one part of said generating in said at least one control-active mini-chamber.

56. The process of claim 55, where in addition to said quantities of said air and said fuel, prior to and for helping said facilitating of said one part of said generating, there are at the same time also quantities of said radical ignition species located within said at least one control-active mini-chamber, where said quantities of said radical ignition species are heretofore resident from an equivalent combustion cycle to said later cycle but occurring before said prior cycle in said cyclic internal combustion engine.

* * * * *